US012154218B2

(12) United States Patent
Manzari et al.

(10) Patent No.: US 12,154,218 B2
(45) Date of Patent: Nov. 26, 2024

(54) USER INTERFACES SIMULATED DEPTH EFFECTS

(71) Applicant: Apple Inc., Cupertino, CA (US)

(72) Inventors: Johnnie B. Manzari, San Francisco, CA (US); Alan C. Dye, San Francisco, CA (US); Richard David Seely, San Jose, CA (US); Andre Souza Dos Santos, San Jose, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 17/846,962

(22) Filed: Jun. 22, 2022

(65) Prior Publication Data

US 2022/0319100 A1 Oct. 6, 2022

Related U.S. Application Data

(63) Continuation of application No. 16/144,629, filed on Sep. 27, 2018, now Pat. No. 11,468,625.

(60) Provisional application No. 62/729,926, filed on Sep. 11, 2018.

(51) Int. Cl.

| | |
|---|---|
| ***G06T 15/10*** | (2011.01) |
| ***G06F 3/04815*** | (2022.01) |
| ***G06F 3/04847*** | (2022.01) |
| ***G06F 3/05*** | (2006.01) |
| ***G06T 7/50*** | (2017.01) |

(52) U.S. Cl.

CPC .......... *G06T 15/10* (2013.01); *G06F 3/04815* (2013.01); *G06F 3/04847* (2013.01); *G06T 7/50* (2017.01)

(58) Field of Classification Search

None

See application file for complete search history.

(56) References Cited

U.S. PATENT DOCUMENTS

| | | | |
|---|---|---|---|
| 4,518,237 | A | 5/1985 | Mizokami |
| 4,933,702 | A | 6/1990 | Komatsuzaki et al. |
| 5,463,443 | A | 10/1995 | Tanaka et al. |
| 5,557,358 | A | 9/1996 | Mukai et al. |
| 5,615,384 | A | 3/1997 | Allard et al. |
| 5,825,353 | A | 10/1998 | Will |
| 6,262,769 | B1 | 7/2001 | Anderson et al. |

(Continued)

FOREIGN PATENT DOCUMENTS

| | | | |
|---|---|---|---|
| AU | 2013368443 | B2 | 3/2016 |
| AU | 2017100683 | B4 | 1/2018 |

(Continued)

OTHER PUBLICATIONS

Junxiang, Zhang, "Playing My New iPad", The Publishing House of Ordinance Industry, Sep. 30, 2012, pp. 217-219.

(Continued)

*Primary Examiner* — Saptarshi Mazumder

(74) *Attorney, Agent, or Firm* — DLA Piper LLP (US)

(57) ABSTRACT

The present disclosure generally relates to user interfaces for adjusting simulated image effects. In some embodiments, user interfaces for adjusting a simulated depth effect is described. In some embodiments, user interfaces for displaying adjustments to a simulated depth effect is described. In some embodiments, user interfaces for indicating an interference to adjusting simulated image effects is described.

42 Claims, 57 Drawing Sheets

(56) References Cited

U.S. PATENT DOCUMENTS 6,268,864 B1 7/2001 Chen et al.
6,278,466 B1 8/2001 Chen
6,359,837 B1 3/2002 Tsukamoto
6,429,896 B1 8/2002 Aruga et al.
6,483,878 B1 11/2002 Yonezawa et al.
6,522,347 B1 2/2003 Sakai et al.
6,621,524 B1 9/2003 Iijima et al.
6,677,981 B1 1/2004 Mancuso et al.
6,809,724 B1 10/2004 Shiraishi et al.
6,809,759 B1 10/2004 Chiang
6,819,867 B2 11/2004 Mayer et al.
6,900,840 B1 5/2005 Schinner et al.
6,985,854 B1 1/2006 Mitsui
7,417,680 B2 8/2008 Aoki et al.
7,463,304 B2 12/2008 Murray
7,515,178 B1 4/2009 Fleischman et al.
7,583,892 B2 9/2009 Okumura
8,073,207 B2 12/2011 Ayaki et al.
8,185,839 B2 5/2012 Jalon et al.
8,189,087 B2 5/2012 Misawa et al.
8,203,640 B2 6/2012 Kim et al.
8,295,546 B2 10/2012 Craig et al.
8,350,945 B2 1/2013 Yumiki
8,390,628 B2 3/2013 Harding et al.
8,405,680 B1 3/2013 Gomes et al.
8,423,089 B2 4/2013 Song et al.
8,493,408 B2 7/2013 Williamson et al.
8,576,304 B2 11/2013 Ishibashi
8,624,836 B1 1/2014 Miller et al.
8,638,371 B2 1/2014 Laberge et al.
8,675,084 B2 3/2014 Bolton et al.
8,723,988 B2 5/2014 Thorn
8,736,704 B2 5/2014 Jasinski et al.
8,736,716 B2 5/2014 Prentice
8,742,890 B2 6/2014 Gocho et al.
8,762,895 B2 6/2014 Mehta et al.
8,817,158 B2 8/2014 Saito
8,848,097 B2 9/2014 Makii
8,885,978 B2 11/2014 Cote et al.
8,896,652 B2 11/2014 Ralston
8,922,588 B2 12/2014 Makino et al.
9,001,226 B1 4/2015 Ng et al.
9,024,938 B2 * 5/2015 Joshi ........................ G06T 19/20 345/419
9,077,896 B2 7/2015 Park et al.
9,094,576 B1 7/2015 Karakotsios
9,143,692 B2 9/2015 Hayashi
9,153,031 B2 10/2015 El-Saban et al.
9,158,974 B1 10/2015 Laska et al.
9,172,866 B2 10/2015 Ito et al.
9,185,291 B1 11/2015 Shabtay et al.
9,207,837 B2 12/2015 Paretti et al.
9,223,486 B2 12/2015 Shin et al.
9,230,241 B1 1/2016 Singh et al.
9,230,306 B2 * 1/2016 Sun ...................... H04N 5/2621
9,230,355 B1 1/2016 Ahuja et al.
9,245,177 B2 1/2016 Perez
9,246,961 B2 1/2016 Walkin et al.
9,250,797 B2 2/2016 Roberts et al.
9,264,660 B1 2/2016 Petterson et al.
9,288,476 B2 3/2016 Sandrew et al.
9,298,263 B2 3/2016 Geisner et al.
9,313,397 B2 4/2016 Harris et al.
9,313,401 B2 4/2016 Frey et al.
9,325,970 B2 4/2016 Sakayori
9,342,230 B2 5/2016 Bastien et al.
9,349,414 B1 5/2016 Furment et al.
9,360,671 B1 6/2016 Zhou
9,423,868 B2 8/2016 Iwasaki
9,448,708 B1 9/2016 Bennett et al.
9,451,144 B2 9/2016 Dye
9,467,812 B2 10/2016 Jung et al.
9,507,420 B2 11/2016 Tartz et al.
9,544,563 B1 1/2017 Cheng et al.
9,592,428 B2 3/2017 Binder
9,600,178 B2 3/2017 Yun et al.
9,602,559 B1 3/2017 Barros et al.
9,609,221 B2 3/2017 Kim et al.
9,626,589 B1 4/2017 Graham et al.
9,628,416 B2 4/2017 Henderson
9,667,881 B2 5/2017 Harris et al.
9,686,497 B1 6/2017 Terry
9,704,250 B1 7/2017 Gilmour et al.
9,716,825 B1 7/2017 Manzari et al.
9,747,504 B2 8/2017 Ma et al.
9,749,543 B2 8/2017 Kim et al.
9,760,976 B2 9/2017 Kameyama
9,767,613 B1 9/2017 Bedikian et al.
9,819,912 B2 11/2017 Maruta
9,874,933 B1 1/2018 Carryer
9,913,246 B1 3/2018 Carey et al.
9,942,463 B2 4/2018 Kuo et al.
9,948,589 B2 4/2018 Gonnen et al.
9,973,674 B2 5/2018 Dye et al.
10,015,298 B2 7/2018 Yang et al.
10,021,294 B2 7/2018 Kwon et al.
10,055,887 B1 8/2018 Gil et al.
10,091,411 B2 10/2018 Ha et al.
10,095,385 B2 10/2018 Walkin et al.
10,127,639 B2 * 11/2018 Miura ................ G02B 27/0075
10,139,218 B2 11/2018 Matsushita
10,152,222 B2 12/2018 Ozawa et al.
10,176,622 B1 1/2019 Waggoner et al.
10,187,587 B2 1/2019 Hasinoff et al.
10,225,463 B2 3/2019 Yun et al.
10,230,901 B2 3/2019 Harris et al.
10,270,983 B1 4/2019 Van Os et al.
10,289,265 B2 5/2019 Kulkarni
10,297,034 B2 5/2019 Nash et al.
10,304,231 B2 5/2019 Saito
10,313,652 B1 6/2019 Falstrup et al.
10,325,417 B1 6/2019 Scapel et al.
10,326,942 B2 6/2019 Shabtay et al.
10,345,592 B2 7/2019 Samec et al.
10,375,313 B1 8/2019 Van Os et al.
10,379,719 B2 8/2019 Scapel et al.
10,397,469 B1 8/2019 Yan et al.
10,397,500 B1 8/2019 Xu et al.
10,447,908 B2 10/2019 Lee et al.
10,467,729 B1 11/2019 Perera et al.
10,467,775 B1 11/2019 Waggoner et al.
10,521,091 B2 12/2019 Anzures et al.
10,521,948 B2 12/2019 Rickwald et al.
10,523,879 B2 12/2019 Dye et al.
10,574,895 B2 2/2020 Lee et al.
10,585,551 B2 3/2020 Lee et al.
10,614,139 B2 4/2020 Fujioka et al.
10,638,058 B2 4/2020 Matsunaga
10,645,294 B1 5/2020 Manzari et al.
10,652,470 B1 5/2020 Manzari et al.
10,657,695 B2 5/2020 Chand et al.
10,659,405 B1 5/2020 Chang et al.
10,674,072 B1 6/2020 Manzari et al.
10,681,282 B1 6/2020 Manzari et al.
10,681,341 B2 6/2020 Lutter et al.
10,698,575 B2 6/2020 Walkin et al.
10,735,642 B1 8/2020 Manzari et al.
10,735,643 B1 8/2020 Manzari et al.
10,791,273 B1 9/2020 Manzari et al.
10,798,035 B2 10/2020 Lewis et al.
10,845,968 B2 11/2020 Scapel et al.
10,855,910 B2 12/2020 Tano et al.
10,902,661 B1 1/2021 Mourkogiannis et al.
10,938,758 B2 3/2021 Allen et al.
10,958,850 B2 3/2021 Kwak et al.
11,032,535 B2 6/2021 Lutter et al.
11,032,536 B2 6/2021 Lutter et al.
11,039,074 B1 6/2021 Manzari et al.
11,054,973 B1 7/2021 Manzari et al.
11,070,717 B2 7/2021 Cragg et al.
11,120,528 B1 9/2021 Seely et al.
11,140,313 B1 10/2021 Knott
11,212,449 B1 12/2021 Manzari et al.
11,321,857 B2 5/2022 Stauber et al.

(56) References Cited

U.S. PATENT DOCUMENTS 11,350,026 B1 5/2022 Manzari et al.
11,399,155 B2 7/2022 Van Os et al.
11,418,699 B1 8/2022 Manzari et al.
11,431,891 B2 8/2022 O'Leary et al.
11,468,625 B2 10/2022 Manzari et al.
11,490,017 B2 11/2022 Bernstein et al.
11,539,876 B2 12/2022 Manzari et al.
11,550,420 B2 1/2023 Bovet et al.
11,570,359 B2 1/2023 Lee et al.
11,606,496 B2 3/2023 Watanabe et al.
11,747,969 B1 9/2023 Karunamuni
11,778,339 B2 10/2023 Manzari et al.
11,811,961 B2 11/2023 Zhang et al.
2002/0070945 A1 6/2002 Kage
2002/0140803 A1 10/2002 Gutta et al.
2002/0167604 A1 11/2002 Ban et al.
2002/0171737 A1 11/2002 Tullis et al.
2003/0025802 A1 2/2003 Mayer, Jr. et al.
2003/0075409 A1 4/2003 Bauer et al.
2003/0107664 A1 6/2003 Suzuki
2003/0122930 A1 7/2003 Schofield et al.
2003/0160756 A1 8/2003 Numano
2003/0174216 A1 9/2003 Iguchi et al.
2003/0184587 A1 10/2003 Ording et al.
2004/0027369 A1 2/2004 Kellock et al.
2004/0041924 A1 3/2004 White et al.
2004/0061796 A1 4/2004 Honda et al.
2004/0090469 A1 5/2004 Moon et al.
2004/0095473 A1 5/2004 Park
2004/0189861 A1 9/2004 Tom et al.
2004/0201699 A1 10/2004 Parulski et al.
2005/0024517 A1 2/2005 Luciano
2005/0027515 A1 2/2005 Huang et al.
2005/0134695 A1 6/2005 Deshpande et al.
2005/0189419 A1 9/2005 Igarashi et al.
2005/0206981 A1 9/2005 Hung
2005/0210380 A1 9/2005 Kramer et al.
2005/0210403 A1 9/2005 Satanek
2005/0237383 A1 10/2005 Soga et al.
2005/0248660 A1 11/2005 Stavely et al.
2005/0270397 A1 12/2005 Battles
2006/0026521 A1 2/2006 Hotelling et al.
2006/0033831 A1 2/2006 Ejima et al.
2006/0132482 A1 6/2006 Oh et al.
2006/0158730 A1 7/2006 Kira
2006/0170781 A1 8/2006 Sobol
2006/0187322 A1 8/2006 Janson et al.
2006/0209067 A1 9/2006 Pellacini et al.
2006/0228040 A1 10/2006 Simon et al.
2006/0233192 A1 10/2006 Mihara
2006/0275025 A1 12/2006 Labaziewicz et al.
2007/0024614 A1 2/2007 Tam et al.
2007/0025711 A1 2/2007 Marcus et al.
2007/0025714 A1 2/2007 Shiraki
2007/0025723 A1 2/2007 Baudisch et al.
2007/0031062 A1 2/2007 Pal et al.
2007/0040810 A1 2/2007 Dowe et al.
2007/0097088 A1 5/2007 Battles
2007/0101355 A1 5/2007 Chung et al.
2007/0109417 A1 5/2007 Hyttfors et al.
2007/0113099 A1 5/2007 Takikawa et al.
2007/0140675 A1 6/2007 Yanagi et al.
2007/0146503 A1 6/2007 Shiraki
2007/0153112 A1 7/2007 Ueda et al.
2007/0165103 A1 7/2007 Arima et al.
2007/0195350 A1 8/2007 Hattori
2007/0222789 A1 9/2007 Yoshio et al.
2007/0228259 A1 10/2007 Hohenberger
2007/0254640 A1 11/2007 Bliss
2007/0257992 A1 11/2007 Kato
2007/0273769 A1 11/2007 Takahashi
2007/0291152 A1 12/2007 Suekane et al.
2008/0030592 A1 2/2008 Border et al.
2008/0084484 A1 4/2008 Ochi et al.
2008/0106601 A1 5/2008 Matsuda
2008/0129759 A1 6/2008 Jeon et al.
2008/0129825 A1 6/2008 Deangelis et al.
2008/0131019 A1 6/2008 Ng
2008/0143840 A1 6/2008 Corkum et al.
2008/0192020 A1 8/2008 Kang et al.
2008/0218611 A1 9/2008 Parulski et al.
2008/0219654 A1 9/2008 Border et al.
2008/0222558 A1 9/2008 Cho et al.
2008/0259154 A1 10/2008 Garrison et al.
2008/0284855 A1 11/2008 Umeyama et al.
2008/0297587 A1 12/2008 Kurtz et al.
2008/0298571 A1 12/2008 Kurtz et al.
2008/0309811 A1 12/2008 Fujinawa et al.
2009/0009612 A1 1/2009 Tico et al.
2009/0021576 A1 1/2009 Linder et al.
2009/0021600 A1 1/2009 Watanabe
2009/0022422 A1 1/2009 Sorek et al.
2009/0027515 A1 1/2009 Maruyama et al.
2009/0027539 A1 1/2009 Kunou
2009/0040332 A1 2/2009 Yoshino et al.
2009/0046097 A1 2/2009 Franklin
2009/0051783 A1 2/2009 Kim et al.
2009/0066817 A1 3/2009 Sakamaki
2009/0073285 A1 3/2009 Terashima
2009/0077460 A1 3/2009 Li et al.
2009/0102918 A1 4/2009 Sakamoto et al.
2009/0102933 A1 4/2009 Harris et al.
2009/0109316 A1 4/2009 Matsui
2009/0144639 A1 6/2009 Nims et al.
2009/0167671 A1 7/2009 Kerofsky
2009/0167672 A1 7/2009 Kerofsky
2009/0175511 A1 7/2009 Lee et al.
2009/0227295 A1 9/2009 Kim
2009/0244318 A1 10/2009 Makii
2009/0251484 A1 10/2009 Zhao et al.
2009/0263044 A1 10/2009 Imagawa et al.
2009/0271705 A1 10/2009 Sheng et al.
2009/0276700 A1 11/2009 Anderson et al.
2009/0315671 A1 12/2009 Gocho et al.
2009/0319897 A1 12/2009 Kotler et al.
2009/0322901 A1 12/2009 Subbotin et al.
2010/0020221 A1 1/2010 Tupman et al.
2010/0020222 A1 1/2010 Jones et al.
2010/0033615 A1 2/2010 Mori
2010/0039522 A1 2/2010 Huang
2010/0042926 A1 2/2010 Bull et al.
2010/0066853 A1 3/2010 Aoki et al.
2010/0066889 A1 3/2010 Ueda et al.
2010/0066890 A1 3/2010 Ueda et al.
2010/0066895 A1 3/2010 Ueda et al.
2010/0093400 A1 4/2010 Ju et al.
2010/0097322 A1 4/2010 Hu et al.
2010/0123737 A1 5/2010 Williamson et al.
2010/0124941 A1 5/2010 Cho
2010/0153847 A1 6/2010 Fama
2010/0162160 A1 6/2010 Stallings et al.
2010/0164893 A1 7/2010 Shin et al.
2010/0188426 A1 7/2010 Ohmori et al.
2010/0194931 A1 8/2010 Kawaguchi et al.
2010/0208122 A1 8/2010 Yumiki
2010/0231735 A1 9/2010 Burian et al.
2010/0231777 A1 9/2010 Shintani et al.
2010/0232703 A1 9/2010 Aiso
2010/0232704 A1 9/2010 Thorn
2010/0238327 A1 9/2010 Griffith et al.
2010/0245287 A1 9/2010 Thorn
2010/0259645 A1 10/2010 Kaplan et al.
2010/0277470 A1 11/2010 Margolis
2010/0283743 A1 11/2010 Coddington
2010/0289825 A1 11/2010 Shin et al.
2010/0289910 A1 11/2010 Kamshilin et al.
2010/0302280 A1 12/2010 Szeliski et al.
2010/0317410 A1 12/2010 Song et al.
2011/0008033 A1 1/2011 Ichimiya et al.
2011/0013049 A1 1/2011 Thörn
2011/0018970 A1 1/2011 Wakabayashi
2011/0019058 A1 1/2011 Sakai et al.
2011/0043662 A1 2/2011 Kim
2011/0050864 A1 3/2011 Bond

(56) References Cited

U.S. PATENT DOCUMENTS

2011/0058052 A1 3/2011 Bolton et al.
2011/0072394 A1 3/2011 Victor et al.
2011/0074710 A1 3/2011 Weeldreyer et al.
2011/0074830 A1 3/2011 Rapp et al.
2011/0085016 A1 4/2011 Kristiansen et al.
2011/0109581 A1 5/2011 Ozawa et al.
2011/0115932 A1 5/2011 Shin et al.
2011/0138332 A1 6/2011 Miyagawa
2011/0157379 A1 6/2011 Kimura
2011/0176039 A1 7/2011 Lo
2011/0187879 A1 8/2011 Ochiai
2011/0199495 A1 8/2011 Laberge et al.
2011/0221755 A1 9/2011 Geisner et al.
2011/0234853 A1 9/2011 Hayashi et al.
2011/0242369 A1 10/2011 Misawa et al.
2011/0249073 A1 10/2011 Cranfill et al.
2011/0249078 A1 10/2011 Abuan et al.
2011/0296163 A1 12/2011 Abernethy et al.
2011/0304632 A1 12/2011 Evertt et al.
2012/0002898 A1 1/2012 Côtéet al.
2012/0011456 A1 1/2012 Noda et al.
2012/0019551 A1 1/2012 Pettigrew et al.
2012/0026378 A1 2/2012 Pang et al.
2012/0036480 A1 2/2012 Warner et al.
2012/0056830 A1 3/2012 Suzuki et al.
2012/0056997 A1 3/2012 Jang
2012/0057064 A1 3/2012 Gardiner et al.
2012/0069028 A1 3/2012 Bouguerra
2012/0069206 A1 3/2012 Hsieh
2012/0079378 A1 3/2012 Goossens
2012/0105579 A1 5/2012 Jeon et al.
2012/0120277 A1 5/2012 Tsai et al.
2012/0127189 A1 5/2012 Park et al.
2012/0127346 A1 5/2012 Sato et al.
2012/0133797 A1 5/2012 Sato et al.
2012/0162242 A1 6/2012 Amano et al.
2012/0162455 A1 6/2012 Kim et al.
2012/0169776 A1 7/2012 Rissa et al.
2012/0188394 A1 7/2012 Park et al.
2012/0194559 A1 8/2012 Lim
2012/0206452 A1 8/2012 Geisner et al.
2012/0206495 A1 8/2012 Endo et al.
2012/0206619 A1 8/2012 Nitta et al.
2012/0206621 A1 8/2012 Chen et al.
2012/0235990 A1 9/2012 Yamaji
2012/0243802 A1 9/2012 Fintel et al.
2012/0249853 A1 10/2012 Krolczyk et al.
2012/0274830 A1 11/2012 Kameyama et al.
2012/0293611 A1 11/2012 Lee
2012/0308209 A1 12/2012 Zaletel
2012/0309520 A1 12/2012 Evertt et al.
2012/0313973 A1 12/2012 Li et al.
2012/0320141 A1 12/2012 Bowen et al.
2013/0009858 A1 1/2013 Lacey
2013/0010170 A1 1/2013 Matsuzawa et al.
2013/0038546 A1 2/2013 Mineo
2013/0038771 A1 2/2013 Brunner et al.
2013/0055119 A1 2/2013 Luong
2013/0057472 A1 3/2013 Dizac et al.
2013/0076908 A1 3/2013 Bratton et al.
2013/0083222 A1 4/2013 Matsuzawa et al.
2013/0088413 A1 4/2013 Raffle et al.
2013/0088614 A1 4/2013 Lee
2013/0091298 A1 4/2013 Ozzie et al.
2013/0093904 A1 4/2013 Wagner et al.
2013/0101164 A1 4/2013 Leclerc et al.
2013/0109425 A1 5/2013 Kerger et al.
2013/0135315 A1 5/2013 Bares et al.
2013/0141362 A1 6/2013 Asanuma et al.
2013/0141513 A1 6/2013 Setton et al.
2013/0141524 A1 6/2013 Karunamuni et al.
2013/0147933 A1 6/2013 Kulas et al.
2013/0155308 A1 6/2013 Wu et al.
2013/0155474 A1 6/2013 Roach et al.
2013/0159900 A1 6/2013 Pendharkar
2013/0165186 A1 6/2013 Choi
2013/0179831 A1 7/2013 Izaki
2013/0194378 A1 8/2013 Brown
2013/0201104 A1 8/2013 Ptucha et al.
2013/0201203 A1 8/2013 Warner
2013/0201307 A1 8/2013 Schloter et al.
2013/0208136 A1 8/2013 Takatsuka et al.
2013/0210563 A1 8/2013 Hollinger
2013/0222663 A1 8/2013 Rydenhag et al.
2013/0222671 A1 8/2013 Tseng et al.
2013/0235222 A1 9/2013 Karn et al.
2013/0235226 A1 9/2013 Karn et al.
2013/0235234 A1 9/2013 Cucci et al.
2013/0239057 A1 9/2013 Ubillos et al.
2013/0246948 A1 9/2013 Chen et al.
2013/0265311 A1 10/2013 Na et al.
2013/0265467 A1 10/2013 Matsuzawa et al.
2013/0278576 A1 10/2013 Lee et al.
2013/0286251 A1 10/2013 Wood et al.
2013/0290905 A1 10/2013 Luvogt et al.
2013/0329074 A1 12/2013 Zhang et al.
2013/0336545 A1 12/2013 Pritikin et al.
2013/0346916 A1 12/2013 Williamson et al.
2014/0007021 A1 1/2014 Akiyama et al.
2014/0009639 A1 1/2014 Lee
2014/0022399 A1 1/2014 Rashid et al.
2014/0028872 A1 1/2014 Lee et al.
2014/0028885 A1 1/2014 Ma et al.
2014/0033043 A1 1/2014 Kashima
2014/0033100 A1 1/2014 Noda et al.
2014/0037178 A1 2/2014 Park
2014/0043329 A1 2/2014 Wang et al.
2014/0043368 A1 2/2014 Yu
2014/0043517 A1 2/2014 Yim et al.
2014/0047389 A1 2/2014 Aarabi
2014/0049536 A1 2/2014 Neuman et al.
2014/0055554 A1 2/2014 Du et al.
2014/0063175 A1 3/2014 Jafry et al.
2014/0063313 A1 3/2014 Choi et al.
2014/0071061 A1 3/2014 Lin et al.
2014/0071325 A1 3/2014 Kawahara et al.
2014/0078371 A1 3/2014 Kinoshita
2014/0092272 A1 4/2014 Choi
2014/0095122 A1 4/2014 Appleman et al.
2014/0099994 A1 4/2014 Bishop et al.
2014/0104449 A1 4/2014 Masarik et al.
2014/0108928 A1 4/2014 Mumick
2014/0118560 A1 5/2014 Bala et al.
2014/0118563 A1 5/2014 Mehta et al.
2014/0123005 A1 5/2014 Forstall et al.
2014/0132735 A1 5/2014 Lee et al.
2014/0143678 A1 5/2014 Mistry et al.
2014/0152886 A1 6/2014 Morgan-Mar et al.
2014/0160231 A1 6/2014 Middleton et al.
2014/0160304 A1 6/2014 Galor et al.
2014/0160316 A1 6/2014 Hwang
2014/0176469 A1 6/2014 Lim
2014/0176565 A1 6/2014 Adeyoola et al.
2014/0184524 A1 7/2014 Schiefer et al.
2014/0192212 A1 7/2014 He et al.
2014/0192232 A1 7/2014 Park et al.
2014/0192233 A1 7/2014 Kakkori et al.
2014/0204229 A1 7/2014 Leung et al.
2014/0205207 A1 7/2014 Bhatt
2014/0218371 A1 8/2014 Du et al.
2014/0218599 A1 8/2014 Nakamura et al.
2014/0226052 A1 8/2014 Kang et al.
2014/0229831 A1 8/2014 Chordia et al.
2014/0232838 A1 8/2014 Jorgensen et al.
2014/0232921 A1 8/2014 Kim et al.
2014/0240471 A1 8/2014 Srinivasa et al.
2014/0240531 A1 8/2014 Nakai et al.
2014/0240551 A1 8/2014 Kim et al.
2014/0240577 A1 8/2014 Masugi
2014/0267126 A1 9/2014 Åberg et al.
2014/0267867 A1 9/2014 Lee et al.
2014/0281966 A1 9/2014 Kajiyama et al.
2014/0281983 A1 9/2014 Xian et al.
2014/0282223 A1 9/2014 Bastien et al.

(56) References Cited

U.S. PATENT DOCUMENTS

2014/0285698 A1 9/2014 Geiss
2014/0300635 A1 10/2014 Suzuki
2014/0300722 A1 10/2014 Garcia
2014/0300779 A1 10/2014 Yeo et al.
2014/0307147 A1 10/2014 Hanzawa et al.
2014/0310598 A1 10/2014 Sprague et al.
2014/0327639 A1 11/2014 Papakipos et al.
2014/0333671 A1 11/2014 Phang et al.
2014/0333790 A1 11/2014 Wakazono
2014/0333824 A1 11/2014 Xiu
2014/0351753 A1 11/2014 Shin et al.
2014/0354845 A1 12/2014 Mølgaard et al.
2014/0359438 A1 12/2014 Matsuki
2014/0362091 A1 12/2014 Bouaziz et al.
2014/0362105 A1 12/2014 Kocienda et al.
2014/0362274 A1 12/2014 Christie et al.
2014/0364228 A1 12/2014 Rimon
2014/0368601 A1 12/2014 Decharms
2014/0368719 A1 12/2014 Kaneko et al.
2014/0372856 A1 12/2014 Radakovitz et al.
2014/0375862 A1 12/2014 Kim et al.
2015/0022649 A1 1/2015 Koppal
2015/0022674 A1 1/2015 Koss et al.
2015/0033129 A1 1/2015 Cho et al.
2015/0033192 A1 1/2015 Bohannon et al.
2015/0035825 A1 2/2015 Zhou et al.
2015/0042852 A1 2/2015 Lee et al.
2015/0043806 A1 2/2015 Sunkavalli et al.
2015/0049233 A1 2/2015 Choi
2015/0058754 A1 2/2015 Rauh
2015/0067513 A1 3/2015 Zambetti et al.
2015/0070362 A1 3/2015 Hirai
2015/0078621 A1 3/2015 Choi et al.
2015/0078726 A1 3/2015 Shakib et al.
2015/0085174 A1 3/2015 Shabtay et al.
2015/0092077 A1 4/2015 Feder et al.
2015/0109417 A1 4/2015 Zirnheld
2015/0116353 A1 4/2015 Miura et al.
2015/0116448 A1 4/2015 Gottlieb
2015/0116542 A1 4/2015 Lee
2015/0116546 A1 4/2015 Tanaka
2015/0135109 A1 5/2015 Zambetti et al.
2015/0135234 A1 5/2015 Hall
2015/0138079 A1 5/2015 Lannsjö
2015/0145950 A1 5/2015 Murphy et al.
2015/0146079 A1 5/2015 Kim
2015/0149927 A1 5/2015 Walkin et al.
2015/0150141 A1 5/2015 Szymanski et al.
2015/0154448 A1 6/2015 Murayama et al.
2015/0172534 A1 6/2015 Miyakawa et al.
2015/0181135 A1 6/2015 Shimosato
2015/0189138 A1 7/2015 Xie et al.
2015/0189162 A1 7/2015 Kuo et al.
2015/0194186 A1 7/2015 Lee et al.
2015/0201130 A1 7/2015 Cho et al.
2015/0208001 A1 7/2015 Nonaka et al.
2015/0212723 A1 7/2015 Lim et al.
2015/0213001 A1 7/2015 Levy et al.
2015/0213604 A1 7/2015 Li et al.
2015/0220249 A1 8/2015 Snibbe et al.
2015/0229838 A1 8/2015 Hakim et al.
2015/0248198 A1 9/2015 Somlai-Fisher et al.
2015/0248583 A1 9/2015 Sekine et al.
2015/0249775 A1 9/2015 Jacumet
2015/0249785 A1 9/2015 Mehta et al.
2015/0254855 A1 9/2015 Patankar et al.
2015/0254868 A1 9/2015 Srikanth et al.
2015/0256749 A1 9/2015 Frey et al.
2015/0264202 A1 9/2015 Pawlowski
2015/0271389 A1 9/2015 Huang et al.
2015/0277686 A1 10/2015 Laforge et al.
2015/0281585 A1 10/2015 Guldogan
2015/0286724 A1 10/2015 Knaapen et al.
2015/0289104 A1 10/2015 Jung et al.
2015/0297185 A1 10/2015 Mccormack et al.
2015/0301731 A1 10/2015 Okamoto et al.
2015/0310583 A1 10/2015 Hume et al.
2015/0312182 A1 10/2015 Langholz
2015/0312184 A1 10/2015 Langholz et al.
2015/0312185 A1 10/2015 Langholz et al.
2015/0334075 A1 11/2015 Wang et al.
2015/0334291 A1 11/2015 Cho et al.
2015/0334292 A1 11/2015 Tartz et al.
2015/0341536 A1 11/2015 Huang et al.
2015/0347824 A1 12/2015 Saari et al.
2015/0350141 A1 12/2015 Yang et al.
2015/0350533 A1 12/2015 Harris et al.
2015/0350535 A1 12/2015 Voss
2015/0362998 A1 12/2015 Park et al.
2015/0365587 A1 12/2015 Ha et al.
2015/0370458 A1 12/2015 Chen
2016/0012567 A1 1/2016 Siddiqui et al.
2016/0026371 A1 1/2016 Lu et al.
2016/0029004 A1 1/2016 Campbell et al.
2016/0044236 A1 2/2016 Matsuzawa et al.
2016/0048598 A1 2/2016 Fujioka et al.
2016/0048599 A1 2/2016 Fujioka et al.
2016/0048725 A1 2/2016 Holz et al.
2016/0048903 A1 2/2016 Fujioka et al.
2016/0050169 A1 2/2016 Ben Atar et al.
2016/0050351 A1 2/2016 Lee et al.
2016/0050446 A1 2/2016 Fujioka et al.
2016/0065832 A1 3/2016 Kim et al.
2016/0065861 A1 3/2016 Steinberg et al.
2016/0065930 A1 3/2016 Chandra et al.
2016/0070427 A1 3/2016 Furtwangler et al.
2016/0077725 A1 3/2016 Maeda
2016/0080639 A1 3/2016 Choi et al.
2016/0080657 A1 3/2016 Chuang et al.
2016/0088280 A1 3/2016 Sadi et al.
2016/0092035 A1 3/2016 Crocker et al.
2016/0098094 A1 4/2016 Minkkinen
2016/0117829 A1 4/2016 Yoon et al.
2016/0119552 A1 4/2016 Oh et al.
2016/0127636 A1 5/2016 Ito et al.
2016/0127638 A1 5/2016 Guo et al.
2016/0132200 A1 5/2016 Walkin et al.
2016/0132201 A1 5/2016 Shaw et al.
2016/0134840 A1 5/2016 Mcculloch
2016/0142649 A1 5/2016 Yim
2016/0148384 A1 5/2016 Bud et al.
2016/0162039 A1 6/2016 Eilat et al.
2016/0163084 A1 6/2016 Corazza et al.
2016/0173869 A1 6/2016 Srikanth et al.
2016/0188181 A1 6/2016 Smith
2016/0212319 A1 7/2016 Harris et al.
2016/0217601 A1 7/2016 Tsuda et al.
2016/0219212 A1 7/2016 Shoji
2016/0219217 A1 7/2016 Williams et al.
2016/0225175 A1 8/2016 Kim et al.
2016/0226926 A1 8/2016 Singh et al.
2016/0227016 A1 8/2016 Kim et al.
2016/0227121 A1 8/2016 Matsushita
2016/0241777 A1 8/2016 Rav-Acha et al.
2016/0241793 A1 8/2016 Shanmugavadivelu et al.
2016/0247288 A1 8/2016 Omori et al.
2016/0247309 A1 8/2016 Li et al.
2016/0255268 A1 9/2016 Kang et al.
2016/0259413 A1 9/2016 Anzures et al.
2016/0259497 A1 9/2016 Bauer et al.
2016/0259498 A1 9/2016 Foss et al.
2016/0259499 A1 9/2016 Kocienda et al.
2016/0259518 A1 9/2016 King et al.
2016/0259519 A1 9/2016 Foss et al.
2016/0259527 A1 9/2016 Kocienda et al.
2016/0259528 A1 9/2016 Foss et al.
2016/0267067 A1 9/2016 Mays et al.
2016/0283097 A1 9/2016 Voss et al.
2016/0283586 A1 9/2016 Thapliyal et al.
2016/0284123 A1 9/2016 Hare et al.
2016/0307324 A1 10/2016 Higuchi et al.
2016/0316147 A1 10/2016 Bernstein et al.
2016/0323507 A1 11/2016 Chong et al.
2016/0337570 A1 11/2016 Tan et al.

(56) References Cited

U.S. PATENT DOCUMENTS

2016/0337582 A1 11/2016 Shimauchi et al.
2016/0353030 A1 12/2016 Tang et al.
2016/0357353 A1 12/2016 Miura et al.
2016/0357387 A1 12/2016 Bovet et al.
2016/0360097 A1 12/2016 Penha et al.
2016/0360116 A1 12/2016 Penha et al.
2016/0366323 A1 12/2016 Chen et al.
2016/0366344 A1 12/2016 Pan et al.
2016/0370974 A1 12/2016 Stenneth
2016/0373631 A1 12/2016 Titi et al.
2016/0373650 A1 12/2016 Kim et al.
2017/0006210 A1 1/2017 Dye et al.
2017/0011773 A1 1/2017 Lee
2017/0013179 A1 1/2017 Kang et al.
2017/0018289 A1 1/2017 Morgenstern
2017/0019604 A1 1/2017 Kim et al.
2017/0024872 A1 1/2017 Olsson et al.
2017/0026565 A1 1/2017 Hong et al.
2017/0032269 A1 2/2017 Portilla et al.
2017/0034449 A1 2/2017 Eum et al.
2017/0038852 A1 2/2017 Hildreth et al.
2017/0039686 A1 2/2017 Miura et al.
2017/0041549 A1 2/2017 Kim et al.
2017/0041677 A1 2/2017 Anderson et al.
2017/0046065 A1 2/2017 Zeng et al.
2017/0048450 A1 2/2017 Lee et al.
2017/0048461 A1 2/2017 Lee et al.
2017/0048494 A1 2/2017 Boyle et al.
2017/0054960 A1 2/2017 Chien et al.
2017/0061635 A1 3/2017 Petrovich et al.
2017/0064184 A1 3/2017 Tsai
2017/0064200 A1 3/2017 Castillo et al.
2017/0064205 A1 3/2017 Choi et al.
2017/0064213 A1 3/2017 Windmark et al.
2017/0092329 A1 3/2017 Kim et al.
2017/0094019 A1 3/2017 Ahmed et al.
2017/0094132 A1 3/2017 Miyata
2017/0094161 A1 3/2017 Graham et al.
2017/0109604 A1 4/2017 Graham et al.
2017/0109912 A1 4/2017 Lee et al.
2017/0111567 A1 4/2017 Pila
2017/0111616 A1 4/2017 Li et al.
2017/0124664 A1 5/2017 Savenok et al.
2017/0134605 A1 5/2017 Ju et al.
2017/0134807 A1 5/2017 Shaw et al.
2017/0139572 A1 5/2017 Sunkavalli et al.
2017/0178287 A1 6/2017 Anderson
2017/0180811 A1 6/2017 Quirino et al.
2017/0186162 A1 6/2017 Mihic et al.
2017/0220212 A1 8/2017 Yang et al.
2017/0230576 A1 8/2017 Sparks et al.
2017/0230585 A1 8/2017 Nash et al.
2017/0237888 A1 8/2017 Harris et al.
2017/0243389 A1 8/2017 Wild et al.
2017/0244482 A1* 8/2017 Dimare ................ H04B 10/116
2017/0244896 A1 8/2017 Chien et al.
2017/0244897 A1 8/2017 Jung et al.
2017/0257559 A1 9/2017 Stricker
2017/0257596 A1 9/2017 Murata et al.
2017/0264817 A1 9/2017 Yan et al.
2017/0272654 A1 9/2017 Poindexter, Jr.
2017/0285764 A1 10/2017 Kim et al.
2017/0285916 A1 10/2017 Xu et al.
2017/0287220 A1 10/2017 Khalid et al.
2017/0289462 A1 10/2017 Eum et al.
2017/0302840 A1 10/2017 Hasinoff et al.
2017/0315772 A1 11/2017 Lee et al.
2017/0324784 A1 11/2017 Taine et al.
2017/0336926 A1 11/2017 Chaudhri et al.
2017/0336928 A1 11/2017 Chaudhri et al.
2017/0336961 A1 11/2017 Heo et al.
2017/0352379 A1 12/2017 Oh et al.
2017/0354888 A1 12/2017 Benedetto et al.
2017/0358071 A1 12/2017 Yamaoka et al.
2017/0359504 A1 12/2017 Manzari et al.
2017/0359505 A1 12/2017 Manzari et al.
2017/0359506 A1 12/2017 Manzari et al.
2017/0366729 A1 12/2017 Itoh
2017/0371844 A1 12/2017 Yao
2018/0007315 A1 1/2018 Kim et al.
2018/0013949 A1 1/2018 Han
2018/0021684 A1 1/2018 Benedetto
2018/0034867 A1 2/2018 Zahn et al.
2018/0035031 A1 2/2018 Kwak et al.
2018/0047200 A1 2/2018 O'Hara et al.
2018/0048820 A1 2/2018 Hinkel et al.
2018/0052571 A1 2/2018 Seol et al.
2018/0077332 A1 3/2018 Shimura et al.
2018/0088787 A1 3/2018 Bereza et al.
2018/0091728 A1 3/2018 Brown et al.
2018/0091732 A1 3/2018 Wilson et al.
2018/0095649 A1 4/2018 Valdivia et al.
2018/0096202 A1 4/2018 Stathacopoulos et al.
2018/0096487 A1 4/2018 Nash et al.
2018/0107367 A1 4/2018 Rinneberg et al.
2018/0109722 A1* 4/2018 Laroia .................... H04N 23/45
2018/0113577 A1 4/2018 Burns et al.
2018/0114543 A1 4/2018 Novikoff
2018/0120661 A1 5/2018 Kilgore et al.
2018/0124299 A1 5/2018 Brook
2018/0129224 A1 5/2018 Hur
2018/0131876 A1 5/2018 Bernstein et al.
2018/0131878 A1 5/2018 Charlton et al.
2018/0146132 A1 5/2018 Manzari et al.
2018/0152611 A1 5/2018 Li et al.
2018/0184008 A1 6/2018 Kondo
2018/0184061 A1 6/2018 Kitsunai et al.
2018/0191944 A1 7/2018 Carbonell et al.
2018/0198985 A1 7/2018 Ishitsuka
2018/0199025 A1 7/2018 Holzer et al.
2018/0213144 A1 7/2018 Kim et al.
2018/0213161 A1 7/2018 Kanda et al.
2018/0227479 A1 8/2018 Parameswaran et al.
2018/0227482 A1 8/2018 Holzer et al.
2018/0227505 A1 8/2018 Baltz et al.
2018/0234608 A1 8/2018 Sudo et al.
2018/0239930 A1 8/2018 Lai et al.
2018/0253194 A1 9/2018 Javadi
2018/0262677 A1 9/2018 Dye et al.
2018/0267703 A1 9/2018 Kamimaru et al.
2018/0270420 A1 9/2018 Lee et al.
2018/0278823 A1 9/2018 Horesh
2018/0284979 A1 10/2018 Choi et al.
2018/0288310 A1 10/2018 Goldenberg
2018/0302551 A1 10/2018 Yamajo et al.
2018/0302568 A1 10/2018 Kim et al.
2018/0308282 A1 10/2018 Yokoi
2018/0335901 A1 11/2018 Manzari et al.
2018/0335927 A1 11/2018 Anzures et al.
2018/0335929 A1 11/2018 Scapel et al.
2018/0335930 A1 11/2018 Scapel et al.
2018/0336715 A1 11/2018 Rickwald et al.
2018/0343383 A1 11/2018 Ito et al.
2018/0349008 A1 12/2018 Manzari et al.
2018/0349659 A1 12/2018 Manzari et al.
2018/0352165 A1 12/2018 Zhen et al.
2018/0376122 A1 12/2018 Park et al.
2019/0007589 A1 1/2019 Kadambala et al.
2019/0028650 A1 1/2019 Bernstein et al.
2019/0029513 A1 1/2019 Gunnerson et al.
2019/0051032 A1 2/2019 Chu et al.
2019/0058827 A1 2/2019 Park et al.
2019/0080189 A1 3/2019 Van Os et al.
2019/0082097 A1 3/2019 Manzari et al.
2019/0089873 A1 3/2019 Misawa et al.
2019/0108684 A1 4/2019 Callaghan
2019/0114740 A1 4/2019 Ogino et al.
2019/0121216 A1 4/2019 Shabtay et al.
2019/0138259 A1 5/2019 Bagaria et al.
2019/0141030 A1 5/2019 Cockerill et al.
2019/0149706 A1 5/2019 Rivard et al.
2019/0174054 A1 6/2019 Srivastava et al.
2019/0199926 A1 6/2019 An et al.
2019/0205861 A1 7/2019 Bace

(56) References Cited

U.S. PATENT DOCUMENTS

| | | | |
|---|---|---|---|
| 2019/0206031 | A1 | 7/2019 | Kim et al. |
| 2019/0220089 | A1 | 7/2019 | Kakizawa et al. |
| 2019/0222769 | A1 | 7/2019 | Srivastava et al. |
| 2019/0235743 | A1 | 8/2019 | Ono |
| 2019/0250812 | A1 | 8/2019 | Davydov et al. |
| 2019/0253619 | A1 | 8/2019 | Davydov et al. |
| 2019/0289201 | A1 | 9/2019 | Nishimura et al. |
| 2019/0289271 | A1 | 9/2019 | Paulus et al. |
| 2019/0318538 | A1 | 10/2019 | Li et al. |
| 2019/0342507 | A1 | 11/2019 | Dye et al. |
| 2019/0342616 | A1 | 11/2019 | Domm et al. |
| 2019/0379821 | A1 | 12/2019 | Kobayashi et al. |
| 2019/0379837 | A1 | 12/2019 | Kim et al. |
| 2020/0045245 | A1 | 2/2020 | Van Os et al. |
| 2020/0053288 | A1 | 2/2020 | Kim et al. |
| 2020/0059605 | A1 | 2/2020 | Liu et al. |
| 2020/0068121 | A1 | 2/2020 | Wang |
| 2020/0082599 | A1 | 3/2020 | Manzari |
| 2020/0104038 | A1 | 4/2020 | Kamath et al. |
| 2020/0105003 | A1 | 4/2020 | Stauber et al. |
| 2020/0106952 | A1 | 4/2020 | Missig et al. |
| 2020/0106965 | A1 | 4/2020 | Malia et al. |
| 2020/0128191 | A1 | 4/2020 | Sun et al. |
| 2020/0142577 | A1 | 5/2020 | Manzari et al. |
| 2020/0204725 | A1 | 6/2020 | Li |
| 2020/0221020 | A1 | 7/2020 | Manzari et al. |
| 2020/0234508 | A1 | 7/2020 | Shaburov et al. |
| 2020/0236278 | A1 | 7/2020 | Yeung et al. |
| 2020/0242788 | A1 | 7/2020 | Jacobs et al. |
| 2020/0244879 | A1 | 7/2020 | Hohjoh |
| 2020/0285806 | A1 | 9/2020 | Radakovitz et al. |
| 2020/0285851 | A1 | 9/2020 | Lin et al. |
| 2020/0335133 | A1 | 10/2020 | Vaucher |
| 2020/0336660 | A1 | 10/2020 | Dong et al. |
| 2020/0336674 | A1 | 10/2020 | Bernstein et al. |
| 2020/0342613 | A1 | 10/2020 | Altuev et al. |
| 2020/0358963 | A1 | 11/2020 | Manzari et al. |
| 2020/0380768 | A1 | 12/2020 | Harris et al. |
| 2020/0380781 | A1 | 12/2020 | Barlier et al. |
| 2020/0382723 | A1 | 12/2020 | Pena et al. |
| 2020/0410730 | A1 | 12/2020 | Wilensky |
| 2020/0410763 | A1 | 12/2020 | Hare et al. |
| 2020/0412975 | A1 | 12/2020 | Al Majid et al. |
| 2021/0005003 | A1 | 1/2021 | Chong et al. |
| 2021/0051275 | A1 | 2/2021 | Brown et al. |
| 2021/0058351 | A1 | 2/2021 | Viklund et al. |
| 2021/0065448 | A1 | 3/2021 | Goodrich et al. |
| 2021/0065454 | A1 | 3/2021 | Goodrich et al. |
| 2021/0081093 | A1 | 3/2021 | Yun et al. |
| 2021/0096703 | A1 | 4/2021 | Anzures et al. |
| 2021/0097695 | A1 | 4/2021 | Lundberg et al. |
| 2021/0099568 | A1 | 4/2021 | Depue et al. |
| 2021/0099761 | A1 | 4/2021 | Zhang |
| 2021/0146838 | A1 | 5/2021 | Goseberg et al. |
| 2021/0152505 | A1 | 5/2021 | Baldwin et al. |
| 2021/0160431 | A1 | 5/2021 | Chen et al. |
| 2021/0168108 | A1 | 6/2021 | Antmen et al. |
| 2021/0168300 | A1 | 6/2021 | Wang et al. |
| 2021/0195093 | A1 | 6/2021 | Manzari et al. |
| 2021/0201953 | A1 | 7/2021 | Takahashi et al. |
| 2021/0264656 | A1 | 8/2021 | Barlier et al. |
| 2021/0266447 | A1 | 8/2021 | Ding et al. |
| 2021/0281746 | A1 | 9/2021 | Fleizach et al. |
| 2021/0286510 | A1 | 9/2021 | Tyler et al. |
| 2021/0287343 | A1 | 9/2021 | Kaida |
| 2021/0318798 | A1 | 10/2021 | Manzari et al. |
| 2021/0344845 | A1 | 11/2021 | Li et al. |
| 2021/0373750 | A1 | 12/2021 | Manzari et al. |
| 2021/0375042 | A1 | 12/2021 | Chen et al. |
| 2021/0389850 | A1 | 12/2021 | Charlton et al. |
| 2021/0397338 | A1 | 12/2021 | Davydov et al. |
| 2022/0006946 | A1 | 1/2022 | Missig et al. |
| 2022/0044459 | A1 | 2/2022 | Zacharia et al. |
| 2022/0053126 | A1 | 2/2022 | Zhao et al. |
| 2022/0053142 | A1 | 2/2022 | Manzari et al. |
| 2022/0057984 | A1 | 2/2022 | Yang et al. |
| 2022/0070380 | A1 | 3/2022 | Bernstein et al. |
| 2022/0070385 | A1 | 3/2022 | Van Os et al. |
| 2022/0086336 | A1 | 3/2022 | Zhang |
| 2022/0103758 | A1 | 3/2022 | Manzari et al. |
| 2022/0124241 | A1 | 4/2022 | Manzari et al. |
| 2022/0134226 | A1 | 5/2022 | Takura et al. |
| 2022/0207838 | A1 | 6/2022 | Anvaripour et al. |
| 2022/0210328 | A1 | 6/2022 | Anvaripour et al. |
| 2022/0210337 | A1 | 6/2022 | Anvaripour et al. |
| 2022/0217253 | A1 | 7/2022 | Tian et al. |
| 2022/0217275 | A1 | 7/2022 | Fan |
| 2022/0224828 | A1 | 7/2022 | Lim et al. |
| 2022/0256068 | A1 | 8/2022 | Geiss et al. |
| 2022/0262022 | A1 | 8/2022 | Stauber et al. |
| 2022/0264028 | A1 | 8/2022 | Manzari et al. |
| 2022/0276041 | A1 | 9/2022 | Dryer et al. |
| 2022/0279116 | A1 | 9/2022 | Zhou |
| 2022/0294992 | A1 | 9/2022 | Manzari et al. |
| 2022/0321797 | A1 | 10/2022 | Bian et al. |
| 2022/0345785 | A1 | 10/2022 | Yang et al. |
| 2022/0353425 | A1 | 11/2022 | Manzari et al. |
| 2022/0382417 | A1 | 12/2022 | Zhang |
| 2022/0382440 | A1 | 12/2022 | Manzari et al. |
| 2022/0382443 | A1 | 12/2022 | Clarke et al. |
| 2022/0394190 | A1 | 12/2022 | Cui et al. |
| 2022/0408020 | A1 | 12/2022 | Zhang |
| 2022/0417416 | A1 | 12/2022 | Li et al. |
| 2022/0417440 | A1 | 12/2022 | Bernstein et al. |
| 2023/0007186 | A1 | 1/2023 | Li et al. |
| 2023/0016178 | A1 | 1/2023 | Ma et al. |
| 2023/0018557 | A1 | 1/2023 | Jiang |
| 2023/0020616 | A1 | 1/2023 | Manzari et al. |
| 2023/0081664 | A1 | 3/2023 | Li |
| 2023/0087879 | A1 | 3/2023 | An et al. |
| 2023/0098395 | A1 | 3/2023 | O'Leary et al. |
| 2023/0115929 | A1 | 4/2023 | Bian et al. |
| 2023/0116044 | A1 | 4/2023 | Han |
| 2023/0118567 | A1 | 4/2023 | Manzari et al. |
| 2023/0156144 | A1 | 5/2023 | Cui |
| 2023/0156316 | A1 | 5/2023 | Kang et al. |
| 2023/0164427 | A1 | 5/2023 | Lu et al. |
| 2023/0179856 | A1 | 6/2023 | Shin |
| 2023/0188831 | A1 | 6/2023 | Hyun et al. |
| 2023/0188861 | A1 | 6/2023 | Bian |
| 2023/0209179 | A1 | 6/2023 | Manzari et al. |
| 2023/0217097 | A1 | 7/2023 | Wu et al. |
| 2023/0217098 | A1 | 7/2023 | Wang et al. |
| 2023/0224575 | A1 | 7/2023 | Ding et al. |
| 2023/0229297 | A1 | 7/2023 | Manzari et al. |
| 2023/0252659 | A1 | 8/2023 | Stauber et al. |
| 2023/0254573 | A1 | 8/2023 | Manzari et al. |
| 2023/0262317 | A1 | 8/2023 | O'Leary et al. |
| 2023/0283884 | A1 | 9/2023 | Van Os et al. |
| 2023/0308742 | A1 | 9/2023 | Lin et al. |
| 2023/0308743 | A1 | 9/2023 | Ku et al. |
| 2023/0308778 | A1 | 9/2023 | Yang |
| 2023/0319394 | A1 | 10/2023 | Manzari et al. |
| 2023/0325989 | A1 | 10/2023 | Zhao |
| 2023/0328379 | A1 | 10/2023 | Bernstein et al. |
| 2023/0328429 | A1 | 10/2023 | Bian |
| 2023/0333704 | A1 | 10/2023 | Chen |
| 2023/0336865 | A1 | 10/2023 | Da Veiga et al. |
| 2023/0345110 | A1 | 10/2023 | Yi et al. |
| 2023/0345113 | A1 | 10/2023 | Liu |
| 2023/0353862 | A1 | 11/2023 | Yi et al. |
| 2023/0359314 | A1 | 11/2023 | Karunamuni |
| 2023/0359315 | A1 | 11/2023 | Karunamuni et al. |
| 2023/0359316 | A1 | 11/2023 | Karunamuni |
| 2023/0367472 | A1 | 11/2023 | Clarke et al. |
| 2023/0370507 | A1 | 11/2023 | Chang et al. |
| 2023/0388665 | A1 | 11/2023 | Manzari et al. |
| 2023/0393705 | A1 | 12/2023 | Krenn |
| 2023/0418426 | A1 | 12/2023 | Karunamuni |
| 2024/0080543 | A1 | 3/2024 | Manzari et al. |
| 2024/0168626 | A1 | 5/2024 | Davydov et al. |
| 2024/0259669 | A1 | 8/2024 | Missig et al. |

(56) References Cited

U.S. PATENT DOCUMENTS

| | | | |
|---|---|---|---|
| 2024/0259670 | A1 | 8/2024 | Manzari et al. |
| 2024/0284037 | A1 | 8/2024 | Manzari et al. |

FOREIGN PATENT DOCUMENTS

| | | | |
|---|---|---|---|
| AU | 2015297035 | B2 | 6/2018 |
| CA | 2729392 | A1 | 8/2011 |
| CA | 2965700 | A1 | 5/2016 |
| CA | 2729392 | C | 5/2017 |
| CA | 2965925 | A1 | 3/2018 |
| CN | 1499878 | A | 5/2004 |
| CN | 1901717 | A | 1/2007 |
| CN | 101533330 | A | 9/2009 |
| CN | 101576996 | A | 11/2009 |
| CN | 101681462 | A | 3/2010 |
| CN | 101778220 | A | 7/2010 |
| CN | 101821707 | A | 9/2010 |
| CN | 201788344 | U | 4/2011 |
| CN | 102202208 | A | 9/2011 |
| CN | 102369723 | A | 3/2012 |
| CN | 102447873 | A | 5/2012 |
| CN | 102541537 | A | 7/2012 |
| CN | 102567953 | A | 7/2012 |
| CN | 202330968 | U | 7/2012 |
| CN | 102625036 | A | 8/2012 |
| CN | 104869346 | A | 9/2012 |
| CN | 102855079 | A | 1/2013 |
| CN | 103037075 | A | 4/2013 |
| CN | 103051837 | A | 4/2013 |
| CN | 103051841 | A | 4/2013 |
| CN | 103324329 | A | 9/2013 |
| CN | 103491298 | A | 1/2014 |
| CN | 103702029 | A | 4/2014 |
| CN | 103777742 | A | 5/2014 |
| CN | 105765967 | A | 9/2014 |
| CN | 104247392 | A | 12/2014 |
| CN | 104423946 | A | 3/2015 |
| CN | 104487928 | A | 4/2015 |
| CN | 104781773 | A | 7/2015 |
| CN | 104836947 | A | 8/2015 |
| CN | 104903834 | A | 9/2015 |
| CN | 105049726 | A | 11/2015 |
| CN | 105138259 | A | 12/2015 |
| CN | 105144057 | A | 12/2015 |
| CN | 105183442 | A | 12/2015 |
| CN | 105210018 | A | 12/2015 |
| CN | 105264480 | A | 1/2016 |
| CN | 105589637 | A | 5/2016 |
| CN | 105620393 | A | 6/2016 |
| CN | 105637855 | A | 6/2016 |
| CN | 105794196 | A | 7/2016 |
| CN | 105991915 | A | 10/2016 |
| CN | 106067947 | A | 11/2016 |
| CN | 106161956 | A | 11/2016 |
| CN | 106257540 | A | 12/2016 |
| CN | 106303280 | A | 1/2017 |
| CN | 106303690 | A | 1/2017 |
| CN | 106341611 | A | 1/2017 |
| CN | 106375662 | A | 2/2017 |
| CN | 106412214 | A | 2/2017 |
| CN | 106412445 | A | 2/2017 |
| CN | 106412706 | A | 2/2017 |
| CN | 106534619 | A | 3/2017 |
| CN | 106575149 | A | 4/2017 |
| CN | 106792147 | A | 5/2017 |
| CN | 106921829 | A | 7/2017 |
| CN | 107566721 | A | 1/2018 |
| CN | 107613283 | A | 1/2018 |
| CN | 107770448 | A | 3/2018 |
| CN | 107800945 | A | 3/2018 |
| CN | 107944397 | A | 4/2018 |
| CN | 108174096 | A | 6/2018 |
| CN | 108319629 | A | 7/2018 |
| CN | 108391053 | A | 8/2018 |
| CN | 108419019 | A | 8/2018 |
| CN | 108513070 | A | 9/2018 |
| CN | 108549522 | A | 9/2018 |
| CN | 108600610 | A | 9/2018 |
| CN | 108668083 | A | 10/2018 |
| CN | 108769562 | A | 11/2018 |
| CN | 108848308 | A | 11/2018 |
| CN | 108886569 | A | 11/2018 |
| CN | 109639970 | A | 4/2019 |
| CN | 109644217 | A | 4/2019 |
| CN | 109769396 | A | 5/2019 |
| CN | 110678832 | A | 1/2020 |
| CN | 110784615 | A | 2/2020 |
| CN | 111142724 | A | 5/2020 |
| CN | 111901475 | A | 11/2020 |
| CN | 111901476 | A | 11/2020 |
| CN | 111917980 | A | 11/2020 |
| CN | 112004136 | A | 11/2020 |
| CN | 112154658 | A | 12/2020 |
| CN | 112291627 | A | 1/2021 |
| CN | 112637477 | | 4/2021 |
| CN | 1437365 | A | 8/2023 |
| DK | 201670652 | A1 | 12/2017 |
| DK | 201670753 | A1 | 1/2018 |
| DK | 201670755 | A1 | 1/2018 |
| DK | 201670627 | A1 | 2/2018 |
| EP | 0651543 | A2 | 5/1995 |
| EP | 0651543 | A3 | 12/1997 |
| EP | 1278099 | A1 | 1/2003 |
| EP | 1592212 | A1 | 11/2005 |
| EP | 1953663 | A1 | 8/2008 |
| EP | 0651543 | A1 | 9/2008 |
| EP | 1981262 | A1 | 10/2008 |
| EP | 2430766 | A4 | 5/2010 |
| EP | 2194508 | A1 | 6/2010 |
| EP | 2430766 | A2 | 3/2012 |
| EP | 2454872 | A1 | 5/2012 |
| EP | 2482179 | A2 | 8/2012 |
| EP | 2487613 | A1 | 8/2012 |
| EP | 2487913 | A2 | 8/2012 |
| EP | 2579572 | A1 | 4/2013 |
| EP | 2627073 | A1 | 8/2013 |
| EP | 2634751 | A1 | 9/2013 |
| EP | 2640060 | A1 | 9/2013 |
| EP | 2682855 | A2 | 1/2014 |
| EP | 3033837 | A4 | 4/2014 |
| EP | 2830297 | A1 | 1/2015 |
| EP | 2843530 | A1 | 3/2015 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 3008575 | A1 | 4/2016 |
| EP | 3012732 | A1 | 4/2016 |
| EP | 3026636 | A1 | 6/2016 |
| EP | 3033837 | A1 | 6/2016 |
| EP | 3046070 | A1 | 7/2016 |
| EP | 3051525 | A1 | 8/2016 |
| EP | 3104590 | A1 | 12/2016 |
| EP | 3107065 | A1 | 12/2016 |
| EP | 3120217 | A1 | 1/2017 |
| EP | 3209012 | A1 | 8/2017 |
| EP | 3211587 | A1 | 8/2017 |
| EP | 2194508 | B1 | 12/2017 |
| EP | 3333544 | A1 | 6/2018 |
| EP | 2556665 | B1 | 8/2018 |
| EP | 3033837 | B1 | 10/2018 |
| EP | 3393119 | A1 | 10/2018 |
| EP | 3135028 | B1 | 1/2019 |
| EP | 2482179 | B1 | 3/2019 |
| EP | 3457680 | A1 | 3/2019 |
| EP | 3012732 | B1 | 5/2019 |
| EP | 3008575 | B1 | 7/2019 |
| EP | 3120217 | B1 | 4/2020 |
| EP | 3633975 | A1 | 4/2020 |
| EP | 3046070 | B1 | 10/2020 |
| EP | 3736676 | A1 | 11/2020 |
| EP | 2682855 | B1 | 2/2021 |
| EP | 3787285 | A1 | 3/2021 |
| EP | 3633975 | B1 | 5/2023 |

(56) References Cited

FOREIGN PATENT DOCUMENTS

| | | | |
|---|---|---|---|
| GB | 2307383 | A | 5/1997 |
| GB | 2515797 | A | 1/2015 |
| GB | 2519363 | A | 4/2015 |
| GB | 2523670 | A | 9/2015 |
| HK | 40022327 | | 11/2020 |
| JP | 2-179078 | A | 7/1990 |
| JP | 9-116792 | A | 5/1997 |
| JP | 11-355617 | A | 12/1999 |
| JP | 2000-207549 | A | 7/2000 |
| JP | 2000-244905 | A | 9/2000 |
| JP | 2001-245204 | A | 9/2001 |
| JP | 2001-298649 | A | 10/2001 |
| JP | 2003-8964 | A | 1/2003 |
| JP | 2003-18438 | A | 1/2003 |
| JP | 2003-32597 | A | 2/2003 |
| JP | 2003-241293 | A | 8/2003 |
| JP | 2003-248549 | A | 9/2003 |
| JP | 2003-338975 | A | 11/2003 |
| JP | 2004-15595 | A | 1/2004 |
| JP | 2004-135074 | A | 4/2004 |
| JP | 2005-31466 | A | 2/2005 |
| JP | 2005-191641 | A | 7/2005 |
| JP | 2005-191985 | A | 7/2005 |
| JP | 2005-311699 | A | 11/2005 |
| JP | 2006-332809 | A | 12/2006 |
| JP | 3872041 | B2 | 1/2007 |
| JP | 2007-28211 | A | 2/2007 |
| JP | 2007-124398 | A | 5/2007 |
| JP | 2008-66978 | A | 3/2008 |
| JP | 2008-236534 | A | 10/2008 |
| JP | 2009-105919 | A | 5/2009 |
| JP | 2009-217816 | A | 9/2009 |
| JP | 2009-246468 | A | 10/2009 |
| JP | 2010-119147 | A | 5/2010 |
| JP | 2010-182023 | A | 8/2010 |
| JP | 2011-41092 | A | 2/2011 |
| JP | 2011-87167 | A | 4/2011 |
| JP | 2012-79302 | A | 3/2012 |
| JP | 2012-147379 | A | 8/2012 |
| JP | 2014-212415 | A | 11/2014 |
| JP | 2015-5255 | A | 1/2015 |
| JP | 2015-91098 | A | 4/2015 |
| JP | 2015-149095 | A | 8/2015 |
| JP | 2016-129315 | A | 7/2016 |
| JP | 2017-34474 | A | 2/2017 |
| JP | 2017-69776 | A | 4/2017 |
| JP | 2017-521804 | A | 8/2017 |
| JP | 2018-10488 | A | 1/2018 |
| JP | 2018-515860 | A | 6/2018 |
| JP | 2019-507928 | A | 3/2019 |
| JP | 2019-145108 | A | 8/2019 |
| JP | 2020-524430 | A | 8/2020 |
| JP | 6982047 | B2 | 11/2021 |
| JP | 2007-258869 | A | 7/2024 |
| JP | 2007-274017 | A | 7/2024 |
| JP | 2004-80401 | A | 8/2024 |
| JP | 2007-529794 | A | 8/2024 |
| JP | 2016-5224 | A | 8/2024 |
| KR | 10-2009-0066319 | A | 6/2009 |
| KR | 10-2009-0096833 | A | 9/2009 |
| KR | 10-2012-0054406 | A | 5/2012 |
| KR | 10-1343591 | B1 | 9/2012 |
| KR | 10-2012-0113252 | A | 10/2012 |
| KR | 10-2014-0019631 | A | 2/2014 |
| KR | 10-2014-0049850 | A | 4/2014 |
| KR | 10-2015-0014290 | A | 2/2015 |
| KR | 10-2016-0020396 | A | 2/2016 |
| KR | 10-1655078 | B1 | 9/2016 |
| KR | 10-1674959 | B1 | 11/2016 |
| KR | 10-2016-0146942 | A | 12/2016 |
| KR | 10-2017-0117306 | A | 10/2017 |
| KR | 10-2017-0123125 | A | 11/2017 |
| KR | 10-1799223 | B1 | 11/2017 |
| KR | 10-2018-0095331 | A | 8/2018 |
| SU | 1610470 | A1 | 11/1990 |
| WO | 99/39307 | A1 | 8/1999 |
| WO | 2005/043892 | A1 | 5/2005 |
| WO | 2007/126707 | A1 | 11/2007 |
| WO | 2008/014301 | A2 | 1/2008 |
| WO | 2008/020655 | A1 | 2/2008 |
| WO | 2008/025120 | A1 | 3/2008 |
| WO | 2008/030779 | A2 | 3/2008 |
| WO | 2008/109644 | A2 | 9/2008 |
| WO | 2009/032638 | A2 | 3/2009 |
| WO | 2009/078091 | A1 | 6/2009 |
| WO | 2010/059426 | A2 | 5/2010 |
| WO | 2010/077048 | A2 | 7/2010 |
| WO | 2010/102678 | A1 | 9/2010 |
| WO | 2010/077048 | A3 | 10/2010 |
| WO | 2010/131869 | A2 | 11/2010 |
| WO | 2010/134275 | A1 | 11/2010 |
| WO | 2011/007264 | A1 | 1/2011 |
| WO | 2010/131869 | A3 | 2/2011 |
| WO | 2010/059426 | A3 | 5/2011 |
| WO | 2011/084860 | A2 | 7/2011 |
| WO | 2012/001947 | A1 | 1/2012 |
| WO | 2012/006251 | A1 | 1/2012 |
| WO | 2012/019163 | A2 | 2/2012 |
| WO | 2012/051720 | A2 | 4/2012 |
| WO | 2013/082325 | A1 | 6/2013 |
| WO | 2013/133895 | A1 | 9/2013 |
| WO | 2013/136394 | A1 | 9/2013 |
| WO | 2013/152453 | A1 | 10/2013 |
| WO | 2013/152454 | A1 | 10/2013 |
| WO | 2013/169870 | A1 | 11/2013 |
| WO | 2013/175784 | A1 | 11/2013 |
| WO | 2013/189058 | A1 | 12/2013 |
| WO | 2014/066115 | A1 | 5/2014 |
| WO | 2014/105276 | A1 | 7/2014 |
| WO | 2014/105277 | A2 | 7/2014 |
| WO | 2014/159779 | A1 | 10/2014 |
| WO | 2014/160819 | A1 | 10/2014 |
| WO | 2014/165141 | A1 | 10/2014 |
| WO | 2014/185028 | A1 | 11/2014 |
| WO | 2014/200734 | A1 | 12/2014 |
| WO | 2014/200798 | A1 | 12/2014 |
| WO | 2015/023044 | A1 | 2/2015 |
| WO | 2015/026864 | A1 | 2/2015 |
| WO | 2015/037211 | A1 | 3/2015 |
| WO | 2015/059349 | A1 | 4/2015 |
| WO | 2015/080744 | A1 | 6/2015 |
| WO | 2015/085042 | A1 | 6/2015 |
| WO | 2015/112868 | A1 | 7/2015 |
| WO | 2014/200798 | A8 | 8/2015 |
| WO | 2015/144209 | A1 | 10/2015 |
| WO | 2015/152953 | A1 | 10/2015 |
| WO | 2015/166684 | A1 | 11/2015 |
| WO | 2015/183438 | A1 | 12/2015 |
| WO | 2015/183756 | A1 | 12/2015 |
| WO | 2015/187458 | A1 | 12/2015 |
| WO | 2015/187494 | A1 | 12/2015 |
| WO | 2015/190666 | A1 | 12/2015 |
| WO | 2016/024440 | A1 | 2/2016 |
| WO | 2016/028806 | A1 | 2/2016 |
| WO | 2016/028807 | A1 | 2/2016 |
| WO | 2016/028808 | A1 | 2/2016 |
| WO | 2016/028809 | A1 | 2/2016 |
| WO | 2016/064435 | A1 | 4/2016 |
| WO | 2016/073804 | A2 | 5/2016 |
| WO | 2016/073804 | A3 | 7/2016 |
| WO | 2016/144975 | A2 | 9/2016 |
| WO | 2016/145129 | A1 | 9/2016 |
| WO | 2016/172619 | A1 | 10/2016 |
| WO | 2016/200587 | A1 | 12/2016 |
| WO | 2016/203282 | A1 | 12/2016 |
| WO | 2016/204936 | A1 | 12/2016 |
| WO | 2017/051605 | A1 | 3/2017 |
| WO | 2017/058834 | A1 | 4/2017 |
| WO | 2017/071559 | A1 | 5/2017 |
| WO | 2017/077751 | A1 | 5/2017 |
| WO | 2017/153771 | A1 | 9/2017 |
| WO | 2017/164716 | A1 | 9/2017 |
| WO | 2017/201326 | A1 | 11/2017 |
| WO | 2017/213439 | A1 | 12/2017 |

(56) References Cited

FOREIGN PATENT DOCUMENTS

| | | | |
|---|---|---|---|
| WO | 2017/218193 | A1 | 12/2017 |
| WO | 2018/006053 | A1 | 1/2018 |
| WO | 2018/012395 | A1 | 1/2018 |
| WO | 2018/012831 | A1 | 1/2018 |
| WO | 2018/017625 | A1 | 1/2018 |
| WO | 2018/048838 | A1 | 3/2018 |
| WO | 2018/049430 | A2 | 3/2018 |
| WO | 2018/057268 | A1 | 3/2018 |
| WO | 2018/099037 | A1 | 6/2018 |
| WO | 2018/144339 | A2 | 8/2018 |
| WO | 2018/159864 | A1 | 9/2018 |
| WO | 2018/212802 | A1 | 11/2018 |
| WO | 2018/222244 | A1 | 12/2018 |
| WO | 2018/226264 | A1 | 12/2018 |
| WO | 2019/050562 | A1 | 3/2019 |
| WO | 2019/216997 | A1 | 11/2019 |
| WO | 2020/055613 | A1 | 3/2020 |
| WO | 2020/227386 | A2 | 11/2020 |
| WO | 2022/231869 | A1 | 11/2022 |

OTHER PUBLICATIONS

Junxiang, Zhang, "Playing My New iPad", The Publishing House of Ordinance Industry, Sep. 30, 2012, pp. 217-219 (Official Copy only). {See Communication under 37 CFR § 1.98(a) (3)}.

Office Action received for Chinese Patent Application No. 201980012481.9, mailed on Nov. 21, 2023, 18 pages (10 pages of English Translation and 8 pages of Official Copy).

Office Action received for Chinese Patent Application No. 202211073034.4, mailed on Nov. 22, 2023, 14 pages (9 pages of English Translation and 5 pages of Official Copy).

Corrected Notice of Allowance received for U.S. Appl. No. 17/721,039, mailed on Mar. 27, 2024, 3 pages.

Corrected Notice of Allowance received for U.S. Appl. No. 18/197,242, mailed on Mar. 27, 2024, 2 pages.

Decision to Grant received for Japanese Patent Application No. 2023-041079, mailed on Mar. 28, 2024, 3 pages (1 page of English Translation and 2 pages of Official Copy).

Extended European Search Report received for European Patent Application No. 24155758.6, mailed on Mar. 20, 2024, 11 pages.

Notice of Allowance received for U.S. Appl. No. 18/196,997, mailed on Mar. 28, 2024, 11 pages.

Result of Consultation received for European Patent Application No. 20206196.6, mailed on Mar. 27, 2024, 4 pages.

Communication for Board of Appeal received for European Patent Application No. 17184710.6, mailed on Feb. 29, 2024, 13 pages.

Corrected Notice of Allowance received for U.S. Appl. No. 18/197,242, mailed on Mar. 18, 2024, 2 pages.

Decision to Grant received for Japanese Patent Application No. 2022-145387, mailed on Mar. 4, 2024, 3 pages (1 page of English Translation and 2 pages of Official Copy).

Final Office Action received for U.S. Appl. No. 17/546,968, mailed on Mar. 19, 2024, 43 pages.

Notice of Allowance received for U.S. Appl. No. 17/466,824, mailed on Mar. 13, 2024, 5 pages.

Notice of Allowance received for U.S. Appl. No. 17/721,039, mailed on Mar. 13, 2024, 33 pages.

Notice of Allowance received for U.S. Appl. No. 18/121,458, mailed on Mar. 12, 2024, 9 pages.

Notice of Allowance received for U.S. Appl. No. 18/197,242, mailed on Mar. 6, 2024, 11 pages.

Office Action received for Chinese Patent Application No. 202211072958.2, mailed on Jan. 27, 2024, 19 pages (8 pages of English Translation and 11 pages of Official Copy).

Office Action received for Korean Patent Application No. 10-2024-7004853, mailed on Mar. 4, 2024, 6 pages (2 pages of English Translation and 4 pages of Official Copy).

Applicant-Initiated Interview Summary received for U.S. Appl. No. 18/197,242, mailed on Feb. 22, 2024, 2 pages.

Communication for Board of Appeal received for European Patent Application No. 19204230.7, mailed on Feb. 16, 2024, 1 page.

Invitation to Pay Search Fees received for European Patent Application No. 20728854.9, mailed on Feb. 23, 2024, 3 pages.

Non-Final Office Action received for U.S. Appl. No. 18/207.293, mailed on Feb. 29, 2024, 11 pages.

Notice of Allowance received for U.S. Appl. No. 18/114,880, mailed on Feb. 15, 2024, 17 pages.

Office Action received for Australian Patent Application No. 2023200607, mailed on Feb. 22, 2024, 2 pages.

Office Action received for Chinese Patent Application No. 201880036400.4, mailed on Jan. 20, 2024, 14 pages (6 pages of English Translation and 8 pages of Official Copy).

Office Action received for Chinese Patent Application No. 202210849316.2, mailed on Jan. 18, 2024, 12 pages (6 pages of English Translation and 6 pages of Official Copy).

Summons to Oral Proceedings received for European Patent Application No. 19204230.7, mailed on Feb. 19, 2024, 2 pages.

Applicant-Initiated Interview Summary received for U.S. Appl. No. 18/123,878, mailed on Apr. 15, 2024, 4 pages,.

Corrected Notice of Allowance received for U.S. Appl. No. 18/197,242, mailed on Apr. 4, 2024, 2 pages.

Corrected Notice of Allowance received for U.S. Appl. No. 18/228,591, mailed on Apr. 16, 2024, 5 pages.

Notice of Allowance received for U.S. Appl. No. 18/228,591, mailed on Apr. 5, 2024, 10 pages.

Office Action received for European Patent Application No. 20728854.9, mailed on Apr. 8, 2024, 7 pages.

Office Action received for Indian Patent Application No. 202117017871, mailed on Apr. 4, 2024, 8 pages.

Applicant-Initiated Interview Summary received for U.S. Appl. No. 17/542,947, mailed on Feb. 9, 2024, 4 pages.

Corrected Notice of Allowance received for U.S. Appl. No. 17/466,824, mailed on Feb. 6, 2024, 2 pages.

Non-Final Office Action received for U.S. Appl. No. 18/123,878, mailed on Jan. 31, 2024, 19 pages.

Notice of Allowance received for Japanese Patent Application No. 2022-095182, mailed on Feb. 5, 2024, 4 pages (1 page of English Translation and 3 pages of Official Copy).

Notice of Hearing received for Indian Patent Application No. 201814036470, mailed on Feb. 7, 2024, 4 pages.

Office Action received for Chinese Patent Application No. 202211072261.5, mailed on Dec. 28, 2023, 22 pages (14 pages of English Translation and 8 pages of Official Copy).

Office Action received for Japanese Patent Application No. 2022-199433, mailed on Jan. 29, 2024, 6 pages (3 pages of English Translation and 3 pages of Official Copy).

Office Action received for Korean Patent Application No. 10-2023-7016569, mailed on Jan. 22, 2024, 10 pages (4 pages of English Translation and 6 pages of Official Copy).

Applicant-Initiated Interview Summary received for U.S. Appl. No. 17/546,968, mailed on Jan. 16, 2024, 3 pages.

Corrected Notice of Allowance received for U.S. Appl. No. 18/121,458, mailed on Jan. 18, 2024, 2 pages.

International Preliminary Report on Patentability received for PCT Patent Application No. PCT/US2022/024964, mailed on Nov. 9, 2023, 11 pages.

Summons to Attend Oral Proceedings received for European Patent Application No. 19707557.5, mailed on Jan. 26, 2024, 6 pages.

Corrected Notice of Allowance received for U.S. Appl. No. 17/944,765, mailed on Jul. 27, 2023, 5 pages.

Office Action received for Chinese Patent Application No. 202211072958.2, mailed on Jun. 20, 2023, 48 pages (24 pages of English Translation and 24 pages of Official Copy).

Office Action received for European Patent Application No. 21157252.4, mailed on Jul. 24, 2023, 5 pages.

Applicant-Initiated Interview Summary received for U.S. Appl. No. 17/466,824, mailed on Oct. 5, 2022, 2 pages.

Corrected Notice of Allowance received for U.S. Appl. No. 17/409,598, mailed on Sep. 30, 2022, 2 pages.

Examiner-Initiated Interview Summary received for U.S. Appl. No. 17/356,322, mailed on Sep. 29, 2022, 4 pages.

(56) References Cited

OTHER PUBLICATIONS

Final Office Action received for U.S. Appl. No. 15/995,040, mailed on Oct. 6, 2022, 27 pages.
Notice of Allowance received for Korean Patent Application No. 10-2022-7006310, mailed on Sep. 20, 2022, 8 pages (2 pages of English Translation and 6 pages of Official Copy).
Office Action received for European Patent Application No. 21163791.3, mailed on Sep. 20, 2022, 6 pages.
Shareit, "WhatsApp Easy Way to Record Long Voice Messages—New Update", Retrieved from Internet: <https://www.youtube.com/watch?v=3MVnYGt8v1l>, Apr. 7, 2018, 39 pages.
Applicant-Initiated Interview Summary received for U.S. Appl. No. 17/466,824, mailed on Sep. 28, 2023, 2 pages.
Communication for Board of Appeal received for European Patent Application No. 19724959.2, mailed on Sep. 27, 2023, 14 pages.
Decision to Grant received for Japanese Patent Application No. 2021-187533, mailed on Sep. 28, 2023, 3 pages (1 page of English Translation and 2 pages of Official Copy).
Notice of Allowance received for U.S. Appl. No. 17/479,897, mailed on Oct. 3, 2023, 5 pages.
Office Action received for Australian Patent Application No. 2022228121, mailed on Sep. 20, 2023, 3 pages.
Corrected Notice of Allowance received for U.S. Appl. No. 16/144,629, mailed on Aug. 24, 2022, 6 pages.
Corrected Notice of Allowance received for U.S. Appl. No. 17/483,684, mailed on Aug. 24, 2022, 6 pages.
Non-Final Office Action received for U.S. Appl. No. 17/479,897, mailed on Aug. 30, 2022, 10 pages.
Office Action received for Japanese Patent Application No. 2020-542592, mailed on Aug. 1, 2022, 5 pages (2 pages of English Translation and 3 pages of Official Copy).
Decision to Grant received for European Patent Application No. 18704732.9, mailed on Aug. 18, 2023, 3 pages.
Non-Final Office Action received for U.S. Appl. No. 18/114,880, mailed on Aug. 29, 2023, 10 pages.
Office Action received for Australian Patent Application No. 2022228191, mailed on Aug. 16, 2023, 4 pages.
Office Action received for Chinese Patent Application No. 201980012481.9, mailed on Jun. 8, 2023, 16 pages (9 pages of English Translation and 7 pages of Official Copy).
Applicant-Initiated Interview Summary received for U.S. Appl. No. 17/546,968, mailed on Apr. 26, 2024, 2 pages.
Applicant-Initiated Interview Summary received for U.S. Appl. No. 18/207,293, mailed on Apr. 19, 2024, 3 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Final Office Action received for U.S. Appl. No. 17/542,947, mailed on Apr. 18, 2024, 55 pages.
Final Office Action received for U.S. Appl. No. 18/123,878, mailed on Apr. 26, 2024, 23 pages.
Intention to Grant received for European Patent Application No. 21202358.4, mailed on Apr. 15, 2024, 9 pages.
Notice of Allowance received for Korean Patent Application No. 10-2023-7036985, mailed on Apr. 11, 2024, 7 pages (2 pages of English Translation and 5 pages of Official Copy).
Office Action received for Chinese Patent Application No. 202010235395.9, mailed on Mar. 16, 2024, 18 pages (9 pages of English Translation and 9 pages of Official Copy).
Office Action received for Chinese Patent Application No. 202110530629.7, mailed on Mar. 14, 2024, 13 pages (6 pages of English Translation and 7 pages of Official Copy).
Technology for Teachers and Students, "Adding Music to PowerPoint Presentations—PowerPoint Tutorial", Online available at: https://www.youtube.com/watch?v=tBiwTRLVOd0, Aug. 6, 2018, 6 pages.
Travelvids—Video O, "How to quickly make a Slideshow video on iPhone (No 3rd party Apps required)", Online available at: https://www.youtube.com/watch?v=KpAzFvBQLf0, May 8, 2020, 4 pages.
Applicant-Initiated Interview Summary received for U.S. Appl. No. 17/041,412, mailed on Jan. 31, 2023, 7 pages.
Corrected Notice of Allowance received for U.S. Appl. No. 17/566,094, mailed on Jan. 23, 2023, 2 pages.
Notice of Acceptance received for Australian Patent Application No. 2021290292, mailed on Jan. 23, 2023, 3 pages.
Notice of Allowance received for Chinese Patent Application No. 202111323807.5, mailed on Jan. 10, 2023, 4 pages (1 page of English Translation and 3 pages of Official Copy).
Office Action received for Chinese Patent Application No. 201980012481.9, mailed on Jan. 12, 2023, 18 pages (9 pages of English Translation and 9 pages of Official Copy).
Office Action received for Chinese Patent Application No. 202210063070.6, mailed on Jan. 5, 2023, 12 pages (6 pages of English Translation and 6 pages of Official Copy).
Office Action received for European Patent Application No. 19769316.1, mailed on Jan. 12, 2023, 10 pages.
Office Action received for Korean Patent Application No. 10-2020-0124139, mailed on Jan. 17, 2023, 10 pages (5 pages of English Translation and 5 pages of Official Copy).
Office Action received for Korean Patent Application No. 10-2022-7043663, mailed on Jan. 6, 2023, 12 pages (5 pages of English Translation and 7 pages of Official Copy).
Corrected Notice of Allowance received for U.S. Appl. No. 18/197,242, mailed on May 15, 2024, 2 pages.
Intention to Grant received for European Patent Application No. 22722604.0, mailed on May 14, 2024, 9 pages.
Notice of Acceptance received for Australian Patent Application No. 2023200607, mailed on May 9, 2024, 3 pages.
Notice of Allowance received for U.S. Appl. No. 18/228,591, mailed on May 16, 2024, 5 pages.
Office Action received for Chinese Patent Application No. 202211073034.4, mailed on Mar. 26, 2024, 14 pages (9 pages of English Translation and 5 pages of Official Copy).
Office Action received for European Patent Application No. 20728854.9, mailed on May 7, 2024, 10 pages.
Applicant-Initiated Interview Summary received for U.S. Appl. No. 17/721,039, mailed on Jul. 25, 2023, 3 pages.
Extended European Search Report received for European Patent Application No. 23173036.7, mailed on Jul. 24, 2023, 13 pages.
Notice of Allowance received for U.S. Appl. No. 17/479,897, mailed on Jul. 26, 2023, 7 pages.
Notice of Hearing received for Indian Patent Application No. 201818046896, mailed on Jul. 11, 2023, 2 pages.
Office Action received for Australian Patent Application No. 2022228121, mailed on Jul. 7, 2023, 3 pages.
Office Action received for Chinese Patent Application No. 202211073034.4, mailed on May 30, 2023, 21 pages (10 pages of English Translation and 11 pages of Official Copy).
Summons to Oral Proceedings received for European Patent Application No. 19724959.2, mailed on Jul. 14, 2023, 6 pages.
Decision to Grant received for Japanese Patent Application No. 2022-130725, mailed on Dec. 11, 2023, 2 pages (1 page of English Translation and 1 page of Official Copy).
International Preliminary Report on Patentability received for PCT Patent Application No. PCT/US2022/030589, mailed on Dec. 14, 2023, 22 pages.
International Preliminary Report on Patentability received for PCT Patent Application No. PCT/US2022/030704, mailed on Dec. 14, 2023, 14 pages.
Leonie, "Can I Interrupt Slideshow Music in Mac Photos?", Online available at: <https://discussions.apple.com/thread/8027658?sortBy=best>, Jul. 31, 2017, 1 page.
Non-Final Office Action received for U.S. Appl. No. 17/542,947, mailed on Dec. 15, 2023, 68 pages.
Notice of Acceptance received for Australian Patent Application No. 2022228121, mailed on Dec. 13, 2023, 3 pages.
Office Action received for Australian Patent Application No. 2023200607, mailed on Dec. 20, 2023, 3 pages.
Office Action received for European Patent Application No. 22184853.4, mailed on Dec. 11, 2023, 4 pages.
Summons to Attend Oral Proceedings received for European Patent Application No. 22184844.3, mailed on Dec. 11, 2023, 9 pages.

(56) References Cited

OTHER PUBLICATIONS

Corrected Notice of Allowance received for U.S. Appl. No. 17/041,412, mailed on May 17, 2023, 2 pages.
Corrected Notice of Allowance received for U.S. Appl. No. 17/525,664, mailed on May 17, 2023, 2 pages.
Decision to Grant received for European Patent Application No. 20210373.5, mailed on May 19, 2023, 4 pages.
Notice of Allowance received for Chinese Patent Application No. 202210063070.6, mailed on May 2, 2023, 2 pages (1 page of English Translation and 1 page of Official Copy).
Notice of Allowance received for U.S. Appl. No. 17/356,322, mailed on May 8, 2023, 10 pages.
Summons to Oral Proceedings received for European Patent Application No. 17184710.6, mailed on May 10, 2023, 3 pages.
Applicant-Initiated Interview Summary received for U.S. Appl. No. 17/542,947, mailed on Jun. 6, 2024, 3 pages.
Applicant-Initiated Interview Summary received for U.S. Appl. No. 18/123,878, mailed on Jun. 3, 2024, 3 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on May 23, 2024, 2 pages.
Corrected Notice of Allowance received for U.S. Appl. No. 18/228,591, mailed on May 28, 2024, 5 pages.
Minutes of the Oral Proceedings received for European Patent Application No. 17184710.6, mailed on May 22, 2024, 4 pages.
Notice of Allowance received for U.S. Appl. No. 17/546,968, mailed on May 31, 2024, 24 pages.
Notice of Allowance received for U.S. Appl. No. 18/628,021, mailed on Jun. 5, 2024, 9 pages.
Office Action received for Chinese Patent Application No. 202211072261.5, mailed on Apr. 28, 2024, 19 pages (13 pages of English Translation and 6 pages of Official Copy).
Advisory Action received for U.S. Appl. No. 18/123,878, mailed on Jun. 24, 2024, 4 pages.
Communication for Board of Appeal received for European Patent Application No. 19204230.7, mailed on Jun. 18, 2024, 15 pages.
Corrected Notice of Allowance received for U.S. Appl. No. 18/196,997, mailed on Jun. 13, 2024, 2 pages.
Corrected Notice of Allowance received for U.S. Appl. No. 18/228,591, mailed on Jun. 13, 2024, 5 pages.
Corrected Notice of Allowance received for U.S. Appl. No. 18/628,021, mailed on Jun. 24, 2024, 2 pages.
International Preliminary Report on Patentability received for PCT Patent Application No. PCT/US2022/050916, mailed on Jun. 13, 2024, 18 pages.
Office Action received for Korean Patent Application No. 10-2023-7002360, mailed on Jun. 5, 2024, 6 pages (2 pages of English Translation and 4 pages of Official Copy).
Supplemental Notice of Allowance received for U.S. Appl. No. 17/546,968, mailed on Jun. 14, 2024, 2 pages.
Applicant-Initiated Interview Summary received for U.S. Appl. No. 15/995,040, mailed on Aug. 2, 2022, 5 pages.
Corrected Notice of Allowance received for U.S. Appl. No. 17/409,598, mailed on Jul. 18, 2022, 3 pages.
Notice of Acceptance received for Australian Patent Application No. 2021203177, mailed on Jul. 14, 2022, 3 pages.
Notice of Allowance received for Japanese Patent Application No. 2020-159338, mailed on Jul. 19, 2022, 3 pages (1 page of English Translation and 2 pages of Official Copy).
Notice of Allowance received for U.S. Appl. No. 16/144,629, mailed on Jul. 25, 2022, 10 pages.
Final Office Action received for U.S. Appl. No. 17/479,897, mailed on Jan. 10, 2023, 15 pages.
Intention to Grant received for European Patent Application No. 20210373.5, mailed on Jan. 10, 2023, 12 pages.
Intention to Grant received for European Patent Application No. 21733324.4, mailed on Jan. 9, 2023, 9 pages.
Non-Final Office Action received for U.S. Appl. No. 17/944,765, mailed on Jan. 18, 2023, 9 pages.
Notice of Allowance received for Brazilian Patent Application No. BR122018076550-0, mailed on Jan. 3, 2022, 3 pages (1 page of English Translation and 2 pages of Official Copy).
Notice of Allowance received for Korean Patent Application No. 10-2022-7010505, mailed on Dec. 26, 2022, 7 pages (2 pages of English Translation and 5 pages of Official Copy).
Hourunranta et al., "Video and Audio Editing for Mobile Applications", Proceedings/2006 IEEE international Conference on multimedia and expo, ICME 2006, Jul. 9, 2006, pp. 1305-1308.
Hurwitz, Jon, "Interface For Small-Screen Media Playback Control", Technical Disclosure Commons, Online available at: https://www.tdcommons.org/cgi/viewcontent.cgi?article=4231&context=dpubs_series, Apr. 17, 2020, pp. 1-9.
Intention to Grant received for European Patent Application No. 21733324.4, mailed on Sep. 13, 2022, 7 pages.
Notice of Allowance received for U.S. Appl. No. 17/409,598, mailed on Sep. 14, 2022, 9 pages.
Extended European Search Report received for European Patent Application No. 23204776.1, mailed on May 6, 2024, 8 pages.
Office Action received for European Patent Application No. 22184853.4, mailed on Apr. 29, 2024, 5 pages.
Office Action received for Indian Patent Application No. 202118028158, mailed on Apr. 22, 2024, 7 pages.
Corrected Notice of Allowance received for U.S. Appl. No. 17/525,664, mailed on Nov. 3, 2022, 2 pages.
Corrected Notice of Allowance received for U.S. Appl. No. 17/740,032, mailed on Nov. 3, 2022, 6 pages.
European Search Report received for European Patent Application No. 22184844.3, mailed on Nov. 4, 2022, 4 pages.
Intention to Grant received for European Patent Application No. 20168009.7, mailed on Oct. 31, 2022, 9 pages.
Notice of Allowance received for Korean Patent Application No. 10-2022-7023077, mailed on Nov. 1, 2022, 8 pages (2 pages of English Translation and 6 pages of Official Copy).
Notice of Allowance received for U.S. Appl. No. 17/732,191, mailed on Nov. 9, 2022, 12 pages.
Applicant-Initiated Interview Summary received for U.S. Appl. No. 17/721,039, mailed on Nov. 21, 2023, 3 pages.
Decision to Grant received for European Patent Application No. 22151131.4, mailed on Nov. 16, 2023, 3 pages.
Decision to Grant received for Japanese Patent Application No. 2023-146062, mailed on Nov. 13, 2023, 2 pages (1 page of English Translation and 1 page of Official Copy).
Intention to Grant received for European Patent Application No. 20206196.6, mailed on Nov. 10, 2023, 10 pages.
Non-Final Office Action received for U.S. Appl. No. 17/546,968, mailed on Nov. 24, 2023, 34 pages.
Non-Final Office Action received for U.S. Appl. No. 18/196,997, mailed on Nov. 20, 2023, 12 pages.
Notice of Allowance received for Korean Patent Application No. 10-2022-7029729, mailed on Nov. 9, 2023, 8 pages (2 pages of English Translation and 6 pages of Official Copy).
Notice of Allowance received for U.S. Appl. No. 18/114,880, mailed on Nov. 15, 2023, 11 pages.
Notice of Hearing received for Indian Patent Application No. 201818045872, mailed on Nov. 16, 2023, 2 pages.
Office Action received for Korean Patent Application No. 10-2023-7037005, mailed on Nov. 13, 2023, 13 pages (6 pages of English Translation and 7 pages of Official Copy).
Notice of Acceptance received for Australian Patent Application No. 2022215297, mailed on Sep. 26, 2022, 3 pages.
Notice of Allowance received for Japanese Patent Application No. 2021-565919, mailed on Oct. 3, 2022, 3 pages (1 page of English Translation and 2 of pages Official Copy).
Notice of Allowance received for U.S. Appl. No. 17/740,032, mailed on Oct. 13, 2022, 11 pages.
Office Action received for Brazilian Patent Application No. BR122018076550-0, mailed on Sep. 28, 2022, 7 pages (1 page of English Translation and 6 pages of Official Copy).
Office Action received for Indian Patent Application No. 202215010325, mailed on Oct. 10, 2022, 7 pages.

(56) References Cited

OTHER PUBLICATIONS

Office Action received for Japanese Patent Application No. 2021-166686, mailed on Oct. 3, 2022, 3 pages (2 pages of English Translation and 1 page of Official Copy).
Applicant-Initiated Interview Summary received for U.S. Appl. No. 17/479,897, mailed on Jun. 12, 2023, 2 pages.
Board Decision received for Chinese Patent Application No. 201811446867.4, mailed on Apr. 26, 2023, 21 pages (05 pages of English Translation and 16 pages of Official copy).
Decision to Grant received for European Patent Application No. 21733324.4, mailed on Jun. 2, 2023, 3 pages.
Office Action received for Chinese Patent Application No. 202211072261.5, mailed on Apr. 29, 2023, 17 pages (9 pages of English Translation and 8 pages of Official Copy).
Office Action received for European Patent Application No. 21202358.4, mailed on Jun. 9, 2023, 7 pages.
Yuan Ye, "iPhone 4s Original Secrets", China Railway Press, 2012, 15 pages (Official Copy Only) {See Communication under 37 CFR § 1.98(a) (3)}.
Notice of Acceptance received for Australian Patent Application No. 2022221466, mailed on Aug. 31, 2023, 3 pages.
Notice of Allowance received for Korean Patent Application No. 10-2023-7009943, mailed on Aug. 31, 2023, 7 pages (2 pages of English Translation and 5 pages of Official Copy).
Result of Consultation received for European Patent Application No. 22184844.3, mailed on Aug. 28, 2023, 3 pages.
Brief Communication Regarding Oral Proceedings received for European Patent Application No. 21163791.3, mailed on Nov. 7, 2023, 4 pages.
Notice of Acceptance received for Australian Patent Application No. 2023204616, mailed on Oct. 31, 2023, 3 pages.
Notice of Allowance received for U.S. Appl. No. 17/466,824, mailed on Nov. 8, 2023, 5 pages.
Office Action received for Japanese Patent Application No. 2022-095182, mailed on Sep. 25, 2023, 10 pages (5 pages of English Translation and 5 pages of Official Copy).
Decision to Refuse received for European Patent Application No. 21163791.3, mailed on Dec. 4, 2023, 16 pages.
Minutes of the Oral Proceedings received for European Patent Application No. 21163791.3, mailed on Dec. 1, 2023, 6 pages.
Non-Final Office Action received for U.S. Appl. No. 18/197,242, mailed on Dec. 7, 2023, 24 pages.
Notice of Allowance received for U.S. Appl. No. 18/121,458, mailed on Dec. 6, 2023, 9 pages.
Notice of Hearing received for Indian Patent Application No. 202118028159, mailed on Nov. 22, 2023, 2 pages.
Office Action received for Japanese Patent Application No. 2023-041079, mailed on Nov. 21, 2023, 6 pages (3 pages of English Translation and 3 pages of Official Copy).
Office Action received for Japanese Patent Application No. 2022-130725, mailed on Sep. 4, 2023, 2 pages (1 page of English Translation and 1 page of Official Copy).
Decision to Grant received for European Patent Application No. 20206197.4, mailed on Oct. 6, 2023, 4 pages.
Non-Final Office Action received for U.S. Appl. No. 17/721,039, mailed on Oct. 12, 2023, 77 pages.
Notice of Acceptance received for Australian Patent Application No. 2022228191, mailed on Oct. 10, 2023, 3 pages.
Office Action received for European Patent Application No. 22722604.0, mailed on Oct. 13, 2023, 11 pages.
Office Action received for Japanese Patent Application No. 2022-145387, mailed on Oct. 2, 2023, 7 pages (3 pages of English Translation and 4 pages of Official Copy).
Corrected Notice of Allowance received for U.S. Appl. No. 17/479,897, mailed on Aug. 17, 2023, 2 pages.
Decision to Grant received for Japanese Patent Application No. 2023-083816, mailed on Aug. 9, 2023, 2 pages (1 page of English Translation and 1 page of Official Copy).
Intention to Grant received for European Patent Application No. 22151131.4, mailed on Aug. 4, 2023, 10 pages.
Notice of Allowance received for Korean Patent Application No. 10-2022-7033119, mailed on Jul. 26, 2023, 7 pages (2 pages of English Translation and 5 pages of Official Copy).
Notice of Allowance received for Korean Patent Application No. 10-2022-7043663, mailed on Jul. 25, 2023, 8 pages (2 pages of English Translation and 6 pages of Official Copy).
Corrected Notice of Allowance received for U.S. Appl. No. 17/566,094, mailed on Feb. 8, 2023, 2 pages.
Corrected Notice of Allowance received for U.S. Appl. No. 17/356,322, mailed on Feb. 15, 2023, 2 pages.
Non-Final Office Action received for U.S. Appl. No. 17/721,039, mailed on Feb. 2, 2023, 65 pages.
Notice of Allowance received for U.S. Appl. No. 17/356,322, mailed on Feb. 2, 2023, 11 pages.
Notice of Allowance received for U.S. Appl. No. 17/510,168, mailed on Feb. 13, 2023, 10 pages.
Notice of Allowance received for U.S. Appl. No. 17/525,664, mailed on Feb. 14, 2023, 10 pages.
Notice of Allowance received for U.S. Appl. No. 17/740,032, mailed on Feb. 1, 2023, 9 pages.
Office Action received for Indian Patent Application No. 202117009020, mailed on Feb. 6, 2023, 7 pages.
Office Action received for Japanese Patent Application No. 2021-187533, mailed on Feb. 6, 2023, 7 pages (4 pages of English Translation and 3 pages of Official Copy).
Result of Consultation received for European Patent Application No. 22184844.3, mailed on Feb. 1, 2023, 3 pages.
Corrected Notice of Allowance received for U.S. Appl. No. 17/525,664, mailed on Feb. 23, 2023, 2 pages.
Corrected Notice of Allowance received for U.S. Appl. No. 17/740,032, mailed on Feb. 15, 2023, 6 pages.
Non-Final Office Action received for U.S. Appl. No. 17/542,947, mailed on Mar. 2, 2023, 59 pages.
Notice of Allowance received for Japanese Patent Application No. 2022-027861, mailed on Feb. 13, 2023, 3 pages (1 page of English Translation and 2 pages of Official Copy).
Notice of Allowance received for U.S. Appl. No. 17/566,094, mailed on Feb. 23, 2023, 8 pages.
Notice of Allowance received for U.S. Appl. No. 17/732,191, mailed on Feb. 27, 2023, 12 pages.
Office Action received for Chinese Patent Application No. 202110766668.7, mailed on Jan. 20, 2023, 11 pages (6 pages of English Translation and 5 pages of Official Copy).
Office Action received for Chinese Patent Application No. 202210849242.2, mailed on Jan. 20, 2023, 12 pages (6 pages of English Translation and 6 pages of Official Copy).
Corrected Notice of Allowance received for U.S. Appl. No. 17/041,412, mailed on Mar. 23, 2023, 7 pages.
Corrected Notice of Allowance received for U.S. Appl. No. 17/041,412, mailed on Mar. 31, 2023, 6 pages.
Corrected Notice of Allowance received for U.S. Appl. No. 17/510,168, mailed on Mar. 29, 2023, 2 pages.
Notice of Allowance received for U.S. Appl. No. 17/944,765, mailed on Apr. 5, 2023, 9 pages.
Office Action received for Australian Patent Application No. 2022218463, mailed on Mar. 17, 2023, 2 pages.
Applicant-Initiated Interview Summary received for U.S. Appl. No. 17/356,322, mailed on Dec. 27, 2022, 4 pages.
Corrected Notice of Allowance received for U.S. Appl. No. 17/566,094, mailed on Jan. 5, 2023, 2 pages.
Intention to Grant received for European Patent Application No. 20206197.4, mailed on Dec. 15, 2022, 10 pages.
International Preliminary Report on Patentability received for PCT Patent Application No. PCT/US2021/034304, mailed on Dec. 15, 2022, 19 pages.
Applicant-Initiated Interview Summary received for U.S. Appl. No. 17/542,947, mailed on Apr. 28, 2023, 4 pages.
Decision to Grant received for Japanese Patent Application No. 2021-166686, mailed on Apr. 20, 2023, 2 pages (1 page of English Translation and 1 page of Official Copy).
Non-Final Office Action received for U.S. Appl. No. 17/479,897, mailed on Apr. 25, 2023, 14 pages.

(56) References Cited

OTHER PUBLICATIONS

Notice of Acceptance received for Australian Patent Application No. 2022218463, mailed on Apr. 18, 2023, 3 pages.
Notice of Allowance received for U.S. Appl. No. 17/041,412, mailed on Apr. 26, 2023, 11 pages.
Notice of Allowance received for U.S. Appl. No. 17/510,168, mailed on May 3, 2023, 10 pages.
Notice of Allowance received for U.S. Appl. No. 17/525,664, mailed on Apr. 26, 2023, 10 pages.
Notice of Allowance received for U.S. Appl. No. 17/940,672, mailed on Apr. 27, 2023, 9 pages.
Office Action received for European Patent Application No. 22184844.3, mailed on Apr. 26, 2023, 5 pages.
Office Action received for European Patent Application No. 22184853.4, mailed on Apr. 26, 2023, 4 pages.
Summons to Attend Oral Proceedings received for European Patent Application No. 21163791.3, mailed on May 3, 2023, 6 pages.
Corrected Notice of Allowance received for U.S. Appl. No. 17/944,765, mailed on Jun. 1, 2023, 5 pages.
Computerhilfen,"Whatsapp: Voice Message without Holding the Button", Retrieved from Internet: <https://www.youtube.com/watch?v=ofFCKvs5URw>, Jan. 14, 2018, 9 pages.
Final Office Action received for U.S. Appl. No. 17/542,947, mailed on May 25, 2023, 55 pages.
Intention to Grant received for European Patent Application No. 20206197.4, mailed on May 25, 2023, 9 pages.
International Search Report and Written Opinion received for PCT Patent Application No. PCT/US2022/050916, mailed on May 15, 2023, 23 pages.
Invitation to Pay Additional Fee received for PCT Patent Application No. PCT/US2022/050916, mailed on Mar. 23, 2023, 16 pages.
Non-Final Office Action received for U.S. Appl. No. 15/995,040, mailed on Jun. 7, 2023, 26 pages.
Non-Final Office Action received for U.S. Appl. No. 17/466,824, mailed on May 25, 2023, 33 pages.
Notice of Acceptance received for Australian Patent Application No. 2022204465, mailed on May 26, 2023, 3 pages.
Applicant-Initiated Interview Summary received for U.S. Appl. No. 17/466,824, mailed on Apr. 20, 2023, 2 pages.
Corrected Notice of Allowance received for U.S. Appl. No. 17/041,412, mailed on Apr. 12, 2023, 2 pages.
Corrected Notice of Allowance received for U.S. Appl. No. 17/525,664, mailed on Apr. 11, 2023, 2 pages.
Hearing Notice received for Indian Patent Application No. 201817024430, mailed on Apr. 6, 2023, 2 pages.
International Preliminary Report on Patentability received for PCT Patent Application No. PCT/US2021/046877, mailed on Apr. 6, 2023, 12 pages.
Office Action received for Chinese Patent Application No. 202211072958.2, mailed on Apr. 5, 2023, 11 pages (6 pages of English Translation and 5 pages of Official Copy).
Office Action received for Indian Patent Application No. 202215026045, mailed on Mar. 31, 2023, 8 pages.
Office Action received for Korean Patent Application No. 10-2022-7033119, mailed on Mar. 29, 2023, 5 pages (2 pages of English Translation and 3 pages of Official Copy).
Applicant-Initiated Interview Summary received for U.S. Appl. No. 15/995,040, mailed on Nov. 18, 2022, 5 pages.
European Search Report received for European Patent Application No. 22184853.4, mailed on Nov. 14, 2022, 5 pages.
Final Office Action received for U.S. Appl. No. 17/356,322, mailed on Nov. 29, 2022, 19 pages.
Final Office Action received for U.S. Appl. No. 17/466,824, mailed on Nov. 25, 2022, 35 pages.
Notice of Allowance received for Japanese Patent Application No. 2020-542592, mailed on Nov. 14, 2022, 2 pages (1 page of English Translation and 1 page of Official Copy).
Notice of Allowance received for U.S. Appl. No. 17/566,094, mailed on Nov. 22, 2022, 10 pages.
Office Action received for European Patent Application No. 22184844.3, mailed on Nov. 16, 2022, 7 pages.
Office Action received for Japanese Patent Application No. 2022-027861, mailed on Nov. 21, 2022, 4 pages (2 pages of English Translation and 2 pages of Official Copy).
Corrected Notice of Allowance received for U.S. Appl. No. 17/409,598, mailed on Jul. 7, 2022, 2 pages.
Notice of Acceptance received for Australian Patent Application No. 2019338180, mailed on Jun. 27, 2022, 3 pages.
Notice of Allowance received for Korean Patent Application No. 10-2020-7022663, mailed on Jun. 23, 2022, 6 pages (2 pages of English Translation and 4 pages of Official Copy).
Office Action received for Indian Patent Application No. 202118028159, mailed on Jun. 27, 2022, 6 pages.
Office Action received for Korean Patent Application No. 10-2022-7010505, mailed on Jun. 14, 2022, 5 pages (2 pages of English Translation and 3 pages of Official Copy).
Applicant-Initiated Interview Summary received for U.S. Appl. No. 17/542,947, mailed on Jul. 10, 2023, 4 pages.
Decision to Grant received for European Patent Application No. 20168009.7, mailed on Jun. 22, 2023, 4 pages.
Final Office Action received for U.S. Appl. No. 17/721,039, mailed on Jul. 6, 2023, 66 pages.
Notice of Allowance received for Korean Patent Application No. 10-2020-0124139, mailed on Jun. 19, 2023, 7 pages (2 pages of English Translation and 5 pages of Official Copy).
Office Action received for Australian Patent Application No. 2022221466, mailed on Jun. 16, 2023, 2 pages.
Office Action received for Chinese Patent Application No. 202110766668.7, mailed on Jun. 7, 2023, 13 pages (9 pages of English Translation and 4 pages of Official Copy).
Office Action received for Japanese Patent Application No. 2021-187533, mailed on Jun. 26, 2023, 6 pages (3 pages of English Translation and 3 pages of Official Copy).
Applicant-Initiated Interview Summary received for U.S. Appl. No. 17/479,897, mailed on Oct. 31, 2022, 3 pages.
Notice of Allowance received for U.S. Appl. No. 17/483,684, mailed on Oct. 24, 2022, 9 pages.
Notice of Allowance received for U.S. Appl. No. 17/525,664, mailed on Oct. 27, 2022, 11 pages.
Office Action received for Chinese Patent Application No. 202110766668.7, mailed on Sep. 15, 2022, 18 pages (9 pages of English Translation and 9 pages of Official Copy).
Office Action received for Korean Patent Application No. 10-2021-7006145, mailed on Oct. 12, 2022, 14 pages (6 pages of English Translation and 8 pages of Official Copy).
Drunk Beauty Flower Digital Technology, "iPhone XS Max Camera Tips, Tricks, Features and Complete Tutorial", Available online at: https://www.ixigua.com/6606874981844386308?wid_try=1, Oct. 2, 2018, 2 pages (Official Copy Only). {See communication under 37 CFR § 1.98(a) (3)}.
International Search Report and Written Opinion received for PCT Patent Application No. PCT/US2022/024964, mailed on Aug. 4, 2022, 17 pages.
Non-Final Office Action received for U.S. Appl. No. 17/356,322, mailed on Aug. 11, 2022, 17 pages.
Notice of Allowance received for U.S. Appl. No. 17/483,684, mailed on Aug. 16, 2022, 9 pages.
Office Action received for Chinese Patent Application No. 202111323807.5, mailed on Jul. 15, 2022, 12 pages (6 pages of English Translation and 6 pages of Official Copy).
Office Action received for European Patent Application No. 20206196.6, mailed on Aug. 10, 2022, 13 pages.
Office Action received for Korean Patent Application No. 10-2022-7023077, mailed on Jul. 25, 2022, 6 pages (2 pages of English Translation and 4 pages of Official Copy).
[B612] Addition of facial recognition bear/cat stamps and AR background function having moving sparkles or hearts, Available Online at: <URL, htpps://apptopi.jp/2017/01/22/b612>, Jan. 22, 2017, 11 pages.
Advisory Action received for U.S. Appl. No. 16/144,629, mailed on Dec. 13, 2019, 9 pages.

(56) References Cited

OTHER PUBLICATIONS

Advisory Action received for U.S. Appl. No. 16/144,629, mailed on Jan. 6, 2021, 10 pages.
Applicant Initiated Interview Summary received for U.S. Appl. No. 17/190,879, mailed on Oct. 26, 2021, 3 pages.
Applicant-Initiated Interview Summary received for U.S. Appl. No. 16/271,583 mailed on Mar. 2, 2020, 3 pages.
Applicant-Initiated Interview Summary received for U.S. Appl. No. 16/271,583, mailed on Jul. 14, 2020, 4 pages.
Applicant-Initiated Interview Summary received for U.S. Appl. No. 15/995,040, mailed on Dec. 23, 2019, 5 pages.
Applicant-Initiated Interview Summary received for U.S. Appl. No. 15/995,040, mailed on Jul. 27, 2020, 4 pages.
Applicant-Initiated Interview Summary received for U.S. Appl. No. 15/995,040, mailed on Nov. 24, 2020, 4 pages.
Applicant-Initiated Interview Summary received for U.S. Appl. No. 16/144,629, mailed on Jul. 2, 2020, 5 pages.
Applicant-Initiated Interview Summary received for U.S. Appl. No. 16/144,629, mailed on Nov. 23, 2020, 3 pages.
Applicant-Initiated Interview Summary received for U.S. Appl. No. 16/528,257, mailed on Nov. 18, 2021, 2 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/584,100, mailed on Feb. 19, 2020, 3 pages.
Applicant-Initiated Interview Summary received for U.S. Appl. No. 16/586,344, mailed on Feb. 27, 2020, 3 pages.
Applicant-Initiated Interview Summary received for U.S. Appl. No. 16/599,433, mailed on Apr. 20, 2021, 7 pages.
Applicant-Initiated Interview Summary received for U.S. Appl. No. 16/733,718, mailed on Nov. 2, 2020, 4 pages
Applicant-Initiated Interview Summary received for U.S. Appl. No. 17/027,317, mailed on Dec. 21, 2020, 4 pages.
Applicant-Initiated Interview Summary received for U.S. Appl. No. 17/220,596, mailed on Aug. 18, 2021, 3 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages
Certificate of Examination received for Australian Patent Application No. 2017100683, mailed on Jan. 16, 2018, 2 pages.
Certificate of Examination received for Australian Patent Application No. 2019100420, mailed on Jul. 3, 2019, 2 pages.
Certificate of Examination received for Australian Patent Application No. 2019100794, mailed on Dec. 19, 2019, 2 pages.
Certificate of Examination received for Australian patent Application No. 2020100189, mailed on May 12, 2020, 2 pages.
Certificate of Examination received for Australian Patent Application No. 2020100720, mailed on Nov. 11, 2020, 2 pages.
Certificate of Examination received for Australian Patent Application No. 2020101043, mailed on Dec. 22, 2020, 2 pages.
Certificate of Examination received for Australian Patent Application No. 2020104220, mailed on Apr. 1, 2021, 2 pages.
Certificate of Examination received for Australian Patent Application No. 2021103004, mailed on Sep. 13, 2021, 2 pages.
Certificate of Examination received for Australian Patent Application No. 2021107587, mailed on Apr. 29, 2022. 2 pages.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed Nov. 2, 2017, 2 pages.
Corrected Notice of Allowance received for U.S. Appl. No. 15/273,503, mailed Nov. 24, 2017, 2 pages.
Corrected Notice of Allowance received for U.S. Appl. No. 15/858,175, mailed on Sep. 21 , 2018, 2 pages
Corrected Notice of Allowance received for U.S. Appl. No. 16/143,097, mailed Nov. 8, 2019, 3 pages.
Corrected Notice of Allowance received for U.S. Appl. No. 16/143,396, mailed on Jan. 30, 2020, 2 pages.
Corrected Notice of Allowance received for U.S. Appl. No. 16/144,629, mailed on Apr. 21, 2022, 5 pages.
Corrected Notice of Allowance received for U.S. Appl. No. 16/144,629, mailed on Jun. 23, 2022, 5 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/528,257, mailed on Feb. 3, 2022, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020., 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/599,433, mailed on Aug. 13, 2021, 5 pages.
Corrected Notice of Allowance received for U.S. Appl. No. 16/599,433, mailed on Oct. 14, 2021, 3 pages.
Corrected Notice of Allowance received for U.S. Appl. No. 16/733,718, mailed on Aug. 18, 2021, 2 pages.
Corrected Notice of Allowance received for U.S. Appl. No. 16/733,718, mailed on Nov. 17, 2021, 2 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.

(56) References Cited

OTHER PUBLICATIONS

Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 16/840,719, mailed on Jul. 8, 2021, 8 pages.
Corrected Notice of Allowance received for U.S. Appl. No. 16/840,719, mailed on May 14, 2021, 4 pages.
Corrected Notice of Allowance received for U.S. Appl. No. 17/027,484, mailed on May 14, 2021, 5 pages.
Corrected Notice of Allowance received for U.S. Appl. No. 17/027,484, mailed on May 28, 2021, 5 pages.
Corrected Notice of Allowance received for U.S. Appl. No. 17/190,879, mailed on Nov. 19, 2021, 2 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Corrected Notice of Allowance received for U.S. Appl. No. 17/354,376, mailed on Apr. 11, 2022, 5 pages.
Corrected Notice of Allowance received for U.S. Appl. No. 17/354,376, mailed on Feb. 16, 2022, 5 pages.
Corrected Notice of Allowance received for U.S. Appl. No. 17/354,376, mailed on Mar. 23, 2022, 6 pages.
Corrected Notice of Allowance received for U.S. Appl. No. 17/484,279, mailed on Feb. 15, 2022, 2 pages.
Corrected Notice of Allowance received for U.S. Appl. No. 17/484,279, mailed on Feb. 28, 2022, pages.
Corrected Notice of Allowance received for U.S. Appl. No. 17/484,307, mailed on Apr. 20, 2022, 2 pages.
Corrected Notice of Allowance received for U.S. Appl. No. 17/484,307, mailed on Feb. 10, 2022, 7 pages.
Corrected Notice of Allowance received for U.S. Appl. No. 17/484,321, mailed on Mar. 24, 2022, 2 pages.
Decision of Refusal received for Japanese Patent Application No. 2018-243463, mailed on Feb. 25, 2019, 8 pages.
Decision of Refusal received for Japanese Patent Application No. 2018-545502, mailed on Feb. 25, 2019, 11 pages.
Decision on Appeal received for Japanese Patent Application No. 2018-225131, mailed on Mar. 11, 2021, 5 pages.
Decision on Appeal received for Japanese Patent Application No. 2018-545502, mailed on Mar. 25, 2021, 3 pages.
Decision on Appeal received for U.S. Appl. No. 15/995,040, mailed on Dec. 29, 2021, 14 pages.
Decision on Appeal received for U.S. Appl. No. 16/144,629, mailed on Jan. 18, 2022, 8 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.
Decision to Grant received for Danish Patent Application No. PA201770719, mailed on Feb. 3, 2022, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 15712218.5, mailed on Jun. 7, 2018, 2 pages.
Decision to Grant received for European Patent Application No. 16784025.5, mailed on Nov. 11, 2021, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for Japanese Patent Application No. 2018-182607, mailed on Apr. 13, 2022, 3 pages.
Decision to Grant received for Japanese Patent Application No. 2018-243463, mailed on Aug. 17, 2020, 2 pages.
Decision to Grant received for Japanese Patent Application No. 2019-203399, mailed on Oct. 20, 2021, 3 pages.
Decision to Grant received for Japanese Patent Application No. 2019-566087, mailed on Jan. 26, 2022, 2 pages.
Decision to Grant received for Japanese Patent Application No. 2020-070418, mailed on Feb. 8, 2021, 3 pages.
Decision to Grant received for Japanese Patent Application No. 2020-184470, mailed on Jul. 1, 2021, 3 pages.
Decision to Grant received for Japanese Patent Application No. 2020-184471, mailed on Jul. 1, 2021, 3 pages.
Decision to Grant received for Japanese Patent Application No. 2020-193703, mailed on Aug. 10, 2021, 3 pages.
Decision to Grant received for Japanese Patent Application No. 2021-051385, mailed on Jul. 8, 2021, 3 pages.
Decision to Refuse received for European Patent Application No. 17184710.6, mailed on Jun. 16, 2020, 9 pages.
Decision to Refuse received for European Patent Application No. 19204230.7, mailed on Feb. 4, 2022, 15 pages.
Decision to Refuse received for European Patent Application No. 19724959.2, mailed on Jun. 22, 2021, 13 pages.
Decision to Refuse received for Japanese Patent Application No. 2018-225131, mailed on Jul. 8, 2019, 6 pages.
Decision to Refuse received for Japanese Patent Application No. 2018-243463, mailed on Jul. 8, 2019, 5 pages.
Decision to Refuse received for Japanese Patent Application No. 2018-545502, mailed on Jul. 8, 2019, 5 pages.
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
European Search Report received for European Patent Application No. 21163791.3, mailed on May 6, 2021, 5 pages.
Examiner Initiated-Interview Summary received for U.S. Appl. No. 16/528,941, mailed on Dec. 1, 2020, 2 pages.
Examiner-Initiated Interview Summary received for U.S. Appl. No. 17/220,596, mailed on Oct. 7, 2021, 2 pages.
Examiner's Answer to Appeal Brief received for U.S. Appl. No. 15/995,040, mailed on Jun. 23, 2021, 31 pages.
Examiner's Answer to Appeal Brief received for U.S. Appl. No. 16/144,629, mailed on Jul. 21, 2021, 21 pages.
Extended European Search Report (includes Supplementary European Search Report and Search Opinion) received for European Patent Application No. 17184710.6, mailed on Nov. 28, 2017, 10 pages.
Extended European Search Report received for European Patent Application No. 16784025.5, mailed on Apr. 16, 2018, 11 pages.
Extended European Search Report received for European Patent Application No. 19204230.7, mailed on Feb. 21, 2020, 7 pages.

(56) References Cited

OTHER PUBLICATIONS

Extended European Search Report received for European Patent Application No. 20168009.7, mailed on Sep. 11, 2020, 12 pages.
Extended European Search Report received for European Patent Application No. 21202358.4, mailed on Dec. 6, 2021, 8 pages.
Extended European Search Report received for European Patent Application No. 22151131.4, mailed on Mar. 24, 2022, 6 pages.
Extended Search Report received for European Patent Application 17809168.2, mailed on Jun. 28, 2018, 9 pages.
Final Office Action received for U.S. Appl. No. 15/268,115, mailed on Oct. 11, 2017, 48 pages.
Final Office Action received for U.S. Appl. No. 15/728,147, mailed on Aug. 29, 2018, 39 pages.
Final Office Action received for U.S. Appl. No. 15/728,147, mailed on May 28, 2019, 45 pages.
Final Office Action received for U.S. Appl. No. 15/995,040, mailed on Oct. 17, 2019, 20 pages.
Final Office Action received for U.S. Appl. No. 15/995,040, mailed on Sep. 2, 2020, 21 pages.
Final Office Action received for U.S. Appl. No. 16/143,396, mailed on Jun. 20, 2019, 14 pages.
Final Office Action received for U.S. Appl. No. 16/144,629, mailed on Sep. 11, 2020, 22 pages.
Final Office Action received for U.S. Appl. No. 16/144,629, mailed on Sep. 18, 2019, 22 pages.
Final Office Action received for U.S. Appl. No. 16/271,583, mailed on Aug. 26, 2020, 18 pages.
Final Office Action received for U.S. Appl. No. 16/528,941, mailed on Jul. 13, 2020, 15 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670627, mailed on Jun. 11, 2018, 2 pages.
Intention to Grant received for Danish Patent Application No. PA201670753, mailed on Oct. 29, 2018, 2 pages.
Intention to Grant received for Danish Patent Application No. PA201670755, mailed on Nov. 13, 2018, 2 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.
Intention to Grant received for Danish Patent Application No. PA202070611, mailed on May 5, 2021, 2 pages.
Intention to Grant received for European Patent Application No. 15712218.5, mailed on Jan. 24, 2018, 7 pages.
Intention to Grant received for European Patent Application No. 16784025.5, mailed on Jul. 15, 2021, 8 pages.
Intention to Grant received for European Patent Application No. 17809168.2, mailed on Jun. 25, 2021, 8 pages.
Intention to Grant received for European Patent Application No. 18176890.4, mailed on Feb. 28, 2020, 8 pages.
Intention to Grant received for European Patent Application No. 18183054.8, mailed on Nov. 5, 2020, 6 pages.
Intention to Grant received for European Patent Application No. 18209460.7, mailed on Jan. 15, 2021, 8 pages.
Intention to Grant received for European Patent Application No. 18214698.5, mailed on Apr. 21, 2020, 8 pages.
Intention to Grant received for European Patent Application No. 20168009.7, mailed on May 17, 2022, 9 pages.
International Preliminary Report on Patentability and Written Opinion received for PCT Application No. PCT/US2016/029030, mailed on Nov. 2, 2017., 35 pages.
International Preliminary Report on Patentability received for PCT Patent Application No. PCT/US2015/019298, mailed on Mar. 16, 2017., 12 pages.
International Preliminary Report on Patentability received for PCT Patent Application No. PCT/US2017/035321, mailed on Dec. 27, 2018, 11 Pages.
International Preliminary Report on Patentability received for PCT Patent Application No. PCT/US2018/015591, mailed on Dec. 19, 2019, 10 pages.
International Preliminary Report on Patentability received for PCT Patent Application No. PCT/US2019/017363, mailed on Aug. 20, 2020, 9 pages.
International Preliminary Report on Patentability received for PCT Patent Application No. PCT/US2019/024067, mailed on Nov. 19, 2020, 12 pages.
International Preliminary Report on Patentability received for PCT Patent Application No. PCT/US2019/049101, mailed on Mar. 25, 2021, 17 pages.
International Preliminary Report on Patentability received for PCT Patent Application No. PCT/US2020/031643, mailed on Nov. 18, 2021, 27 pages.
International Search Report & Written Opinion received for PCT Patent Application No. PCT/US2016/029030, mailed on Aug. 5, 2016, 37 pages.
International Search Report and Written Opinion received for PCT Patent Application No. PCT/US2017/035321, mailed on Oct. 6, 2017, 15 pages.
International Search Report and Written Opinion received for PCT Patent Application No. PCT/US2018/015591, mailed on Jun. 14, 2018, 14 pages.
International Search Report and Written Opinion received for PCT Patent Application No. PCT/US2019/017363, mailed on Aug. 12, 2019, 12 pages.
International Search Report and Written Opinion received for PCT Patent Application No. PCT/US2019/024067, mailed on Oct. 9, 2019, 18 pages.
International Search Report and Written Opinion received for PCT Patent Application No. PCT/US2019/049101, mailed on Dec. 16, 2019, 26 pages.
International Search Report and Written Opinion received for PCT Patent Application No. PCT/US2020/031643, mailed on Dec. 2, 2020, 33 pages.
International Search Report and Written Opinion received for PCT Patent Application No. PCT/US2020/031643, mailed on Nov. 2, 2020, 34 pages.
International Search Report and Written Opinion received for PCT Patent Application No. PCT/US2021/034304, mailed on Oct. 11, 2021, 24 pages.
International Search Report and Written Opinion received for PCT Patent Application No. PCT/US2021/046877, mailed on Mar. 1, 2022, 17 pages.
Invitation to Pay Addition Fees received for PCT Patent Application No. PCT/US2017/035321, mailed on Aug. 17, 2017, 3 pages.
Invitation to Pay Additional Fees and Partial International Search Report received for PCT Patent Application No. PCT/US2019/049101, mailed on Oct. 24, 2019, 17 pages.
Invitation to Pay Additional Fees received for PCT Patent Application No. PCT/US2019/017363, mailed on Jun. 17, 2019, 8 pages.
Invitation to Pay Additional Fees received for PCT Patent Application No. PCT/US2019/024067, mailed on Jul. 16, 2019, 13 pages.
Invitation to Pay Additional Fees received for PCT Patent Application No. PCT/US2020/031643, mailed on Sep. 9, 2020, 30 pages.
Invitation to Pay Additional Fees received for PCT Patent Application No. PCT/US2021/034304, mailed on Aug. 20, 2021, 16 pages.
Invitation to Pay Additional Fees received for PCT Patent Application No. PCT/US2021/046877, mailed on Jan. 5, 2022, 10 pages.
Invitation to Pay Search Fees received for European Patent Application No. 18704732.9, mailed on Jun. 2, 2021, 3 pages.
Invitation to Pay Search Fees received for European Patent Application No. 19724959.2, mailed on Feb. 25, 2020, 3 pages.
iPhone User Guide For iOS 4.2 and 4.3 Software, Available at https://manuals.info.apple.com/MANUALS/1000/MA1539/en_US/iPhone_iOS4_User_Guide.pdf, 2011, 274 pages.
Minutes of the Oral Proceedings received for European Patent Application No. 19204230.7, mailed on Feb. 2, 2022, 9 pages.

(56) References Cited

OTHER PUBLICATIONS

Minutes of the Oral Proceedings received for European Patent Application No. 19724959.2, mailed on Jun. 14, 2021, 6 pages.
Nikon Digital Camera D7200 User's Manual, Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 16/528,257, mailed on Jul. 30, 2021, 12 pages.
Non-Final Office Action received for U.S. Appl. No. 14/869,807, mailed on Dec. 2, 2016, 23 pages.
Non-Final Office Action received for U.S. Appl. No. 15/136,323, mailed on Apr. 6, 2017, 27 pages.
Non-Final Office Action received for U.S. Appl. No. 15/268,115, mailed on Apr. 13, 2017, 44 pages.
Non-Final Office Action received for U.S. Appl. No. 15/273,522, mailed on Nov. 30, 2016, 15 pages.
Non-Final Office Action received for U.S. Appl. No. 15/273,544, mailed on May 25, 2017, 18 pages.
Non-Final Office Action received for U.S. Appl. No. 15/728,147, mailed on Feb. 22, 2018, 20 pages.
Non-Final Office Action received for U.S. Appl. No. 15/728,147, mailed on Jan. 31, 2019, 41 pages.
Non-Final Office Action received for U.S. Appl. No. 15/863,369, mailed on Apr. 4, 2018, 15 pages.
Non-Final Office Action received for U.S. Appl. No. 15/995,040, mailed on Apr. 8, 2022, 21 pages.
Non-Final Office Action received for U.S. Appl. No. 15/995,040, mailed on Apr. 15, 2020, 19 pages.
Non-Final Office Action received for U.S. Appl. No. 15/995,040, mailed on May 16, 2019, 24 pages.
Non-Final Office Action received for U.S. Appl. No. 16/143,097, mailed on Feb. 28, 2019, 17 pages.
Non-Final Office Action received for U.S. Appl. No. 16/143,396, mailed on Jan. 7, 2019, 13 pages.
Non-Final Office Action received for U.S. Appl. No. 16/144,629, mailed on Mar. 13, 2020, 24 pages.
Non-Final Office Action received for U.S. Appl. No. 16/144,629, mailed on Mar. 29, 2019, 18 pages.
Non-Final Office Action received for U.S. Appl. No. 16/271,583, mailed on May 6, 2020, 24 pages.
Non-Final Office Action received for U.S. Appl. No. 16/271,583, mailed on Nov. 29, 2019, 18 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/582,595, mailed on Nov. 26, 2019, 17 pages.
Non-Final Office Action received for U.S. Appl. No. 16/583,020, mailed on Nov. 14, 2019, 9 pages.
Non-Final Office Action received for U.S. Appl. No. 16/599,433, mailed on Jan. 28, 2021, 16 pages.
Non-Final Office Action received for U.S. Appl. No. 16/733,718, mailed on Sep. 16, 2020, 25 pages.
Non-Final Office Action received for U.S. Appl. No. 16/825,879, mailed on May 5, 2021, 12 pages.
Non-Final Office Action received for U.S. Appl. No. 17/027,317, mailed on Nov. 17, 2020, 17 pages.
Non-Final Office Action received for U.S. Appl. No. 17/190,879, mailed on Oct. 13, 2021, 10 pages.
Non-Final Office Action received for U.S. Appl. No. 17/220,596, mailed on Jun. 10, 2021, 31 pages.
Non-Final Office Action received for U.S. Appl. No. 17/466,824, mailed on May 11, 2022, 30 pages.
Notice of Acceptance received for Australian Patent Application No. 2016252993, mailed on Dec. 19, 2017, 3 pages.
Notice of Acceptance received for Australian Patent Application No. 2017286130, mailed on Apr. 26, 2019, 3 pages.
Notice of Acceptance received for Australian Patent Application No. 2018279787, mailed on Dec. 10, 2019, 3 pages.
Notice of Acceptance received for Australian Patent Application No. 2019213341, mailed on Aug. 25, 2020, 3 pages.
Notice of Acceptance received for Australian Patent Application No. 2019218241, mailed on Mar. 9, 2022, 3 pages.
Notice of Acceptance received for Australian Patent Application No. 2019266049, mailed on Nov. 24, 2020, 3 pages.
Notice of Acceptance received for Australian Patent Application No. 2020201969, mailed on Mar. 26, 2021, 3 pages.
Notice of Acceptance received for Australian Patent Application No. 2020239717, mailed on Jun. 1, 2022, 3 pages.
Notice of Acceptance received for Australian Patent Application No. 2020260413, mailed on Oct. 14, 2021, 3 pages.
Notice of Acceptance received for Australian Patent Application No. 2020267151, mailed on Dec. 9, 2020, 3 pages.
Notice of Acceptance received for Australian Patent Application No. 2020277216, mailed on Mar. 15, 2021, 3 pages.
Notice of Acceptance received for Australian Patent Application No. 2021201167, mailed on Mar. 15, 2021, 3 pages.
Notice of Acceptance received for Australian Patent Application No. 2021201295, mailed on May 10, 2022, 3 pages.
Notice of Acceptance received for Australian Patent Application No. 2021203210, mailed on Jul. 9, 2021, 3 pages.
Notice of Acceptance received for Australian Patent Application No. 2021254567, mailed on Nov. 17, 2021, 3 pages.
Notice of Acceptance received for Australian Patent Application No. 2022200966, mailed on Feb. 25, 2022, 3 pages.
Notice of Acceptance received for Australian Patent Application No. 2022202377, mailed on May 11, 2022, 3 pages.
Notice of Allowance received for Brazilian Patent Application No. 112018074765-3, mailed on Oct. 8, 2019, 2 pages.
Notice of Allowance received for Chinese Patent Application No. 201580046237.6, mailed on Aug. 29, 2018, 4 pages.
Notice of Allowance received for Chinese Patent Application No. 201680023520.1, mailed on Jun. 28, 2019, 2 pages.
Notice of Allowance received for Chinese Patent Application No. 201710657424.9, mailed on May 8, 2020, 2 pages.
Notice of Allowance received for Chinese Patent Application No. 201780002533.5, mailed on Apr. 14, 2020, 2 pages.
Notice of Allowance received for Chinese Patent Application No. 201810566134.8, mailed on Apr. 7, 2020, 3 pages.
Notice of Allowance received for Chinese Patent Application No. 201810664927.3, mailed on Jul. 19, 2019, 2 pages.
Notice of Allowance received for Chinese Patent Application No. 201811512767.7, mailed on Jul. 27, 2020, 4 pages.
Notice of Allowance received for Chinese Patent Application No. 201910692978.1, mailed on Feb. 4, 2021, 6 pages.
Notice of Allowance received for Chinese Patent Application No. 201910864074.2, mailed on Mar. 10, 2021, 2 pages.
Notice of Allowance received for Chinese Patent Application No. 201911202668.3, mailed on Feb. 4, 2021, 5 pages.
Notice of Allowance received for Chinese Patent Application No. 201911219525.3, mailed on Sep. 29, 2020, 2 pages.
Notice of Allowance received for Chinese Patent Application No. 202010218168.5, mailed on Aug. 25, 2021, 6 pages.
Notice of Allowance received for Chinese Patent Application No. 202010287950.2, mailed on Mar. 22, 2022, 7 pages.
Notice of Allowance received for Chinese Patent Application No. 202010287953.6, mailed on Mar. 18, 2021, 7 pages.
Notice of Allowance received for Chinese Patent Application No. 202010287958.9, mailed on Aug. 27, 2021, 6 pages.
Notice of Allowance received for Chinese Patent Application No. 202010287961.0, mailed on Mar. 9, 2021, 8 pages.
Notice of Allowance received for Chinese Patent Application No. 202010287975.2, mailed on Mar. 1, 2021, 7 pages.
Notice of Allowance received for Chinese Patent Application No. 202010600151.6, mailed on Aug. 13, 2021, 2 pages.
Notice of Allowance received for Chinese Patent Application No. 202010600197.8, mailed on Feb. 9, 2022, 5 pages.
Notice of Allowance received for Chinese Patent Application No. 202010601484.0, mailed on Nov. 23, 2021, 2 pages.

(56) References Cited

OTHER PUBLICATIONS

Notice of Allowance received for Chinese Patent Application No. 202011480411.7, mailed on Feb. 18, 2022, 6 pages.
Notice of Allowance received for Chinese Patent Application No. 202180002106.3, mailed on May 5, 2022, 6 pages.
Notice of Allowance received for Japanese Patent Application No. 2018-171188, mailed on Jul. 16, 2019, 3 pages.
Notice of Allowance received for Japanese Patent Application No. 2021-510849, mailed on May 16, 2022, 4 pages.
Notice of Allowance received for Korean Patent Application No. 10-2018-7026743, mailed on Mar. 20, 2019, 7 pages.
Notice of Allowance received for Korean Patent Application No. 10-2018-7028849, mailed on Feb. 1, 2019, 4 pages.
Notice of Allowance received for Korean Patent Application No. 10-2018-7034780, mailed on Jun. 19, 2019, 4 pages.
Notice of Allowance received for Korean Patent Application No. 10-2018-7036893, mailed on Jun. 12, 2019, 4 pages.
Notice of Allowance received for Korean Patent Application No. 10-2019-7027042, mailed on Nov. 26, 2020, 4 pages.
Notice of Allowance received for Korean Patent Application No. 10-2019-7035478, mailed on Apr. 24, 2020, 4 pages.
Notice of Allowance received for Korean Patent Application No. 10-2020-0052618, mailed on Mar. 23, 2021, 5 pages.
Notice of Allowance received for Korean Patent Application No. 10-2020-0143726, mailed on Nov. 10, 2020, 5 pages.
Notice of Allowance received for Korean Patent Application No. 10-2020-0155924, mailed on Nov. 23, 2020, 7 pages.
Notice of Allowance received for Korean Patent Application No. 10-2020-7021870, mailed on Apr. 26, 2021, 4 pages.
Notice of Allowance received for Korean Patent Application No. 10-2020-7031855, mailed on Mar. 22, 2021, 5 pages.
Notice of Allowance received for Korean Patent Application No. 10-2021-0022053, mailed on Nov. 23, 2021, 5 pages.
Notice of Allowance received for Korean Patent Application No. 10-2021-7000954, mailed on Aug. 18, 2021, 5 pages.
Notice of Allowance received for Korean Patent Application No. 10-2021-7019525, mailed on Jul. 13, 2021, 5 pages.
Notice of Allowance received for Korean Patent Application No. 10-2021-7020693, mailed on Dec. 27, 2021, 5 pages.
Notice of Allowance received for Korean Patent Application No. 10-2021-7035687, mailed on Dec. 30, 2021, 5 pages.
Notice of Allowance received for Korean Patent Application No. 10-2021-7036337, mailed on Apr. 5, 2022, 4 pages.
Notice of Allowance received for Korean Patent Application No. 10-2022-7002829, mailed on Feb. 12, 2022, 6 pages.
Notice of Allowance received for Korean Patent Application No. 10-2022-7016421, mailed on May 25, 2022, 6 pages.
Notice of Allowance received for Taiwanese Patent Application No. 104107328, mailed on Jun. 12, 2017, 3 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 14/641,251, mailed on May 18, 2016, 13 pages.
Notice of Allowance received for U.S. Appl. No. 14/869,807, mailed on Jun. 21, 2017, 9 Pages.
Notice of Allowance received for U.S. Appl. No. 14/869,807, mailed on Oct. 10, 2017, 9 pages.
Notice of Allowance received for U.S. Appl. No. 15/136,323, mailed on Feb. 28, 2018, 9 pages.
Notice of Allowance received for U.S. Appl. No. 15/136,323, mailed on Oct. 12, 2017, 8 pages.
Notice of Allowance received for U.S. Appl. No. 15/268,115, mailed on Mar. 7, 2018, 15 pages.
Notice of Allowance received for U.S. Appl. No. 15/273,453, mailed on Oct. 12, 2017, 11 pages.
Notice of Allowance received for U.S. Appl. No. 15/273,503, mailed on Aug. 14, 2017, 9 pages.
Notice of Allowance received for U.S. Appl. No. 15/273,522, mailed on Mar. 28, 2017, 9 Pages.
Notice of Allowance received for U.S. Appl. No. 15/273,522, mailed on May 19, 2017, 2 pages.
Notice of Allowance received for U.S. Appl. No. 15/273,522, mailed on May 23, 2017, 2 pages.
Notice of Allowance received for U.S. Appl. No. 15/273,544, mailed on Mar. 13, 2018, 8 pages.
Notice of Allowance received for U.S. Appl. No. 15/273,544, mailed on Oct. 27, 2017, 8 pages.
Notice of Allowance received for U.S. Appl. No. 15/728,147, mailed on Aug. 19, 2019, 13 pages.
Notice of Allowance received for U.S. Appl. No. 15/858,175, mailed on Jun. 1, 2018, 8 pages.
Notice of Allowance received for U.S. Appl. No. 15/858,175, mailed on Sep. 12, 2018, 8 pages.
Notice of Allowance received for U.S. Appl. No. 15/863,369, mailed on Jun. 28, 2018, 8 pages.
Notice of Allowance received for U.S. Appl. No. 15/975,581, mailed on Oct. 3, 2018, 25 pages.
Notice of Allowance received for U.S. Appl. No. 16/110,514, mailed on Apr. 29, 2019, 9 pages.
Notice of Allowance received for U.S. Appl. No. 16/110,514, mailed on Mar. 13, 2019, 11 pages.
Notice of Allowance received for U.S. Appl. No. 16/143,097, mailed on Aug. 29, 2019, 23 pages.
Notice of Allowance received for U.S. Appl. No. 16/143,201, mailed on Feb. 8, 2019, 9 pages.
Notice of Allowance received for U.S. Appl. No. 16/143,201, mailed on Nov. 28, 2018, 14 pages.
Notice of Allowance received for U.S. Appl. No. 16/143,396, mailed on Nov. 27, 2019, 8 pages.
Notice of Allowance received for U.S. Appl. No. 16/144,629, mailed on Apr. 7, 2022, 8 pages.
Notice of Allowance received for U.S. Appl. No. 16/191,117, mailed on Oct. 29, 2019, 9 pages.
Notice of Allowance received for U.S. Appl. No. 16/271,583, mailed on Apr. 14, 2021, 6 pages.
Notice of Allowance received for U.S. Appl. No. 16/271,583, mailed on Dec. 9, 2020, 6 pages.
Notice of Allowance received for U.S. Appl. No. 16/271,583, mailed on Jul. 23, 2021, 6 pages.
Notice of Allowance received for U.S. Appl. No. 16/271,583, mailed on May 10, 2021, 3 pages.
Notice of Allowance received for U.S. Appl. No. 16/528,257, mailed on Jan. 14, 2022, 10 pages.
Notice of Allowance received for U.S. Appl. No. 16/582,595, mailed on Mar. 20, 2020, 9 pages.
Notice of Allowance received for U.S. Appl. No. 16/583,020, mailed on Apr. 1, 2020, 5 pages.
Notice of Allowance received for U.S. Appl. No. 16/583,020, mailed on Feb. 28, 2020, 5 pages.
Notice of Allowance received for U.S. Appl. No. 16/584,044, mailed on Dec. 11, 2019, 15 pages.
Notice of Allowance received for U.S. Appl. No. 16/584,044, mailed on Mar. 30, 2020, 16 pages.
Notice of Allowance received for U.S. Appl. No. 16/584,044, mailed on Nov. 14, 2019, 13 pages.
Notice of Allowance received for U.S. Appl. No. 16/584,100, mailed on Apr. 8, 2020, 12 pages.
Notice of Allowance received for U.S. Appl. No. 16/584,100, mailed on Jan. 14, 2020, 13 pages.
Notice of Allowance received for U.S. Appl. No. 16/584,693, mailed on Jan. 15, 2020, 15 pages.
Notice of Allowance received for U.S. Appl. No. 16/584,693, mailed on May. 4, 2020, 12 pages.
Notice of Allowance received for U.S. Appl. No. 16/586,314, mailed on Apr. 1, 2020, 8 pages.
Notice of Allowance received for U.S. Appl. No. 16/586,314, mailed on Jan. 9, 2020, 10 pages.
Notice of Allowance received for U.S. Appl. No. 16/582,595, mailed on Dec. 16, 2019, 12 pages.

(56) References Cited

OTHER PUBLICATIONS

Notice of Allowance received for U.S. Appl. No. 16/586,344, mailed on Mar. 27, 2020, 12 pages.
Notice of Allowance received for U.S. Appl. No. 16/599,433, mailed on May 14, 2021, 11 pages.
Notice of Allowance received for U.S. Appl. No. 16/599,433, mailed on Oct. 4, 2021, 13 pages.
Notice of Allowance received for U.S. Appl. No. 16/733,718, mailed on Feb. 5, 2021, 14 pages.
Notice of Allowance received for U.S. Appl. No. 16/733,718, mailed on Jul. 29, 2021, 26 pages.
Notice of Allowance received for U.S. Appl. No. 16/733,718, mailed on Oct. 20, 2021, 24 pages.
Notice of Allowance received for U.S. Appl. No. 16/825,879, mailed on Jul. 13, 2021, 9 pages.
Notice of Allowance received for U.S. Appl. No. 16/825,879, mailed on Sep. 28, 2021, 8 pages.
Notice of Allowance received for U.S. Appl. No. 16/835,651, mailed on Jul. 23, 2021, 8 pages.
Notice of Allowance received for U.S. Appl. No. 16/835,651, mailed on Jul. 1, 2021, 10 pages.
Notice of Allowance received for U.S. Appl. No. 16/835,651, mailed on Nov. 10, 2021, 9 pages.
Notice of Allowance received for U.S. Appl. No. 16/840,719, mailed on Apr. 30, 2021, 13 pages.
Notice of Allowance received for U.S. Appl. No. 17/027,317, mailed on Apr. 12, 2021, 7 pages.
Notice of Allowance received for U.S. Appl. No. 17/027,317, mailed on Jan. 13, 2021, 10 pages.
Notice of Allowance received for U.S. Appl. No. 17/027,484, mailed on May 3, 2021, 11 pages.
Notice of Allowance received for U.S. Appl. No. 17/190,879, mailed on Nov. 10, 2021, 8 pages.
Notice of Allowance received for U.S. Appl. No. 17/220,596, mailed on Oct. 21, 2021, 43 pages.
Notice of Allowance received for U.S. Appl. No. 17/354,376, mailed on Jan. 27, 2022, 10 pages.
Notice of Allowance received for U.S. Appl. No. 17/354,376, mailed on Mar. 4, 2022, 5 pages.
Notice of Allowance received for U.S. Appl. No. 17/354,376, mailed on Mar. 30, 2022, 5 pages.
Notice of Allowance received for U.S. Appl. No. 17/409,598 mailed on Jun. 21, 2022, 12 pages.
Notice of Allowance received for U.S. Appl. No. 17/483,684, mailed on Apr. 27, 2022, 10 pages.
Notice of Allowance received for U.S. Appl. No. 17/484,279, mailed on Jan. 26, 2022, 12 pages.
Notice of Allowance received for U.S. Appl. No. 17/484,279, mailed on May 13, 2022, 9 pages.
Notice of Allowance received for U.S. Appl. No. 17/484,307, mailed on Mar. 8, 2022, 11 pages.
Notice of Allowance received for U.S. Appl. No. 17/484,307, mailed on Nov. 30, 2021, 11 pages.
Notice of Allowance received for U.S. Appl. No. 17/484,321, mailed on Nov. 30, 2021, 10 pages.
Office Action received for Australian Patent Application No. 2017100683, mailed on Sep. 20, 2017, 3 pages.
Office Action received for Australian Patent Application No. 2017100684, mailed on Jan. 24, 2018, 4 pages.
Office Action received for Australian Patent Application No. 2017100684, mailed on Oct. 5, 2017, 4 pages.
Office Action Received for Australian Patent Application No. 2017286130, mailed on Jan. 21, 2019, 4 pages.
Office Action received for Australian Patent Application No. 2019100794, mailed on Oct. 3, 2019, 4 pages.
Office Action received for Australian Patent Application No. 2019213341, mailed on Jun. 30, 2020, 6 pages.
Office Action received for Australian Patent Application No. 2019218241, mailed on Apr. 1, 2021, 3 pages.
Office Action received for Australian Patent Application No. 2019338180, mailed on Feb. 18, 2022, 3 pages.
Office Action received for Australian Patent Application No. 2020100189, mailed on Apr. 1, 2020, 3 pages.
Office Action received for Australian Patent Application No. 2020100720, mailed on Jul. 9, 2020, 7 pages.
Office Action received for Australian Patent Application No. 2020100720, mailed on Sep. 1, 2020, 5 pages.
Office Action received for Australian Patent Application No. 2020101043, mailed on Aug. 14, 2020, 5 pages.
Office Action received for Australian Patent Application No. 2020101043, mailed on Oct. 30, 2020, 4 pages.
Office Action received for Australian Patent Application No. 2020201969, mailed on Sep. 25, 2020, 5 pages.
Office Action received for Australian Patent Application No. 2020239717, mailed on Dec. 15, 2021, 6 pages.
Office Action received for Australian Patent Application No. 2020239717, mailed on Jun. 23, 2021, 7 pages.
Office Action received for Australian Patent Application No. 2020239717, mailed on Mar. 16, 2022, 4 pages.
Office Action received for Australian Patent Application No. 2020239717, mailed on Sep. 28, 2021, 6 pages.
Office Action received for Australian Patent Application No. 2020260413, mailed on Jun. 24, 2021, 2 pages.
Office Action received for Australian Patent Application No. 2020277216, mailed on Dec. 17, 2020, 5 pages.
Office Action received for Australian Patent Application No. 2021103004, mailed on Aug. 12, 2021, 5 pages.
Office Action received for Australian Patent Application No. 2021107587, mailed on Feb. 1, 2022, 6 pages.
Office Action received for Australian Patent Application No. 2021201295, mailed on Jan. 14, 2022, 3 pages.
Office Action received for Australian Patent Application No. 2021203177, mailed on May 4, 2022, 7 pages.
Office Action received for Chinese Patent Application No. 201580046237.6, mailed on Feb. 6, 2018, 10 pages.
Office Action received for Chinese Patent Application No. 201680023520.1, mailed on Jan. 3, 2019, 10 pages.
Office Action received for Chinese Patent Application No. 201710657424.9, mailed on Sep. 17, 2019, 23 pages.
Office Action received for Chinese Patent Application No. 201780002533.5, mailed on Apr. 25, 2019, 17 pages.
Office Action received for Chinese Patent Application No. 201780002533.5, mailed on Feb. 3, 2020, 6 pages.
Office Action received for Chinese Patent Application No. 201780002533.5, mailed on Sep. 26, 2019, 21 pages.
Office Action received for Chinese Patent Application No. 201810566134.8, mailed on Aug. 13, 2019, 14 pages.
Office Action received for Chinese Patent Application No. 201810664927.3, mailed on Mar. 28, 2019, 11 pages.
Office Action received for Chinese Patent Application No. 201811446867.4, mailed on Dec. 31, 2019, 12 pages.
Office Action received for Chinese Patent Application No. 201811446867.4, mailed on May 6, 2020, 10 pages.
Office Action received for Chinese Patent Application No. 201811446867.4, mailed on Sep. 8, 2020, 9 pages.
Office Action received for Chinese Patent Application No. 201811512767.7, mailed on Dec. 20, 2019, 14 pages.
Office Action received for Chinese Patent Application No. 201811512767.7, mailed on Jun. 4, 2020, 6 pages.
Office Action received for Chinese Patent Application No. 201910692978.1, mailed on Apr. 3, 2020, 19 pages.
Office Action received for Chinese Patent Application No. 201910692978.1, mailed on Nov. 4, 2020, 4 pages.
Office Action received for Chinese Patent Application No. 201910864074.2, mailed on Sep. 23, 2020, 11 pages.
Office Action received for Chinese Patent Application No. 201911202668.3, mailed on Aug. 4, 2020, 13 pages.
Office Action received for Chinese Patent Application No. 201911219525.3, mailed on Jul. 10, 2020, 7 pages.
Office Action received for Chinese Patent Application No. 202010218168.5, mailed on Feb. 9, 2021, 21 pages.

(56) References Cited

OTHER PUBLICATIONS

Office Action received for Chinese Patent Application No. 202010287950.2, mailed on Aug. 10, 2021, 12 pages.
Office Action received for Chinese Patent Application No. 202010287950.2, mailed on Feb. 20, 2021, 22 pages.
Office Action received for Chinese Patent Application No. 202010287950.2, mailed on Nov. 19, 2021, 8 pages.
Office Action received for Chinese Patent Application No. 202010287953.6, mailed on Jan. 14, 2021, 14 pages.
Office Action received for Chinese Patent Application No. 202010287958.9, mailed on Jan. 5, 2021, 16 pages.
Office Action received for Chinese Patent Application No. 202010287961.0, mailed on Dec. 30, 2020, 16 pages.
Office Action received for Chinese Patent Application No. 202010287975.2, mailed on Dec. 30, 2020, 17 pages.
Office Action received for Chinese Patent Application No. 202010600151.6, mailed on Apr. 29, 2021, 11 pages.
Office Action received for Chinese Patent Application No. 202010600197.8, mailed on Jul. 2, 2021, 14 pages.
Office Action received for Chinese Patent Application No. 202010601484.0, mailed on Jun. 3, 2021, 13 pages.
Office Action received for Chinese Patent Application No. 202011480411.7, mailed on Aug. 2, 2021, 12 pages.
Office Action received for Chinese Patent Application No. 202011480411.7, mailed on Jan. 12, 2022, 7 pages.
Office Action received for Chinese Patent Application No. 202110766668.7, mailed on Feb. 16, 2022, 12 pages.
Office Action received for Chinese Patent Application No. 202180002106.3, mailed on Feb. 16, 2022, 12 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Sep. 6, 2016, 4 pages.
Office Action received for Danish Patent Application No. PA201670627, mailed on Apr. 5, 2017, 3 pages.
Office Action received for Danish Patent Application No. PA201670627, mailed on Nov. 6, 2017, 2 pages.
Office Action received for Danish Patent Application No. PA201670627, mailed on Oct. 11, 2016, 8 pages.
Office Action received for Danish Patent Application No. PA201670753, mailed on Dec. 20, 2016, 7 pages.
Office Action received for Danish Patent Application No. PA201670753, mailed on Jul. 5, 2017, 4 pages.
Office Action received for Danish Patent Application No. PA201670753, mailed on Mar. 23, 2018, 5 pages.
Office Action received for Danish Patent Application No. PA201670755, mailed on Apr. 6, 2017, 5 pages.
Office Action received for Danish Patent Application No. PA201670755, mailed on Apr. 20, 2018, 2 pages.
Office Action received for Danish Patent Application No. PA201670755, mailed on Dec. 22, 2016, 6 pages.
Office Action received for Danish Patent Application No. PA201670755, mailed on Oct. 20, 2017, 4 pages.
Office Action received for Danish Patent Application No. PA201770563, mailed on Aug. 13, 2018, 5 pages.
Office Action received for Danish Patent Application No. PA201770563, mailed on Jan. 28, 2020, 3 pages.
Office Action received for Danish Patent Application No. PA201770563, mailed on Jun. 28, 2019, 5 pages.
Office Action received for Danish Patent Application No. PA201770719, mailed on Aug. 14, 2018, 6 pages.
Office Action received for Danish Patent Application No. PA201770719, mailed on Feb. 19, 2019, 4 pages.
Office Action received for Danish Patent Application No. PA201770719, mailed on Jan. 17, 2020, 4 pages.
Office Action received for Danish Patent Application No. PA201770719, mailed on Jun. 30, 2021, 3 pages.
Office Action received for Danish Patent Application No. PA201770719, mailed on Nov. 16, 2020, 5 pages.
Office Action received for Danish Patent Application No. PA201770719, mailed on Nov. 16, 2021, 2 pages.
Office Action received for Danish Patent Application No. PA201870366, mailed on Aug. 22, 2019, 3 pages.
Office Action received for Danish Patent Application No. PA201870366, mailed on Dec. 12, 2018, 3 pages.
Office Action received for Danish Patent Application No. PA201870367, mailed on Dec. 20, 2018, 5 pages.
Office Action received for Danish Patent Application No. PA201870368, mailed on Dec. 20, 2018, 5 pages.
Office Action received for Danish Patent Application No. PA201870368, mailed on Oct. 1, 2019, 6 pages.
Office Action received for Danish Patent Application No. PA201870623, mailed on Jan. 30, 2020, 2 pages.
Office Action received for Danish Patent Application No. PA201870623, mailed on Jul. 12, 2019, 4 pages.
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.
Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.
Office Action received for Danish Patent Application No. PA201970605, mailed on Mar. 10, 2020, 5 pages.
Office Action received for Danish Patent Application No. PA202070611, mailed on Dec. 22, 2020, 7 pages.
Office Action received for European Patent Application 17809168.2, mailed on Jan. 7, 2020, 5 pages.
Office Action received for European Patent Application 17809168.2, mailed on Oct. 8, 2020, 4 pages.
Office Action received for European Patent Application No. 15712218.5, mailed on Aug. 3, 2017, 4 pages.
Office Action received for European Patent Application No. 16784025.5, mailed on Jul. 17, 2020, 6 pages.
Office Action received for European Patent Application No. 17184710.6, mailed on Dec. 21, 2018, 7 pages.
Office Action received for European Patent Application No. 18176890.4, mailed on Oct. 16, 2018, 8 pages.
Office Action received for European Patent Application No. 18183054.8, mailed on Feb. 24, 2020, 6 pages.
Office Action received for European Patent Application No. 18183054.8, mailed on Nov. 16, 2018, 8 Pages.
Office Action received for European Patent Application No. 18209460.7, mailed on Apr. 10, 2019, 7 pages.
Office Action received for European Patent Application No. 18209460.7, mailed on Apr. 21, 2020, 5 pages.
Office Action received for European Patent Application No. 18214698.5, mailed on Apr. 2, 2019, 8 pages.
Office Action received for European Patent Application No. 18704732.9, mailed on Sep. 7, 2021, 10 pages.
Office Action received for European Patent Application No. 19204230.7, mailed on Sep. 28, 2020, 6 pages.
Office Action received for European Patent Application No. 19707557.5, mailed on Jun. 3, 2022, 5 pages.

(56) References Cited

OTHER PUBLICATIONS

Office Action received for European Patent Application No. 19724959.2, mailed on Apr. 23, 2020, 10 pages.
Office Action received for European Patent Application No. 20168009.7, mailed on Apr. 20, 2021, 6 pages.
Office Action received for European Patent Application No. 20168009.7, mailed on Sep. 13, 2021, 8 pages.
Office Action received for European Patent Application No. 20206196.6, mailed on Jan. 13, 2021, 10 pages.
Office Action received for European Patent Application No. 20206197.4, mailed on Aug. 27, 2021, 6 pages.
Office Action received for European Patent Application No. 20206197.4, mailed on Jan. 12, 2021, 9 pages.
Office Action received for European Patent Application No. 20206197.4, mailed on Mar. 18, 2022, 7 pages.
Office Action received for European Patent Application No. 20210373.5, mailed on Dec. 9, 2021, 7 pages.
Office Action received for European Patent Application No. 20210373.5, mailed on May 10, 2021, 9 pages.
Office Action received for European Patent Application No. 20210373.5, mailed on May 31, 2022, 5 pages.
Office Action received for European Patent Application No. 21157252.4, mailed on Apr. 23, 2021, 8 pages.
Office Action received for European Patent Application No. 21163791.3, mailed on Jun. 2, 2021, 8 pages.
Office Action received for Indian Patent Application No. 201814036470, mailed on Feb. 26, 2021, 7 pages.
Office Action received for Indian Patent Application No. 201817024430, mailed on Sep. 27, 2021, 8 pages.
Office Action received for Indian Patent Application No. 201818025015, mailed on Feb. 4, 2022, 7 pages.
Office Action received for Indian Patent Application No. 201818045872, mailed on Oct. 13, 2021, 7 pages.
Office Action received for Indian Patent Application No. 201818046896, mailed on Feb. 2, 2022, 7 pages.
Office Action received for Indian Patent Application No. 201917053025, mailed on Mar. 19, 2021, 7 pages.
Office Action received for Indian Patent Application No. 202014041530, mailed on Dec. 8, 2021, 7 pages.
Office Action received for Indian Patent Application No. 202018006172, mailed on May 5, 2021, 6 pages.
Office Action received for Indian Patent Application No. 202118021941, mailed on Mar. 23, 2022, 5 pages.
Office Action received for Indian Patent Application No. 202118046032, mailed on Apr. 25, 2022, 6 pages.
Office Action received for Indian Patent Application No. 202118046033, mailed on Apr. 25, 2022, 7 pages.
Office Action received for Indian Patent Application No. 202118046044, mailed on Apr. 25, 2022, 6 pages.
Office Action received for Japanese Patent Application No. 2018-182607, mailed on Apr. 6, 2020, 6 pages.
Office Action received for Japanese Patent Application No. 2018-182607, mailed on Jul. 20, 2020, 5 pages.
Office Action received for Japanese Patent Application No. 2018-182607, mailed on Sep. 8, 2021, 7 pages.
Office Action received for Japanese Patent Application No. 2018-225131, mailed on Aug. 17, 2020, 21 pages.
Office Action received for Japanese Patent Application No. 2018-225131, mailed on Mar. 4, 2019, 10 pages.
Office Action received for Japanese Patent Application No. 2018-545502, mailed on Aug. 17, 2020, 14 pages.
Office Action received for Japanese Patent Application No. 2019-203399, mailed on Aug. 10, 2021, 4 pages.
Office Action received for Japanese Patent Application No. 2019-566087, mailed on Oct. 18, 2021, 10 pages.
Office Action received for Japanese Patent Application No. 2020-070418, mailed on Aug. 3, 2020, 22 pages.
Office Action received for Japanese Patent Application No. 2020-159338, mailed on Dec. 8, 2021, 9 pages.
Office Action received for Japanese Patent Application No. 2020-184470, mailed on May 10, 2021, 3 pages.
Office Action received for Japanese Patent Application No. 2020-184471, mailed on May 10, 2021, 3 pages.
Office Action received for Japanese Patent Application No. 2020-193703, mailed on Apr. 19, 2021, 4 pages.
Office Action received for Japanese Patent Application No. 2020-542592, mailed on Sep. 21, 2021, 5 pages.
Office Action received for Japanese Patent Application No. 2021-565919, mailed on Jun. 13, 2022, 4 pages.
Office Action received for Korean Patent Application No. 10-2018-7026743, mailed on Jan. 17, 2019, 5 pages.
Office Action received for Korean Patent Application No. 10-2018-7034780, mailed on Apr. 4, 2019, 11 pages.
Office Action received for Korean Patent Application No. 10-2018-7036893, mailed on Apr. 9, 2019, 6 pages.
Office Action received for Korean Patent Application No. 10-2019-7027042, mailed on May 13, 2020, 6 pages.
Office Action received for Korean Patent Application No. 10-2019-7035478, mailed on Jan. 17, 2020, 17 pages.
Office Action received for Korean Patent Application No. 10-2020-0052618, mailed on Aug. 18, 2020, 11 pages.
Office Action received for Korean Patent Application No. 10-2020-7021870, mailed on Nov. 11, 2020, 11 pages.
Office Action received for Korean Patent Application No. 10-2020-7022663, mailed on Aug. 17, 2021, 11 pages.
Office Action received for Korean Patent Application No. 10-2020-7031855, mailed on Nov. 24, 2020, 6 pages.
Office Action received for Korean Patent Application No. 10-2021-0022053, mailed on Mar. 1, 2021, 11 pages.
Office Action received for Korean Patent Application No. 10-2021-7000954, mailed on Jan. 28, 2021, 5 pages.
Office Action received for Korean Patent Application No. 10-2021-7020693, mailed on Jul. 14, 2021, 7 pages.
Office Action received for Korean Patent Application No. 10-2021-7036337, mailed on Dec. 8, 2021, 6 pages.
Office Action received for Korean Patent Application No. 10-2022-7006310, mailed on Mar. 8, 2022, 6 pages.
Office Action received for Taiwanese Patent Application No. 104107328, mailed on Dec. 28, 2016, 4 pages.
Pre-Appeal Review Report received for Japanese Patent Application No. 2018-182607, mailed on Jan. 21, 2021, 4 pages.
Pre-Appeal Review Report received for Japanese Patent Application No. 2018-225131, mailed on Jan. 24, 2020, 8 pages.
Pre-Appeal Review Report received for Japanese Patent Application No. 2018-545502, mailed on Jan. 24, 2020, 8 pages.
Pro camera Capture the Moment, Online Available at: http://www.procamera-app.com/procamera_manual/ProCamera_Manual_EN.pdf, Apr. 21, 2016, 63 pages.
Record of Oral Hearing received for U.S. Appl. No. 16/144,629, mailed on Jan. 28, 2022, 13 pages.
Remote Shot for Smart Watch 2, Available online at: -https://play.google.com/store/apps/details?id=net.watea.sw2.rshot&h1=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Search Report and Opinion received for Danish Patent Application No. PA201770563, mailed on Oct. 10, 2017, 9 pages.
Search Report and Opinion received for Danish Patent Application No. PA201870366, mailed on Aug. 27, 2018, 9 pages.
Search Report and Opinion received for Danish Patent Application No. PA201870367, mailed on Aug. 27, 2018, 9 pages.
Search Report and Opinion received for Danish Patent Application No. PA201870368, mailed on Sep. 6, 2018, 7 pages.

(56) References Cited

OTHER PUBLICATIONS

Search Report and Opinion received for Danish Patent Application No. PA201870623, mailed on Dec. 20, 2018, 8 pages.
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
Search Report received for Danish Patent Application No. PA201770719, mailed on Oct. 17, 2017, 9 pages.
Sony Xperia XZ3 Camera Review—The Colors, Duke, The Colors! Android Headlines—Android News & Tech News, Available online at <https://www.youtube.com/watch?v=mwpYXzWVOgw>, See especially 1:02-1:27, 2:28-2:30, Nov. 3, 2018, 3 pages.
Summons to Attend Oral Proceedings received for European Patent Application No. 17184710.6, mailed on Sep. 17, 2019, 7 pages.
Summons to Attend Oral Proceedings received for European Patent Application No. 19204230.7, mailed on May 25, 2021, 10 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Supplemental Notice of Allowance received for U.S. Appl. No. 15/136,323, mailed on Jan. 31, 2018, 6 pages.
Supplemental Notice of Allowance received for U.S. Appl. No. 15/863,369, mailed on Aug. 8, 2018, 4 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, mailed on Dec. 19, 2018, 2 pages.
Supplemental Notice of Allowance received for U.S. Appl. No. 16/143,201, mailed on Jan. 10, 2019, 2 pages.
Supplemental Notice of Allowance received for U.S. Appl. No. 16/733,718, mailed on Mar. 9, 2021, 21 pages.
Supplemental Notice of Allowance received for U.S. Appl. No. 16/733,718, mailed on Mar. 29, 2021, 2 pages.
Supplemental Notice of Allowance received for U.S. Appl. No. 17/484,321, mailed on Mar. 1, 2022, 6 pages.
Supplementary European Search Report received for European Patent Application No. 18176890.4, mailed on Sep. 20, 2018, 4 pages.
Supplementary European Search Report received for European Patent Application No. 18183054.8, mailed on Oct. 11, 2018, 4 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Astrovideo, "AstroVideo enables you to use a low-cost, low-light video camera to capture astronomical images.", Available online at: https://www.coaa.co.uk/astrovideo.htm, Retrieved on: Nov. 18, 2019, 5 pages.
Channel Highway, "Virtual Makeover in Real-time and in full 3D", Available online at :—https://www.youtube.com/watch?v=NgUbBzb5qZg, Feb. 16, 2016, 1 page.
Clover Juli, "Moment Pro Camera App for iOS Gains Zebra Striping for Displaying Over and Underexposed Areas", Online Available at: https://web.archive.org/web/20190502081353/https://www.macrumors.com/2019/05/01/momentcamera-app-zebra-striping-and-more/, May 1, 2019, 8 pages.
Demetriou Soteris, "Analyzing & Designing the Security of Shared Resources on Smartphone Operating Systems", Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Digital Trends, "ModiFace Partners with Samsung to Bring AR Makeup to the Galaxy S9", Available online at:—https://www.digitaltrends.com/mobile/modiface-samsung-partnership-ar-makeup-galaxy-s9/, 2018, 16 pages.
Dutta Tushars, "Warning! iOS Apps with Camera Access Permission Can Spy on You", Online available at: https://web.archive.org/web/20180219092123/https://techviral.net/ios-apps-camera-can-spy/, Feb. 19, 2018, 3 pages.
Fedko Daria, "AR Hair Styles", Online Available at <https://www.youtube.com/watch?v=FrS6tHRbFE0>, Jan. 24, 2017, 2 pages.
Feng et al., "3D Direct Human-Computer Interface Paradigm Based on Free Hand Tracking", Chinese Journal of Computers, vol. 37, No. 6, Jun. 30, 2014, 15 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gadgets Portal, "Galaxy J5 Prime Camera Review! (vs J7 Prime) 4K", Available Online at :—https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRKTg>, Jun. 19, 2018, 3 pages.
Helpvideostv, "How to Use Snap Filters on Snapchat", Retrieved from <https://www.youtube.com/watch?v=oR-7clWPszU&feature=youtu.be>, Mar. 22, 2017, pp. 1-2.
Hernández Carlos, "Lens Blur in the New Google Camera App", Available online at: https://research.googleblog.com/2014/04/lens-blur-in-new-google-camera-app.html, https://ai.googleblog.com/2014/04/1ens-blur-in-new-google-camera-app.html, Apr. 16, 2014, 6 pages.
Huawei Mobile PH, "Huawei P10 Tips & Tricks: Compose Portraits with Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S10 vs Huawei P30 Pro (Review/How to/Explained)", Online Available at: https://www.youtube.com/watch?v=d4r3PWioY4Y, Apr. 26, 2019, 4 pages
Imagespacetv, "Olympus OM-D E-M1 Mark II—Highlights & Shadows with Gavin Hoey", Online available at: https://www.youtube.com/watch?v=goEhh1n--hQ, Aug. 3, 2018, 3 pages.
Johnson Dave, "What is the Clips app on an iPhone?': How to use your iPhone's free video-editing app, and make custom videos for social media", Available online at: https://www.businessinsider.com/what-is-clips-on-iphone?IR=T, Oct. 26, 2019, 14 pages.
King Juliea, "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.

(56) References Cited

OTHER PUBLICATIONS

KK World, “Redmi Note 7 Pro Night Camera Test I Night Photography with Night Sight & Mode”, Online Available at: https://www.youtube.com/watch?v=3EKjGBjX3PY, Mar. 26, 2019, 4 pages.
Kozak Tadeusz, “When You’re Video Chatting on Snapchat, How Do You Use Face Filters?”, Quora, Online Available at: https://www.quora.com/When-youre-video-chatting-on-Snapchat-how-do-you-use-face-filters, Apr. 29, 2018, 1 page.
Lang Brian, “How to Audio & Video Chat with Multiple Users at the Same Time in Groups”, Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Messelodi et al., “A Kalman filter-based background updating algorithm robust to sharp illumination changes.”, International Conference on Image Analysis and Processing. Springer, Berlin, Heidelberg, 2005, pp. 163-170.
Mobiscrub, “Galaxy S4 mini camera review”, Available Online at:—https://www.youtube.com/watch?v=KYKOydw8QT8, Aug. 10, 2013, 3 pages.
Mobiscrub, “Samsung Galaxy S5 Camera Review—HD Video”, Available Online on:—https://www.youtube.com/watch?v=BFgwDtNKMjg, Mar. 27, 2014, 3 pages.
Modifacechannel, “Sephora 3D Augmented Reality Mirror”, Available Online at: https://www.youtube.com/watch?v=wwBO4PU9EXI, May 15, 2014, 1 page.
Neurotechnology, “Sentimask SDK”, Available at: https://www.neurotechnology.com/sentimask.html, Apr. 22, 2018, 5 pages.
Osxdaily, “How to Zoom the Camera on iPhone”, Available Online at: https://osxdaily.com/2012/04/18/zoom-camera-iphone/, Apr. 18, 2012, 6 pages.
Office action received for Danish Patent Application No. PA201570791, mailed on Apr. 6, 2016, 12 pages.
Paine Steve, “Samsung Galaxy Camera Detailed Overview—User Interface”, Retrieved from: <https://www.youtube.com/watch?v=td8UYSySulo&feature=youtu.be>, Sep. 18, 2012, pp. 1-2.
PC World, “How to make AR Emojis on the Samsung Galaxy S9”, You Tube, Available Online: https://www.youtube.com/watch?v=8wQICfulkz0, Feb. 25, 2018, 2 pages.
International Search Report and Written Opinion received for PCT Patent Application No. PCT/US2015/019298, mailed on Jul. 13, 2015, 17 pages.
Peckham James, “What is Apple Clips? Plus, we teach you how to use it”, Available online at: https://www.techradar.com/how-to/what-is-apple-clips-and-how-to-use-it, Jul. 20, 2017, 11 pages.
Phonearena, “Sony Xperia Z5 camera app and UI overview”, Retrieved from <https://www.youtube.com/watch?v=UtDzdTsmkfU&feature=youtu.be>, Sep. 8, 2015, pp. 1-3.
Playmemories Camera Apps, “PlayMemories Camera Apps Help Guide”, available at <https://www.playmemoriescameraapps.com/portal/manual/IS9104-NPIA09014_00-F00002/en/index.html>, 2012, 3 pages.
Ritchie Rene, “Clips app: The ultimate guide”, Available online at: https://www.imore.com/clips, May 13, 2017, 16 pages.
Schiffhauer Alexander, “See the Light with Night Sight”, Available online at: https://www.blog.google/products/pixel/see-light-night-sight, Nov. 14, 2018, 6 pages.
Shaw et al., “Skills for Closeups Photography”, Watson-Guptill Publications, Nov. 1999, 5 pages.
Shiftdelete.net, “Oppo Reno 10x Zoom ön Inceleme—Huawei P30 Pro’ya rakip mi geliyor?”, Available online at <https://www.youtube.com/watch?v=ev2wIUztdrg>, See especially 5:34-6:05., Apr. 24, 2019, 2 pages.
Sigdel Prakash, “How to record WhatsApp voice massage without continue holding down button”, Available Online at: https://www.youtube.com/watch?v=m3Hz6TXtOPA, Dec. 6, 2017, 9 pages.
Smart Reviews, “Honor10 AI Camera’s In-Depth Review”, See Especially 2:37-2:48; 6:39-6:49, Available Online at <https://www.youtube.com/watch?v=oKFqRvxeDBQ>, May 31, 2018, 2 pages.
Snapchat Lenses, “How to Get All Snapchat Lenses Face Effect Filter on Android”, Retrieved from: <https://www.youtube.com/watch?v=0PfnF1RInfw&feature=youtu.be>, Sep. 21, 2015, pp. 1-2.
Sony, “User Guide, Xperia XZ3, H8416/H9436/H9493”, Sony Mobile Communications Inc., Retrieved from <https://www-support-downloads.sonymobile.com/h8416/userguide_EN_H8416-H9436-H9493_2_Android9.0.pdf>, See pp. 86-102., 2018, 121 pages.
Tech Stuff, “Telegram 4.0: Video Messages + Telescope, Payments and more . . . ”, Available Online at: https://www.youtube.com/watch?v=yDalJRPH7nQ, May 19, 2017, 46 pages.
Tech With Brett, “How to Create Your AR Emoji on the Galaxy S9 and S9+”, Available online at: <https://www.youtube.com/watch?v=HHMdcBpC8MQ>, Mar. 16, 2018, 5 pages.
Techsmith, “Snagit ® 11 Snagit 11.4 Help”, available at <http://assets.techsmith.com/Downloads/ua-tutorials-snagit-11/Snagit_11.pdf>, Jan. 2014, 146 pages.
Techtag, “Samsung J5 Prime Camera Review | True Review”, Available online at:—https://www.youtube.com/watch?v=a_p906ai6PQ, Oct. 26, 2016, 3 pages.
Techtag, “Samsung J7 Prime Camera Review (Technical Camera)”, Available Online at:—https://www.youtube.com/watch?v=AJPcLP8GpFQ, Oct. 4, 2016, 3 pages.
Telleen et al., “Synthetic Shutter Speed Imaging”, University of California, Santa Cruz, vol. 26, No. 3, 2007, 8 pages.
The Nitpicker, “Sony Xperia XZ3 | in-depth Preview”, Available online at <https://www.youtube.com/watch?v=TGCKxBuiO5c>, See especially 12:40-17:25, Oct. 7, 2018, 3 pages.
Tico et al., “Robust method of digital image stabilization”, Nokia Research Center, ISCCSP, Malta, Mar. 12-14, 2008, pp. 316-321.
Travel Tech Sports Channel, “New Whatsapp update—voice message recording made easy—Want to record long voice messages”, Available Online at: https://www.youtube.com/watch?v=SEviqgsAdUk, Nov. 30, 2017, 13 pages.
Vickgeek, “Canon 80D Live View Tutorial | Enhance your image quality”, Available online at:—https://www.youtube.com/watch?v=JGNCiy6Wt9c, Sep. 27, 2016, 3 pages.
Vivo India, “Bokeh Mode | Vivo V9”, Available Online at <https://www.youtube.com/watch?v=B5AIHhH5Rxs>, Mar. 25, 2018, 3 pages.
Whitacre Michele, “Photography 101 | Exposure Meter”, Online available at: https://web.archive.org/web/20160223055834/http://www.michelewhitacrephotographyblog.com, Feb. 23, 2016, 4 pages.
Wong Richard, “Huawei Smartphone (P20/P10/P9, Mate 10/9) Wide Aperture Mode Demo”, Available Online at <https://www.youtube.com/watch?v=eLY3LsZGDPA>, May 7, 2017, 2 pages.
Wu et al., “Security Threats to Mobile Multimedia Applications: Camera-Based Attacks on Mobile Phones”, IEEE Communications Magazine, Available online at: http://www.ieeeprojectmadurai.in/BASE/ANDROID/Security%20Threats%20to%20Mobile.pdf, Mar. 2014, pp. 80-87.
Xeetechcare, “Samsung Galaxy S10—Super Night Mode & Ultra-Fast Charging!”, Online Available at: https://www.youtube.com/watch?v=3bguV4FX6aA, Mar. 28, 2019, 4 pages.
Xiao et al., “Expanding the Input Expressivity of Smartwatches with Mechanical Pan, Twist, Tilt and Click”, 14th Proceedings of the SIGCHI Conference on Human Factors in Computing Systems, Apr. 26, 2014, pp. 193-196.
Xperia Blog, “Action Camera Extension Gives Smartwatch/Smartband Owners Ability to Control Sony Wireless Cameras”, Available at <http://www.xperiablog.net/2014/06/13/action-camera-extension-gives-smartwatchsmartband-owners-ability-to-control-sony-wireless-cameras/>, Jun. 13, 2014, 10 pages.
X-Tech, “Test Make up via Slick Augmented Reality Mirror Without Putting It on”, Available Online at: http://x-tech.am/test-make-up-via-slick-augmented-reality-mirror-without-putting-it-on/, Nov. 29, 2014, 5 pages.
Applicant Initiated Interview Summary received for U.S. Appl. No. 17/721,039, mailed on Mar. 10, 2023, 3 pages.
Board Opinion received for Chinese Patent Application No. 201811446867.4, mailed on Feb. 14, 2023, 11 pages (4 pages of English Translation and 7 pages of Official Copy).
Corrected Notice of Allowance received for U.S. Appl. No. 17/356,322, mailed on Mar. 8, 2023, 2 pages.

(56) References Cited

OTHER PUBLICATIONS

Corrected Notice of Allowance received for U.S. Appl. No. 17/510,168, mailed on Mar. 16, 2023, 2 pages.
Corrected Notice of Allowance received for U.S. Appl. No. 17/566,094, mailed on Mar. 7, 2023, 2 pages.
Intention to Grant received for European Patent Application No. 20168009.7, mailed on Feb. 28, 2023, 10 pages.
Non-Final Office Action received for U.S. Appl. No. 17/940,672, mailed on Mar. 16, 2023, 15 pages.
Notice of Allowance received for Korean Patent Application No. 10-2021-7006145, mailed on Mar. 6, 2023, 5 pages (2 pages of English Translation and 3 pages of Official Copy).
Notice of Allowance received for U.S. Appl. No. 17/041,412, mailed on Mar. 15, 2023, 13 pages.
Office Action received for Australian Patent Application No. 2022204465, mailed on Mar. 10, 2023, 4 pages.
Office Action received for Indian Patent Application No. 202015008746, mailed on Mar. 6, 2023, 7 pages.
Intention to Grant received for European Patent Application No. 18704732.9, mailed on Dec. 6, 2022, 10 pages.
International Search Report and Written Opinion received for PCT Patent Application No. PCT/US2022/030589, mailed on Sep. 5, 2022, 26 pages.
International Search Report and Written Opinion received for PCT Patent Application No. PCT/US2022/030704, mailed on Nov. 9, 2022, 19 pages.
Invitation to Pay Additional Fees and Partial International Search Report received for PCT Patent Application No. PCT/US2022/030704, mailed on Sep. 15, 2022, 12 pages.
Non-Final Office Action received for U.S. Appl. No. 17/041,412, mailed on Dec. 5, 2022, 13 pages.
Non-Final Office Action received for U.S. Appl. No. 17/510,168, mailed on Dec. 6, 2022, 11 pages.
Office Action received for Australian Patent Application No. 2021290292, mailed on Nov. 24, 2022, 2 pages.
Office Action received for European Patent Application No. 22184853.4, mailed on Nov. 25, 2022, 7 pages.
ComputerHilfen, "WhatsApp: voice message without holding the button", available online at: https://www.youtube.com/watch?v=ofFCKvs5URw, Jan. 14, 2018, 9 pages.
Corrected Notice of Allowance received for U.S. Appl. No. 18/207,293, mailed on Sep. 20, 2024, 2 pages.
Non-Final Office Action received for U.S. Appl. No. 18/423,234, mailed on Sep. 16, 2024, 9 pages.
Office Action received for Chinese Patent Application No. 201880036400.4, mailed on Aug. 24, 2024, 16 pages (9 pages of English Translation and 7 pages of Official Copy).
Applicant-Initiated Interview Summary received for U.S. Appl. No. 18/628,021, mailed on Aug. 5, 2024, 4 pages.
Corrected Notice of Allowance received for U.S. Appl. No. 17/721,039, mailed on Aug. 21, 2024, 3 pages.
Corrected Notice of Allowance received for U.S. Appl. No. 18/196,997, mailed on Aug. 19, 2024, 2 pages.
Corrected Notice of Allowance received for U.S. Appl. No. 18/197,242, mailed on Jul. 22, 2024, 2 pages.
Corrected Notice of Allowance received for U.S. Appl. No. 18/228,591, mailed on Aug. 5, 2024, 5 pages.
Decision to Grant received for European Patent Application No. 21202358.4, mailed on Aug. 29, 2024, 2 pages.
Kaceli Techtraining, "PowerPoint 2016: How to Insert and Embed a YouTube Video in PowerPoint (10/30)", Available online at: https://www.youtube.com/watch?v=OEpbmaX2zJQ, May 19, 2017, 3 pages.
Non-Final Office Action received for U.S. Appl. No. 17/542,947, mailed on Aug. 13, 2024, 58 pages.
Notice of Allowance received for Korean Patent Application No. 10-2023-7037005, mailed on Jul. 2, 2024, 10 pages (2 pages of English Translation and 8 pages of Official Copy).
Notice of Allowance received for U.S. Appl. No. 17/721,039, mailed on Jul. 25, 2024, 34 pages.
Notice of Allowance received for U.S. Appl. No. 18/196,997, mailed on Jul. 15, 2024, 11 pages.
Notice of Allowance received for U.S. Appl. No. 18/197,242, mailed on Jul. 10, 2024, 12 pages.
Notice of Allowance received for U.S. Appl. No. 18/207,293, mailed on Aug. 7, 2024, 12 pages.
Notice of Allowance received for U.S. Appl. No. 18/228,591, mailed on Jul. 29, 2024, 8 pages.
Notice of Allowance received for U.S. Appl. No. 18/628,021, mailed on Aug. 28, 2024, 9 pages.
Office Action received for Japanese Patent Application No. 2022-199433, mailed on Jul. 2, 2024, 6 pages (3 pages of English Translation and 3 pages of Official Copy).
Office Action received for Japanese Patent Application No. 2023-560219, mailed on Aug. 5, 2024, 8 pages (4 pages of English Translation and 4 pages of Official Copy).
Office Action received for Japanese Patent Application No. 2024-060293, mailed on Jul. 29, 2024, 6 pages (3 pages of English Translation and 3 pages of Official Copy).
Office Action received for Japanese Patent Application No. 2024-073909, mailed on Aug. 1, 2024, 4 pages (2 pages of English Translation and 2 pages of Official Copy).
Office Action received for Korean Patent Application No. 10-2023-7033717, mailed on Aug. 16, 2024, 25 pages (12 pages of English Translation and 13 pages of Official Copy).
Corrected Notice of Allowance received for U.S. Appl. No. 18/207,293, mailed on Sep. 12, 2024, 2 pages.
Corrected Notice of Allowance received for U.S. Appl. No. 18/628,021, mailed on Sep. 12, 2024, 2 pages.
Notice of Allowance received for U.S. Appl. No. 17/546,968, mailed on Sep. 13, 2024, 25 pages.
Notice of Allowance received for U.S. Appl. No. 18/123,878, mailed on Sep. 5, 2024, 11 pages.
Office Action received for Indian Patent Application No. 202218016788, mailed on Sep. 4, 2024, 5 pages.
Notice of Allowance received for Korean Patent Application No. 10-2023-7016569, mailed on Sep. 10, 2024, 7 pages (2 pages of English Translation and 5 pages of Official Copy).

* cited by examiner

Figure 9B:
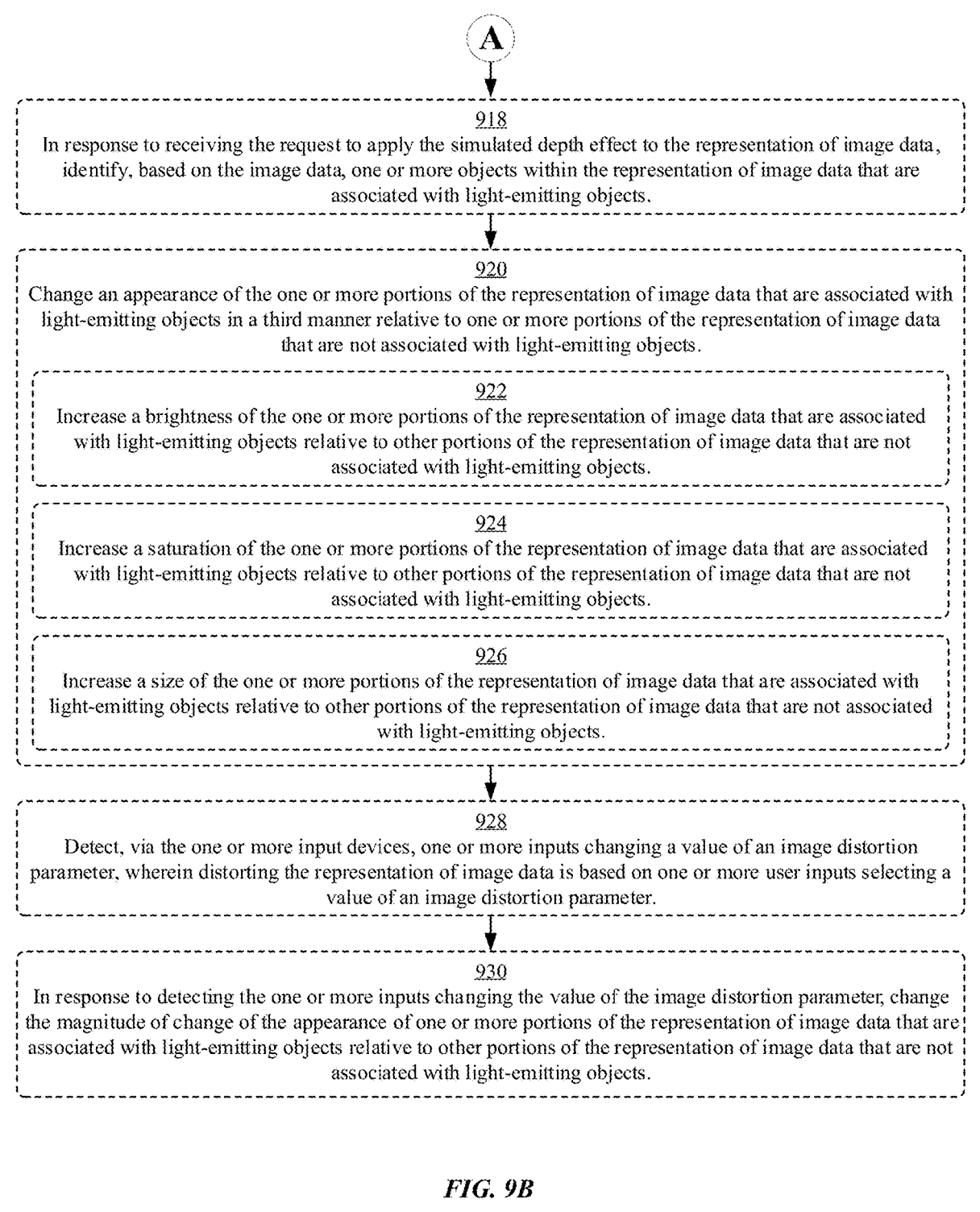

A

918
In response to receiving the request to apply the simulated depth effect to the representation of image data, identify, based on the image data, one or more objects within the representation of image data that are associated with light-emitting objects.

920
Change an appearance of the one or more portions of the representation of image data that are associated with light-emitting objects in a third manner relative to one or more portions of the representation of image data that are not associated with light-emitting objects.

922
Increase a brightness of the one or more portions of the representation of image data that are associated with light-emitting objects relative to other portions of the representation of image data that are not associated with light-emitting objects.

924
Increase a saturation of the one or more portions of the representation of image data that are associated with light-emitting objects relative to other portions of the representation of image data that are not associated with light-emitting objects.

926
Increase a size of the one or more portions of the representation of image data that are associated with light-emitting objects relative to other portions of the representation of image data that are not associated with light-emitting objects.

928
Detect, via the one or more input devices, one or more inputs changing a value of an image distortion parameter, wherein distorting the representation of image data is based on one or more user inputs selecting a value of an image distortion parameter.

930
In response to detecting the one or more inputs changing the value of the image distortion parameter, change the magnitude of change of the appearance of one or more portions of the representation of image data that are associated with light-emitting objects relative to other portions of the representation of image data that are not associated with light-emitting objects.

1102
While displaying, on the display, a user interface of a camera application, detect, via the one or more sensors, external interference that will impair operation of a respective function of the one or more cameras.

1104
The respective function is a focus function of the one or more cameras of the electronic device.

1106
The interference is magnetic interference.

1108
The interference is from an accessory of the electronic device.

1110
In response to detecting the interference external to the electronic device:

1112
In accordance with a determination that a first criteria has been satisfied, display, on the display, a notification indicating that an operation mode of the one or more cameras has been changed to reduce an impact of the external interference on the respective function of the one or more cameras.

1114
The first criteria includes a requirement that is met when a first predetermined amount of occurrences of detecting the external interference by the electronic device.

1116
The first predetermined number is dependent on the number of times the notification has previously been displayed on the electronic device.

1118
The change to the operation mode of the one or more cameras to reduce the impact of the external interference on the respective function of the one or more cameras includes reducing the responsiveness of one or more functions, wherein the one or more functions correspond to functions that cannot be reliably executed by the one or more cameras while the external interference is being detected by the electronic device.

1120
In accordance with a determination that the first criteria has not been satisfied, forgo displaying, on the display, the notification indicating that the operation mode of the one or more cameras has been changed.

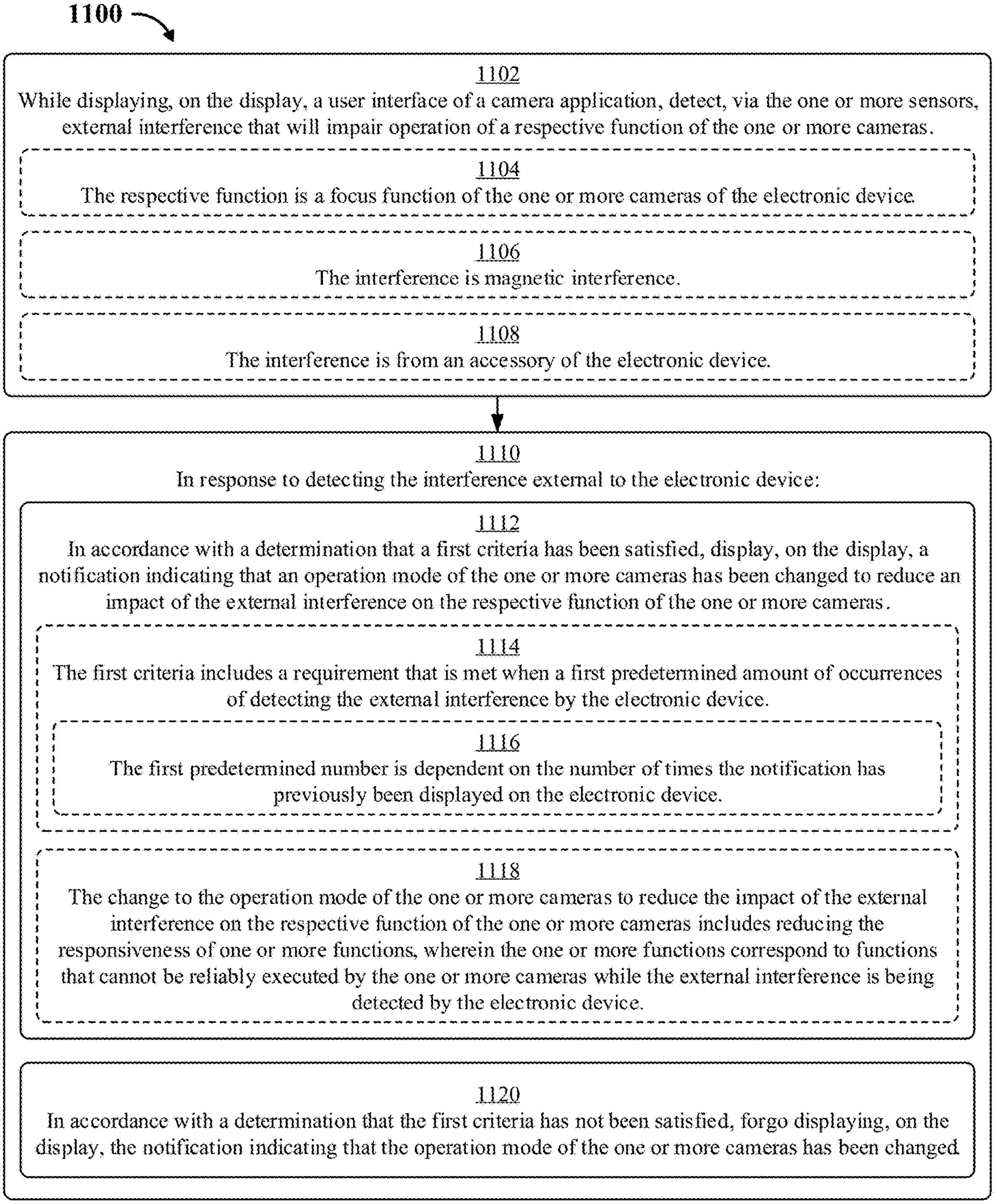

*FIG. 11*

USER INTERFACES SIMULATED DEPTH EFFECTS

CROSS-REFERENCE TO RELATED APPLICATIONS

This application is a continuation of U.S. Nonprovisional patent application Ser. No. 16/144,629, entitled "USER INTERFACES FOR SIMULATED DEPTH EFFECTS," filed Sep. 27, 2018, which claims priority to U.S. Provisional Patent Application Ser. No. 62/729,926, entitled "USER INTERFACES FOR SIMULATED DEPTH EFFECTS," filed Sep. 11, 2018, the contents of which are hereby incorporated by reference in their entirety.

FIELD

The present disclosure relates generally to computer user interfaces, and more specifically to techniques for managing user interfaces for simulated depth effects.

BACKGROUND

At present, a user cannot capture an image or photo with precise depth-of-field properties without the aid of a bulky camera. Furthermore, a user cannot quickly and easily make precise adjustments to depth-of-field properties of a stored image or photo.

BRIEF SUMMARY

Some techniques for simulating depth effects using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for simulated depth effects. Such methods and interfaces optionally complement or replace other methods for simulated depth effects. Such methods and interfaces reduce the cognitive burden on a user and produce a more efficient human-machine interface. For battery-operated computing devices, such methods and interfaces conserve power and increase the time between battery charges. Such methods and interfaces also enable easy application and editing of applied depth effects using only the electronic device without the aid of another device, thereby enhancing user efficiency and convenience.

In accordance with some embodiments, a method performed at an electronic device with a display and one or more input devices is described. The method comprises: displaying, on the display, a representation of image data; while displaying the representation of image data with a simulated depth effect as modified by a first value of a plurality of selectable values for the simulated depth effect, detecting, via the one or more input devices, a first input; in response to detecting the first input, displaying, on the display, an adjustable slider associated with manipulating the representation of image data, wherein the adjustable slider includes: a plurality of option indicators corresponding to a plurality of the selectable values for the simulated depth effect; and a selection indicator indicating that the first value is a currently-selected simulated depth effect value; while displaying the adjustable slider, detecting, via the one or more input devices, an input directed to the adjustable slider; and in response to detecting the input directed to the adjustable slider: moving the adjustable slider to indicate that a second value, of the plurality of selectable values for the simulated depth effect, is the currently-selected simulated depth effect value; and changing an appearance of the representation of image data in accordance with the simulated depth effect as modified by the second value.

In accordance with some embodiments, a non-transitory computer-readable storage medium is described. The non-transitory computer-readable storage medium stores one or more programs configured to be executed by one or more processors of an electronic device with a display and one or more input devices, the one or more programs including instructions for: displaying, on the display, a representation of image data; while displaying the representation of image data with a simulated depth effect as modified by a first value of a plurality of selectable values for the simulated depth effect, detecting, via the one or more input devices, a first input; in response to detecting the first input, displaying, on the display, an adjustable slider associated with manipulating the representation of image data, wherein the adjustable slider includes: a plurality of option indicators corresponding to a plurality of the selectable values for the simulated depth effect; and a selection indicator indicating that the first value is a currently-selected simulated depth effect value; while displaying the adjustable slider, detecting, via the one or more input devices, an input directed to the adjustable slider; and in response to detecting the input directed to the adjustable slider: moving the adjustable slider to indicate that a second value, of the plurality of selectable values for the simulated depth effect, is the currently-selected simulated depth effect value; and changing an appearance of the representation of image data in accordance with the simulated depth effect as modified by the second value.

In accordance with some embodiments, a transitory computer-readable storage medium is described. The transitory computer-readable storage medium stores one or more programs configured to be executed by one or more processors of an electronic device with a display and one or more input devices, the one or more programs including instructions for: displaying, on the display, a representation of image data; while displaying the representation of image data with a simulated depth effect as modified by a first value of a plurality of selectable values for the simulated depth effect, detecting, via the one or more input devices, a first input; in response to detecting the first input, displaying, on the display, an adjustable slider associated with manipulating the representation of image data, wherein the adjustable slider includes: a plurality of option indicators corresponding to a plurality of the selectable values for the simulated depth effect; and a selection indicator indicating that the first value is a currently-selected simulated depth effect value; while displaying the adjustable slider, detecting, via the one or more input devices, an input directed to the adjustable slider; and in response to detecting the input directed to the adjustable slider: moving the adjustable slider to indicate that a second value, of the plurality of selectable values for the simulated depth effect, is the currently-selected simulated depth effect value; and changing an appearance of the representation of image data in accordance with the simulated depth effect as modified by the second value.

In accordance with some embodiments, an electronic device is described. The electronic device comprises a display, one or more input devices, one or more processors, and memory storing one or more programs configured to be executed by the one or more processors, the one or more programs including instructions for: displaying, on the display, a representation of image data; while displaying the representation of image data with a simulated depth effect as modified by a first value of a plurality of selectable values for the simulated depth effect, detecting, via the one or more input devices, a first input; in response to detecting the first input, displaying, on the display, an adjustable slider associated with manipulating the representation of image data, wherein the adjustable slider includes: a plurality of option indicators corresponding to a plurality of the selectable values for the simulated depth effect; and a selection indicator indicating that the first value is a currently-selected simulated depth effect value; while displaying the adjustable slider, detecting, via the one or more input devices, an input directed to the adjustable slider; and in response to detecting the input directed to the adjustable slider: moving the adjustable slider to indicate that a second value, of the plurality of selectable values for the simulated depth effect, is the currently-selected simulated depth effect value; and changing an appearance of the representation of image data in accordance with the simulated depth effect as modified by the second value.

In accordance with some embodiments, an electronic device is described. The electronic device comprises a display; one or more input devices; means for displaying, on the display, a representation of image data; means, while displaying the representation of image data with a simulated depth effect as modified by a first value of a plurality of selectable values for the simulated depth effect, for detecting, via the one or more input devices, a first input; and means, in response to detecting the first input, for displaying, on the display, an adjustable slider associated with manipulating the representation of image data, wherein the adjustable slider includes: a plurality of option indicators corresponding to a plurality of the selectable values for the simulated depth effect; and a selection indicator indicating that the first value is a currently-selected simulated depth effect value; means, while displaying the adjustable slider, for detecting, via the one or more input devices, an input directed to the adjustable slider; and means, in response to detecting the input directed to the adjustable slider, for: moving the adjustable slider to indicate that a second value, of the plurality of selectable values for the simulated depth effect, is the currently-selected simulated depth effect value; and changing an appearance of the representation of image data in accordance with the simulated depth effect as modified by the second value.

In accordance with some embodiments, a method performed at an electronic device with a display and one or more input devices is described. The method comprises: receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including: distorting a first portion of the representation of image data that has a first depth in a first manner, wherein the first manner is determined based on a distance of the first portion from a predefined portion of the representation of image data; and distorting a second portion of the representation of image data that has the first depth in a second manner that is different from the first manner, wherein the second manner is determined based on a distance of the second portion from the predefined portion of the representation of image data.

In accordance with some embodiments, a non-transitory computer-readable storage medium is described. The non-transitory computer-readable storage medium stores one or more programs configured to be executed by one or more processors of an electronic device with a display and one or more input devices, the one or more programs including instructions for: receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including: distorting a first portion of the representation of image data that has a first depth in a first manner, wherein the first manner is determined based on a distance of the first portion from a predefined portion of the representation of image data; and distorting a second portion of the representation of image data that has the first depth in a second manner that is different from the first manner, wherein the second manner is determined based on a distance of the second portion from the predefined portion of the representation of image data.

In accordance with some embodiments, a transitory computer-readable storage medium is described. The transitory computer-readable storage medium stores one or more programs configured to be executed by one or more processors of an electronic device with a display and one or more input devices, the one or more programs including instructions for: receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including: distorting a first portion of the representation of image data that has a first depth in a first manner, wherein the first manner is determined based on a distance of the first portion from a predefined portion of the representation of image data; and distorting a second portion of the representation of image data that has the first depth in a second manner that is different from the first manner, wherein the second manner is determined based on a distance of the second portion from the predefined portion of the representation of image data.

In accordance with some embodiments, an electronic device is described. The electronic device comprises a display, one or more input devices, one or more processors, and memory storing one or more programs configured to be executed by the one or more processors, the one or more programs including instructions for: receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including: distorting a first portion of the representation of image data that has a first depth in a first manner, wherein the first manner is determined based on a distance of the first portion from a predefined portion of the representation of image data; and distorting a second portion of the representation of image data data that has the first depth in a second manner that is different from the first manner, wherein the second manner is determined based on a distance of the second portion from the predefined portion of the representation of image data.

In accordance with some embodiments, an electronic device is described. The electronic device comprises a display; one or more input devices; means for receiving, via the one or more input devices, a request to apply a simulated depth effect to a representation of image data, wherein depth data for a subject within the representation of image data is available; and means, in response to receiving the request to apply the simulated depth effect to the representation of image data, for displaying, on the display, the representation of image data with the simulated depth effect, including: distorting a first portion of the representation of image data that has a first depth in a first manner, wherein the first manner is determined based on a distance of the first portion from a predefined portion of the representation of image data; and distorting a second portion of the representation of image data that has the first depth in a second manner that is different from the first manner, wherein the second manner is determined based on a distance of the second portion from the predefined portion of the representation of image data.

In accordance with some embodiments, a method performed at an electronic device with a display and one or more sensors, including one or more cameras, is described. The method comprises: while displaying, on the display, a user interface of a camera application, detecting, via the one or more sensors, external interference that will impair operation of a respective function of the one or more cameras; and in response to detecting the interference external to the electronic device: in accordance with a determination that a first criteria has been satisfied, displaying, on the display, a notification indicating that an operation mode of the one or more cameras has been changed to reduce an impact of the external interference on the respective function of the one or more cameras; and in accordance with a determination that the first criteria has not been satisfied, forgoing displaying, on the display, the notification indicating that the operation mode of the one or more cameras has been changed.

In accordance with some embodiments, a non-transitory computer-readable storage medium is described. The non-transitory computer-readable storage medium stores one or more programs configured to be executed by one or more processors of an electronic device with a display and one or more sensors, including one or more cameras, the one or more programs including instructions for: while displaying, on the display, a user interface of a camera application, detecting, via the one or more sensors, external interference that will impair operation of a respective function of the one or more cameras; and in response to detecting the interference external to the electronic device: in accordance with a determination that a first criteria has been satisfied, displaying, on the display, a notification indicating that an operation mode of the one or more cameras has been changed to reduce an impact of the external interference on the respective function of the one or more cameras; and in accordance with a determination that the first criteria has not been satisfied, forgoing displaying, on the display, the notification indicating that the operation mode of the one or more cameras has been changed.

In accordance with some embodiments, a transitory computer-readable storage medium is described. The transitory computer-readable storage medium stores one or more programs configured to be executed by one or more processors of an electronic device with a display and one or more sensors, including one or more cameras, the one or more programs including instructions for: while displaying, on the display, a user interface of a camera application, detecting, via the one or more sensors, external interference that will impair operation of a respective function of the one or more cameras; and in response to detecting the interference external to the electronic device: in accordance with a determination that a first criteria has been satisfied, displaying, on the display, a notification indicating that an operation mode of the one or more cameras has been changed to reduce an impact of the external interference on the respective function of the one or more cameras; and in accordance with a determination that the first criteria has not been satisfied, forgoing displaying, on the display, the notification indicating that the operation mode of the one or more cameras has been changed.

In accordance with some embodiments, an electronic device is described. The electronic device comprises a display, one or more sensors, including one or more cameras, one or more processors, and memory storing one or more programs configured to be executed by the one or more processors, the one or more programs including instructions for: while displaying, on the display, a user interface of a camera application, detecting, via the one or more sensors, external interference that will impair operation of a respective function of the one or more cameras; and in response to detecting the interference external to the electronic device: in accordance with a determination that a first criteria has been satisfied, displaying, on the display, a notification indicating that an operation mode of the one or more cameras has been changed to reduce an impact of the external interference on the respective function of the one or more cameras; and in accordance with a determination that the first criteria has not been satisfied, forgoing displaying, on the display, the notification indicating that the operation mode of the one or more cameras has been changed.

In accordance with some embodiments, an electronic device is described. The electronic device comprises a display; one or more sensors, including one or more cameras; means, while displaying, on the display, a user interface of a camera application, for detecting, via the one or more sensors, external interference that will impair operation of a respective function of the one or more cameras; and means, in response to detecting the interference external to the electronic device, for: in accordance with a determination that a first criteria has been satisfied, displaying, on the display, a notification indicating that an operation mode of the one or more cameras has been changed to reduce an impact of the external interference on the respective function of the one or more cameras; and in accordance with a determination that the first criteria has not been satisfied, forgoing displaying, on the display, the notification indicating that the operation mode of the one or more cameras has been changed.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for adjusting image effects, thereby increasing the effectiveness, efficiency, and user satisfaction with such devices. Such methods and interfaces may complement or replace other methods for adjusting image effects.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9B are a flow diagram illustrating a method for managing user interfaces for displaying adjustments to a simulated depth effect, in accordance with some embodiments.

FIG. 11 is a flow diagram illustrating a method for managing user interfaces for indicating an interference to adjusting simulated image effects, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for simulating depth effects. For example, there is a need for a device that can capture a live feed image/photo or display a stored image/photo and enable a user to quickly and easily make precise adjustments to depth-of-field properties of the image/photo. Such techniques can reduce the cognitive burden on a user who accesses displayed content associated with adjusting image effects, thereby enhancing productivity. Further, such techniques can reduce processor and battery power otherwise wasted on redundant user inputs.

Figure 6A:
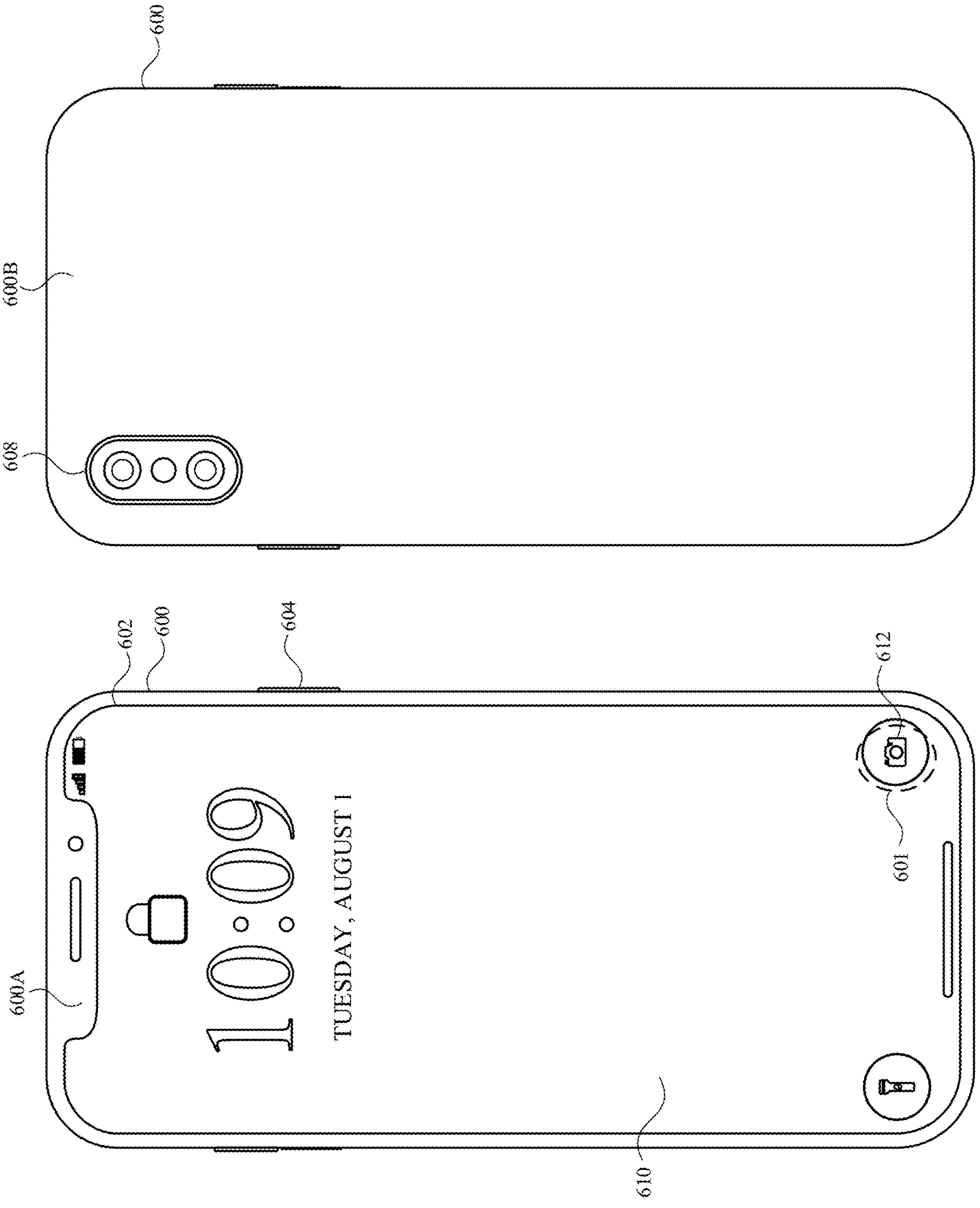
FIGS. 6A-6T illustrate exemplary user interfaces for adjusting a simulated depth effect, in accordance with some embodiments.
Figure 6T:
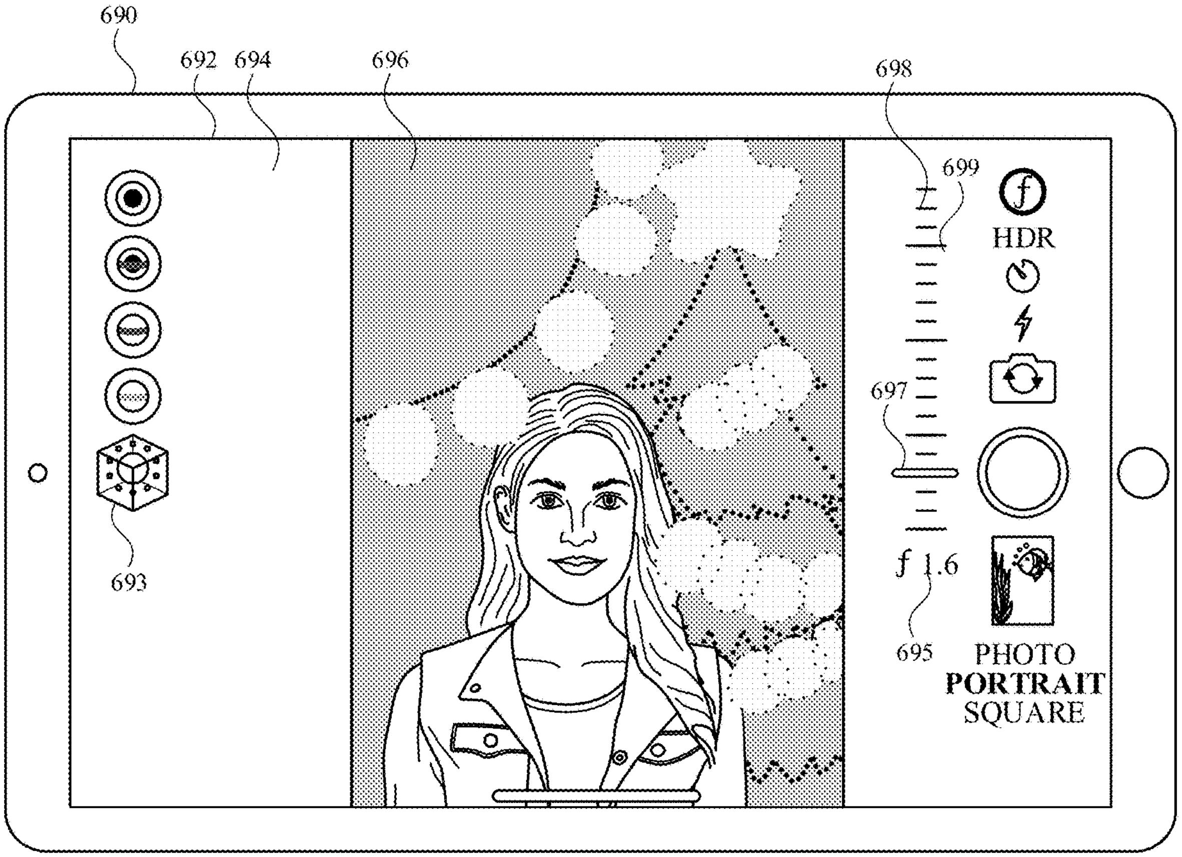
Figure 7A:
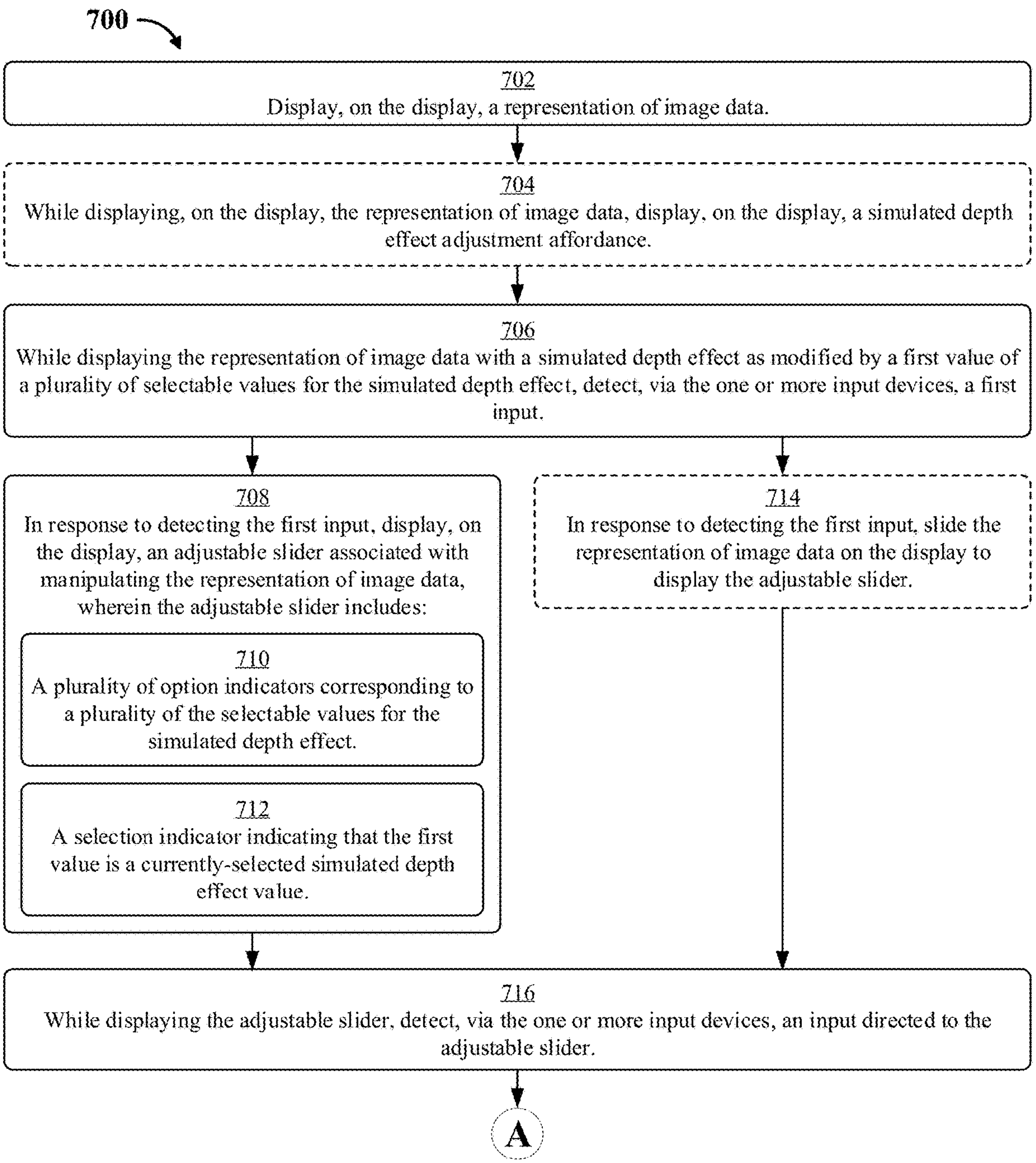
FIGS. 7A-7B are a flow diagram illustrating a method for managing user interfaces for adjusting a simulated depth effect, in accordance with some embodiments.
Figure 7B:
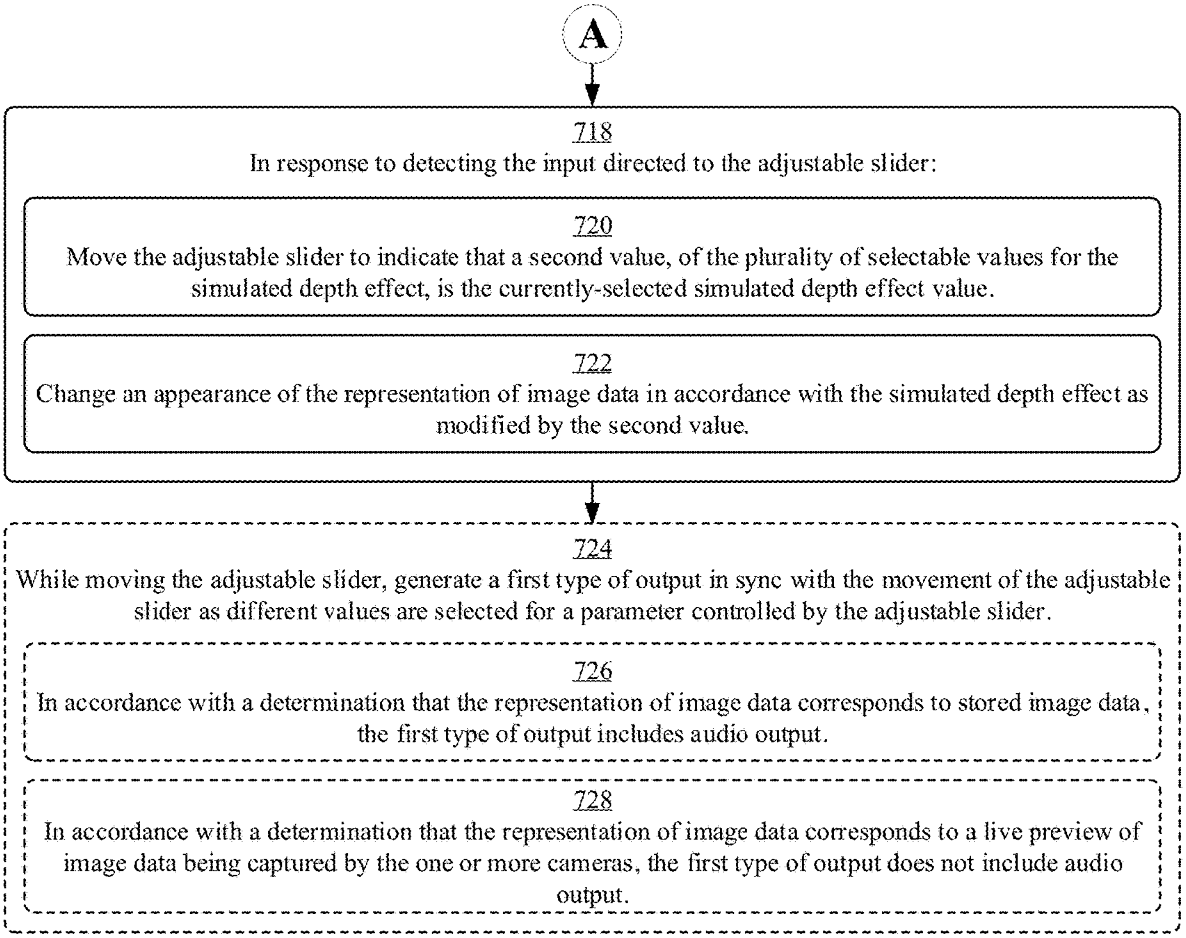
Figure 8A:
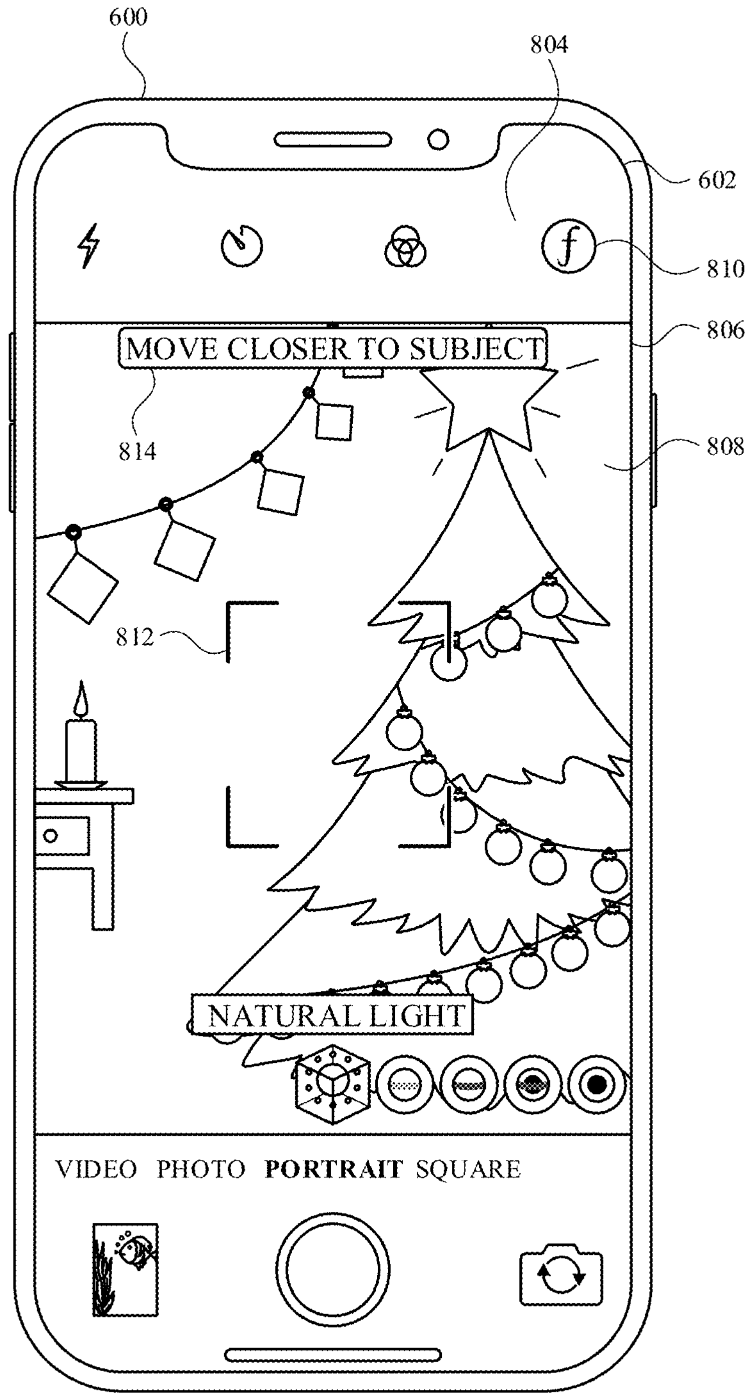
FIGS. 8A-8R illustrate exemplary user interfaces for displaying adjustments to a simulated depth effect, in accordance with some embodiments.
Figure 8R:
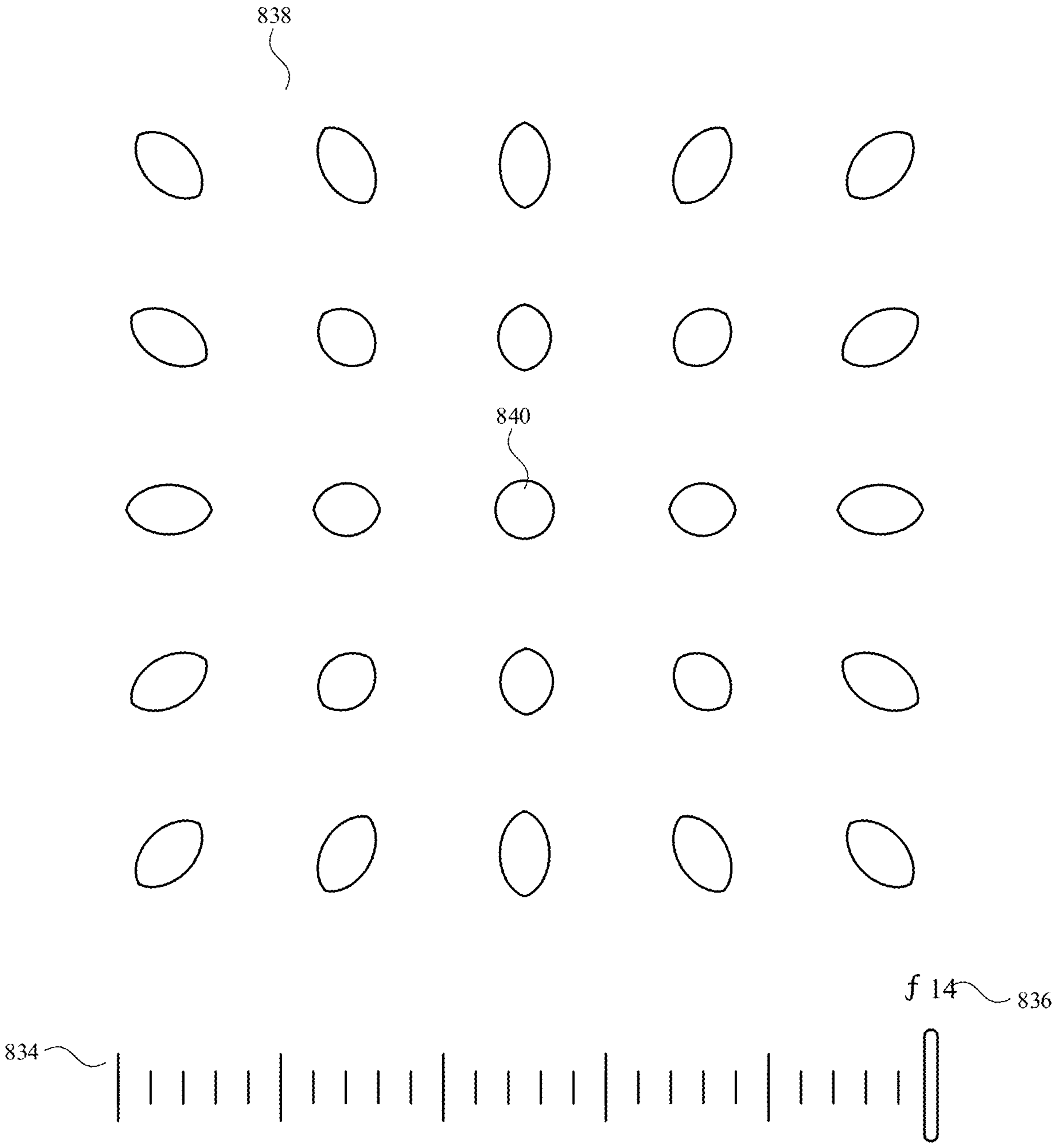
Figure 9A:
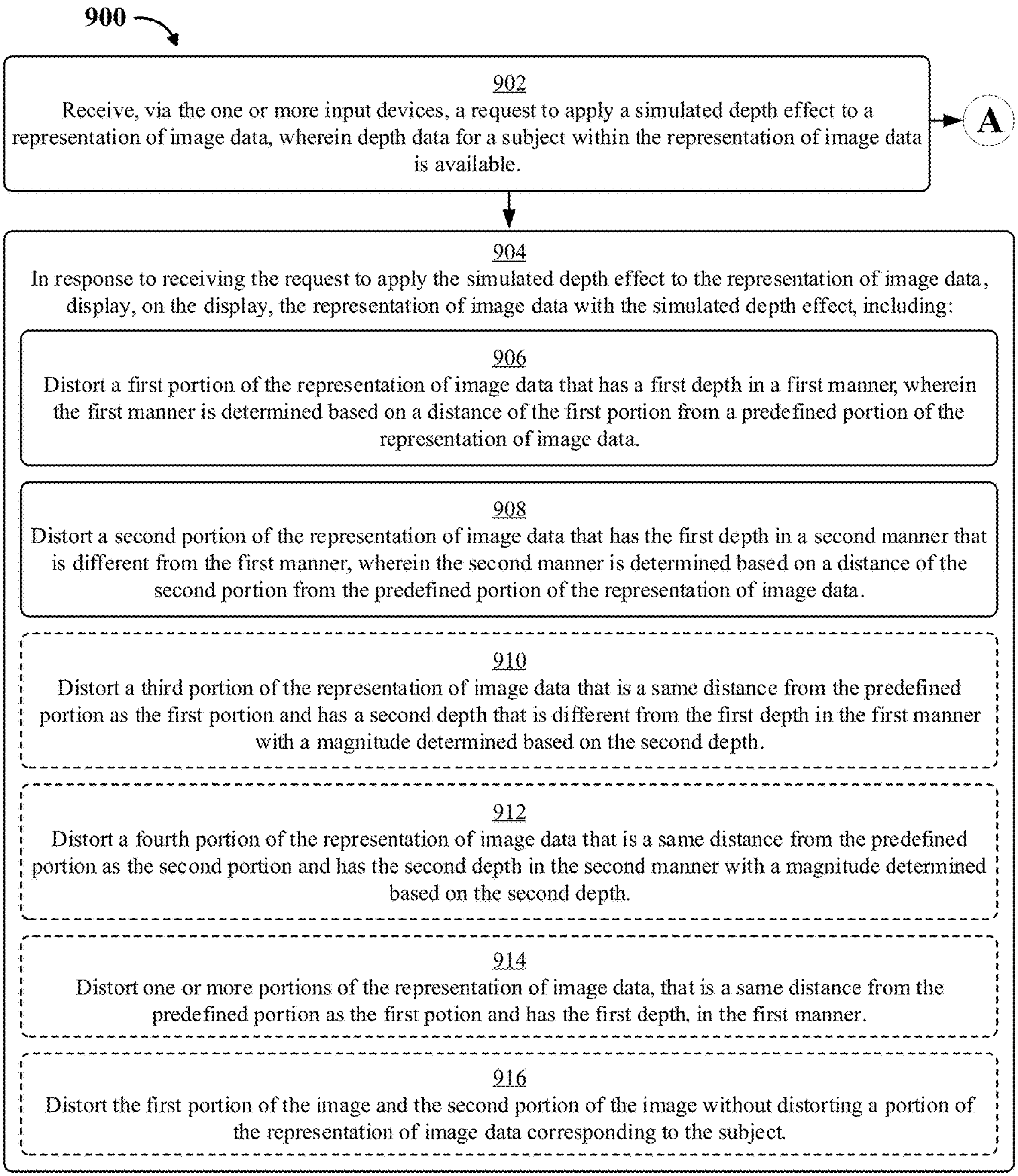

Below, FIGS. 1A-1B, 2, 3, 4A-4B, and 5A-5B provide a description of exemplary devices for performing the techniques for managing event notifications. FIGS. 6A-6T illustrate exemplary user interfaces for adjusting a simulated depth effect, in accordance with some embodiments. FIGS. 7A-7B are a flow diagram illustrating a method for managing user interfaces for adjusting a simulated depth effect, in accordance with some embodiments. The user interfaces in FIGS. 6A-6T are used to illustrate the processes described below, including the processes in FIGS. 7A-7B. FIGS. 8A-8R illustrate exemplary user interfaces for displaying adjustments to a simulated depth effect, in accordance with some embodiments. FIG. 9A-9B are a flow diagram illustrating a method for managing user interfaces for displaying adjustments to a simulated depth effect, in accordance with some embodiments. The user interfaces in FIGS. 8A-8R are used to illustrate the processes described below, including the processes in FIGS. 9A-9B. FIGS. 10A-10F illustrate exemplary user interfaces for indicating an interference to adjusting simulated image effects, in accordance with some embodiments. FIG. 11 is a flow diagram illustrating a method for managing user interfaces for indicating an interference to adjusting simulated image effects, in accordance with some embodiments. The user interfaces in FIGS. 10A-10F are used to illustrate the processes described below, including the processes in FIG. 11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
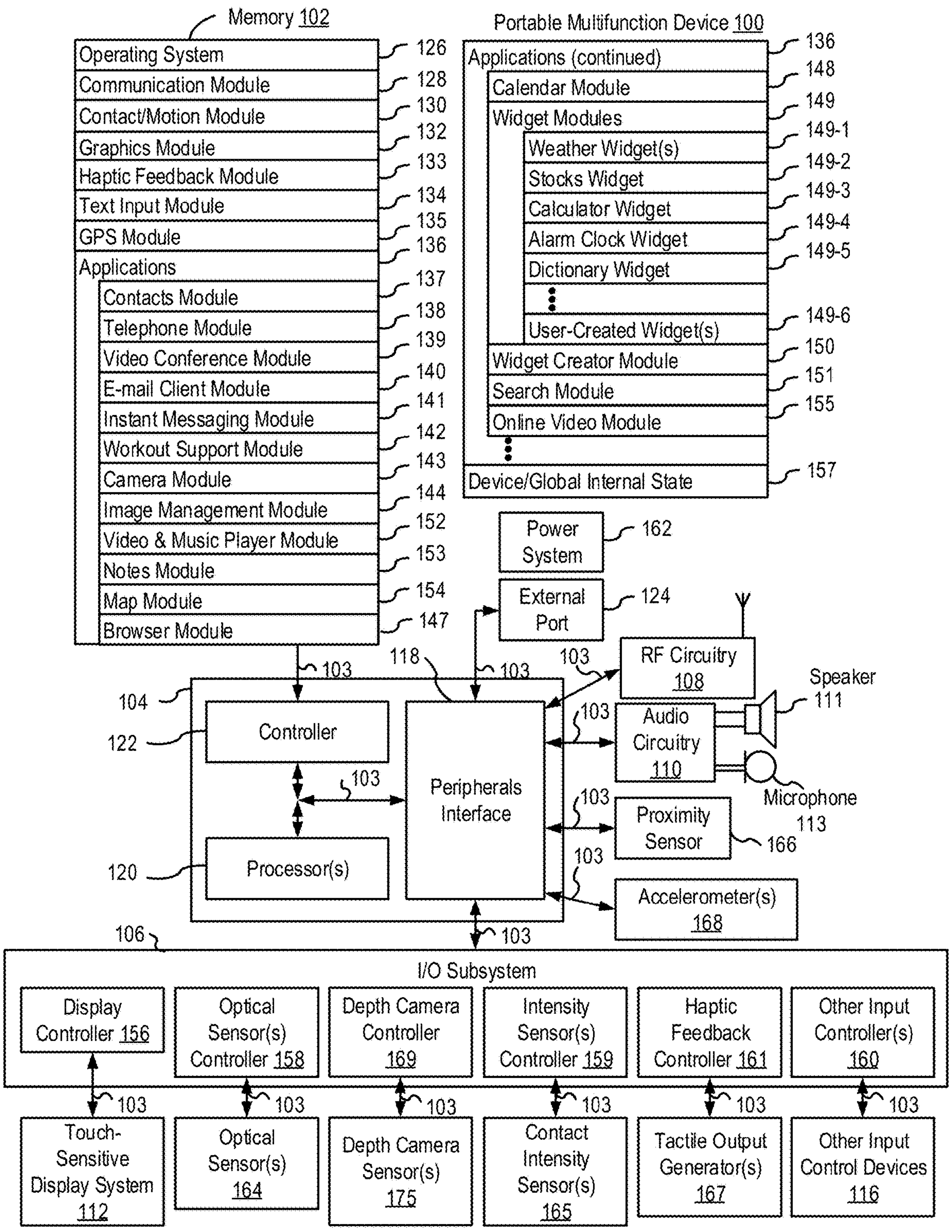
FIG. 1A is a block diagram illustrating a portable multifunction device with a touch-sensitive display, in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
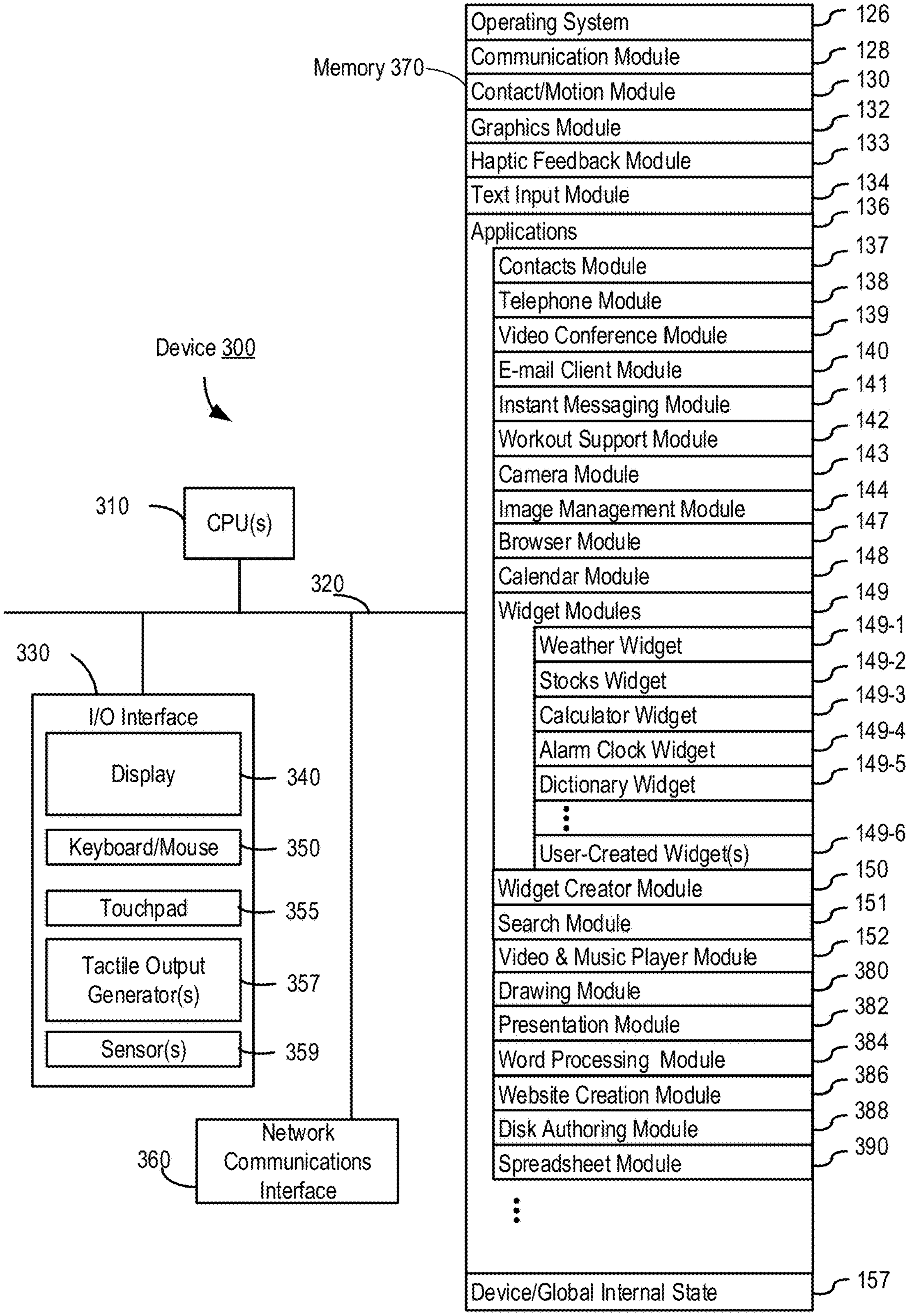
FIG. 3 is a block diagram of an exemplary multifunction device with a display and a touch-sensitive surface, in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, in some examples, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
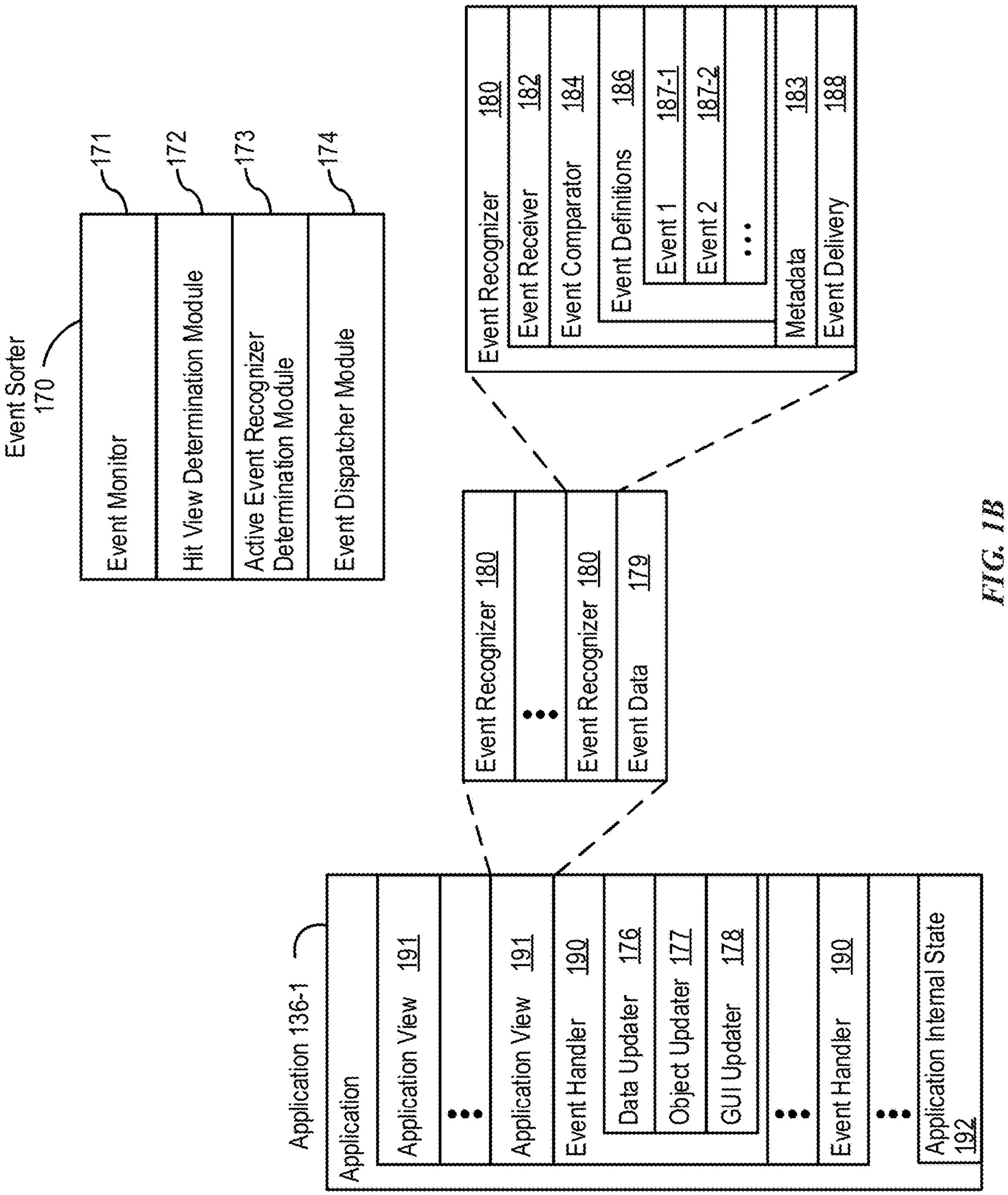
FIG. 1B is a block diagram illustrating exemplary components for event handling, in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
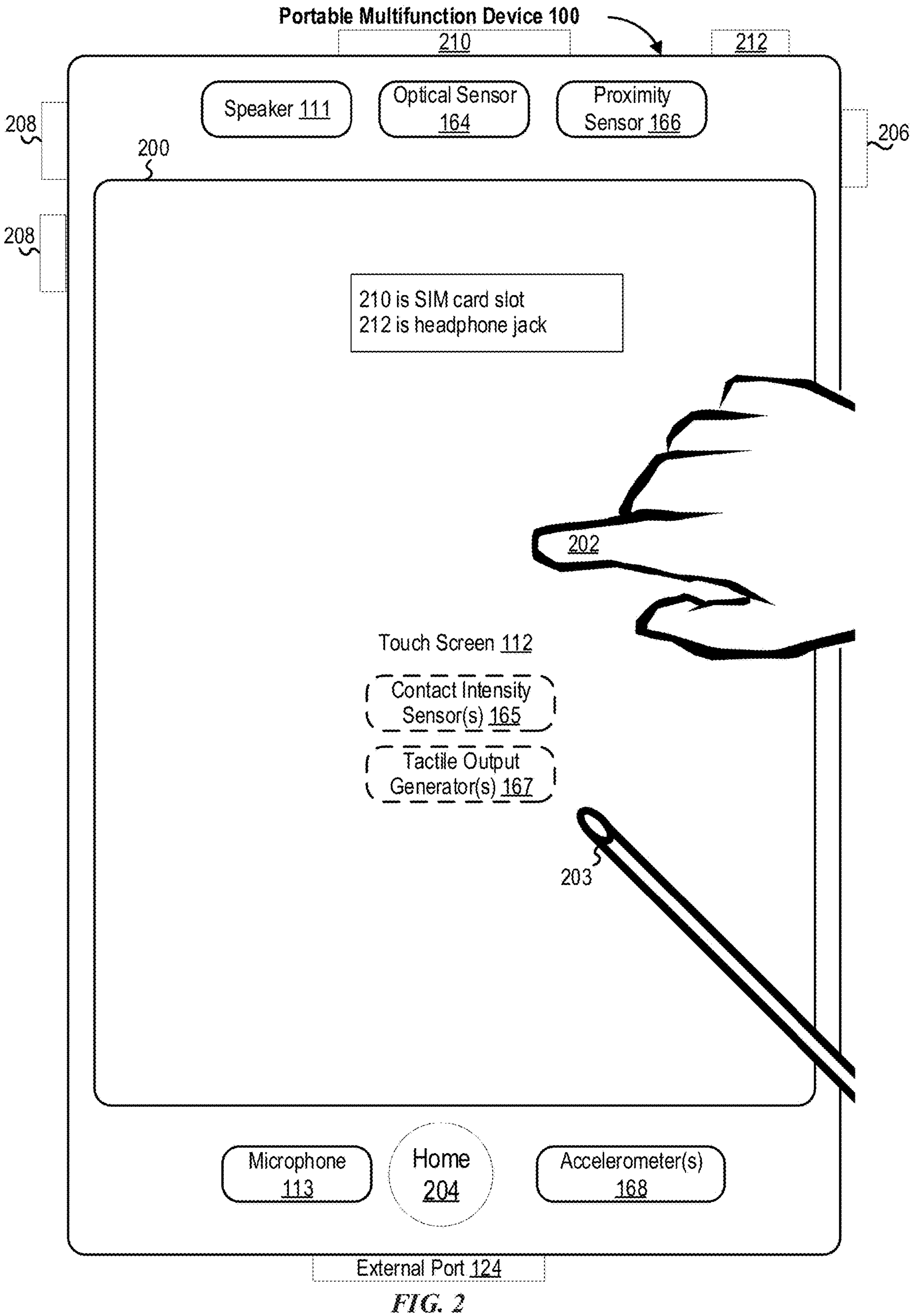
FIG. 2 illustrates a portable multifunction device having a touch screen, in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
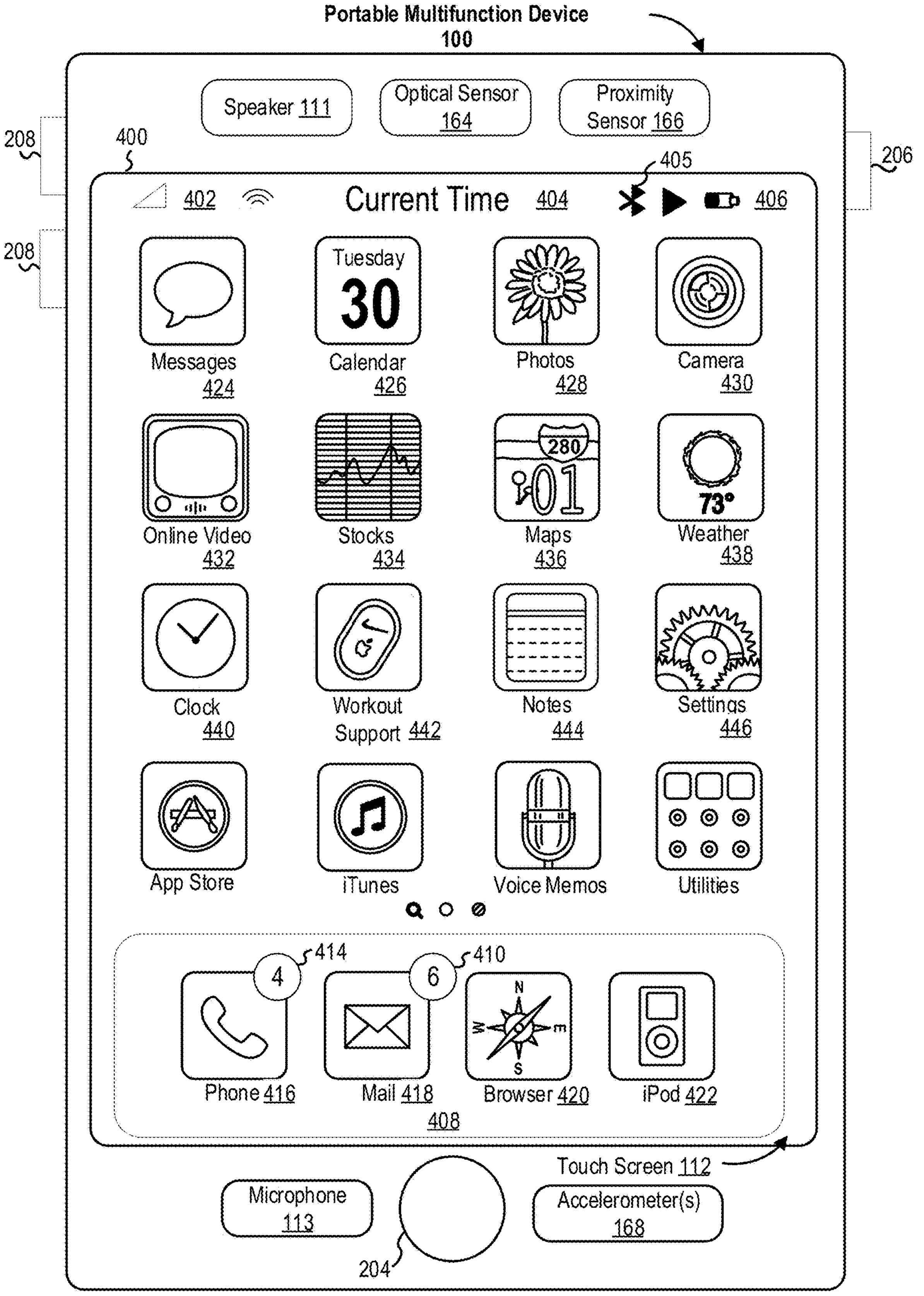
FIG. 4A illustrates an exemplary user interface for a menu of applications on a portable multifunction device, in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
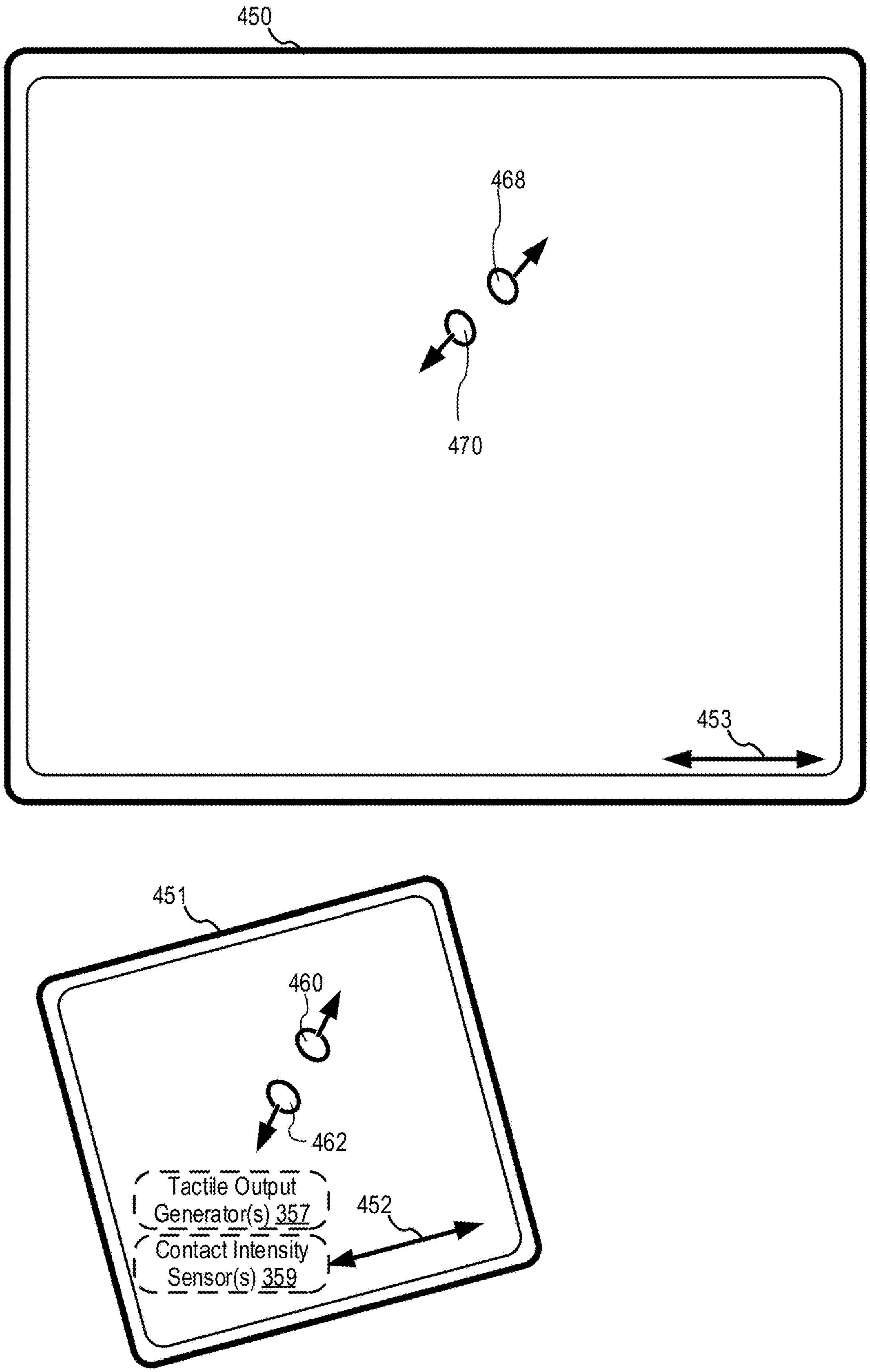
FIG. 4B illustrates an exemplary user interface for a multifunction device with a touch-sensitive surface that is separate from the display, in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
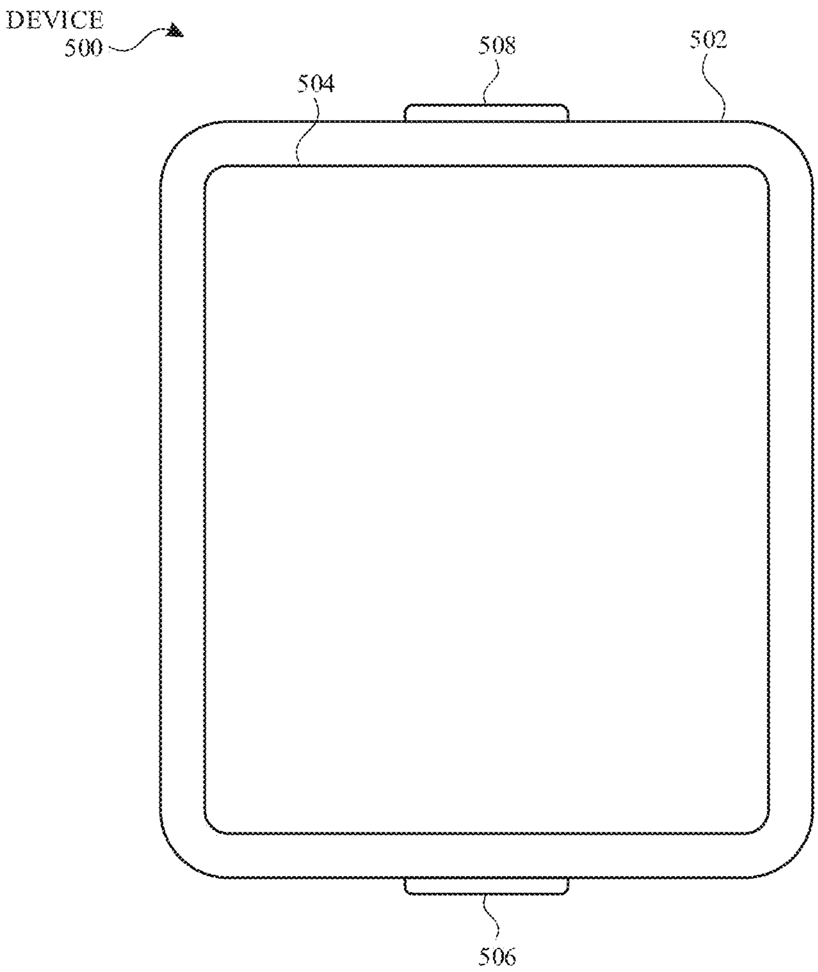
FIG. 5A illustrates a personal electronic device, in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
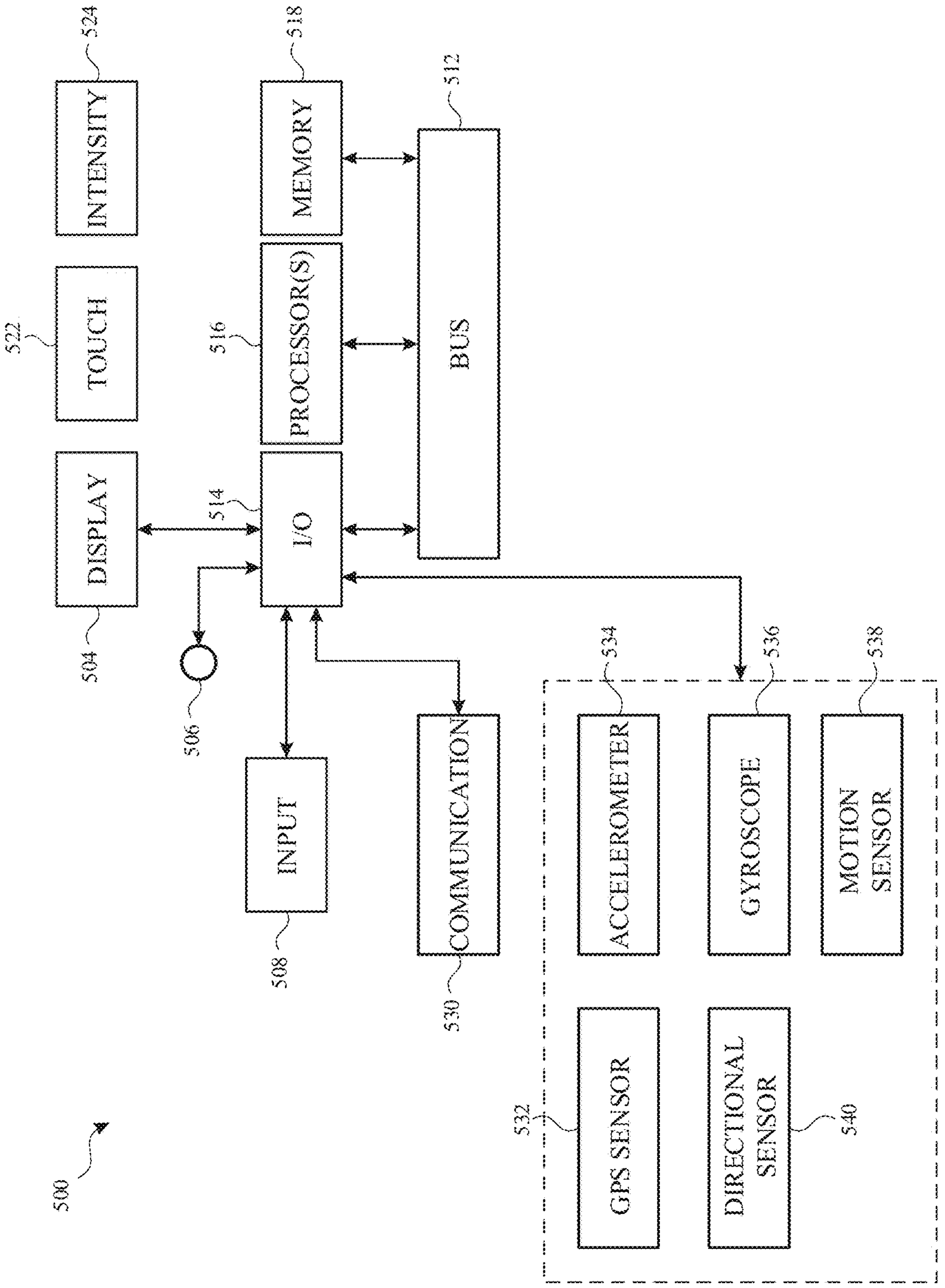
FIG. 5B is a block diagram illustrating a personal electronic device, in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7A-7B, 9A-9B, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6T illustrate exemplary user interfaces for adjusting a simulated depth effect (e.g., a Bokeh effect), in accordance with some embodiments. The user interfaces in these figures are used to illustrate the processes described below, including the processes in FIGS. 7A-7B.

FIG. 6A illustrates a front-view 600A and a rear-view 600B of an electronic device 600 (e.g., a smartphone). Electronic device 600 includes a display 602 (e.g., integrated with a touch-sensitive surface), an input device 604 (e.g., a mechanical input button, a press-able input button), a front-facing sensor 606 (e.g., including one or more front-facing cameras), and a rear-facing sensor 608 (e.g., including one or more rear-facing cameras). In some embodiments, electronic device 600 also includes one or more biometric sensors (e.g., a fingerprint sensor, a facial recognition sensor, an iris/retina scanner).

Electronic device 600 optionally also includes one or more depth camera sensors (e.g., similar to one or more depth camera sensors 175 described with reference to FIG. 1A). The one or more depth camera sensors receive data from the environment to create a three-dimensional model of an object (e.g., a face) within a scene from a viewpoint (e.g., a depth camera sensor). In some embodiments, in conjunction with an imaging module (e.g., similar to imaging module 143 described with reference to FIG. 1A, and also called a camera module), the one or more depth camera sensors are optionally used to determine a depth map of different portions of an image captured by the imaging module. In some embodiments, one or more depth camera sensors are located on the front of device so that the user's image with depth information is, optionally, obtained for video conferencing while the user views the other video conference participants on the touch screen display and to capture selfies with depth map data. In some embodiments, the one or more depth camera sensors are located on the back of device, or on the back and the front of the device. In some embodiments, the position(s) of the one or more depth camera sensors can be changed by the user (e.g., by rotating the lens and the sensor in the device housing) so that a depth camera sensor is used along with the touch screen display for both video conferencing and still and/or video image acquisition. In some embodiments, the one or more depth camera sensors are integrated with front-facing camera 606 and/or rear-facing camera 608.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

In FIG. 6A, electronic device 600 displays, on display 602, a user interface 610 (e.g., a lockscreen user interface) that includes an affordance 612 for launching an image capture application (e.g., a camera application, an image/photo capturing and editing application). While displaying user interface 610, electronic device 600 detects (e.g., via a touch-sensitive surface of display 602) an activation 601 of affordance 612 (e.g., a tap gesture on affordance 612).

Figure 6B:
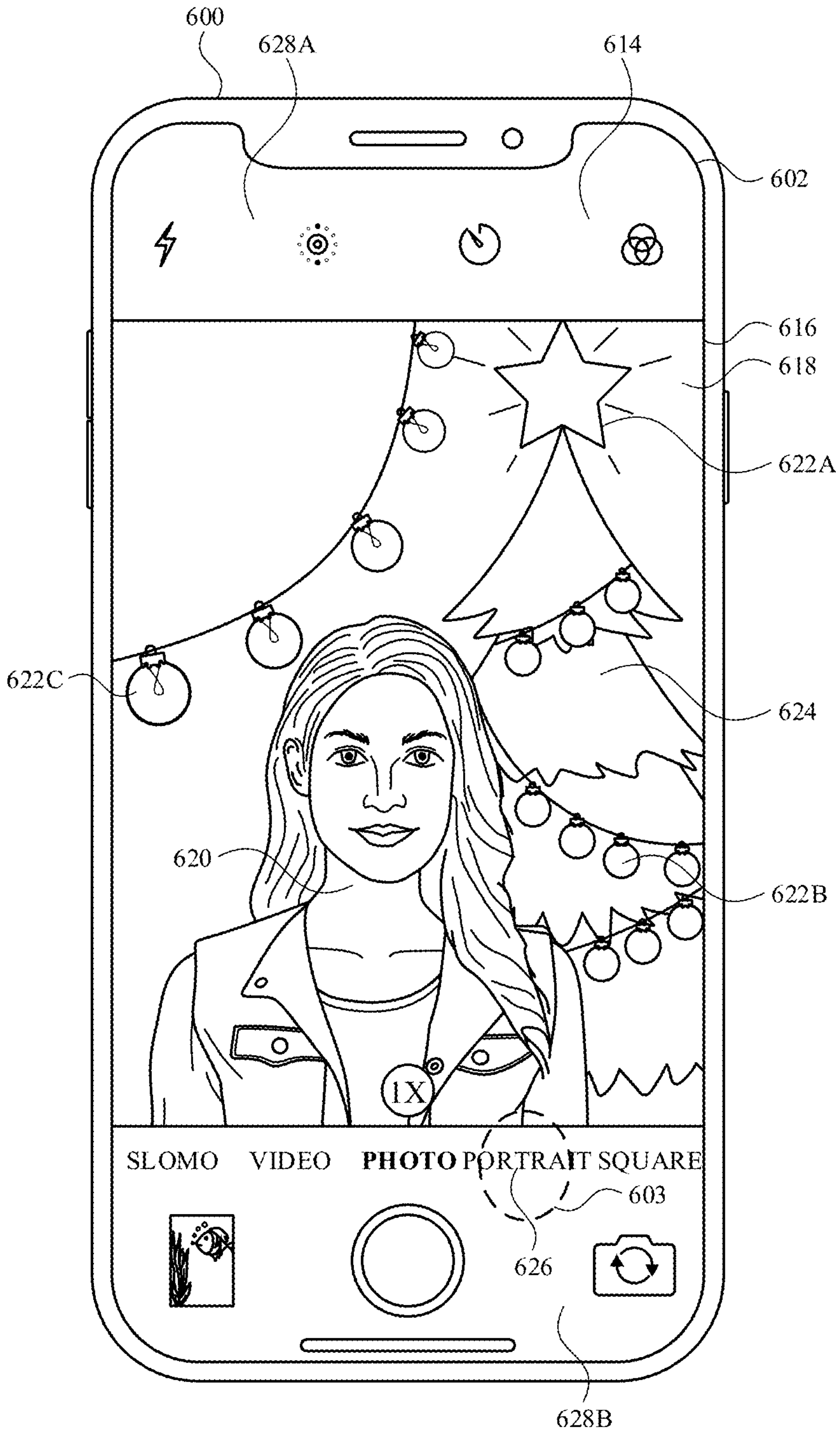

In FIG. 6B, in response to detecting activation 601, electronic device 600 displays, on display 602, a user interface 614 of the image capture application. In this example, image capture application is in a photo mode. While displaying user interface 614 of the image capture application, electronic device 600 receives, via rear-facing camera 608, image data corresponding to the environment within the field-of-view of rear-facing camera 608. In some examples, if the image capture application is in front-facing mode as opposed to rear-facing mode, electronic device 600 receives, via front-facing camera 606, image data corresponding to the environment within the field-of-view of front-facing camera 606.

Electronic device 600 displays, in an image display region 616 of user interface 614 of the image capture application, an image representation 618 of the image data received via rear-facing camera 608. In this example, image representation 618 includes a subject 620 (e.g., a view of a person that includes the face of the person and at least a portion of the upper body of the person). In this example, image representation 618 also includes a light-emitting object 622A (corresponding to a real light-emitting object in the real environment), light-emitting objects 622B (corresponding to real light-emitting objects in the real environment), and light-emitting objects 622C (corresponding to real light-emitting objects in the real environment). In this example, image representation 618 also includes a non-light emitting object 624 (corresponding to a real non-light-emitting object in the real environment).

User interface 614 of the image capture application also includes a first menu region 628A and a second menu region 628B. First menu region 628A includes a plurality of affordances associated with adjusting image effects and/or properties. Second menu region 628B includes a plurality of image capture mode options (e.g., photo mode, video mode, portrait mode, square mode, slow-motion mode). In FIG. 6B, electronic device 600 detects (e.g., via a touch-sensitive surface of display 602) an activation 603 of a portrait mode affordance 626 corresponding to portrait mode.

Figure 6C:
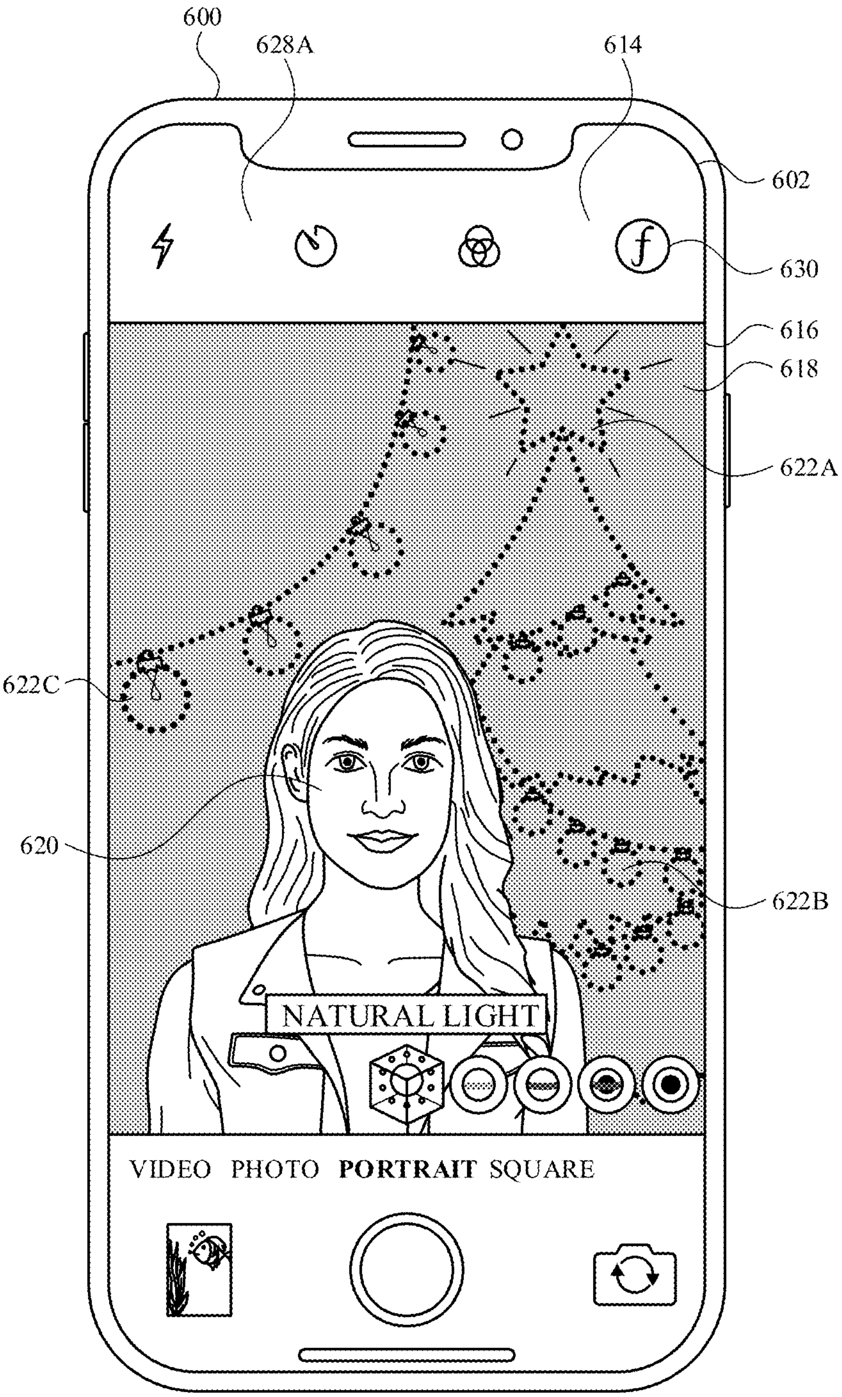

In FIG. 6C, in response to detecting activation 603 of portrait mode affordance 626, electronic device 600 changes the current image capture mode of the image capture application from photo mode to portrait mode. In portrait mode, electronic device 600 displays, in first menu region 628A of user interface 614, a depth effect affordance 630 (e.g., for adjusting a depth-of-field of image representation 618 by adjusting a simulated f-number, also known as the f-stop, f-ratio, or focal ratio).

Further, in portrait mode, electronic device 600 applies a simulated depth effect (e.g., a Bokeh effect, a depth-of-field effect, with a default 4.5 f-number) to image representation 618 displayed in image display region 616. In some embodiments, the simulated depth effect is applied to the background of image representation 618, with subject 620 as the focal point. In some embodiments, the simulated depth effect is applied throughout image representation 618 based on a focal point within subject 620 (e.g., the center region of the face of subject 620, such as the nose of subject 620).

As shown in FIG. 6C, with the simulated depth effect applied, depth-of-field properties of an object within image representation 618 are adjusted based on one or more characteristics of the particular object (e.g., the type of object, such as whether the object corresponds to a light-emitting object or to a non-light-emitting object, the shape of the object, the distance of the object from the focal point). For example, the depth-of-field properties of light-emitting objects 622A, 622B, and 622C in image representation 618 are adjusted more drastically relative to non-light-emitting object 624 in image representation 618 (e.g., such that the light-emitting objects look more blurred, larger, brighter, more saturated, and/or with a more distorted shape than non-light-emitting objects). Adjustments to the depth-of-field properties of an object based on one or more characteristics of the object is described in greater detail below with reference to the user interfaces of FIGS. 8A-8R.

Figure 6D:
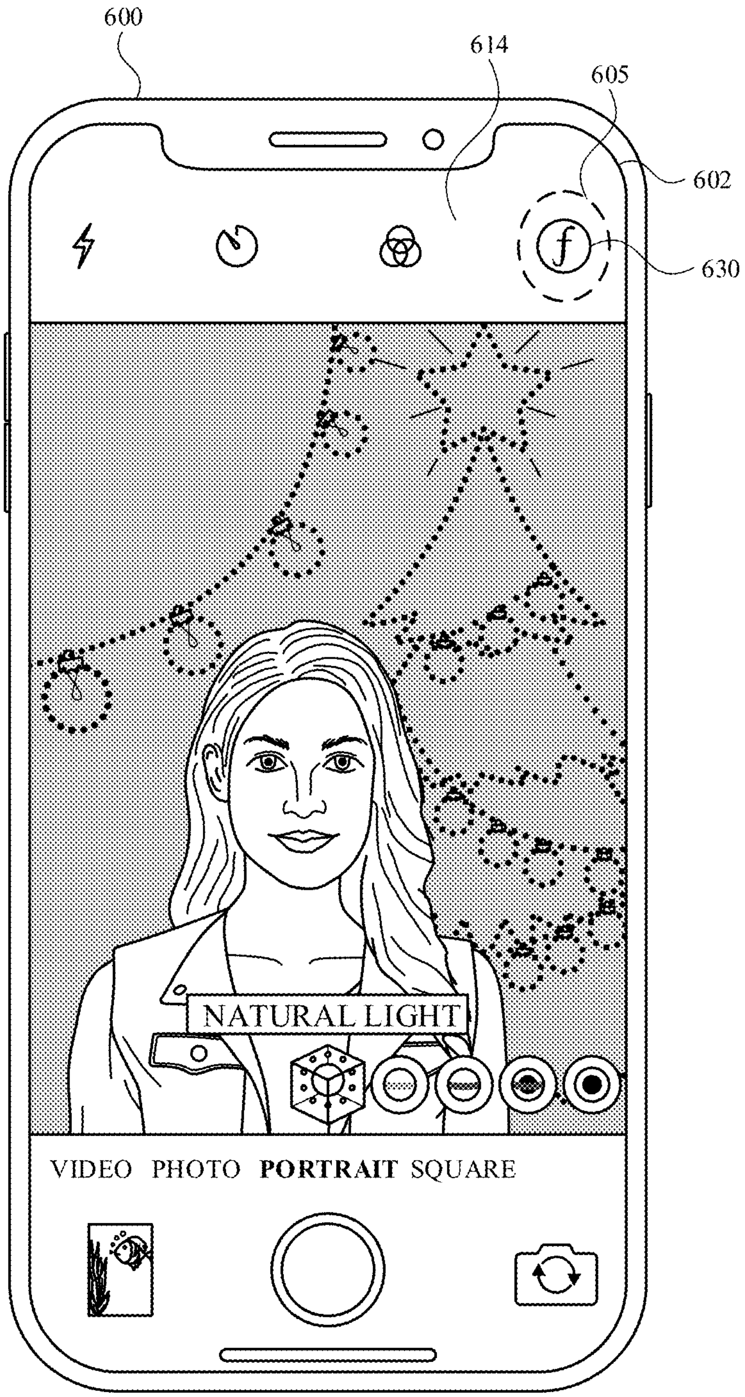
Figure 6E:
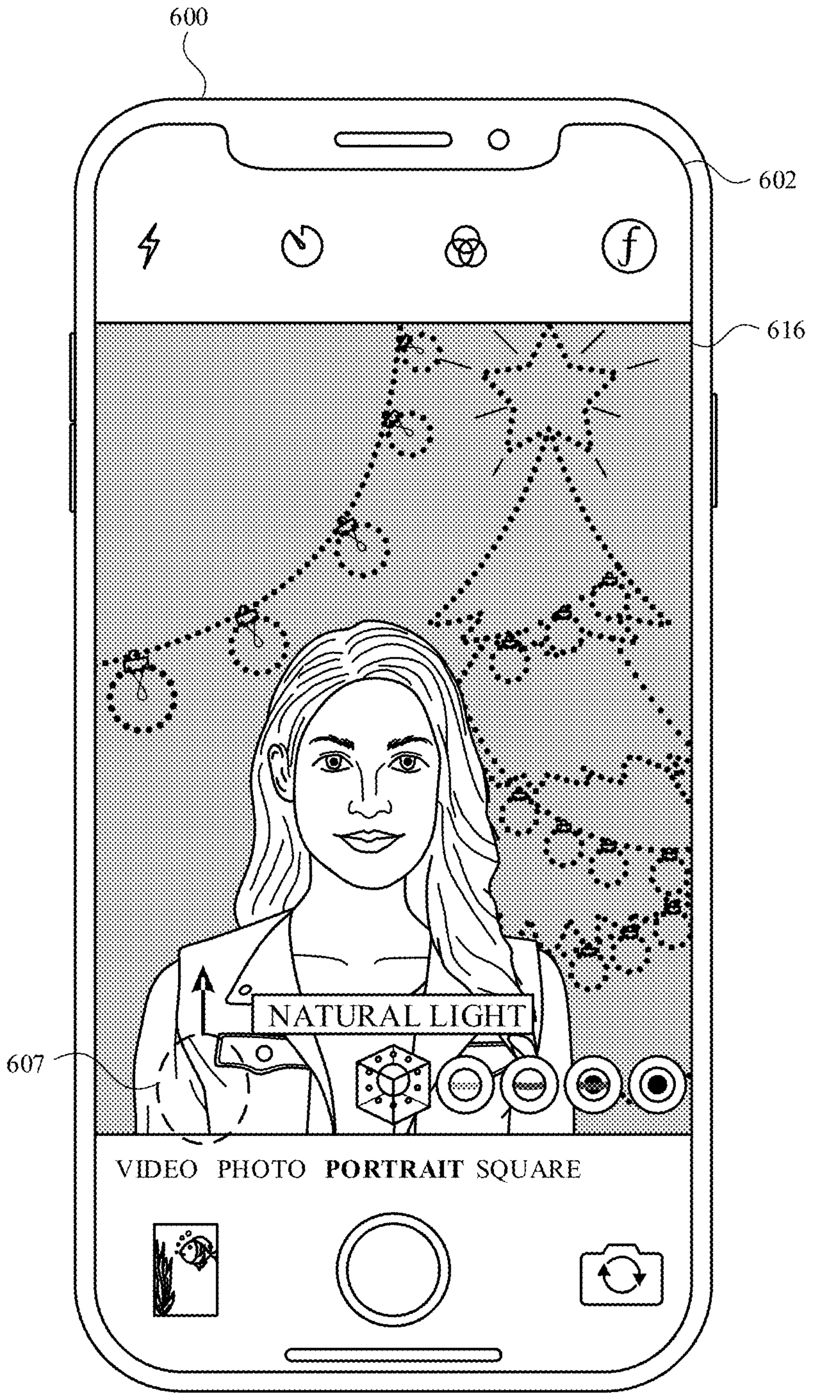

In FIG. 6D, while in portrait mode, electronic device 600 detects (e.g., via a touch-sensitive surface of display 602) an activation 605 of depth effect affordance 630 (e.g., a tap gesture on depth effect affordance 630). In some embodiments, electronic device 600 changes a visual characteristic of depth effect affordance (e.g., changes a color of the affordance) upon detecting activation of the affordance. Alternatively, in FIG. 6E, while in portrait mode, electronic device 600 detects (e.g., via a touch-sensitive surface of display 602) a swipe gesture 607 (e.g., a vertical swipe gesture, a swipe-up gesture) within image display region 616.

Figure 6F:
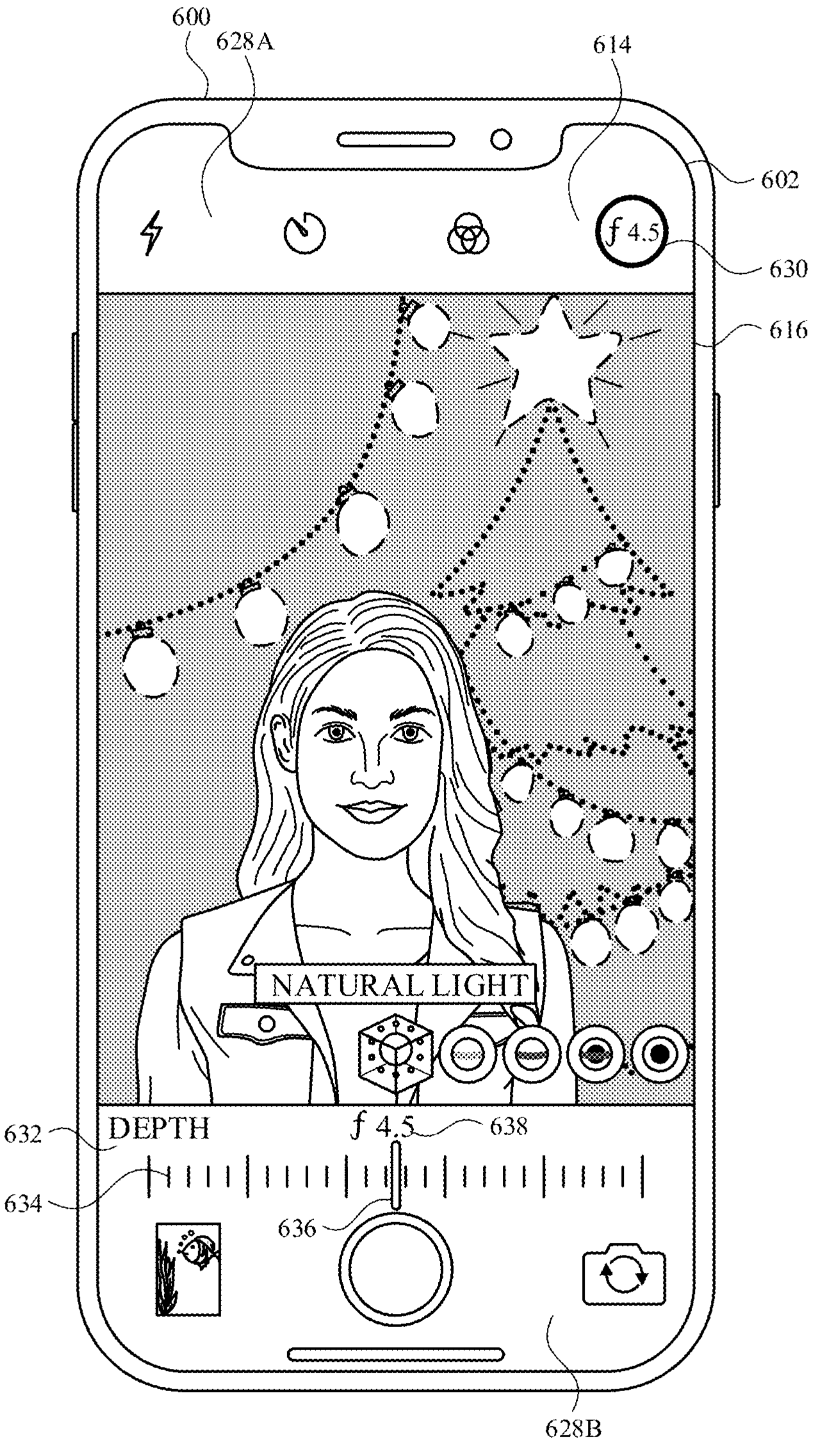

In FIG. 6F, in response to detecting activation 605 of depth effect affordance 630 or swipe gesture 607 on image display region 616, electronic device 600 shifts upwards image display region 616 within user interface 614 (such that first menu region 628A becomes vertically narrower and second menu region 628B becomes vertically wider) to display, in second menu region 628B, a depth adjustment slider 632.

Depth adjustment slider 632 includes a plurality of tickmarks 634 corresponding to f-numbers and a needle 636 indicating the currently-selected tickmark (and thus the currently-selected f-number). Depth adjustment slider 632 also includes a f-number indicator 638 (e.g., located over or adjacent to needle 636) indicating the value of the currently-selected f-number. As previously mentioned, in some embodiments, the default f-number is 4.5. In some embodiments, in addition to displaying the current f-number in f-number indicator 638, electronic device 600 also displays the current f-number in depth effect affordance 630.

Figure 6G:
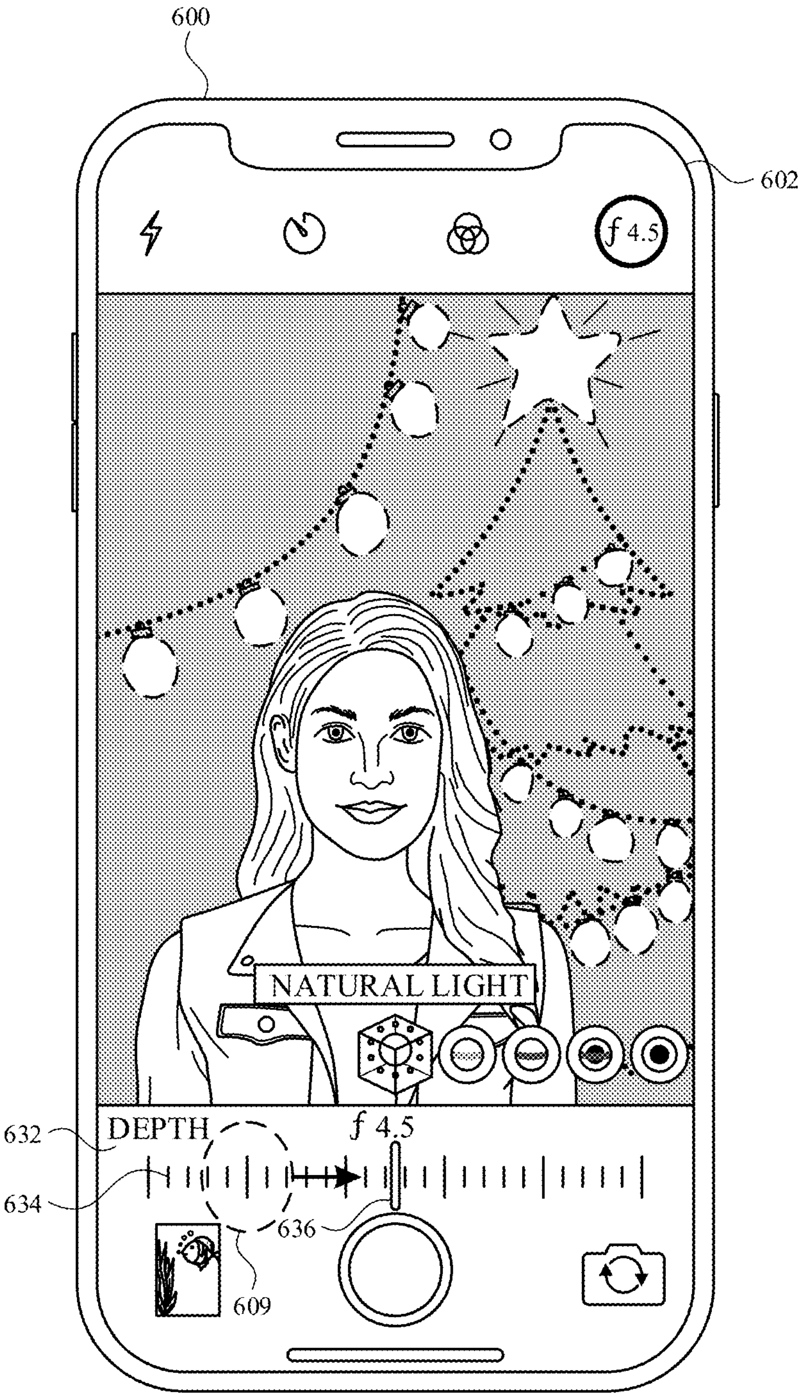

In FIG. 6G, while displaying depth adjustment slider 632, electronic device 600 detects (e.g., via a touch-sensitive surface of display 602) a swipe gesture 609 (e.g., a horizontal swipe gesture, a swipe-right gesture) on depth adjustment slider 632 (e.g., over tickmarks 634). In some examples, tickmarks 634 are (horizontally) shifted in response to swipe gesture 609 and needle 636 remains affixed. In some examples, needle 636 is shifted over affixed tickmarks 634 in response to a swipe gesture on depth adjustment slider 632.

Figure 6H:
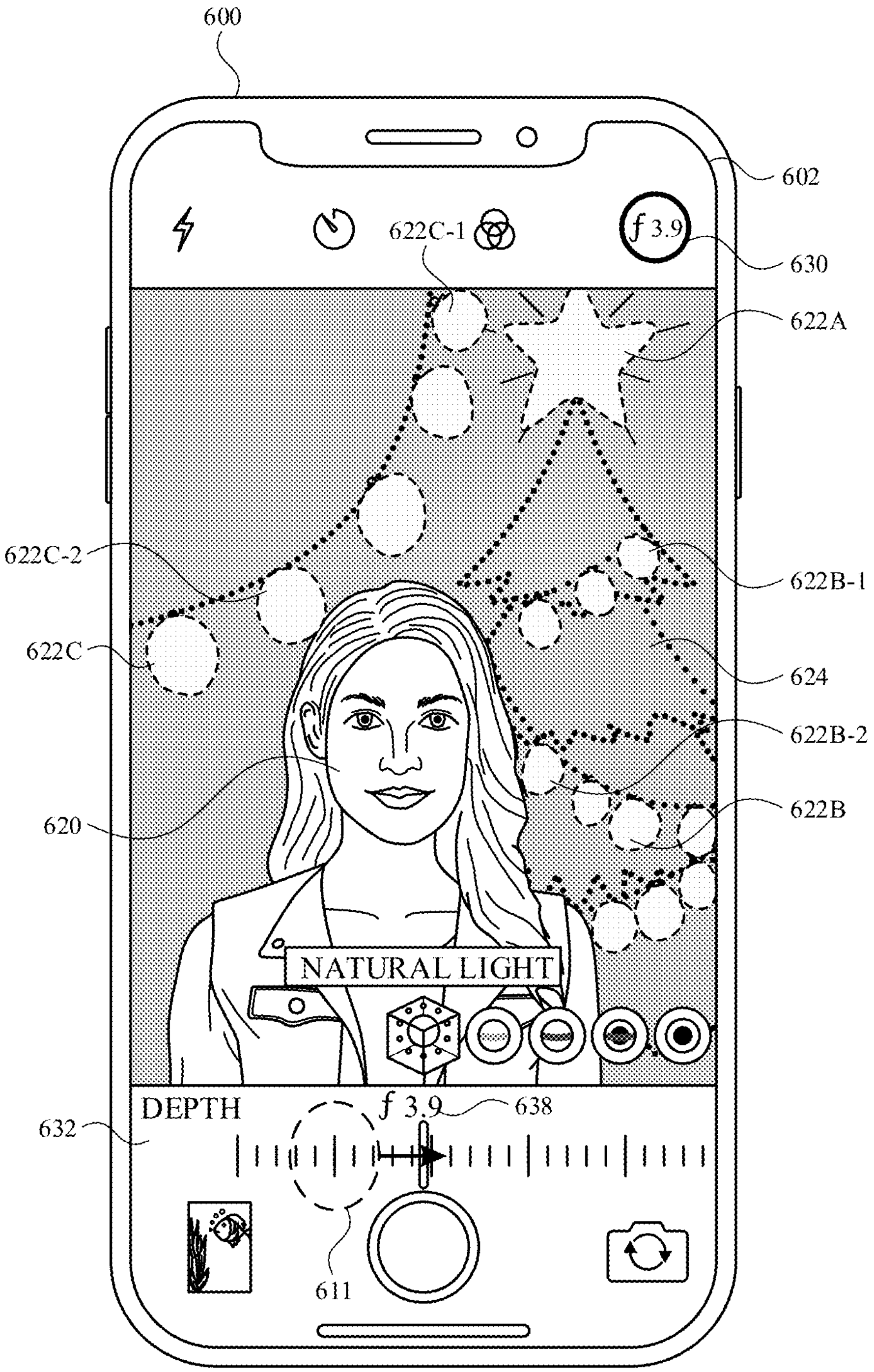

In FIG. 6H, in response to detecting swipe gesture 609, electronic device 600 adjusts, based on the focal point of image representation 618 (e.g., the nose of subject 620), the depth-of-field properties of the objects (e.g., light-emitting objects 622A, 622B, and 622C, and non-light-emitting object 624) within image representation 618.

As shown by f-number indicator 638 (and, in some embodiments, also by depth effect affordance 630), the current f-number (3.9) is decreased from the previous (default) f-number (4.5) as a result of swipe gesture 609. Light-emitting objects 622A, 622B, and 622C are more blurred, larger, brighter, more saturated, and/or with a more distorted shape in FIG. 6H (with a 3.9 f-number) than in FIG. 6G (with a 4.5 f-number) and, likewise, non-light-emitting object 624 is more blurred, larger, larger, more saturated, and/or with a more distorted shape in FIG. 6H than in FIG. 6G. The degree of change in the blurriness, the size, the degree of brightness, the degree of saturation, and/or the degree of shape-distortion of the objects from the previous f-number (4.5) to the lower f-number (3.9) is more drastic for light-emitting objects as compared to non-light-emitting objects.

Additionally, the shape of each object is further distorted based on each object's distance from the focal point (e.g., the nose of subject 620) of image representation 618 (e.g., if image representation 618 is viewed as an x, y-plane with the focal point being the center of the plane, the distance is measured as the straight line distance from the center of an object to the center of the plane). For example, the degree of shape distortion of object 622B-1 is more drastic (e.g., such that the object is less circular and more oval/stretched) than the degree of shape distortion of object 622B-2. Similarly, the degree of shape distortion of object 622C-1 is more drastic (e.g., such that the object is less circular and more oval/stretched) than the degree of shape distortion of object 622C-2. As mentioned, the changes in the depth-of-field properties of objects within the image representation are described in greater detail below with reference to FIGS. 8A-8R.

In FIG. 6H, electronic device 600 detects (e.g., via a touch-sensitive surface of display 602), a swipe gesture 611 (e.g., a continuation of swipe gesture 609) on depth adjustment slider 632.

Figure 6I:
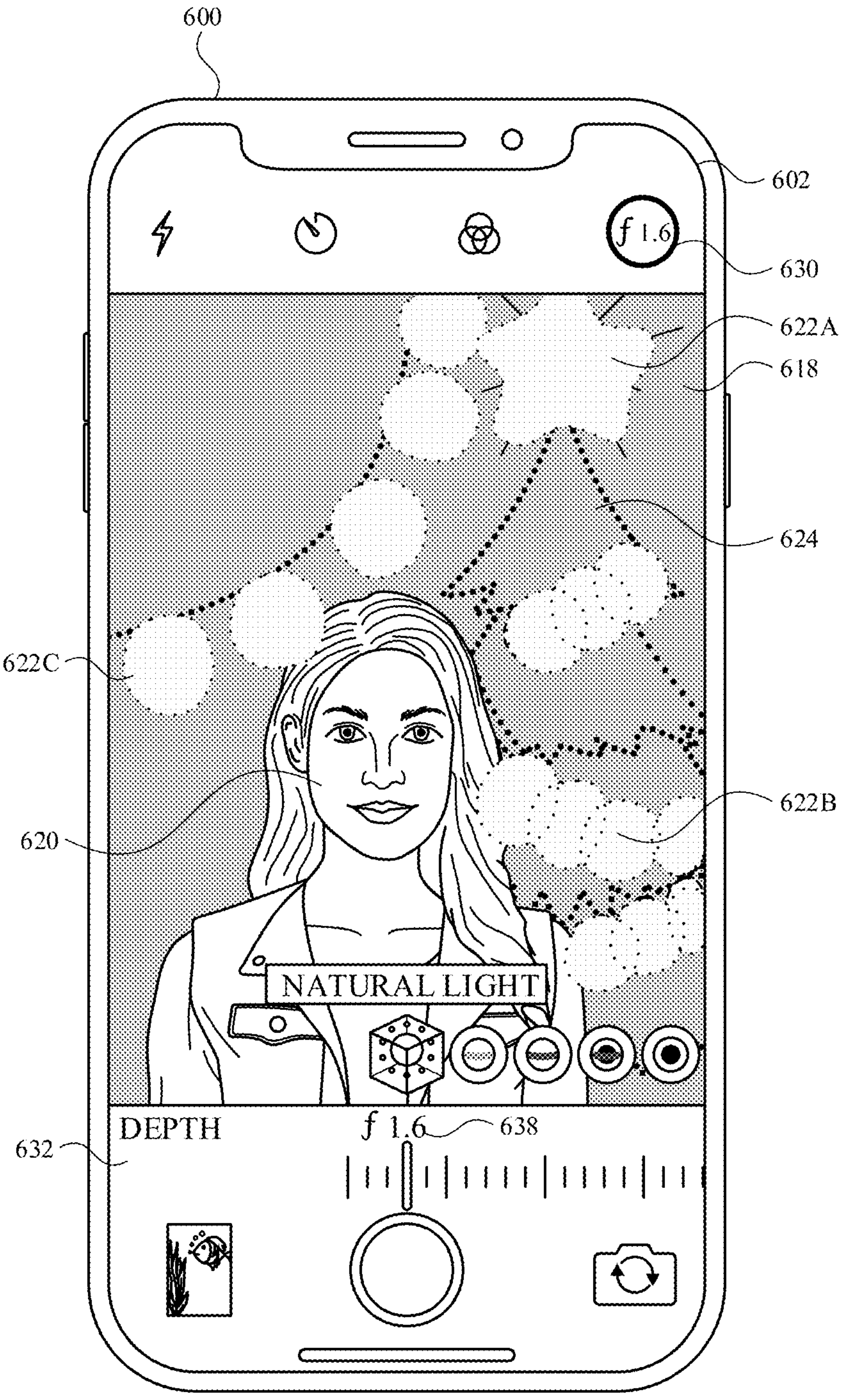

In FIG. 6I, in response to detecting swipe gesture 611, electronic device 600 further adjusts, based on the focal point of image representation 618 (e.g., the nose of subject 620), the depth-of-field properties of the objects (e.g., light-emitting objects 622A, 622B, and 622C, and non-light-emitting object 624) within image representation 618.

As shown by f-number indicator 638 (and, in some embodiments, also by depth effect affordance 630), the current f-number (1.6) is further decreased from the previous f-number (3.9) as a result of swipe gesture 611. Light-emitting objects 622A, 622B, and 622C are more blurred, larger, brighter, more saturated, and/or with a more distorted shape in FIG. 6I (with a 1.6 f-number) than in FIG. 6H (with a 3.9 f-number) and, likewise, non-light-emitting object 624 is more blurred, larger, brighter, more saturated, and/or with a more distorted shape in FIG. 6I than in FIG. 6H. The degree of change in the blurriness, the size, the degree of brightness, the degree of saturation, and/or the degree of shape-distortion of the objects from the previous f-number (3.9) to the lower f-number (1.6) is more drastic for light-emitting objects as compared to non-light-emitting objects.

Figure 6J:
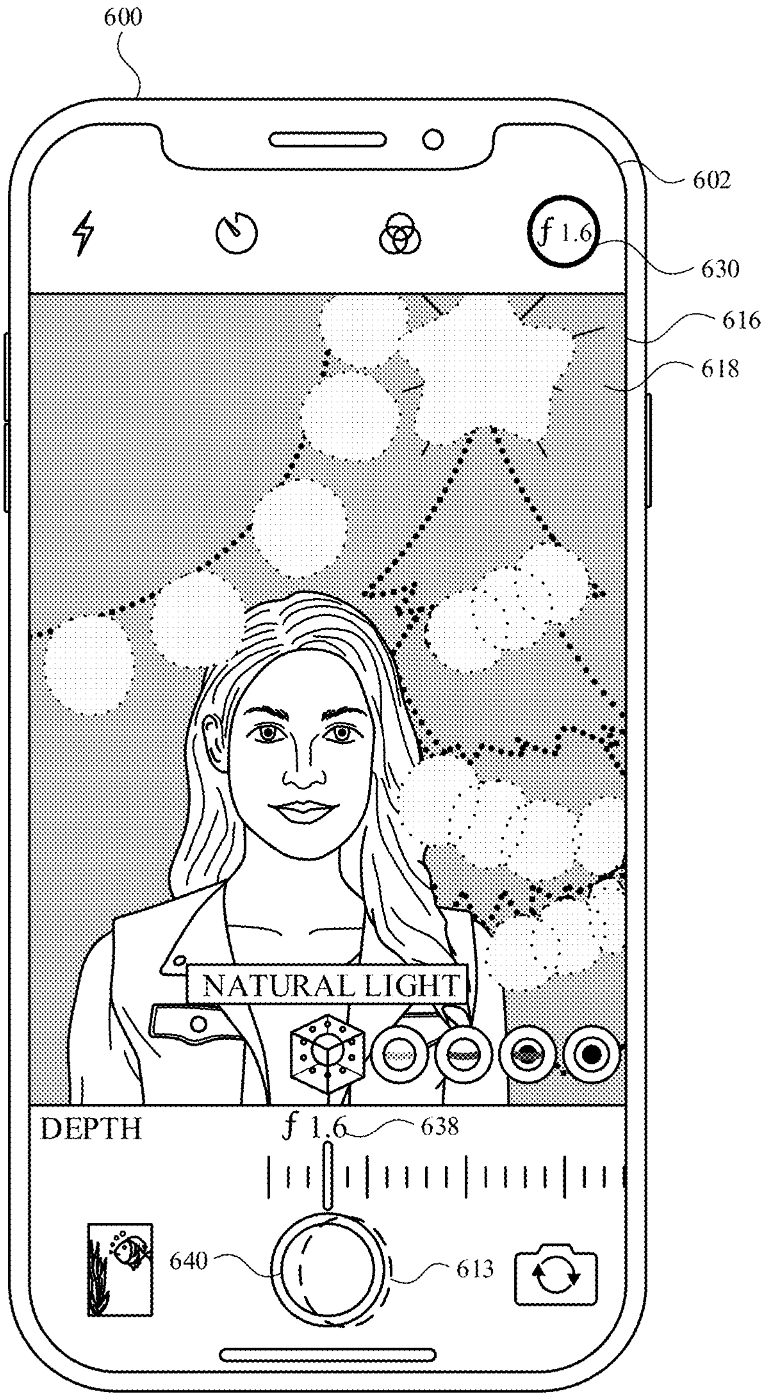

In FIG. 6J, while displaying, in image display region 616, image representation 618 corresponding to image data detected via rear-facing camera 608, and while the simulated depth-of-field is set to a 1.6 f-number (as indicated by f-number indicator 1.6) as previously set in FIG. 6I, electronic device 600 detects (e.g., via a touch-sensitive surface of display 602) an activation 613 of image capture affordance 640 (e.g., a tap gesture on image capture affordance 640).

In response to detecting activation 613 of image capture affordance 640, electronic device 600 stores (e.g., in a local memory of the device and/or a remote server accessible by the device) image data corresponding to image representation 618 with the simulated depth effect (with a 1.6 f-number) applied.

Figure 6K:
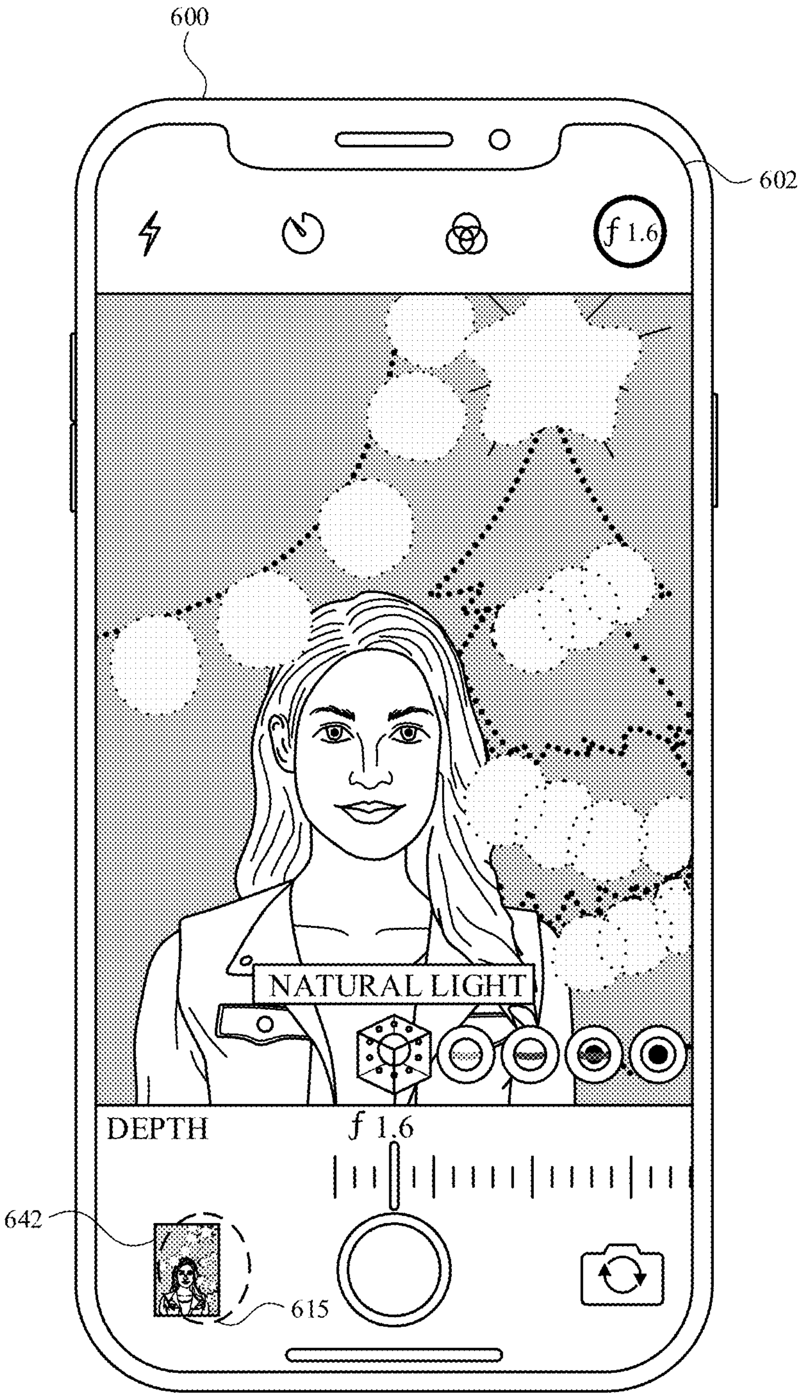

In FIG. 6K, electronic device 600 detects (e.g., via a touch-sensitive surface of display 602) an activation 615 of a stored images affordance 642 (e.g., a tap gesture on stored images affordance 642.

Figure 6L:
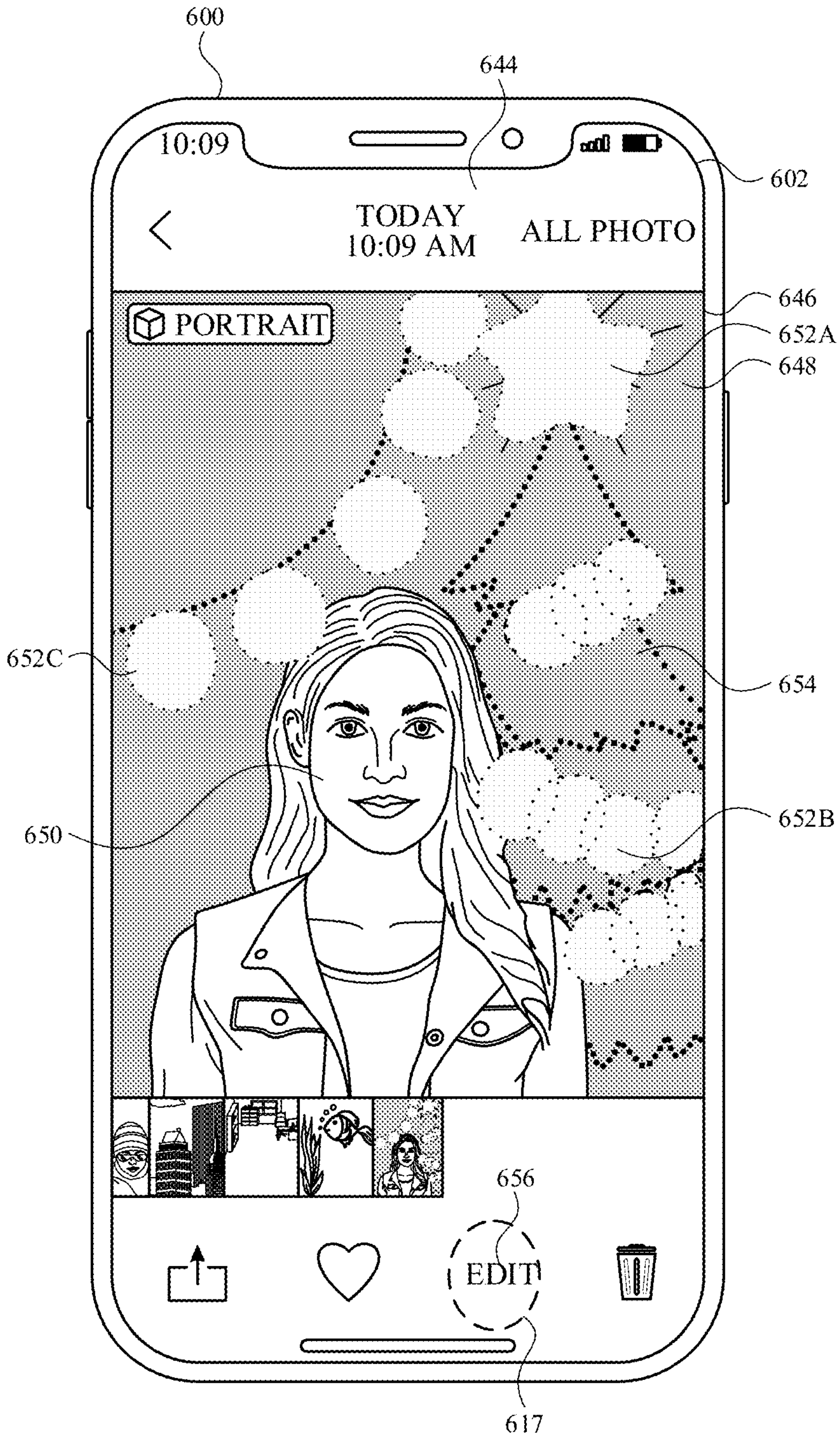

In FIG. 6L, in response to detecting activation 615 of stored images affordance 642, electronic device displays, on display 602, a user interface 644 of a stored images application. User interface 644 includes an image display region 646 for displaying a stored image. In FIG. 6L, electronic device 600 displays, in image display region 646, a stored image representation 648 corresponding to image representation 618 captured in FIG. 6J. As with image representation 618, stored image representation 648 includes a subject 650 (corresponding to subject 620), a light-emitting object 652A (corresponding to light-emitting object 622A), light-emitting objects 652B (corresponding to light-emitting objects 622B), light-emitting objects 652C (corresponding to light-emitting objects 622C), and non-light-emitting object 654 corresponding to non-light-emitting object 624). Further, as with image representation 618 when captured (in FIG. 6J), stored image representation 648 is adjusted with a 1.6 f-number simulated depth-of-field setting.

In FIG. 6L, while displaying stored image representation 648, electronic device 600 detects (e.g., via a touch-sensitive surface of display 602) an activation 617 of an edit affordance 656 of user interface 644 (e.g., a tap gesture on edit affordance 656).

Figure 6M:
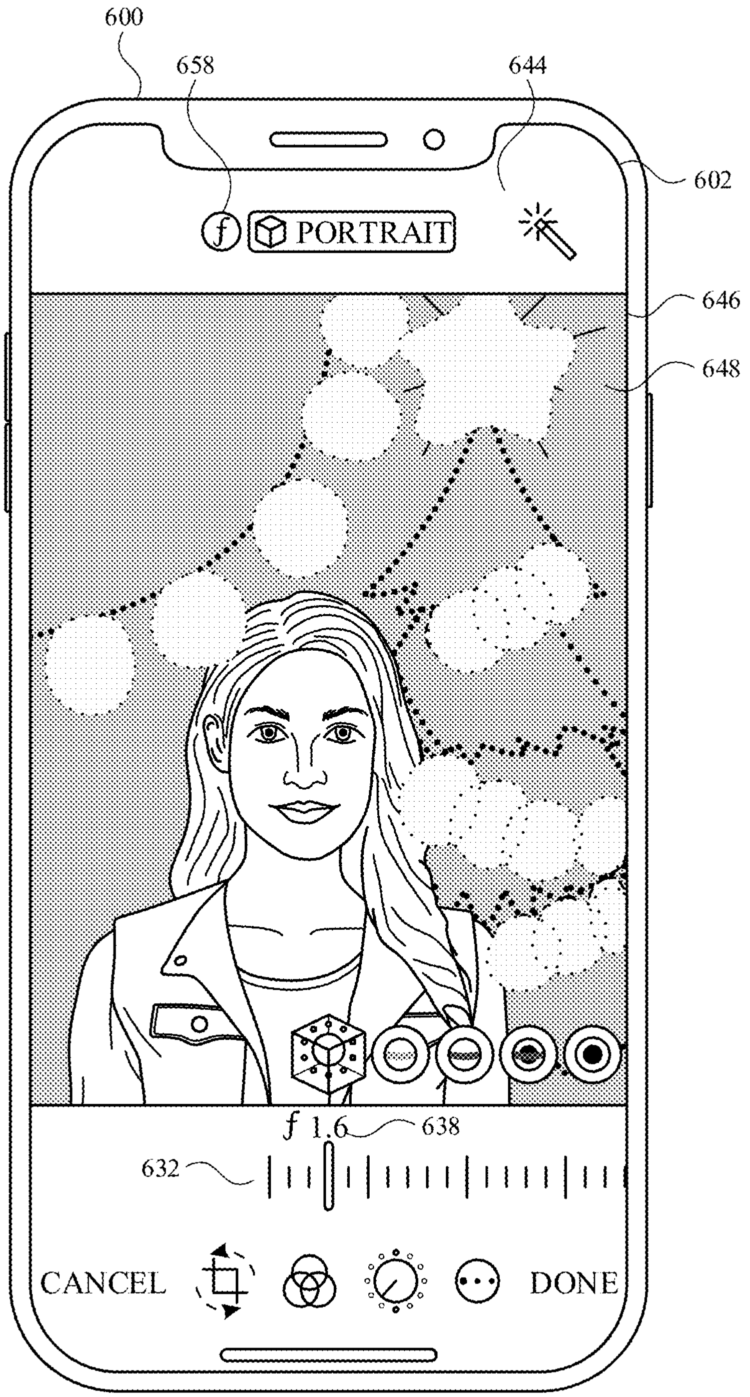

In FIG. 6M, in response to detecting activation 617 of edit affordance 656, electronic device 600 displays (e.g., in a menu region of user interface 644 below image display region 646 showing the stored image representation) depth adjustment slider 632 (set to a 1.6 f-number, as indicated by f-number indicator 638). In some examples, image display region 646 shifts upwards within user interface 644 to display depth adjustment slider 632 (e.g., similar to image display region 616 shifting upwards, as described with reference to FIG. 6F). Electronic device 600 also displays (e.g., in a region of user interface 644 above image display region 646 showing the stored image representation), a depth effect indicator 658 indicating that the currently-displayed stored image representation (stored image representation 648) is adjusted with a simulated depth effect.

Figure 6N:
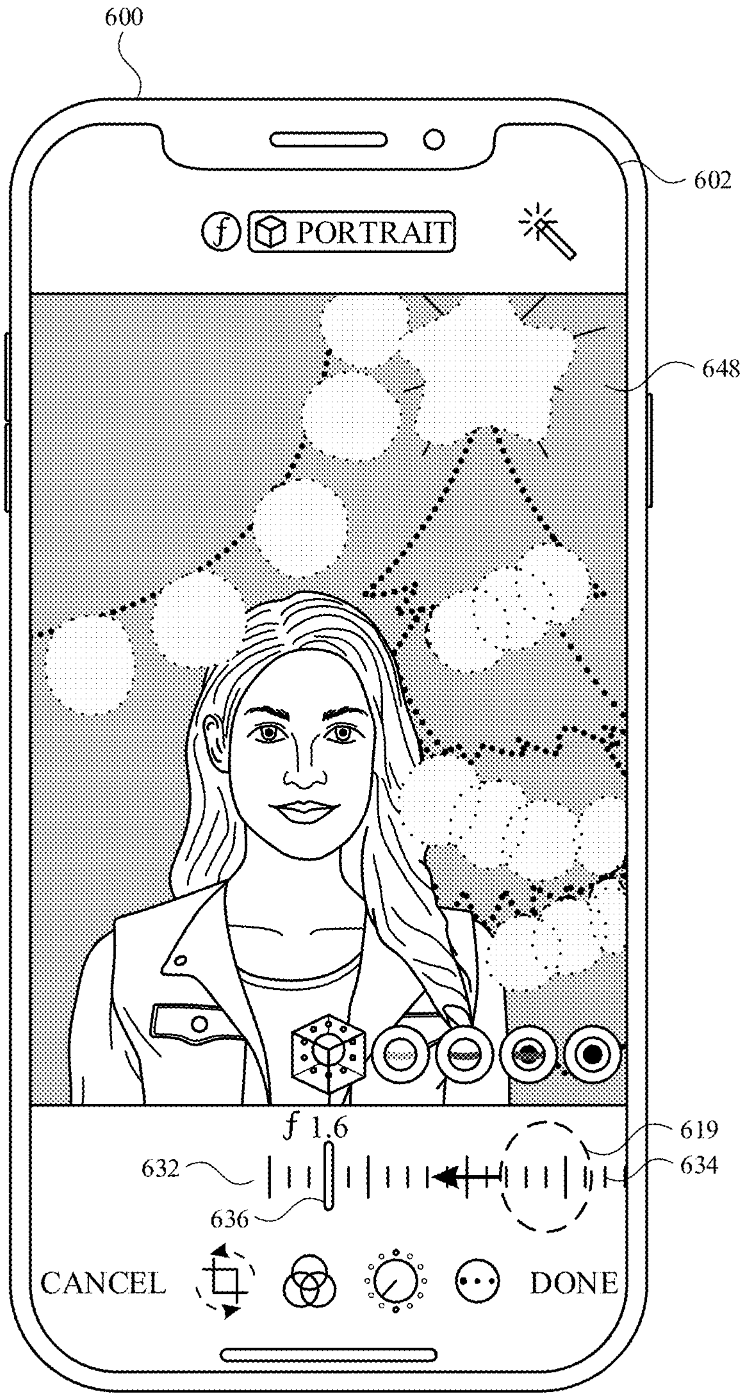

In FIG. 6N, while displaying depth adjustment slider 632, electronic device 600 detects (e.g., via a touch-sensitive surface of display 602), a swipe gesture 619 (e.g., a horizontal swipe gesture, a swipe-left gesture) on depth adjustment slider 632 (e.g., over tickmarks 634). In some examples, tickmarks 634 are (horizontally) shifted in response to swipe gesture 619 and needle 636 remains affixed. In some examples, needle 636 is shifted over affixed tickmarks 634 in response to a swipe gesture on depth adjustment slider 632.

Figure 6O:
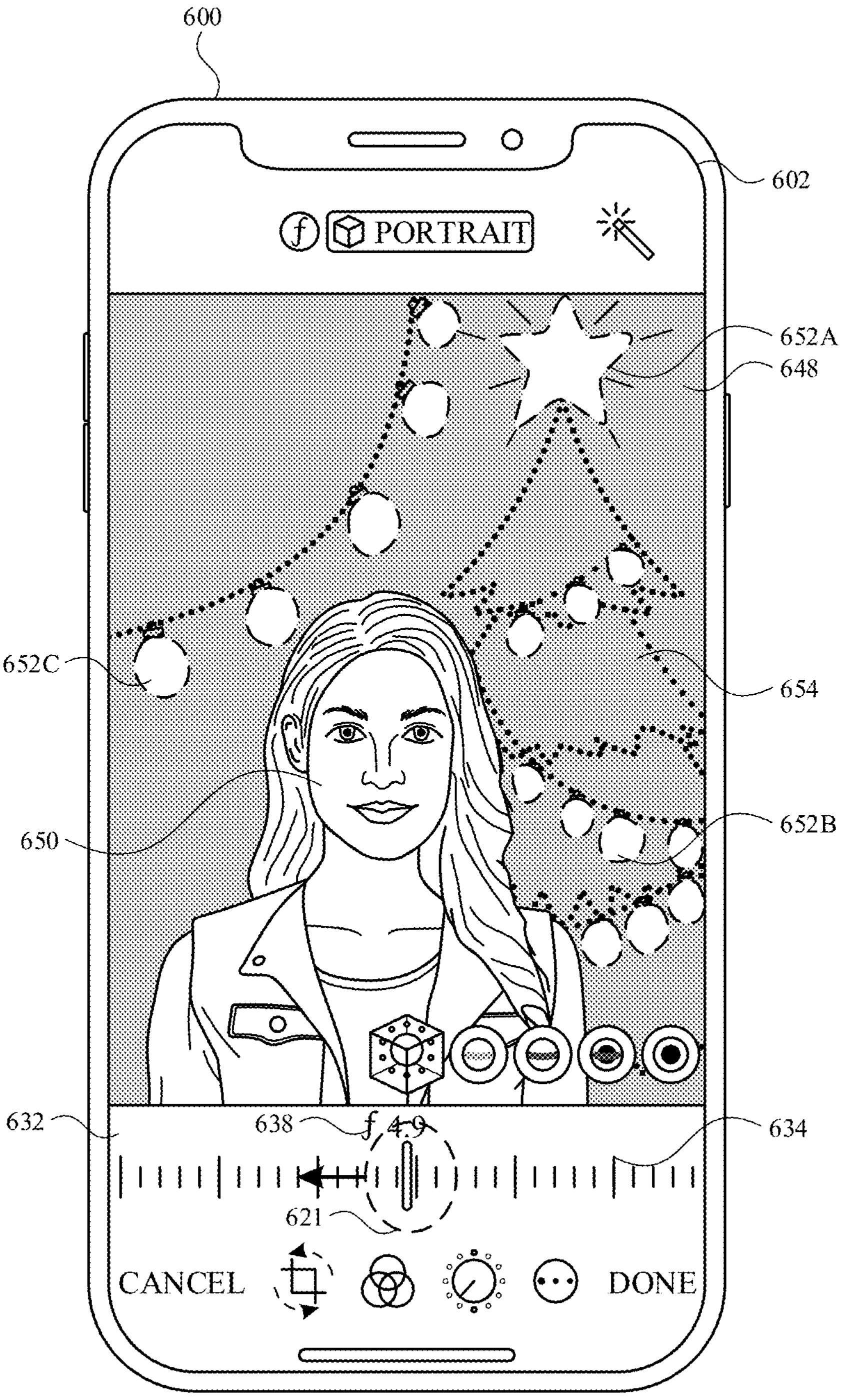

In FIG. 6O, in response to detecting swipe gesture 619, electronic device 600 adjusts, based on the focal point of stored image representation 648 (e.g., the nose of subject 650), the depth-of-field properties of the objects (e.g., light-emitting objects 652A, 652B, and 652C, and non-light-emitting object 654) within stored image representation 648.

As shown by f-number indicator 638, the current f-number (4.9) is increased from the previous (stored) f-number (1.6) as a result of swipe gesture 619. As such, light-emitting objects 652A, 652B, and 652C are less blurred, smaller, less bright, less saturated, and/or with a less distorted shape (and more "sharp") in FIG. 6O (with a 4.9 f-number) than in FIG. 6N (with a 1.6 f-number) and, likewise, non-light-emitting object 654 is less blurred, smaller, less bright, less saturated, and/or with a less distorted shape and instead sharper in FIG. 6O than in FIG. 6N. The degree of change in the blurriness, the size, the degree of brightness, the degree of saturation, and/or with the degree of shape-distortion (and an increase in sharpness) of the objects from the previous f-number (1.6) to the higher f-number (4.9) is more drastic for light-emitting objects as compared to non-light-emitting objects. As mentioned, the changes in the depth-of-field properties of objects within the image representation are described in greater detail below with reference to FIGS. 8A-8R.

In FIG. 6O, electronic device 600 detects (e.g., via a touch-sensitive surface of display 602), a swipe gesture 621 (e.g., a continuation of swipe gesture 619) on depth adjustment slider 632.

Figure 6P:
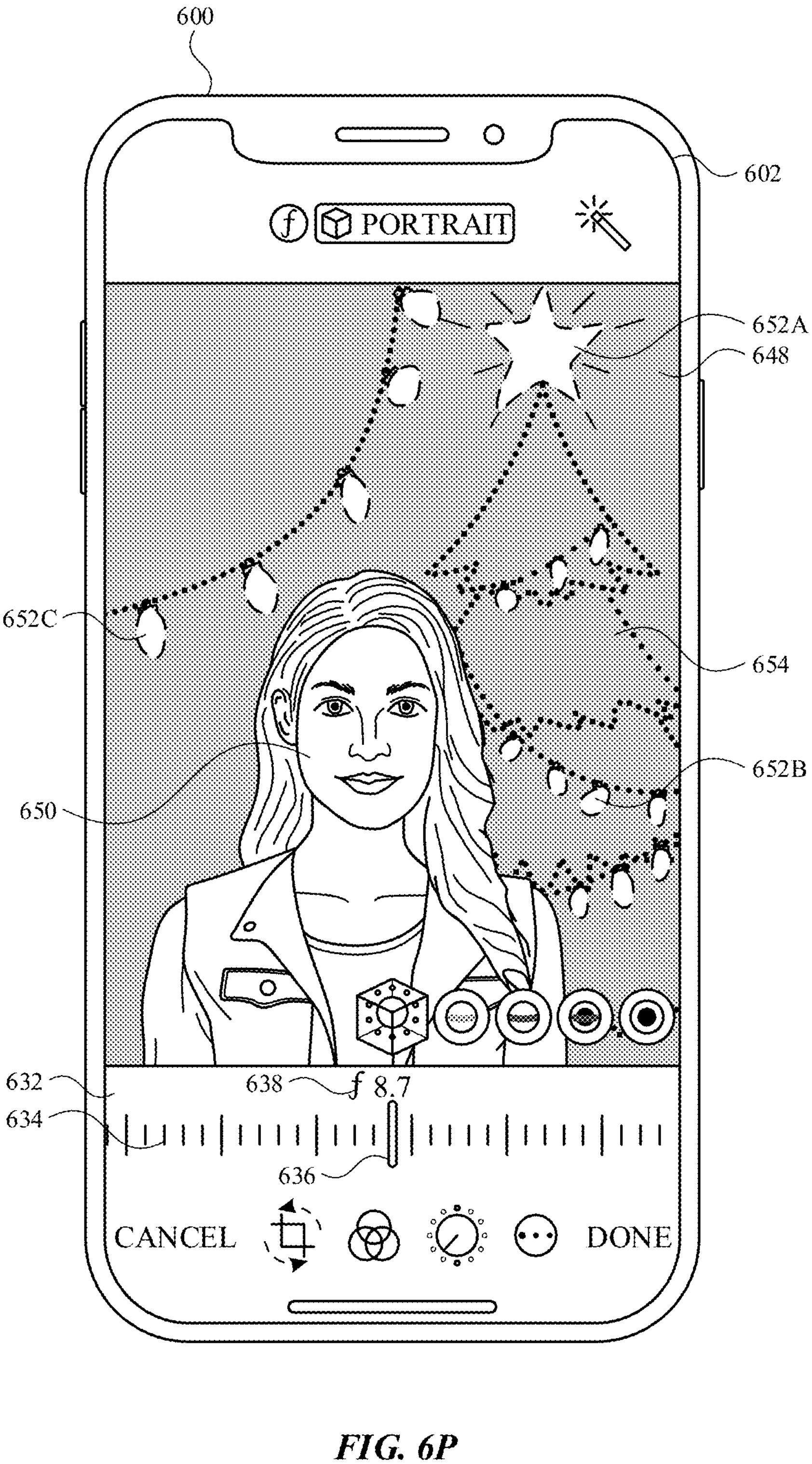

In FIG. 6P, in response to detecting swipe gesture 621, electronic device 600 further adjusts, based on the focal point of stored image representation 648 (e.g., the nose of subject 650), the depth-of-field properties of the objects (e.g., light-emitting objects 652A, 652B, and 652C, and non-light-emitting object 654) within stored image representation 648.

As shown by f-number indicator 638, the current f-number (8.7) is increased from the previous f-number (4.9) as a result of swipe gesture 621. As such, light-emitting objects 652A, 652B, and 652C are less blurred, smaller, less bright, less saturated, and/or with a less distorted shape (and sharper, and thus closer to its real shape without any image distortion) in FIG. 6P (with a 8.7 f-number) than in FIG. 6O (with a 4.9 f-number) and, likewise, non-light-emitting object 654 is less blurred, smaller, less bright, less saturated, and/or with a less distorted shape (and sharper, and thus closer to its real shape without any image distortion) in FIG. 6P than in FIG. 6O. The degree of change in the blurriness, the size, the degree of brightness, the degree of saturation, and/or the degree of shape-distortion (and an increase in sharpness) of the objects from the previous f-number (5) to the higher f-number (10) is more drastic for light-emitting objects as compared to non-light-emitting objects. As mentioned, the changes in the depth-of-field properties of objects within the image representation are described in greater detail below with reference to FIGS. 8A-8R.

Figure 6Q:
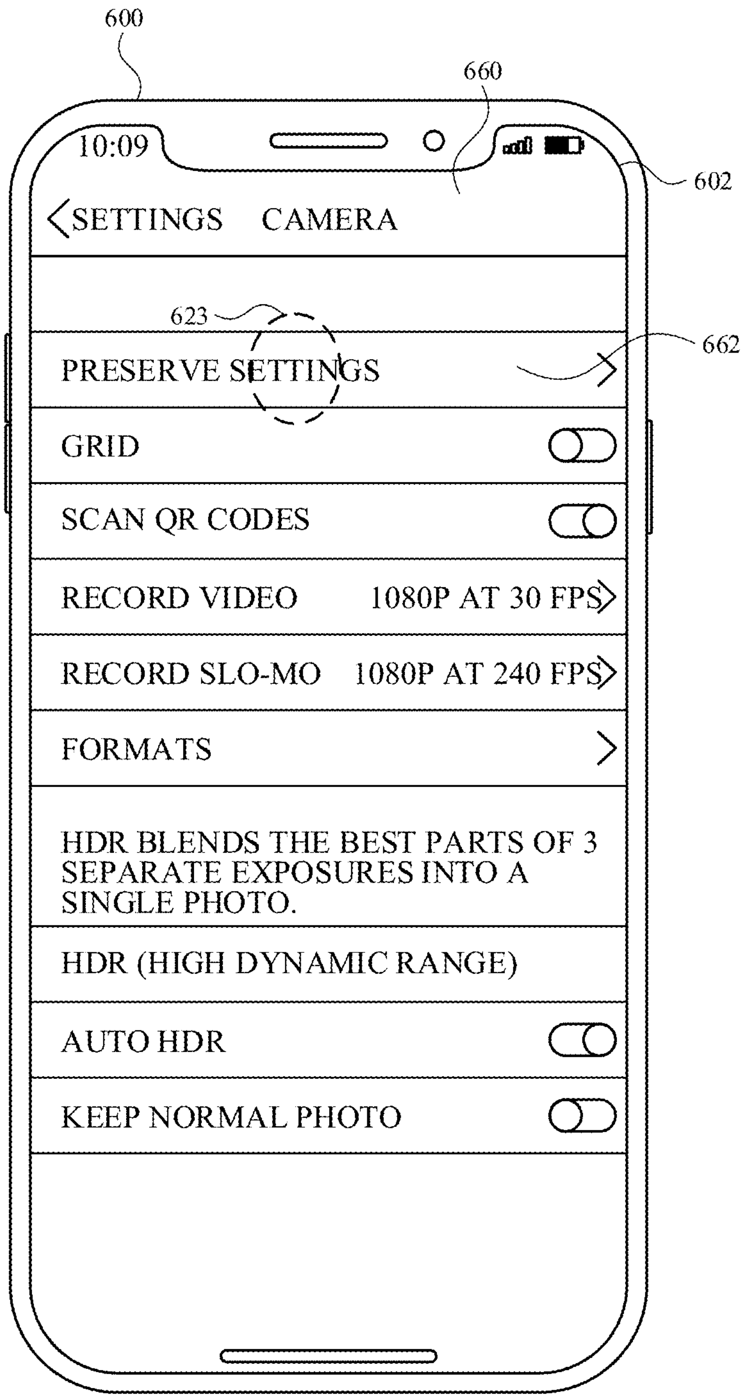

FIG. 6Q illustrates electronic device 600 displaying, in display 602, a settings user interface 660 of the image capture application. In FIG. 6Q, while displaying settings user interface 660, electronic device detects (e.g., via a touch-sensitive surface of display 602) an activation 623 of a preserve settings affordance 662 of settings user interface 660 (e.g., a tap gesture on preserve settings affordance 662).

Figure 6R:
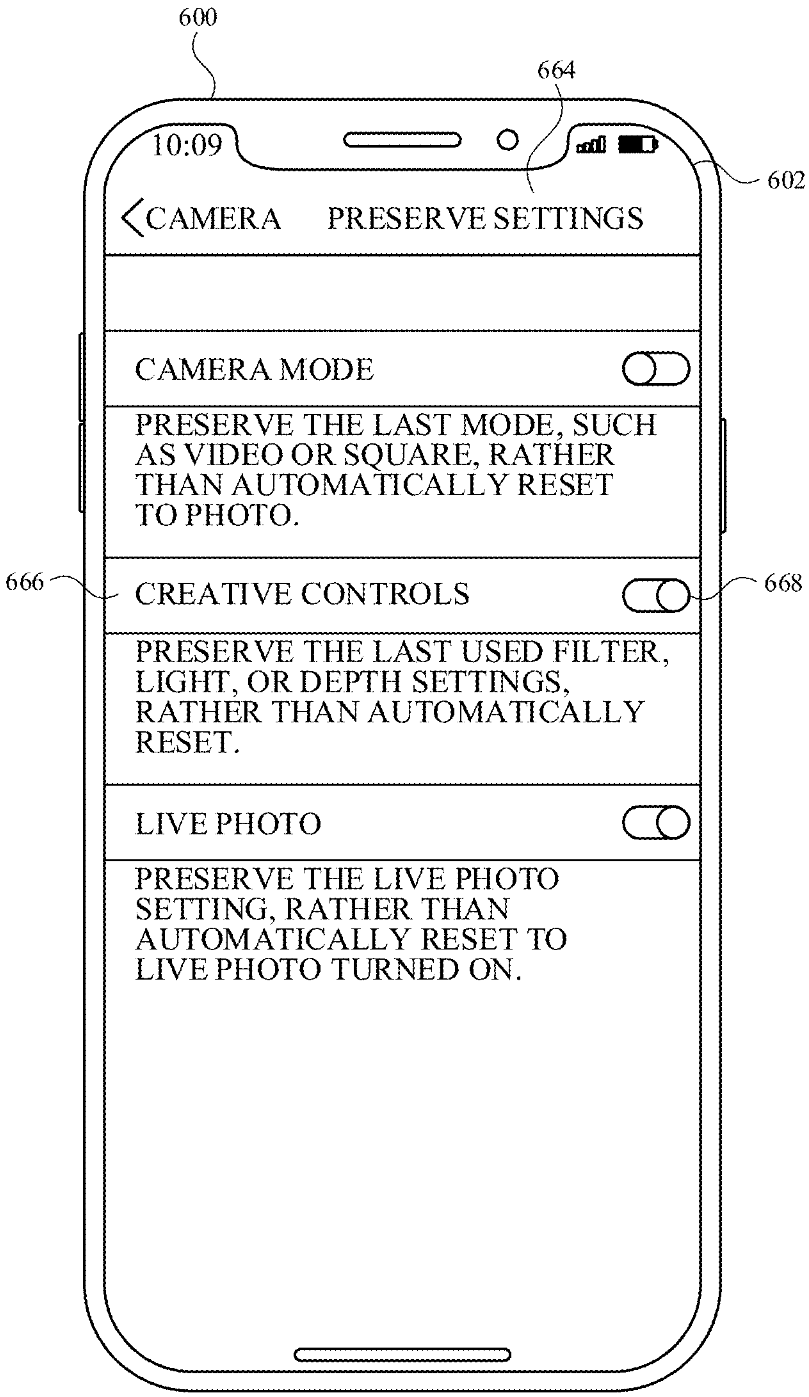

In FIG. 6R, in response to detecting activation 623 of preserve settings affordance 662, electronic device 600 displays, on display 602, a preserve settings user interface 664 associated with the image capture application and the stored images application. Preserve settings user interface 664 includes a creative controls option 666 (e.g., with a corresponding toggle 668) for activating or de-activating creative controls. In some embodiments, when creative controls is active, electronic device 600 preserves previously-set image effects settings (e.g., including the simulated depth effect setting) when the image capture application and/or the stored images application are closed and re-launched (such that the previously-set image effects setting, such as the previously-set f-number, is automatically re-loaded and applied to the displayed image representation). In some embodiments, when creative controls is inactive, electronic device 600 does not preserve the previously-set image effects settings, and image effects settings (including the depth effect setting) is restored to default values when the image capture application and/or stored images application are re-launched.

Figure 6S:
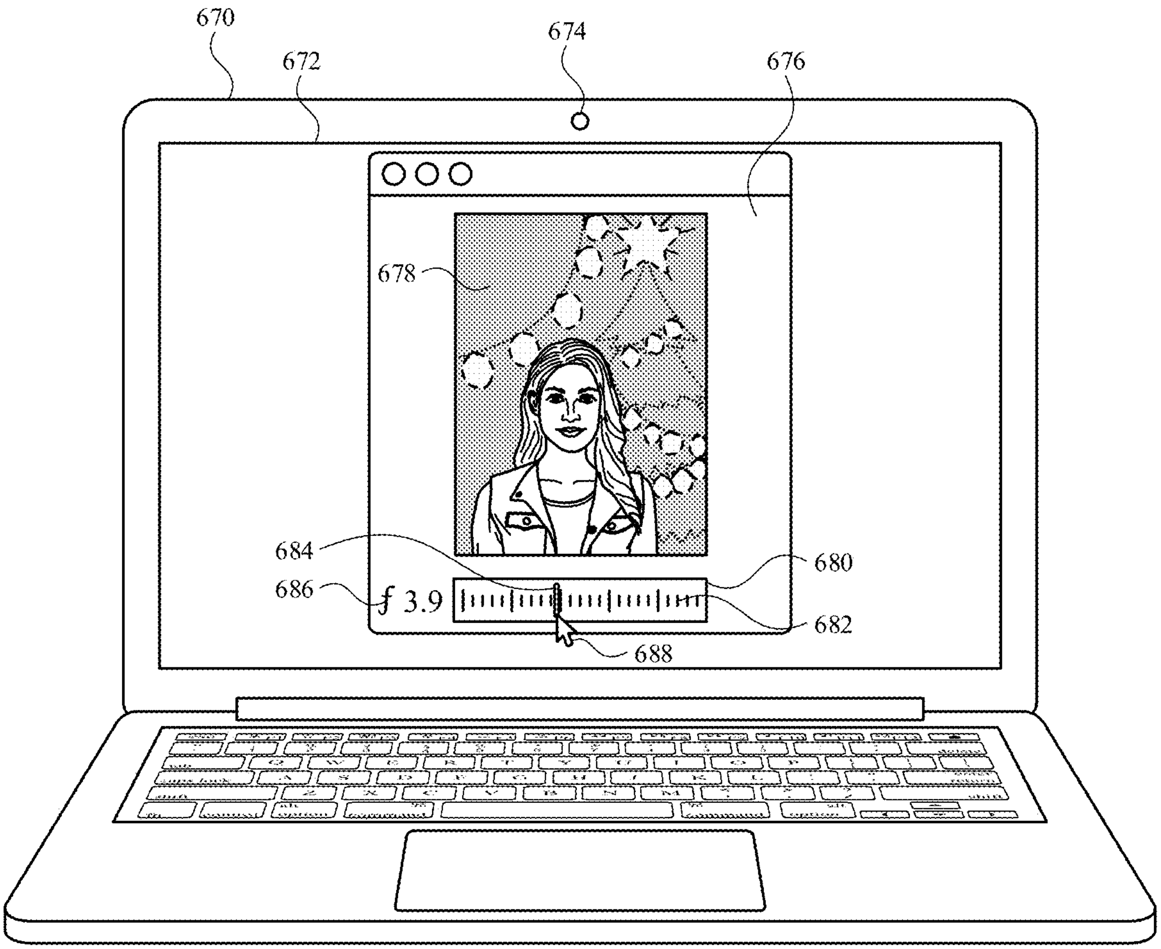

FIG. 6S illustrates an electronic device 670 (e.g., a laptop computer) with a display 672 and a front-facing camera 674. In some embodiments, electronic device 670 also includes a rear-facing camera.

In FIG. 6S, electronic device 670 displays, on display 672, a user interface 676 of an image application (e.g., corresponding to the image capture application or the stored images application), where an image representation 678 corresponding to image representation 618 is displayed in user interface 676. Electronic device 670 also displays, within user interface 676 (e.g., below image representation 678), a depth adjustment slider 680 similar to depth adjustment slider 632. Depth adjustment slider 680 includes a plurality of tickmarks 682 corresponding to f-numbers and a needle 684 indicating the currently-selected tickmark (and thus the currently-selected f-number). Depth adjustment slider 680 also includes a f-number indicator 686 (e.g., located adjacent to the slider) indicating the value of the currently-selected f-number. In some examples, a cursor 688 can be used to navigate needle 684 over tickmarks 682, thereby changing the f-number to adjust the simulated depth effect of image representation 678.

FIG. 6T illustrates an electronic device 690 (e.g., a tablet computer, a laptop computer with a touch-sensitive display) with a display 692. In some embodiments, electronic device 690 also includes a front-facing camera and/or a rear-facing camera.

In FIG. 6T, electronic device 690 displays, on display 692, a user interface 694 of an image application (e.g., corresponding to the image capture application or the stored images application), where an image representation 696 corresponding to image representation 618 is displayed in user interface 694. Electronic device 690 also displays, within user interface 694 (e.g., adjacent to image representation 696), a depth adjustment slider 698 (e.g., in a vertical direction) similar to depth adjustment slider 632. Depth adjustment slider 698 includes a plurality of tickmarks 699 corresponding to f-numbers and a needle 697 indicating the currently-selected tickmark (and thus the currently-selected f-number). Depth adjustment slider 698 also includes a f-number indicator 695 (e.g., located below or adjacent to the slider) indicating the value of the currently-selected f-number.

In some examples, depth adjustment slider 698 can be adjusted via vertical swipe gestures such that tickmarks 699 are moved relative to an affixed needle 697. In some examples, depth adjustment slider 698 can be adjusted via vertical swipe gestures such that needle 697 is moved relative to affixed tickmarks 699.

In some examples, electronic device 690 also displays (e.g., in a region of user interface 694 adjacent to image representation 696, in a region of user interface 694 adjacent to image representation 696 and opposite from depth adjustment slider 698), a plurality of lighting settings 693 corresponding to various lighting/light filtering options that can be applied to image representation 696, and can be changed via vertical swipe gestures. In some examples, depth adjustment slider 698 and lighting settings 693 can concurrently be adjusted and the concurrent adjustments can simultaneously be reflected in image representation 696.

FIGS. 7A-7B are a flow diagram illustrating a method for managing user interfaces for adjusting a simulated depth effect, in accordance with some embodiments. Method 700 is performed at a device (e.g., 100, 300, 500, 600) with a display and one or more input devices (e.g., a touch-sensitive surface of the display, a mechanical input device). Some operations in method 700 are, optionally, combined, the orders of some operations are, optionally, changed, and some operations are, optionally, omitted.

As described below, method 700 provides an intuitive way for managing user interfaces for simulated depth effects. The method reduces the cognitive burden on a user for managing and navigating user interfaces for simulated depth effects, thereby creating a more efficient human-machine interface. For battery-operated computing devices, enabling a user to navigate user interfaces faster and more efficiently by providing easy management of user interfaces for simulating depth effects conserves power and increases the time between battery charges.

The electronic device (e.g., 600) displays (702), on the display (e.g., 602), a representation of image data (e.g., 618, a displayed image corresponding to the image data, a portrait image of a person/subject).

In some embodiments, the representation of image data (e.g., 618) is a live-feed image currently being captured by one or more cameras of the electronic device (e.g., 600). In some embodiments, the representation of image data (e.g., 648) is a previously-taken image stored in and retrieved from memory (of the electronic device or an external server). In some embodiments, the depth data of the image can be adjusted/manipulated to apply a depth effect to the representation of image data.

In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background).

In some embodiments, the depth data is a depth map. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background in the camera display region. In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects having a depth component) to the subject and background. In some embodiments, all areas of the image data that do not correspond to the first depth component (e.g., areas of the image data that are out of range of the depth camera) are adjusted based on different degrees of blurriness/sharpness, size, brightness, saturation, and/or shape-distortion in order to simulate a depth effect, such as a Bokeh effect.

In some embodiments, displaying, on the display, the representation of image data further comprises, in accordance with a determination that the representation of image data corresponds to stored image data (e.g., that of a stored/saved image or a previously-captured image), displaying the representation of image data with a prior simulated depth effect as previously modified by a prior first value for the simulated depth effect. In some embodiments, the representation of image data (e.g., 648) corresponds to stored image data when a camera/image application for displaying representations of image data is in an edit mode (e.g., a mode for editing existing/previously-captured images or photos). In some embodiments, if the representation of image data corresponds to stored image data with a prior simulated depth effect, the electronic device (e.g., 600) automatically displayed the adjustable slider upon (e.g., concurrently with) displaying the representation of image data (e.g., within a camera/image application). Thus, in some embodiments, the adjustable slider (e.g., 632) is displayed with the representation of image data without the first input. In some embodiments, whether the adjustable slider is automatically displayed upon displaying the representation of image data (if the image data is already associated with a prior simulated depth effect) depends on the type of the electronic device (e.g., whether the electronic device is a smartphone, a smartwatch, a laptop computer, or a desktop computer).

While displaying the representation of image data (e.g., 618, 648) with a simulated depth effect (e.g., a depth effect, such as a Bokeh effect, that is applied to the representation based on a manipulation of the underlying data to artificially generate the effect) as modified by a first value of a plurality of selectable values for the simulated depth effect, the electronic device (e.g., 600) detects (706), via the one or more input devices, a first input (e.g., 605, 607, an activation of an affordance displayed on the display, a gesture, such as a slide-up gesture on the image, detected via the touch-sensitive surface of the display).

In some embodiments, while displaying, on the display (e.g., 602), the representation of image data (e.g., 618, 648), the electronic device (e.g., 600) displays (704), on the display (e.g., in an affordances region (e.g., 628A) corresponding to different types of effects that can be applied to the representation of image data), a simulated depth effect adjustment affordance (e.g., 630), wherein the first input is an activation (e.g., 605, a tap gesture) of the simulated depth effect adjustment affordance. In some embodiments, the simulated depth effect adjustment affordance includes a symbol indicating that the affordance relates to depth effects, such as a f-number symbol. Displaying the simulated depth effect adjustment affordance while displaying the representation of image data and including a symbol indicating that the affordance relates to depth effects improves visual feedback by enabling a user to quickly and easily recognize that adjustments to depth-of-field properties can be made to the representation of image data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the simulated depth effect is "simulated" in that the effect is (artificially) generated based on a manipulation of the underlying image data to create and apply the effect to the corresponding representation of image data (e.g., 618, 648) (e.g., as opposed to being a "natural" effect that is based on underlying data as originally captured via one or more cameras).

In some embodiments, prior to detecting the first input (e.g., 605, 607), the simulated depth effect adjustment affordance (e.g., 630) is displayed with a first visual characteristic (e.g., a particular color indicating that the affordance is not currently selected, such as a default color or a white color). In some embodiments, after detecting the first input, the simulated depth effect adjustment affordance is displayed with a second visual characteristic (e.g., a particular color indicating that the affordance is currently selected, such as a highlight color or a yellow color) different from the first visual characteristic. Changing a visual characteristic of the simulated depth effect adjustment affordance improves visual feedback by enabling the user to quickly and easily recognize that the simulated depth effect feature is active. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the simulated depth effect adjustment affordance (e.g., 630) comprises, in accordance with a determination that the currently-selected depth effect value corresponds to a default depth effect value (e.g., a default f-number value determined/set by the electronic device), forgoing displaying, in the simulated depth effect adjustment affordance, the currently-selected depth effect value. In some embodiments, the default depth effect value is a 4.5 f-number. In some embodiments, displaying the simulated depth effect adjustment affordance comprises, in accordance with a determination that the currently-selected depth effect value corresponds to a non-default depth effect value (e.g., any f-number value within a range of available f-number values that does not correspond to the default f-number value), displaying, in the simulated depth effect adjustment affordance (e.g., adjacent to a f-number symbol), the currently-selected depth effect value.

In some embodiments, prior to detecting the first input (e.g., 605, 607), the electronic device (e.g., 600) displays, on the display (e.g., 602), one or more mode selector affordances (e.g., a region with one or more affordances for changing a camera-related operation mode of the electronic device, such as a camera mode selector affordance), wherein displaying the adjustable slider (e.g., 632) comprises replacing display of the one or more mode selector affordances with the adjustable slider. Replacing display of the one or more mode selector affordances with the adjustable slider improves visual feedback and enabling the user to quickly and easily recognize that the device is now in a depth effect adjustment mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to detecting the first input, the electronic device (e.g., 600) displays, on the display (e.g., 602), a zoom control element (e.g., a region with one or more affordances for changing a zoom level of the camera), wherein displaying the adjustable slider (e.g., 632) comprises replacing display of the zoom control element.

In some embodiments, the first input (e.g., 607) is a swipe gesture in a first direction in a first portion of the user interface (e.g., 614, a swipe-up gesture on the touch-sensitive surface of the display). In some embodiments, the swipe gesture is a swipe-up gesture on a region of the display corresponding to the representation of image data. In some embodiments, the swipe gesture is a swipe-up gesture on a region of the display corresponding to a bottom edge of the representation image data (e.g., 618). In some embodiments, if the swipe is in a second direction, the adjustable slider is not displayed and, optionally, a different operation is performed (e.g., switching camera modes or performing a zoom operation). In some embodiments, if the swipe is in a second portion of the user interface, the adjustable slider is not displayed and, optionally, a different operation is performed. Providing additional control options (without cluttering the user interface with additional displayed controls) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the first input (e.g., 605, 607), the electronic device (e.g., 600) displays (708), on the display (e.g., 602) (e.g., below the representation of image data, adjacent to the representation of image data), an adjustable slider (e.g., 632) (e.g., a horizontal or vertical slider comprising a plurality of tick marks and a needle) associated with manipulating the representation of image data (e.g., manipulating a depth effect of the representation of image data, a depth-of-field effect of the representation of image data). The adjustable slider includes (710) a plurality of option indicators (e.g., 634, represented as tick marks, gauge marks) corresponding to a plurality of the selectable values for the simulated depth effect (e.g., (simulated) depth-of-field, f-number/f-stop). In some embodiments, the plurality of option indicators are slidable (e.g., horizontally or vertically) within the adjustable slider. The adjustable slider also includes (712) a selection indicator (e.g., 636, represented as a needle) indicating that the first value is a currently-selected simulated depth effect value.

In some embodiments, the position of the selection indicator (e.g., 636, needle) is fixed and the plurality of option indicators (e.g., 634, tickmarks) are adjustable within the slider (e.g., 632) such that the plurality of option indicators are moved relative to the selection indicator to adjust the currently-selected depth-of-field value. In some embodiments, only a subset of all of the available option indicators are concurrently displayed within the slider—option indicators that are not displayed are displayed within the slider in response to an adjustment of the slider (e.g., a user input moving the option indicators in a horizontal or vertical direction).

In some embodiments, the plurality of option indicators (e.g., 634) are fixed and the position of the selection indicator (e.g., 636) is adjustable within the slider such that the selection indicator is moved relative to the plurality of option indicators to adjust the currently-selected depth-of-field value.

In some embodiments, in response to detecting the first input (e.g., 605, 607), the electronic device (e.g., 600) slides (714) (e.g., vertically, sliding up by a predetermined amount) the representation of image data (e.g., 618) on the display (e.g., 602) to display (e.g., reveal) the adjustable slider (e.g., 632) (e.g., sliding the representation of the image data in a direction corresponding to a direction of a swipe input).

While displaying the adjustable slider (e.g., 632), the electronic device (e.g., 600) detects (716) via the one or more input devices, an input directed to the adjustable slider.

In some embodiments, the input (e.g., 609, 611, 619, 621) directed to the adjustable slider (e.g., 632) is a (horizontal) swipe gesture (e.g., a swipe-left gesture or a swipe-right gesture) on the adjustable slider, wherein the swipe gesture includes a user movement (e.g., using a finger) in a first direction having at least a first velocity (greater than a threshold velocity) at an end of the swipe gesture (e.g., a velocity of movement of a contact performing the swipe gesture at or near when the contact is lifted-off from the touch-sensitive surface).

In response to detecting (718) the input (e.g., 609, 611, 619, 621) directed to the adjustable slider (e.g., 632) (e.g., a tap or swipe at a location corresponding to the adjustable slider), the electronic device (e.g., 600) moves (720) the adjustable slider to indicate that a second value, of the plurality of selectable values for the simulated depth effect, is the currently-selected simulated depth effect value.

In response to detecting (718) the input directed to the adjustable slider (e.g., a tap or swipe at a location corresponding to the adjustable slider), the electronic device (e.g., 600) changes (722) an appearance of the representation of image data (e.g., 618, 648) in accordance with the simulated depth effect as modified by the second value. Changing an appearance of the representation of image data in response to detecting the input directed to the adjustable slider improves visual feedback by enabling the user to quickly and easily view changes to the representation of image data that is caused by the user's input. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, moving the adjustable slider (e.g., 632) comprises moving the plurality of option indicators (e.g., 634, represented as tick marks) while the selection indicator (e.g., 636, represented as a needle) remains fixed. Thus, in some embodiments, moving the adjustable slider comprises sliding the plurality of tick marks corresponding to f-values while the needle stays fixed in the same location within the slider. In some embodiments, moving the adjustable slider comprises moving the selection indicator (e.g., represented as a needle) while the plurality of option indicators remain fixed (e.g., represented as tick marks). Thus, in some embodiments, moving the adjustable slider comprises sliding the needle back and forth over the plurality of tick marks corresponding to f-values while the tick marks stay fixed in the same location within the slider.

In some embodiments, while moving the adjustable slider (e.g., 632) (e.g., by moving the plurality of option indicators relative to a fixed selection indicator, or by moving the selection indicator relative to fixed option indicators), the electronic device (e.g., 600) generates (724) (e.g., via one or more tactile output generators and/or one or more speakers of the electronic device) a first type of output (e.g., tactile output, audio output) in sync with the movement of the adjustable slider as different values are selected for a parameter controlled by the adjustable slider. In some embodiments, the electronic device generates a discrete output (e.g., a discrete tactile output, a discrete audio output) each time the selection indicator aligns with or passes an option indicator of the plurality of option indicators. Generating a first type of output (e.g., tactile output, audio output) in sync with the movement of the adjustable slider as different values are selected for a parameter controlled by the adjustable slider improves feedback by providing a coordinated response to the user's input. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while moving the adjustable slider (e.g., 632), in accordance with a determination that the representation of image data (e.g., 618, 648) corresponds to stored image data (e.g., that of a stored/saved image or a previously-captured image), the first type of output includes (726) audio output (e.g., generated via one or more speakers of the electronic device and/or generated via one or more tactile output generators of the electronic device). In some embodiments, while moving the adjustable slider, in accordance with a determination that the representation of image data corresponds to a live preview of image data being captured by the one or more cameras, the first type of output does not include (728) audio output (e.g., generated via one or more speakers of the electronic device and/or generated via one or more tactile output generators of the electronic device). In some embodiments, the representation of image data corresponds to stored image data when a camera/image application for displaying representations of image data is in an edit mode (e.g., a mode for editing existing/previously-captured images or photos).

Note that details of the processes described above with respect to method 700 (e.g., FIGS. 7A-7B) are also applicable in an analogous manner to the methods described below. For example, method 900 optionally includes one or more of the characteristics of the various methods described above with reference to method 700. For example, the simulated depth effect applied to an image representation, as described in method 900, can be adjusted using the depth adjustment slider described in method 700. For another example, method 1100 optionally includes one or more of the characteristics of the various methods described above with reference to method 700. For example, the notification concerning detected interference, as described in method 1100, can be associated with detected magnetic interference that can impede with one or more depth sensors used for simulating depth effects. For brevity, these details are not repeated below.

FIGS. 8A-8R illustrate exemplary user interfaces for displaying adjustments to a simulated depth effect (e.g., a Bokeh effect), in accordance with some embodiments. The user interfaces in these figures are used to illustrate the processes described below, including the processes in FIGS. 9A-9B.

FIG. 8A illustrates electronic device 600 as described above with reference to FIGS. 6A-6T. In FIG. 8A, electronic device 600 displays, on display 602, a user interface 804 of the image capture application, where the image capture application is in portrait mode. While in portrait mode, user interface 804 displays (e.g., above or adjacent to an image display region 806) a depth effect affordance 810 (e.g., corresponding to depth effect affordance 630).

Electronic device 600 also displays, in image display region 806, an image representation 808 of image data captured via rear-facing camera 608. In this example, image representation 808 does not include a subject (e.g., a person), as a subject is not within the field-of-view of rear-facing camera 608.

In portrait mode, electronic device 600 displays, in image representation 808, subject markers 812 indicating that a subject need to be placed within the general region of image representation 808 occupied by the markers to properly enable portrait mode. Because a subject is not currently detected, electronic device 600 displays (e.g., in a top portion of image display region 806), a message 814 requesting that a subject be placed in the environment corresponding to the region of image representation 808 occupied by subject markers 812.

Figure 8B:
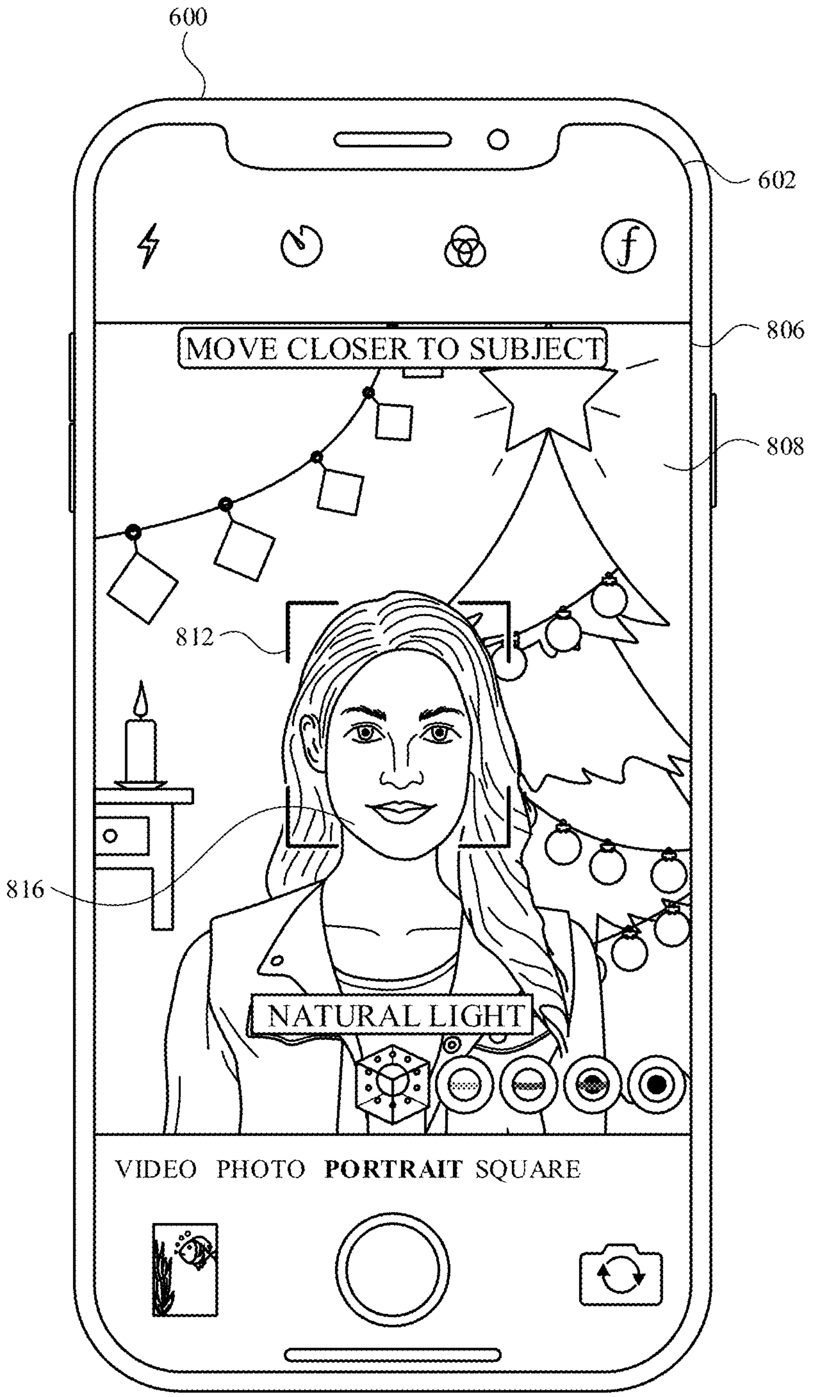

In FIG. 8B, a real subject in the real environment is detected within the field-of-view of rear-facing camera 608. Upon detecting the real subject, electronic device 600 displays, in image representation 808, a subject 816 corresponding to the real subject detected within the field-of-view of rear-facing camera 608.

Figure 8C:
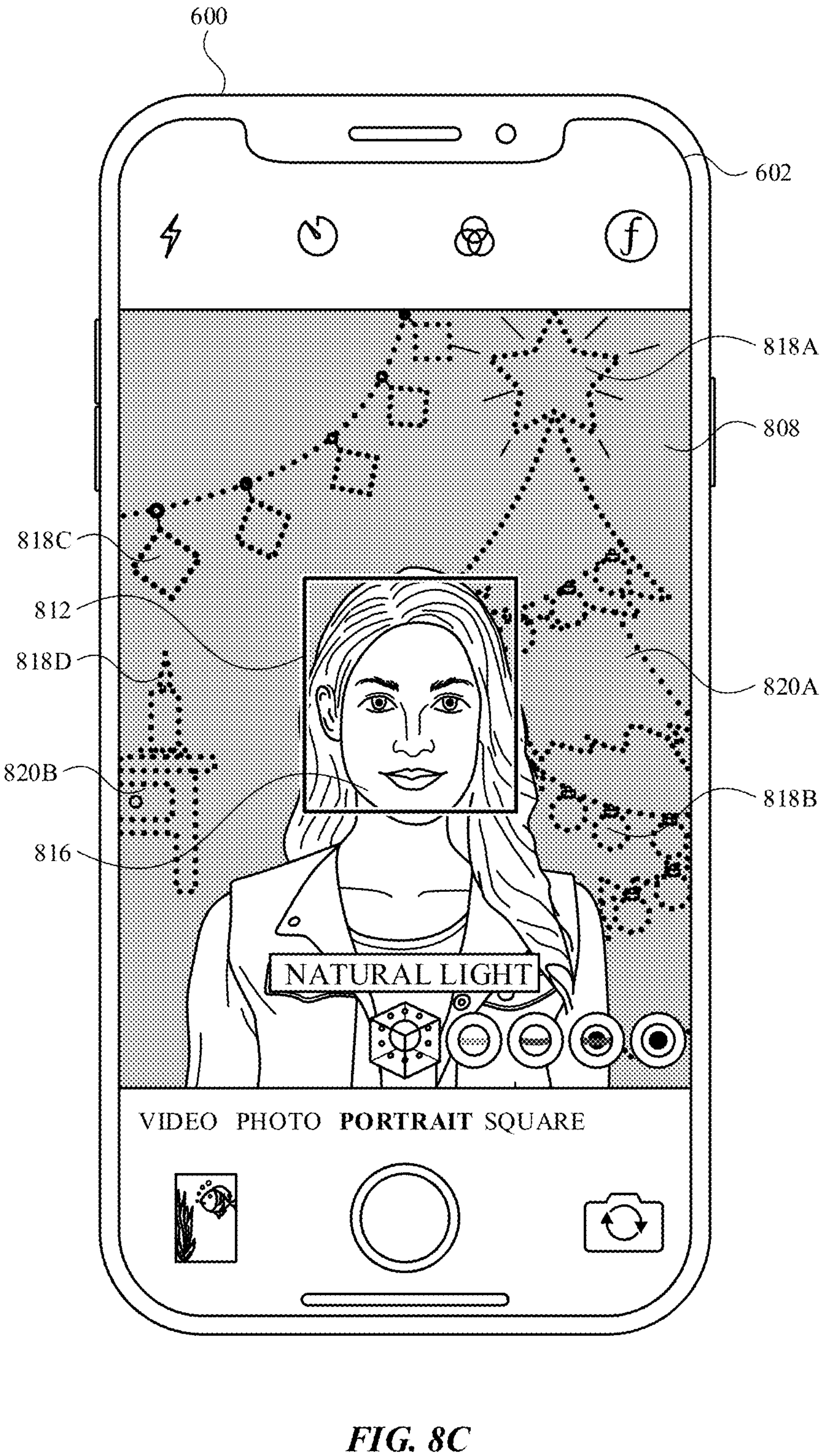

In FIG. 8C, in accordance with a determination that subject 816 is within the general region of image representation 808 indicated by subject markers 812, electronic device 600 provides, via subject markers 812 (e.g., by the markers "locking on" to the subject, by the markers changing a visual characteristic, such as changing to a different color), an indication that the subject is within the general region of image representation 808 occupied by subject markers 812 to properly enable portrait mode.

In some embodiments, if a subject is detected but is too far away from electronic device 600 (e.g., more than a predefined distance away from the device, such as more than 10 feet away from the device) to fully enable portrait mode, electronic device 600 displays a notification indicating that the subject be placed closer to the device. In some embodiments, if a subject is detected but is too close to electronic device 600 (e.g., less than a predefined distance away from the device, such as closer than 1 foot from the device) to fully enable portrait mode, electronic device 600 displays a notification indicating that the subject be placed farther away from the device.

Upon detecting subject 816 within the general region of image representation 808 indicated by subject markers 812, electronic device 600 activates portrait mode. Upon activation of portrait mode, electronic device 600 adjusts image representation 812 by applying, based on a focal point within image representation 808 (e.g. the nose of subject 816), a simulated depth effect (e.g., a Bokeh effect, the simulated depth effect described above with respect to image representation 618) to objects within image representation 808 with the default f-number (e.g., 4.5). In this example, image representation 808 includes light-emitting objects 818A, 818B, 818C, and 818D and non-light-emitting objects 820A and 820B. In some embodiments, the simulated depth effect is also applied to portions of subject 816 that do not correspond to the focal point (e.g., portions of subject 816 other than the nose of the subject).

Figure 8D:
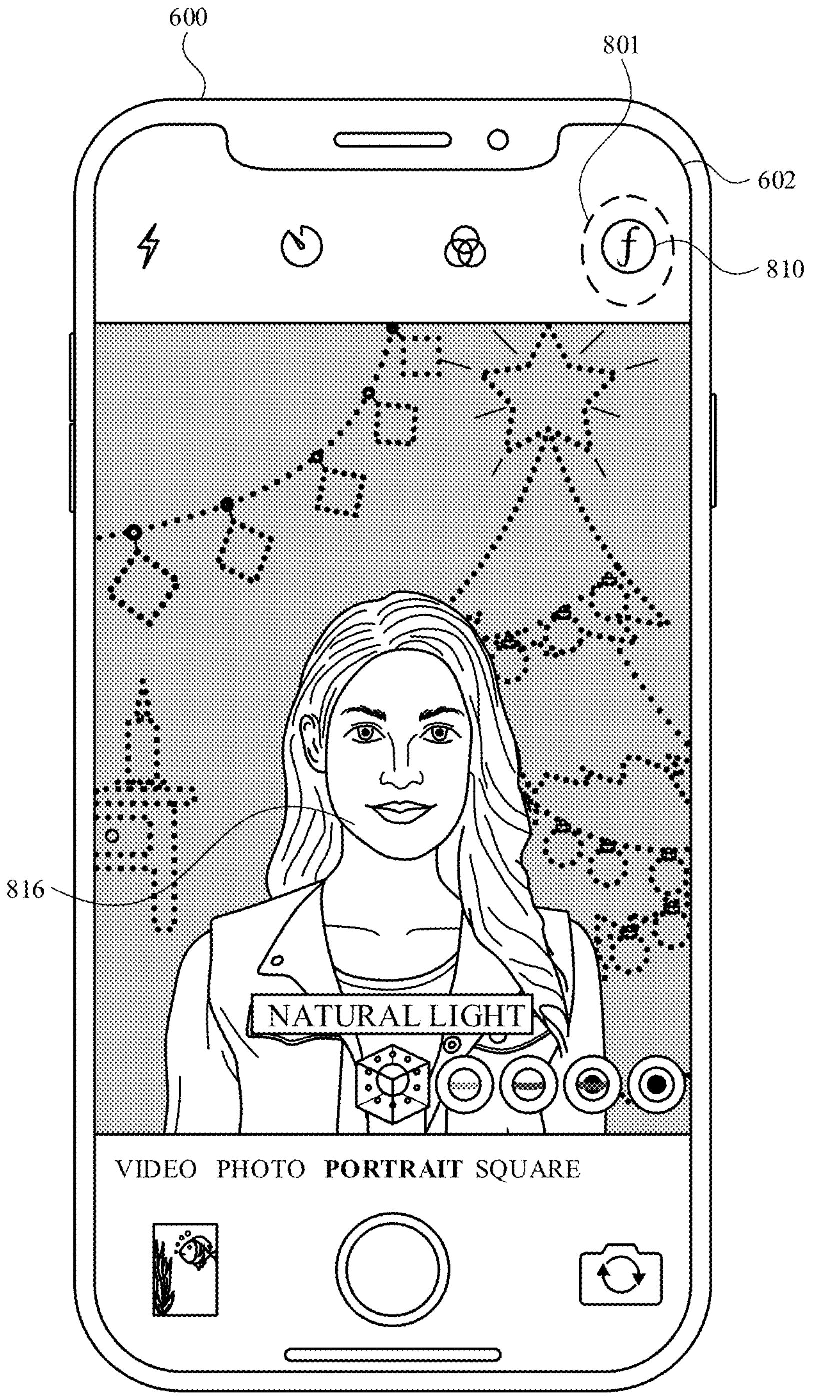

In FIG. 8D, while displaying image representation 808 with subject 816 detected, electronic device 600 detects (e.g., via a touch-sensitive surface of display 602) an activation 801 of depth effect affordance 810.

Figure 8E:
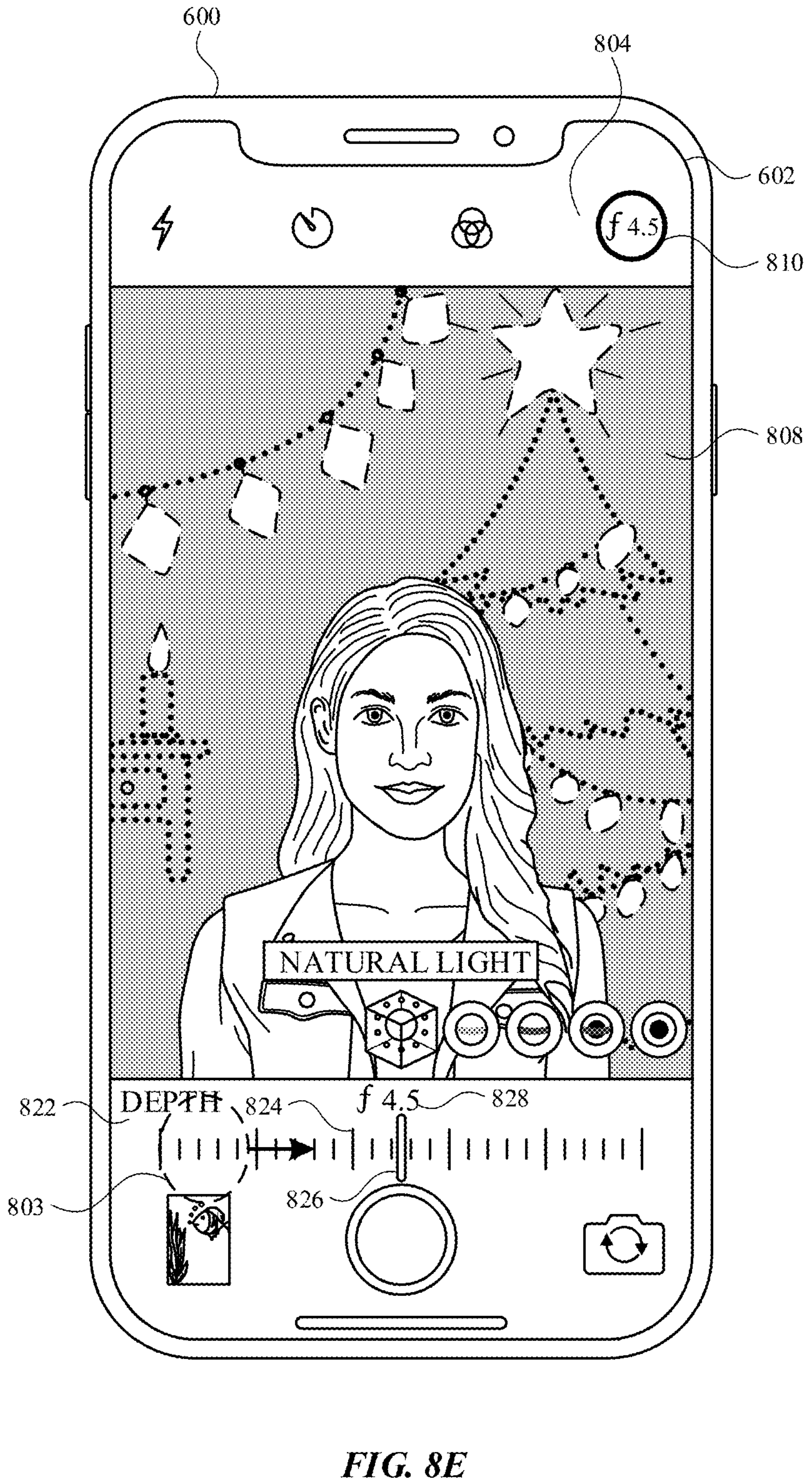

In FIG. 8E, in response to detecting activation 801 of depth effect affordance 810, electronic device 600 displays (e.g., within a menu region of user interface 804 below image display region 806, a depth adjustment slider 822 (corresponding to depth adjustment slider 632 described above with reference to FIGS. 6A-6R). As with depth adjustment slider 632, depth adjustment slider 822 includes a plurality of tickmarks 824 corresponding to f-numbers, a needle 824 indicating the currently-selected tickmark (and thus the currently-selected f-number), and a f-number indicator 828 (e.g., located below or adjacent to the slider) indicating the value of the currently-selected f-number. In FIG. 8E, because the current f-number is the default f-number, f-number indicator 828 indicates the default f-number value (e.g., of 4.5). In some embodiments, when depth adjustment slider 822 is activated, in addition to f-number indicator 828, depth effect affordance 810 also displays the current f-number.

In FIG. 8E, while displaying depth adjustment slider 822, electronic device 600 detects (e.g., via a touch-sensitive surface of display 602) a swipe gesture 803 (e.g., a horizontal swipe gesture, a swipe-right gesture) on depth adjustment slider 822, thereby causing tickmarks 824 to horizontally slide relative to the affixed needle 826.

Figure 8F:
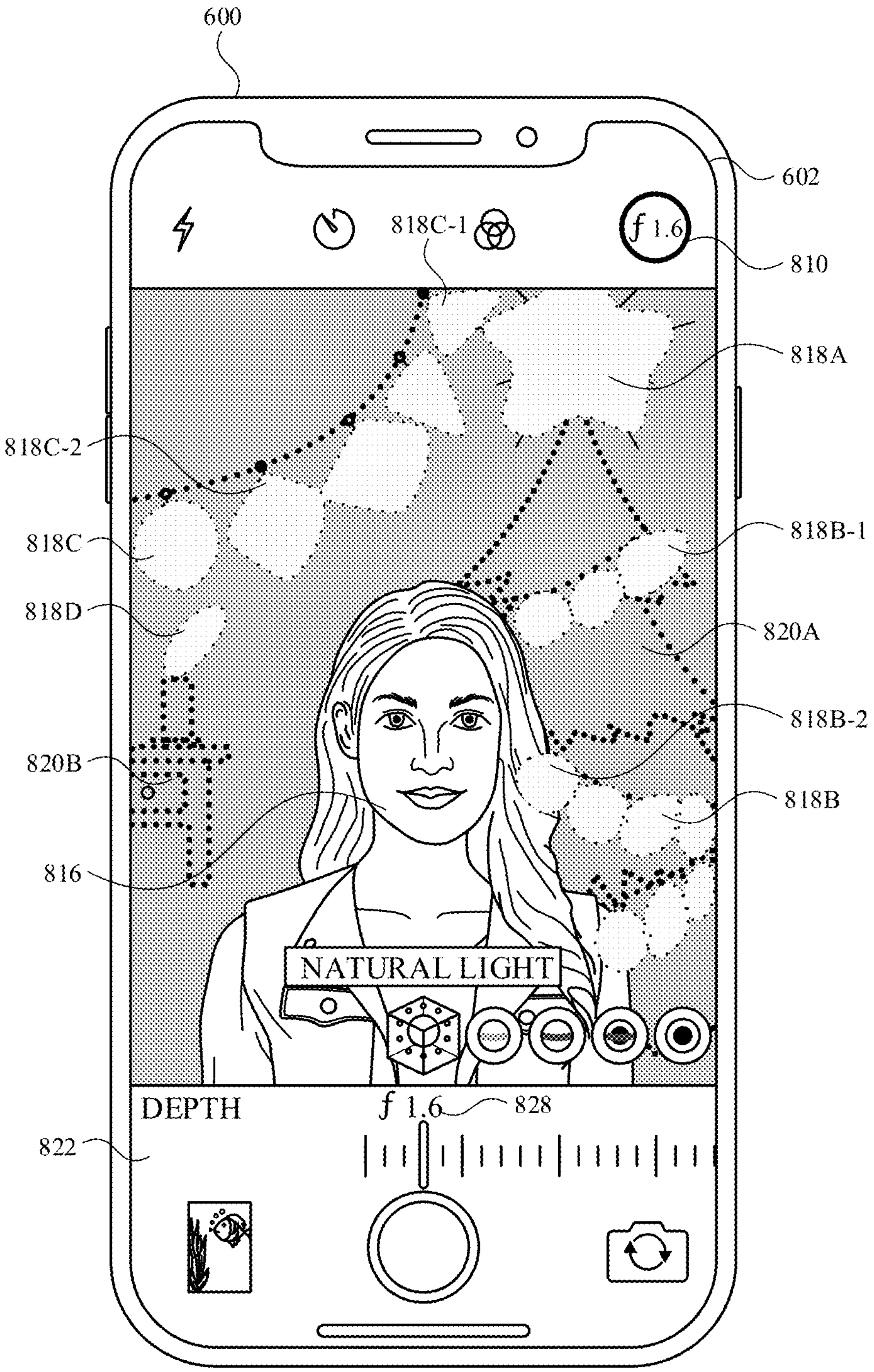

As shown in FIG. 8F, swipe gesture 803 causes depth adjustment slider 822 to slide such that a lower f-number (e.g., of 1.6) is set as the current f-number, as indicated by f-number indicator 828 (and, in some embodiments, also by depth effect affordance 810).

In FIG. 8F, electronic device 800 adjusts image representation 808 to reflect the new depth-of-field value. (e.g., of 1.6). Specifically, because of the smaller simulated depth-of-field value, light-emitting object 818A is more distorted (e.g., blurrier, larger, brighter, more saturated, and/or with a more distorted shape) in FIG. 8F (with f-number 1.6) than in FIG. 8E (with f-number 4.5). Similarly, because of the smaller simulated depth-of-field value, light-emitting objects 818B are more distorted (e.g., blurrier, larger, brighter, more saturated, and/or with a more distorted shape) in FIG. 8F (with f-number 1.6) than in FIG. 8E (with f-number 4.5). Similarly, because of the smaller simulated depth-of-field value, light-emitting objects 818C are more distorted (e.g., blurrier, larger, brighter, more saturated, and/or with a more distorted shape) in FIG. 8F (with f-number 1.6) than in FIG. 8E (with f-number 4.5). Similarly, because of the smaller simulated depth-of-field value, non-light-emitting object 820A is more distorted (e.g., blurrier, larger, brighter, more saturated, and/or with a more distorted shape) in FIG. 8F (with f-number 1.6) than in FIG. 8E (with f-number 4.5). Similarly, because of the smaller simulated depth-of-field value, non-light-emitting object 820B is more distorted (e.g., blurrier, larger, brighter, more saturated, and/or with a more distorted shape) in FIG. 8F (with f-number 1.6) than in FIG. 8E (with f-number 4.5).

Further, the degree of distortion (e.g., the degree of blurriness, the size, the degree of brightness, the degree of saturation, and/or the degree of distortion in the shape of the object relative to the focal point) of the objects differs based on the distance of each object to the focal point of image representation 808 (e.g., the nose of subject 816). Specifically, if each depth pixel (e.g., comprising a particular object) in image representation 808 defines the position in the viewpoint's z-axis where its corresponding two-dimensional pixel is located, and each pixel is defined by a value (e.g., 0-255, where the "0" value represents pixels that are located at the most distant place in a "three dimensional" scene and the "255" value represents pixels that are located closest to a viewpoint (e.g., camera) in the "three dimensional" scene), then the degree of blurriness/sharpness, the size, the degree of brightness, the degree of saturation, and/or the degree of shape-distortion is dependent upon the distance in the z-axis direction (the value between 0-255). That is, the more distant depth pixels in an object are in the z-direction, the more "blurry" the object will appear in image representation 808, and closer depth pixels in an object are in the z-direction, the sharper the object will appear in image representation 808. Meanwhile, if image representation 808 is viewed as a two-dimensional x, y-plane with the focal point (e.g., the nose of subject 820) as the center (e.g., the origin) of the plane, the straight-line distance from the (x, y) point of the pixels constituting an object in image representation 808 to the center of the plane affects the degree of shape distortion of the object—the greater the distance of the pixels from the center (the focal point), the greater the degree of shape distortion, and the closer the distance of the pixels from the center, the more minimal the shape distortion.

For example, in FIG. 8F, the degree of distortion of object 818B-1 is greater than the change in the degree of distortion of object 818B-2 (e.g., object 818B-1 is relatively blurrier, larger, brighter, more saturated, and/or more shape-distorted relative to the focal point than object 818B-2) because object 818B-1 is farther away from the focal point (e.g., the nose of subject 816) than object 818B-2. Similarly, in FIG. 8F, the degree of distortion of object 818C-1 is greater than the degree of distortion of object 818C-2 (e.g., object 818C-1 becomes relatively "blurrier" and more shape-distorted relative to the focal point than object 818C-2) because object 818C-1 is farther away from the focal point (e.g., the nose of subject 816) than object 818C-2. Differences in the degree of distortion based on the distance of an object to the focal point also applies to non-light-emitting objects (e.g., object 820A and 820B) and, in some embodiments, to portions of subject 816 not corresponding to the focal point (e.g., the upper body of the subjects, portions of the face and head of the subject surrounding the focal point).

Further, the degree of distortion (e.g., the degree of blurriness, difference in size, the degree of brightness, the degree of saturation, and/or the degree of distortion in the shape of the object relative to the focal point) of the objects differs based on the type of the object—whether the object corresponds to a light-emitting object or a non-light-emitting object. The resulting change in distortion is generally greater for light-emitting objects than for non-light-emitting objects for the same adjustment in depth-of-field.

In some embodiments, the depth-of-field characteristic of the objects are adjusted continuously as depth adjustment slider 822 is navigated (e.g., from 4.5 in FIG. 8E to 1.6 in FIG. 8F).

Figure 8G:
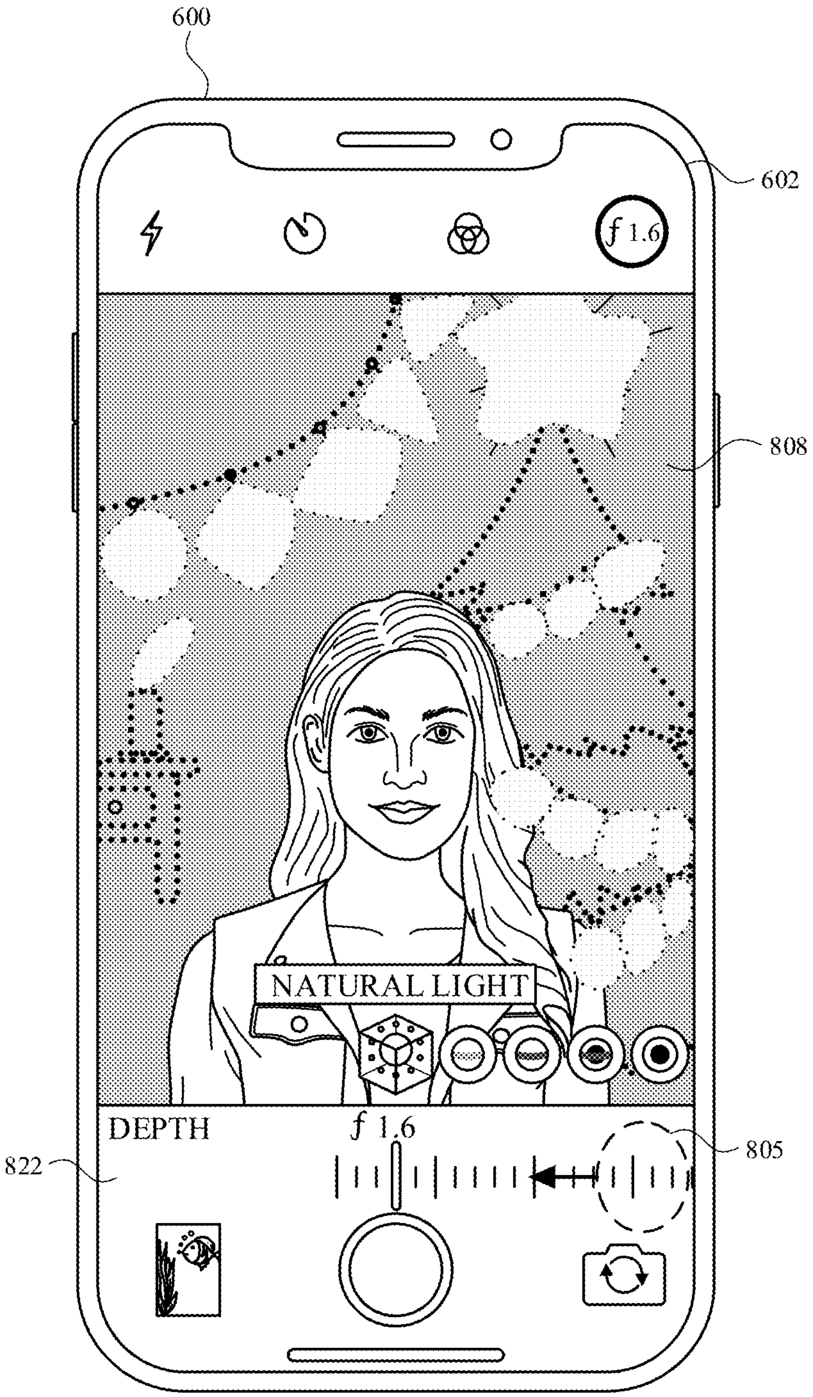

In FIG. 8G, while the f-number is set at 1.6, electronic device 600 detects (e.g., via a touch-sensitive surface of display 602) a swipe gesture 805 (e.g., a horizontal swipe gesture, a swipe-left gesture) on depth adjustment slider 822, thereby causing tickmarks 824 to horizontally slide in the opposite direction relative to the affixed needle 826.

Figure 8H:
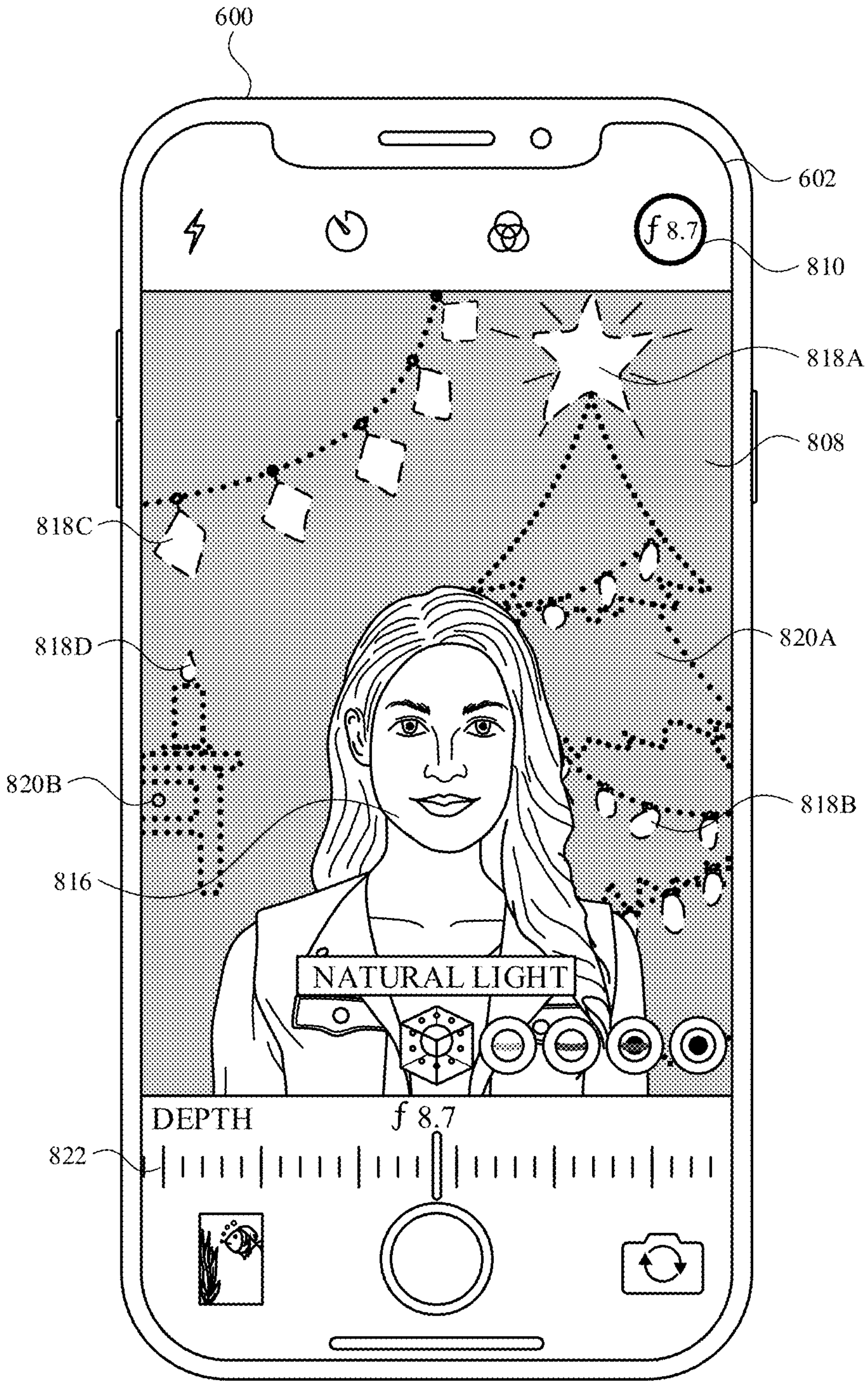

As shown in FIG. 8H, swipe gesture 805 causes depth adjustment slider 822 to slide such that a higher f-number (e.g., of 8.7) is set as the current f-number, as indicated by f-number indicator 828 (and, in some embodiments, also by depth effect affordance 810).

In FIG. 8H, electronic device 800 adjusts image representation 808 to reflect the new depth-of-field value. (e.g., of 8.7). Specifically, because of the larger simulated depth-of-field value, light-emitting object 818A is less distorted (e.g., sharper, closer to an accurate representation of its real form) in FIG. 8H (with f-number 8.7) than in FIG. 8F (with f-number 1.6) and in FIG. 8E (with f-number 4.5). Similarly, because of the larger simulated depth-of-field value, light-emitting objects 818B is less distorted (e.g., sharper, closer to an accurate representation of its real form) in FIG. 8H (with f-number 8.7) than in FIG. 8F (with f-number 1.6) and in FIG. 8E (with f-number 4.5). Similarly, because of the larger simulated depth-of-field value, light-emitting objects 818C are less distorted (e.g., sharper, closer to an accurate representation of its real form) in FIG. 8H (with f-number 8.7) than in FIG. 8F (with f-number 1.6) and in FIG. 8E (with f-number 4.5). Similarly, because of the larger simulated depth-of-field value, non-light-emitting object 820A is less distorted (e.g., sharper, closer to an accurate representation of its real form) in FIG. 8H (with f-number 8.7) than in FIG. 8F (with f-number 1.6) and in FIG. 8E (with f-number 4.5). Similarly, because of the larger simulated depth-of-field value, non-light-emitting object 820B is less distorted (e.g., sharper, closer to an accurate representation of its real form) in FIG. 8H (with f-number 8.7) than in FIG. 8F (with f-number 1.6) and in FIG. 8E (with f-number 4.5).

As already discussed above, the degree of distortion (e.g., the degree of blurriness, the difference in size, the degree of brightness, the degree of saturation, the degree of distortion in the shape of the object relative to the focal point) of the objects differs based on the distance of each object to the focal point of image representation 808 (e.g., the nose of subject 816). Thus, for example, in FIG. 8H, the degree of distortion of object 818B-1 is still greater than the degree of distortion of object 818B-2 (e.g., object 818B-1 is still relatively blurrier, larger, brighter, more saturated, and/or more shape-distorted relative to the focal point than object 818B-2) because object 818B-1 is farther away from the focal point (e.g., the nose of subject 816) than object 818B-2. Similarly, in FIG. 8H, the degree of distortion of object 818C-1 is still greater than the degree of distortion of object 818C-2 (e.g., object 818C-1 becomes relatively blurrier, larger, brighter, more saturated, and/or more shape-distorted relative to the focal point than object 818C-2) because object 818C-1 is farther away from the focal point (e.g., the nose of subject 816) than object 818C-2.

FIGS. 8I-8M illustrate a plurality of circular objects 830 (which can be light-emitting objects or non-light-emitting objects) arranged in a five-by-five gird-like pattern with the focal point at center object 832. FIGS. 8I-8M also illustrate a depth adjustment slider 834 corresponding to depth adjustment slider 822 described above with reference to FIGS. 8A-8H. FIGS. 8I-8M are provided to further illustrate, in one embodiment, the distortion of objects under different f-number settings, where the degree of distortion differs based on a distance of an object from the focal point.

Figure 8I:
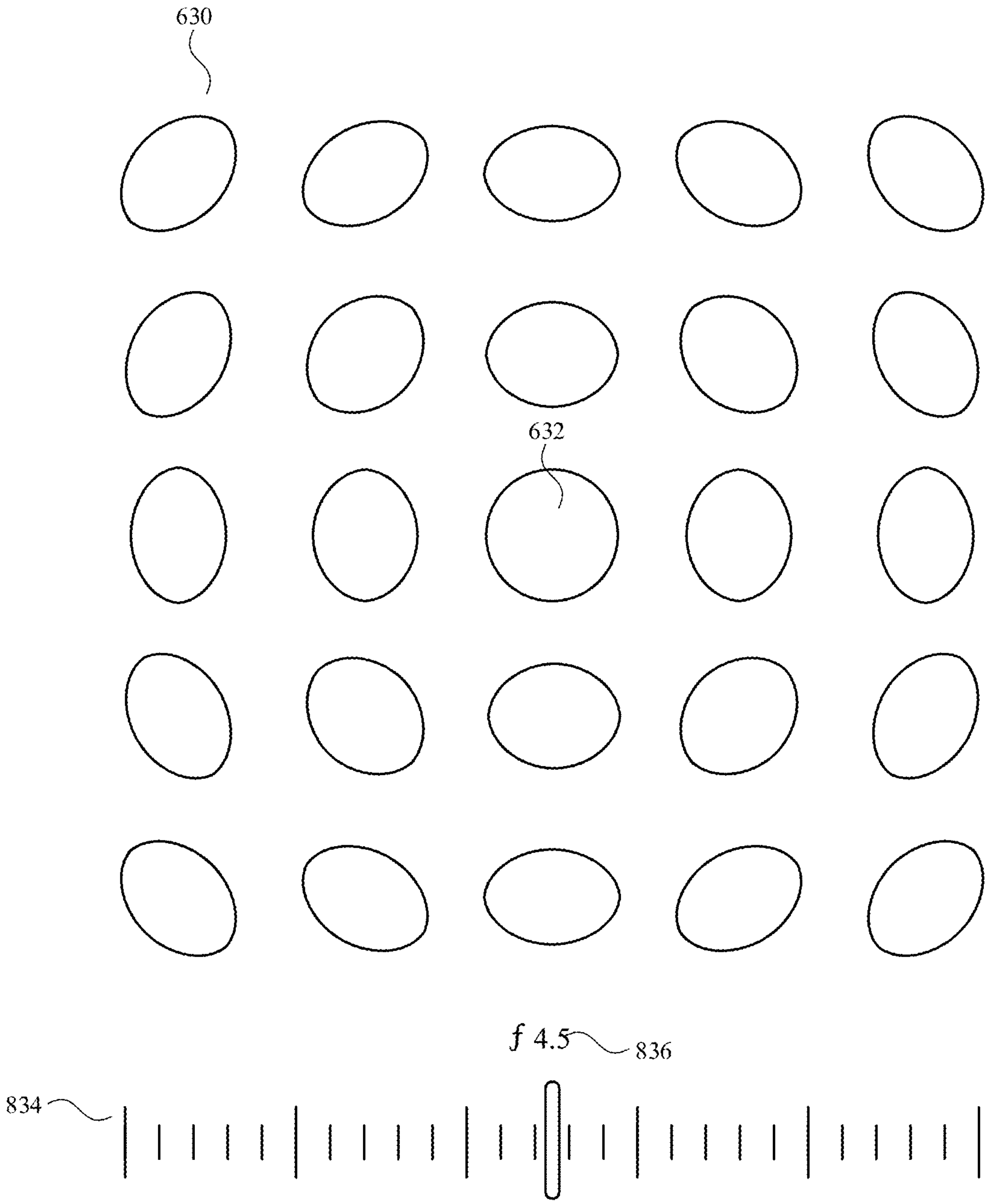

In FIG. 8I, as indicated by f-number indicator 836, the current f-number is set to 4.5 (e.g., the default f-number). FIG. 8I illustrates circular objects 830 adjusted, relative to object 832 as the focal point, with a 4.5 f-number. As shown in FIG. 8I, objects that are farther away from the focal point are more distorted (e.g., more blurred, larger, brighter, more saturated, and/or with a more distorted shape) than objects that are on or closer to the focal point.

Figure 8J:
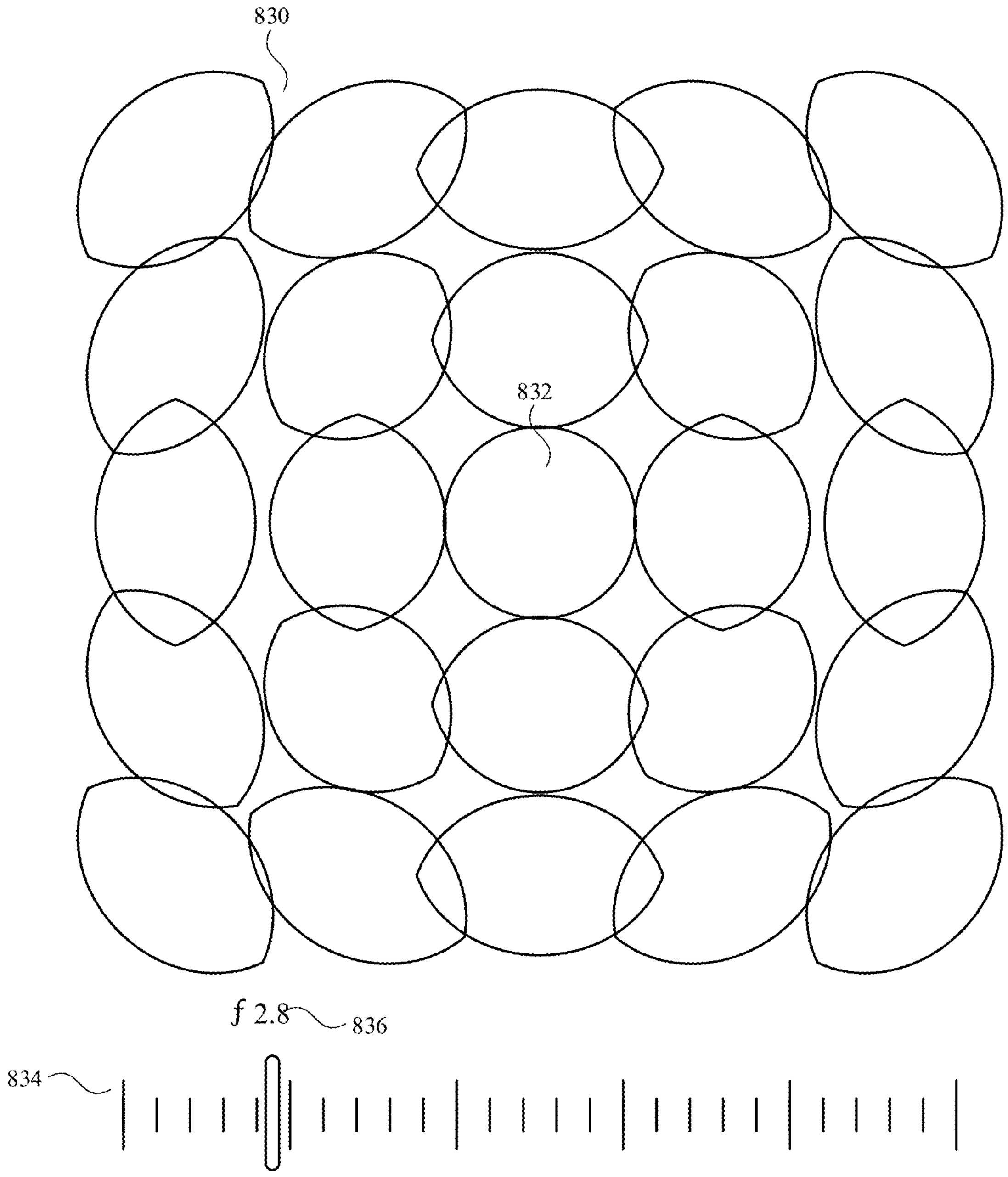

In FIG. 8J, as indicated by f-number indicator 836, the current f-number is set to 2.8. FIG. 8J illustrates circular objects 830 adjusted, relative to object 832 as the focal point, with a 2.8 f-number. Objects 830 in FIG. 8J appear "larger" because, under a smaller f-number, the objects are more blurred, larger, brighter, more saturated, and/or with a more distorted shape than corresponding objects 830 in FIG. 8I. As in FIG. 8I, in FIG. 8J objects that are farther away from the focal point are more distorted (e.g., more blurred, larger, brighter, more saturated, and/or with a more distorted shape) than objects that are on or closer to the focal point.

Figure 8K:
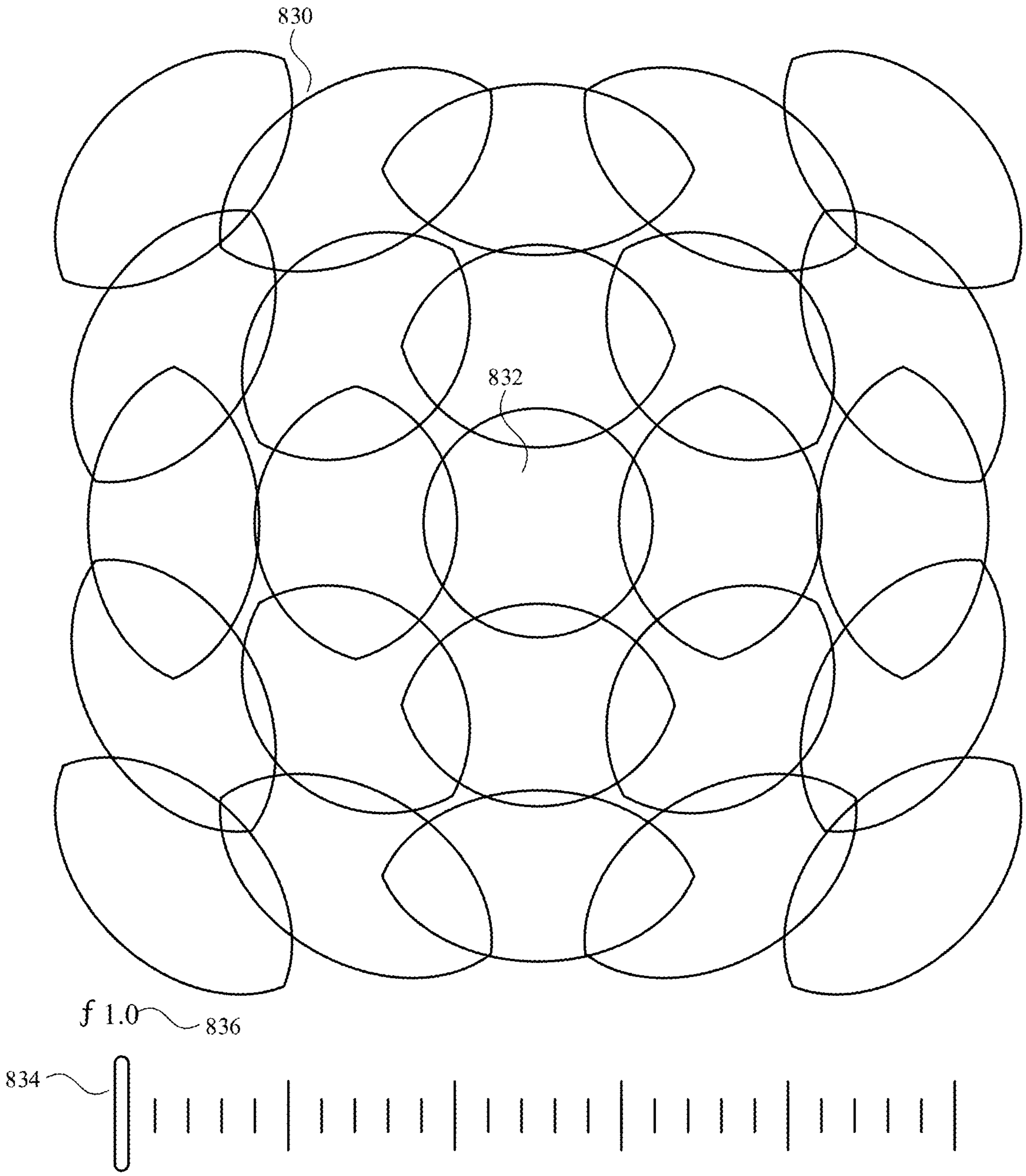

In FIG. 8K, as indicated by f-number indicator 836, the current f-number is set to 1.0. FIG. 8K illustrates circular objects 830 adjusted, relative to object 832 as the focal point, with a 1.0 f-number. Objects 830 in FIG. 8K appear even "larger" because, under an even smaller f-number, the objects are more blurred, larger, brighter, more saturated, and/or with a more distorted shape than corresponding objects 830 in FIG. 8J. As in FIG. 8I-8J, in FIG. 8K objects that are farther away from the focal point are more distorted (e.g., more blurred, larger, brighter, more saturated, and/or with a more distorted shape) than objects that are on or closer to the focal point.

Figure 8L:
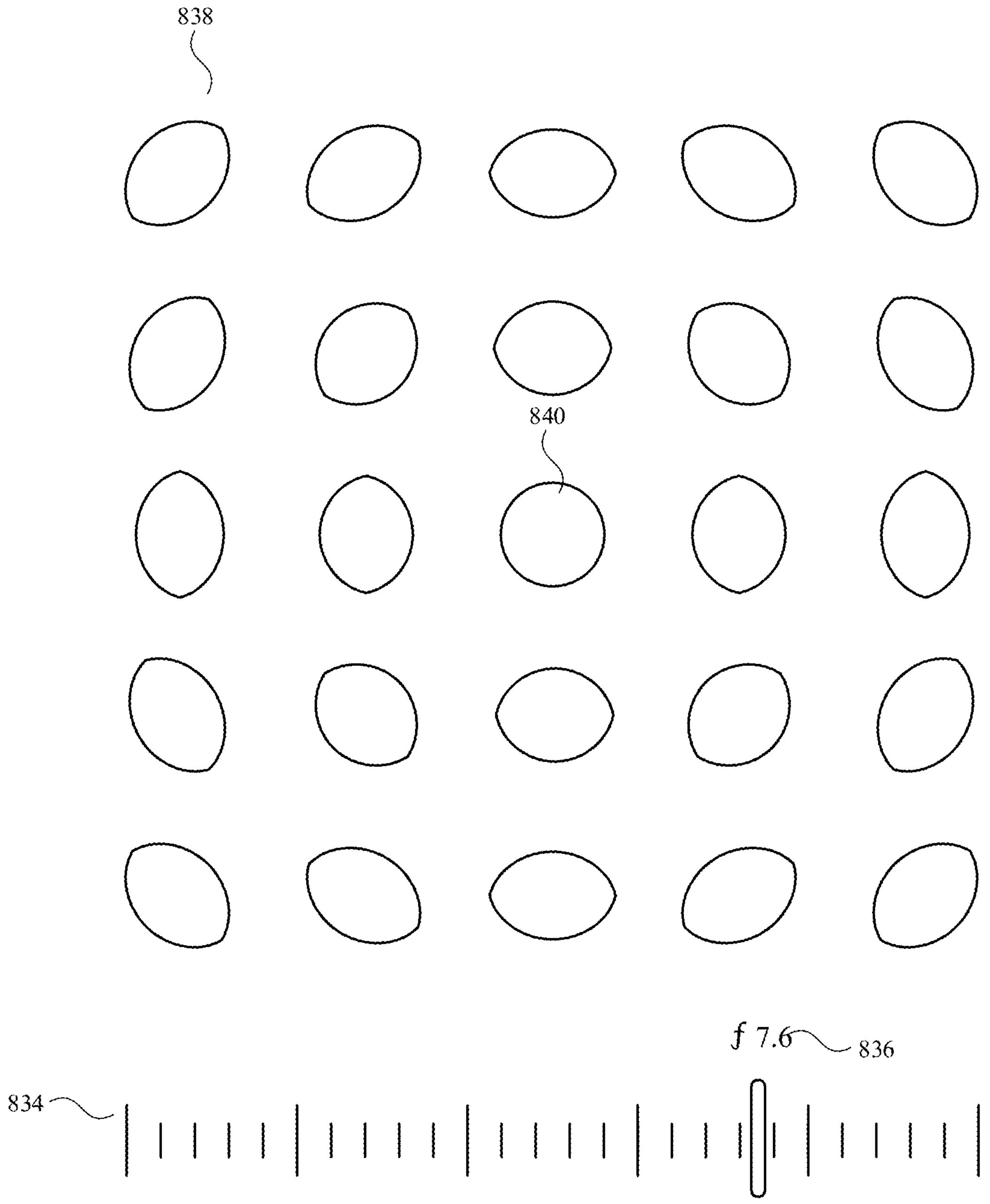

In FIG. 8L, as indicated by f-number indicator 836, the current f-number is set to 7.6. FIG. 8L illustrates circular objects 830 adjusted, relative to object 832 as the focal point, with a 7.6 f-number. Objects 830 in FIG. 8K appear "smaller" than corresponding objects 830 in FIG. 8I because, under a larger f-number, the objects are less blurred, smaller, less bright, less saturated, and/or with a less distorted shape and instead sharper than corresponding objects 830 in FIG. 8I. Still, as in FIG. 8I-8K, in FIG. 8L objects that are farther away from the focal point are more distorted (e.g., more blurred, larger, brighter, more saturated, and/or with a more distorted shape) than objects that are on or closer to the focal point.

Figure 8M:
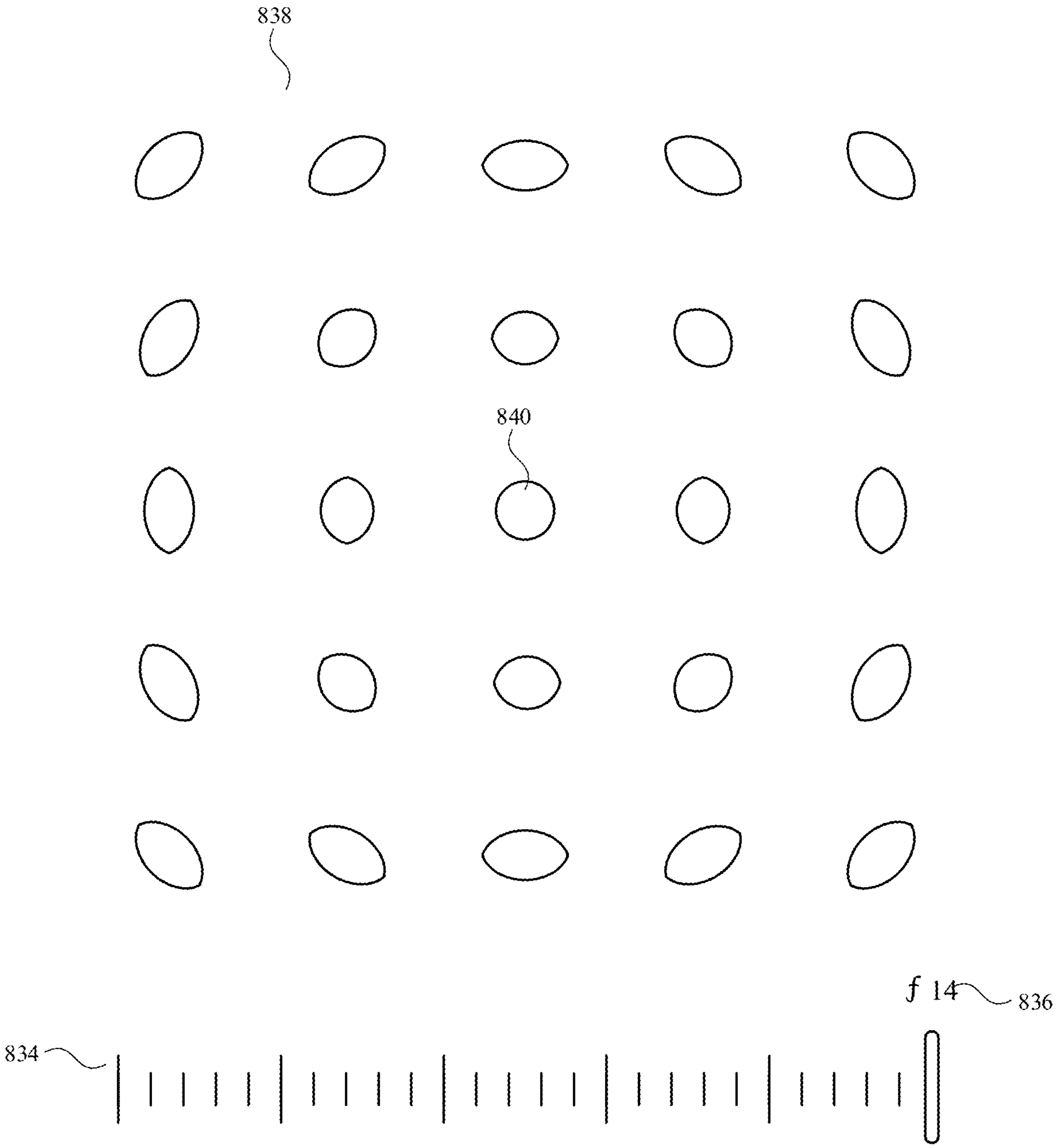

In FIG. 8M, as indicated by f-number indicator 836, the current f-number is set to 14. FIG. 8M illustrates circular objects 830 adjusted, relative to object 832 as the focal point, with a 14 f-number. Objects 830 in FIG. 8M appear even "smaller" than corresponding objects 830 in FIG. 8L because, under an even larger f-number, the objects are less blurred, smaller, less bright, less saturated, and/or with a less distorted shape and instead sharper than corresponding objects 830 in FIG. 8L. As such, objects 830 in FIG. 8M are more of "true" circles than objects 830 in FIGS. 8I-8L. Still, as in FIGS. 8I-8L, in FIG. 8M objects that are farther away from the focal point are more distorted (e.g., more blurred, larger, brighter, more saturated, and/or with a more distorted shape) than objects that are on or closer to the focal point.

FIGS. 8N-8R illustrate a plurality of circular objects 838 (which can be light-emitting objects or non-light-emitting objects) arranged in a five-by-five gird-like pattern with the focal point at center object 840 (similar to FIGS. 8I-8M). FIGS. 8N-8R also illustrate depth adjustment slider 834 corresponding to depth adjustment slider 822 described above with reference to FIGS. 8A-8H. FIGS. 8N-8R are provided to further illustrate, in another embodiment, the distortion of objects under different f-number settings, where the degree of distortion differs based on a distance of an object from the focal point.

Figure 8N:
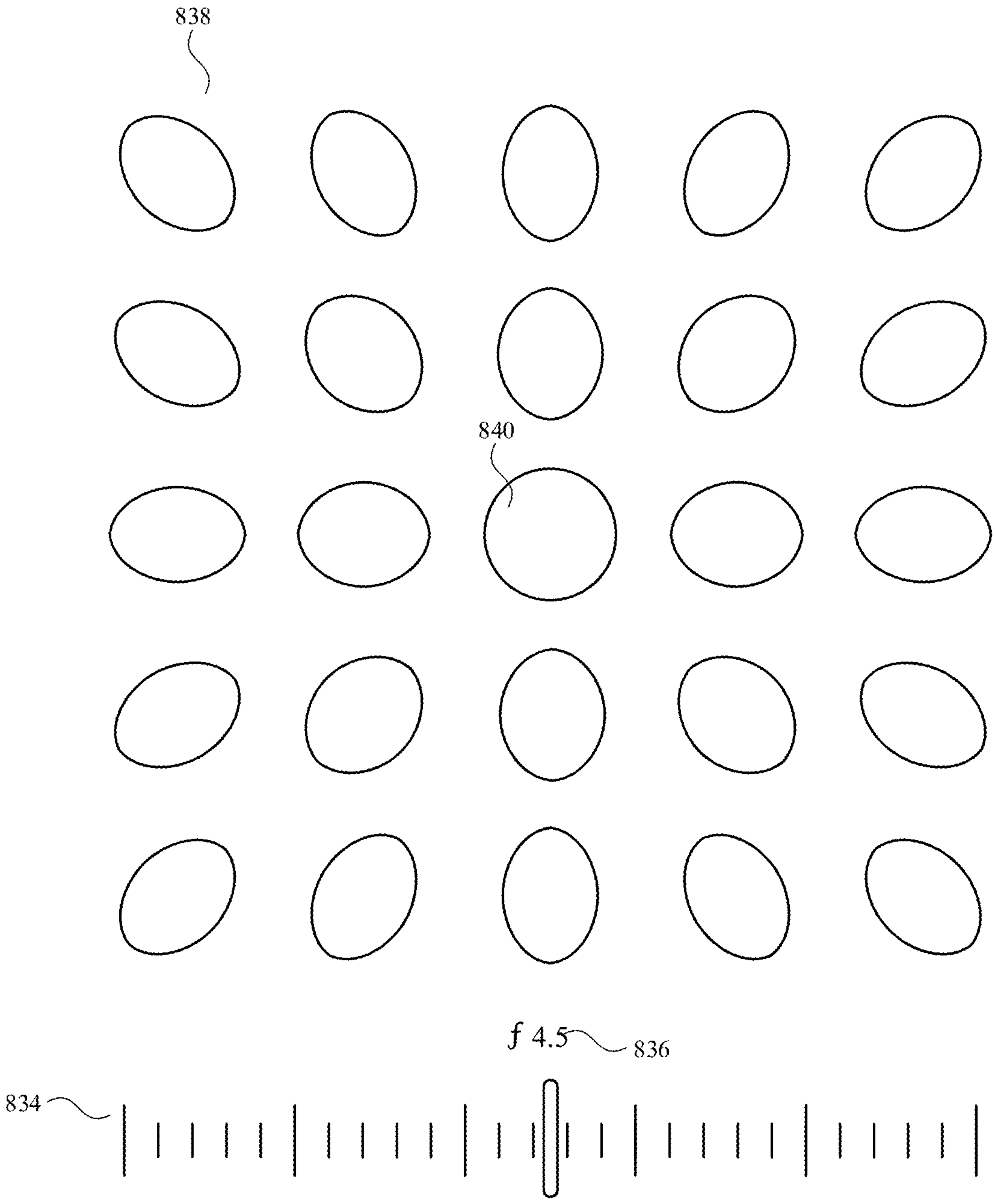

In FIG. 8N, as indicated by f-number indicator 836, the current f-number is set to 4.5 (e.g., the default f-number). FIG. 8N illustrates circular objects 838 adjusted, relative to object 840 as the focal point, with a 4.5 f-number. As shown in FIG. 8N, objects that are farther away from the focal point are more distorted (e.g., more blurred, larger, brighter, more saturated, and/or with a more distorted shape) than objects that are on or closer to the focal point.

Figure 8O:
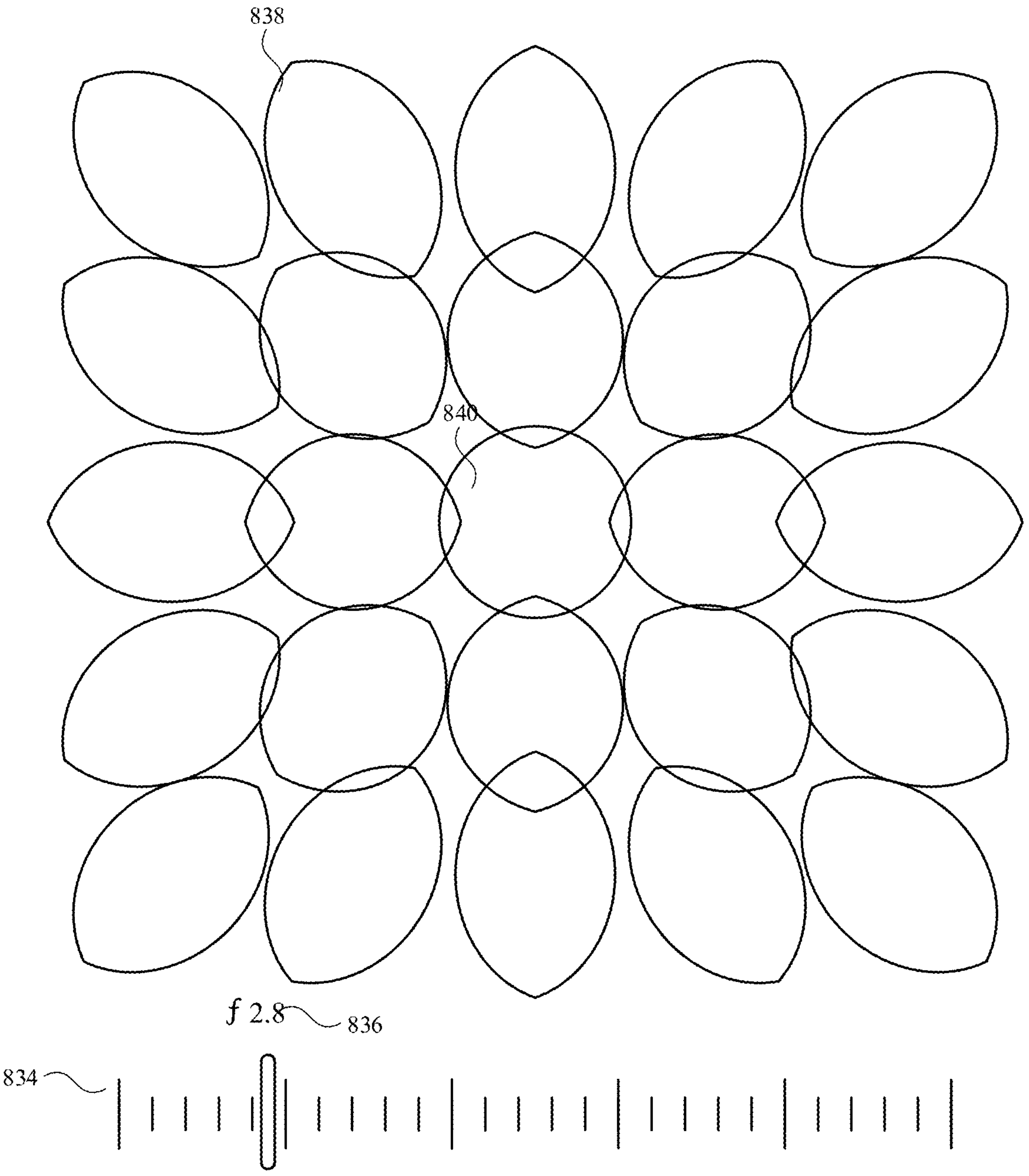

In FIG. 8O, as indicated by f-number indicator 836, the current f-number is set to 2.8. FIG. 8O illustrates circular objects 838 adjusted, relative to object 834 as the focal point, with a 2.8 f-number. Objects 838 in FIG. 8O appear "larger" because, under a smaller f-number, the objects are more blurred, larger, brighter, more saturated, and/or with a more distorted shape than corresponding objects 838 in FIG. 8N. As in FIG. 8N, in FIG. 8O objects that are farther away from the focal point are more distorted (e.g., more blurred, larger, brighter, more saturated, and/or with a more distorted shape) than objects that are on or closer to the focal point.

Figure 8P:
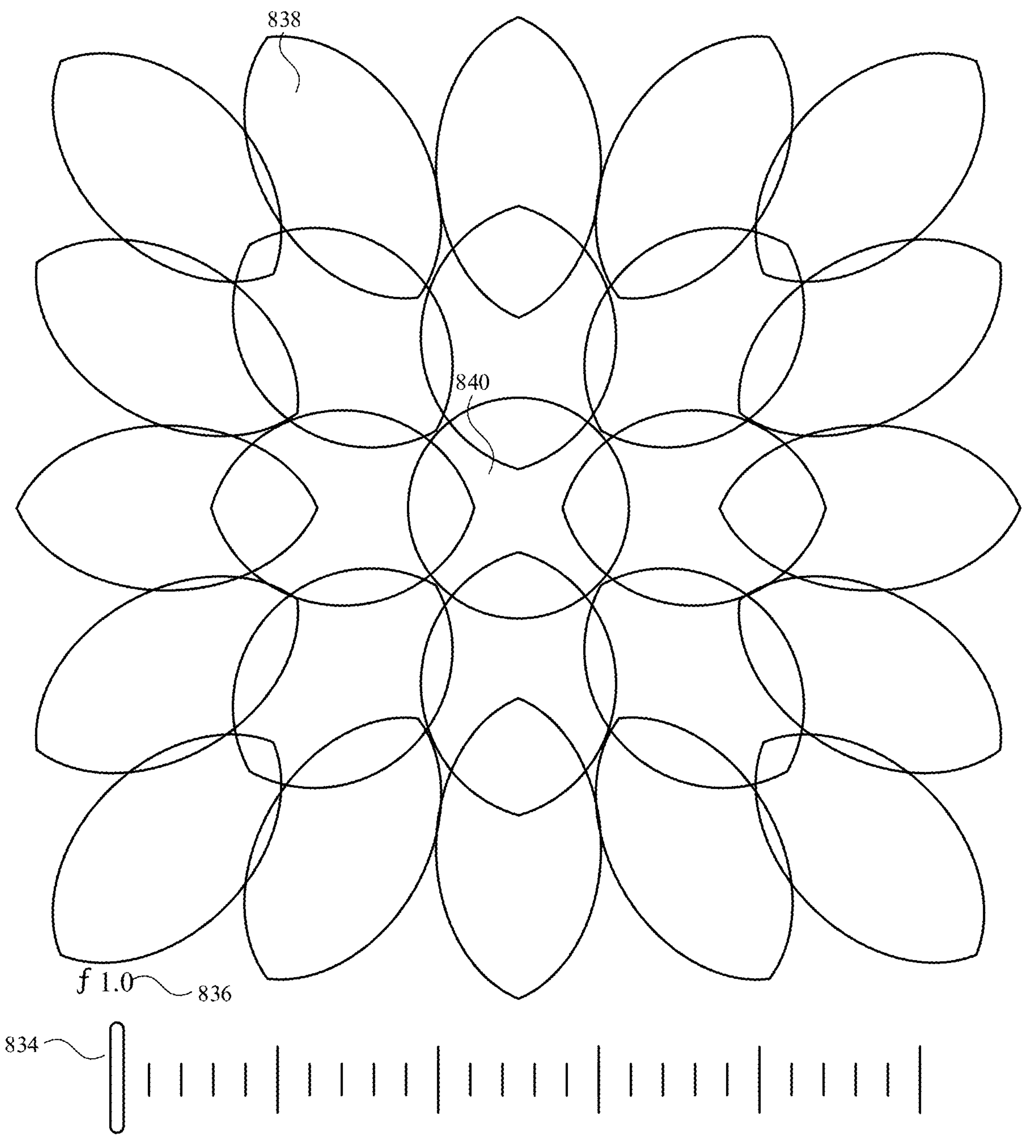

In FIG. 8P, as indicated by f-number indicator 836, the current f-number is set to 1.0. FIG. 8P illustrates circular objects 838 adjusted, relative to object 840 as the focal point, with a 1.0 f-number. Objects 838 in FIG. 8P appear even "larger" because, under an even smaller f-number, the objects are more blurred, larger, brighter, more saturated, and/or with a more distorted shape than corresponding objects 838 in FIG. 8O. As in FIG. 8N-8O, in FIG. 8P objects that are farther away from the focal point are more distorted (e.g., more blurred, larger, brighter, more saturated, and/or with a more distorted shape) than objects that are on or closer to the focal point.

Figure 8Q:
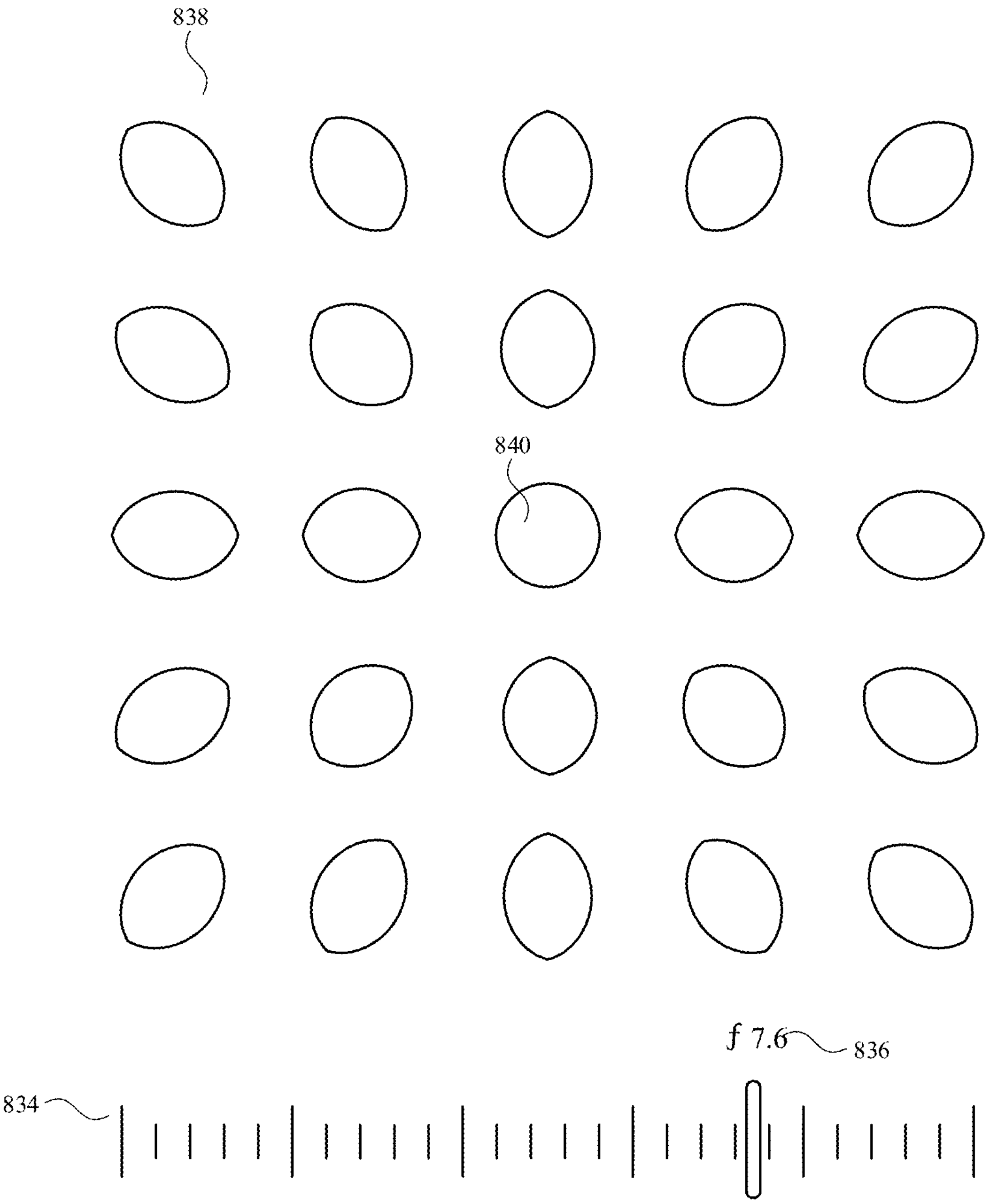

In FIG. 8Q, as indicated by f-number indicator 836, the current f-number is set to 7.6. FIG. 8Q illustrates circular objects 838 adjusted, relative to object 840 as the focal point, with a 7.6 f-number. Objects 838 in FIG. 8Q appear "smaller" than corresponding objects 838 in FIG. 8N because, under a larger f-number, the objects are less blurred, smaller, less bright, less saturated, and/or with a less distorted shape and instead sharper than corresponding objects 838 in FIG. 8N. Still, as in FIG. 8N-8P, in FIG. 8Q objects that are farther away from the focal point are more distorted (e.g., more blurred, larger, brighter, more saturated, and/or with a more distorted shape) than objects that are on or closer to the focal point.

In FIG. 8R, as indicated by f-number indicator 836, the current f-number is set to 14. FIG. 8R illustrates circular objects 838 adjusted, relative to object 840 as the focal point, with a 14 f-number. Objects 838 in FIG. 8R appear even "smaller" than corresponding objects 838 in FIG. 8Q because, under an even larger f-number, the objects are less blurred, smaller, less bright, less saturated, and/or with a less distorted shape and instead sharper than corresponding objects 838 in FIG. 8Q. As such, objects 838 in FIG. 8R are more of "true" circles than objects 838 in FIGS. 8N-8Q. Still, as in FIGS. 8N-8Q, in FIG. 8R objects that are farther away from the focal point are more distorted (e.g., more blurred, larger, brighter, more saturated, and/or with a more distorted shape) than objects that are on or closer to the focal point.

FIGS. 9A-9B are a flow diagram illustrating a method for managing user interfaces for displaying adjustments to a simulated depth effect, in accordance with some embodiments. Method 900 is performed at a device (e.g., 100, 300, 500, 600) with a display and one or more input devices (e.g., a touch-sensitive surface of the display, a mechanical input device). Some operations in method 900 are, optionally, combined, the orders of some operations are, optionally, changed, and some operations are, optionally, omitted.

As described below, method 900 provides an intuitive way for managing user interfaces for simulated depth effects. The method reduces the cognitive burden on a user for managing and navigating user interfaces for simulated depth effects, thereby creating a more efficient human-machine interface. For battery-operated computing devices, enabling a user to navigate user interfaces faster and more efficiently by providing easy management of user interfaces for simulating depth effects conserves power and increases the time between battery charges.

The electronic device (e.g., 600) receives (902), via the one or more input devices, a request to apply a simulated depth effect to a representation of image data (e.g., 808, a displayed image corresponding to the image data, a portrait image of a person/subject), wherein depth data for a subject within the representation of image data is available.

In some embodiments, the representation of image data (e.g., 808) is a live-feed image currently being captured by one or more cameras of the electronic device. In some embodiments, the representation of image data is a previously-taken image stored in and retrieved from memory (of the electronic device or an external server). In some embodiments, the depth data of the image can be adjusted/manipulated to apply a depth effect to the representation of image data.

In some embodiments, the image data includes at least two components: an RGB component that encodes the visual characteristics of a captured image, and depth data that encodes information about the relative spacing relationship of elements within the captured image (e.g., the depth data encodes that a user is in the foreground, and background elements, such as a tree positioned behind the user, are in the background).

In some embodiments, the depth data is a depth map. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the depth data has a second depth component (e.g., a second portion of depth data that encodes a spatial position of the background in the camera display region; a plurality of depth pixels that form a discrete portion of the depth map, such as a background), separate from the first depth component, the second depth aspect including the representation of the background in the camera display region. In some embodiments, the first depth aspect and second depth aspect are used to determine a spatial relationship between the subject in the camera display region and the background in the camera display region. This spatial relationship can be used to distinguish the subject from the background. This distinction can be exploited to, for example, apply different visual effects (e.g., visual effects having a depth component) to the subject and background. In some embodiments, all areas of the image data that do not correspond to the first depth component (e.g., areas of the image data that are out of range of the depth camera) are adjusted based on different degrees of blurriness/sharpness, the size, the degree of brightness, the degree of saturation, and/or the degree of shape-distortion in order to simulate a depth effect, such as a Bokeh effect.

In some embodiments, the request corresponds to an adjustment (e.g., a sliding gesture in a horizontal or vertical direction) of an adjustable slider (e.g., 822) associated with modifying/adjusting the simulated depth effect applied to/being applied to the representation of image data (e.g., 808). Applying a simulated depth effect to a representation of image data using an adjustable slider enhances visual feedback by enabling the user to quickly and easily view adjustments being made by the user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the simulated depth effect is "simulated" in that the effect is (artificially) generated based on a manipulation of the underlying image data to create and apply the effect to the corresponding representation of image data (e.g., 808) (e.g., as opposed to being a "natural" effect that is based on underlying data as originally captured via one or more cameras).

In some embodiments, receiving, via the one or more input devices, the request to apply the simulated depth effect to the representation of image data (e.g., 808) comprises detecting, via the one or more input devices, one or more inputs selecting a value of an image distortion parameter, wherein distorting (a portion of) the representation of image data is based on (and is responsive to) one or more user inputs selecting a value of an image distortion parameter (e.g., via a movement of the adjustable slider for controlling the parameter). In some embodiments, the adjustable slider is adjusted to distort (e.g., apply a simulated depth effect to) the representation of image data, as described above with reference to FIGS. 6A-6T. Providing an adjustable slider to be used to distort the representation of image data enhances user convenience by enabling the user to easily and efficient make adjustments to the displayed representation of image data. Providing additional control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, selecting a different value for the image distortion parameter causes a first change to the first portion of the representation of the image data and causes a second change to the second portion of the representation of the image data, wherein the first change is different from the second change and the first change and the second change both include the same type of change (e.g., an increase or decrease in blurriness, size, brightness, saturation, and/or shape-distortion).

In response to receiving (904) the request to apply the simulated depth effect to the representation of image data (e.g., 808), the electronic device (e.g., 600) displays, on the display (e.g., 602), the representation of image data with the simulated depth effect. Displaying the representation of image data with the simulated depth effect in response to receiving the request to apply the simulated depth effect to the representation of image data enables a user to quickly and easily view and respond to the adjustments being made to the representation of image data. Providing convenient control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying, on the display (e.g., 602), the representation of image data (e.g., 808) with the simulated depth effect includes distorting (906) a first portion of the representation of image data that has a first depth in a first manner (e.g., a first particular blurriness/sharpness, a first particular size, a first particular brightness, a first particular saturation, and/or a first particular shape), wherein the first manner is determined based on a distance of the first portion from a predefined portion of the representation of image data (e.g., a center of a field of view of a camera or a point of focus of the camera). Enabling a user to adjust a representation of image data to apply an accurate simulated depth effect enhances user convenience/efficiency and operability and versatility of the device by allowing the user create a similar image/photo to what the user would have otherwise only been able to obtain using a larger and/or more expensive piece of hardware (e.g., a professional-level camera). That is, the simulated depth effect (a software effect) enables the user to utilize a device that is relatively smaller and less expensive to apply a depth effect to an image/photo (e.g., as opposed to if the user was using a camera sensor and lens included in/attached to the device that is capable of producing the depth effect via optical distortion). This is turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Displaying, on the display (e.g., 602), the representation of image data (e.g., 808) with the simulated depth effect also includes distorting a second portion of the representation of image data that has the first depth in a second manner (e.g., a second particular blurriness/sharpness, a second particular size, a second particular brightness, a second particular saturation, and/or a second particular shape) that is different from the first manner, wherein the second manner is determined based on a distance of the second portion from the predefined portion of the representation of image data. Enabling a user to adjust a representation of image data to apply an accurate simulated depth effect enhances user convenience/efficiency and operability and versatility of the device by allowing the user create a similar image/photo to what the user would have otherwise only been able to obtain using a larger and/or more expensive piece of hardware (e.g., a professional-level camera). That is, the simulated depth effect (a software effect) enables the user to utilize a device that is relatively smaller and less expensive to apply a depth effect to an image/photo (e.g., as opposed to if the user was using a camera sensor and lens included in/attached to the device that is capable of producing the depth effect via optical distortion). This is turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, on the display (e.g., 602), the representation of image data (e.g., 808) with the simulated depth effect further includes distorting (910) a third portion of the representation of image data that is a same distance from the predefined portion as the first portion and has a second depth that is different from the first depth in the first manner with a magnitude (e.g., of blurriness/sharpness) determined based on the second depth (e.g., the depth of the third portion). Enabling a user to adjust a representation of image data to apply an accurate simulated depth effect enhances user convenience/efficiency and operability and versatility of the device by allowing the user create a similar image/photo to what the user would have otherwise only been able to obtain using a larger and/or more expensive piece of hardware (e.g., a professional-level camera). That is, the simulated depth effect (a software effect) enables the user to utilize a device that is relatively smaller and less expensive to apply a depth effect to an image/photo (e.g., as opposed to if the user was using a camera sensor and lens included in/attached to the device that is capable of producing the depth effect via optical distortion). This is turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, on the display (e.g., 602), the representation of image data (e.g., 808) with the simulated depth effect further includes distorting (912) a fourth portion of the representation of image data that is a same distance from the predefined portion as the second portion and has the second depth in the second manner with a magnitude (e.g., of blurriness/sharpness) determined based on the second depth (e.g., the depth of the fourth portion). Enabling a user to adjust a representation of image data to apply an accurate simulated depth effect enhances user convenience/efficiency and operability and versatility of the device by allowing the user create a similar image/photo to what the user would have otherwise only been able to obtain using a larger and/or more expensive piece of hardware (e.g., a professional-level camera). That is, the simulated depth effect (a software effect) enables the user to utilize a device that is relatively smaller and less expensive to apply a depth effect to an image/photo (e.g., as opposed to if the user was using a camera sensor and lens included in/attached to the device that is capable of producing the depth effect via optical distortion). This is turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, on the display (e.g., 602), the representation of image data (e.g., 808) with the simulated depth effect further includes distorting (914) one or more portions of the representation of image data, that is a same distance from the predefined portion (e.g., a reference point or focus point within the representation of image data) as the first portion and has the first depth, in the first manner. Thus, in some embodiments, portion of the representation of image data that have the same depth and are the same distance away from the predefined portion of the representation of image data are distorted in the same way. Enabling a user to adjust a representation of image data to apply an accurate simulated depth effect enhances user convenience/efficiency and operability and versatility of the device by allowing the user create a similar image/photo to what the user would have otherwise only been able to obtain using a larger and/or more expensive piece of hardware (e.g., a professional-level camera). That is, the simulated depth effect (a software effect) enables the user to utilize a device that is relatively smaller and less expensive to apply a depth effect to an image/photo (e.g., as opposed to if the user was using a camera sensor and lens included in/attached to the device that is capable of producing the depth effect via optical distortion). This is turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, distorting the first portion of the representation of image data (e.g., 808) in the first manner comprises distorting the first portion based on (e.g., by applying) a first distortion shape (e.g., a circular shape or a lemon/oval-type shape). In some embodiments, distorting the second portion of the representation of image data in the second manner comprises distorting the second portion based on (e.g., by applying) a second distortion shape (e.g., a more circular shape or a more lemon/oval-type shape) different from the first distortion shape. In some embodiments, if the second portion is at a greater distance (farther) from the predefined portion than the first portion, one or more objects (e.g., light-emitting objects) within the second portion are shape-distorted to a more lemon/oval shape than one or more objects (e.g., light-emitting objects) within the first portion.

In some embodiments, distorting the first portion of the representation of image data (e.g., 808) in the first manner comprises distorting the first portion by a first degree of distortion (e.g., a degree of distortion of a shape of one or more objects within the first portion). In some embodiments, distorting the second portion of the representation of image data in the second manner comprises distorting the second portion by second degree of distortion (e.g., a degree of distortion of a shape of one or more objects within the second portion) that is greater than the first degree of distortion, wherein the second portion is at a greater distance (farther) from the predefined portion (e.g., a reference point or focus point within the representation of image data) than the first portion. In some embodiments, objects in the periphery of the representation of image data are distorted to be more lemon/oval in shape, whereas objects closer to the predefined portion (e.g., a center portion, a focus portion) are less distorted. In some embodiments, the degree of distortion changes (e.g., increases or decreases) gradually as the distance from the predefined portion of the changes.

In some embodiments, distorting the first portion in the first manner comprises blurring (e.g., asymmetrically blurring/changing the sharpness of) the first portion by a first magnitude. In some embodiments, distorting the first portion in the first manner comprises distorting the second portion in the second manner comprises blurring (e.g., asymmetrically blurring/changing the sharpness of) the second portion by a second magnitude. In some embodiments, in accordance with a determination that the first portion is a greater distance from the predefined portion than the second distance is from the predefined portion (e.g., a reference point or focus point within the representation of image data), the first magnitude is greater than the second magnitude. In some embodiments, in accordance with a determination that the second portion is a greater distance from the predefined portion than the first portion is from the predefined portion, the second magnitude is greater than the first magnitude.

In some embodiments, prior to receiving the request to apply the simulated depth effect to the representation of image data (e.g., 808), the electronic device (e.g., 600) displays, on the display (e.g., 602), the representation of image data. In some embodiments, while displaying the representation of image data, the electronic device (e.g., 600) detects, using the image data (e.g., via an analysis of the image data and/or based on a user input identifying that the region of the representation of image data includes a subject, such as a tap input in a live preview of camera data), a presence of the subject (e.g., a person, at least a portion of the person, such as the face of a person or a face and upper body of a person) within the representation of image data.

In some embodiments, displaying, on the display (e.g., 602), the representation of image data (e.g., 808) with the simulated depth effect further comprises distorting the first portion of the image and the second portion of the image without distorting (916) a portion of the representation of image data corresponding to (a center portion/region of) the subject. In some embodiments, the portion of the representation of image data corresponding to the subject is distorted less than the first portion of the image and the second portion of the image.

In some embodiments, distorting the first portion of the representation of image data includes distorting the first portion in accordance with a determination that the first portion does not correspond to (a center portion/region of) the subject. In some embodiments, distorting the second portion of the representation of image data includes distorting the second portion in accordance with a determination that the second portion does not correspond to (a center portion/region of) the subject.

In some embodiments, in response to receiving the request to apply the simulated depth effect to the representation of image data (e.g., 808), the electronic device (e.g., 600) identifies (918), based on the image data (e.g., via an analysis of the image data), one or more objects within the representation of image data that are associated with light-emitting objects (e.g., 818A, 818B, 818C, 818D) (e.g., as opposed to those that are not associated with light-emitting objects).

In some embodiments, displaying, on the display (e.g., 602), the representation of image data (e.g., 808) with the simulated depth effect further comprises changing (920) an appearance of the one or more portions of the representation of image data that are associated with (e.g., are identified as) light-emitting objects (e.g., 818A, 818B, 818C, 818D) in a third manner relative to one or more portions of the representation of image data that are not associated with (e.g., are not identified as) light-emitting objects (e.g., 820A, 820B). In some embodiments, the third manner involves blurring/sharpening the objects by a greater magnitude compared to the fourth manner. In some embodiments, the third manner involves distorting the shape of the objects by a greater degree compared to the fourth manner.

In some embodiments, changing the appearance of objects in the representation of image data (e.g., 808) that are associated with light-emitting objects (e.g., 818A, 818B, 818C, 818D) in the third manner includes one or more of: increasing (922) a brightness of the one or more portions of the representation of image data that are associated with light-emitting objects relative to other portions of the representation of image data that are not associated with light-emitting objects, increasing (924) a saturation of the one or more portions of the representation of image data that are associated with light-emitting objects relative to other portions of the representation of image data that are not associated with light-emitting objects, and increasing (926) a size of the one or more portions of the representation of image data that are associated with light-emitting objects relative to other portions of the representation of image data that are not associated with light-emitting objects (e.g., 820A, 820B).

In some embodiments, the electronic device (e.g., 600) detects (928), via the one or more input devices, one or more inputs changing a value of an image distortion parameter, wherein distorting (a portion of) the representation of image data (e.g., 808) is based on (and is responsive to) one or more user inputs selecting a value of an image distortion parameter (e.g., via a movement of the adjustable slider for controlling the parameter). In some embodiments, the adjustable slider (e.g., 822) is adjusted to distort (e.g., apply a simulated depth effect to) the representation of image data. In some embodiments, providing an adjustable slider to distort the representation of image data enables a user to quickly and easily provide one or more inputs to change a value of an image distortion parameter to distort the representation of image data. Providing additional control options and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in response to detecting the one or more inputs (e.g., 803, 805) changing the value of the image distortion parameter, changing (930) the magnitude of change of the appearance of one or more portions of the representation of image data that are associated with light-emitting objects (e.g., 818A, 818B, 818C, 818D) relative to other portions of the representation of image data that are not associated with light-emitting objects (e.g., 820A, 820B) (e.g., gradually increasing a brightness, size, and/or saturation of the objects associated with light-emitting sources relative to other portions of the representation of data as the distortion parameter gradually increases (and the blurriness of regions of time image outside of the simulated focal plane gradually increases), and gradually decreasing a brightness, size, and/or saturation of the objects associated with light-emitting sources relative to other portions of the representation of data as the distortion parameter gradually decreases (and the blurriness of regions of time image outside of the simulated focal plane gradually decreases)).

Note that details of the processes described above with respect to method 900 (e.g., FIGS. 9A-9B are also applicable in an analogous manner to the methods described above and below. For example, method 700 optionally includes one or more of the characteristics of the various methods described above with reference to method 900. For example, the depth adjustment slider described in method 700 can be used to apply the simulated depth effect to objects within an image representation. For another example, method 1100 optionally includes one or more of the characteristics of the various methods described above with reference to method 900. For example, the notification concerning detected interference, as described in method 1100, can be associated with detected magnetic interference that can impede with one or more depth sensors used for simulating depth effects. For brevity, these details are not repeated below.

FIGS. 10A-10F illustrate exemplary user interfaces for indicating an interference to adjusting simulated image effects (e.g., simulated depth effects, such as a Bokeh effect), in accordance with some embodiments. The user interfaces in these figures are used to illustrate the processes described below, including the processes in FIG. 11.

Figure 10A:
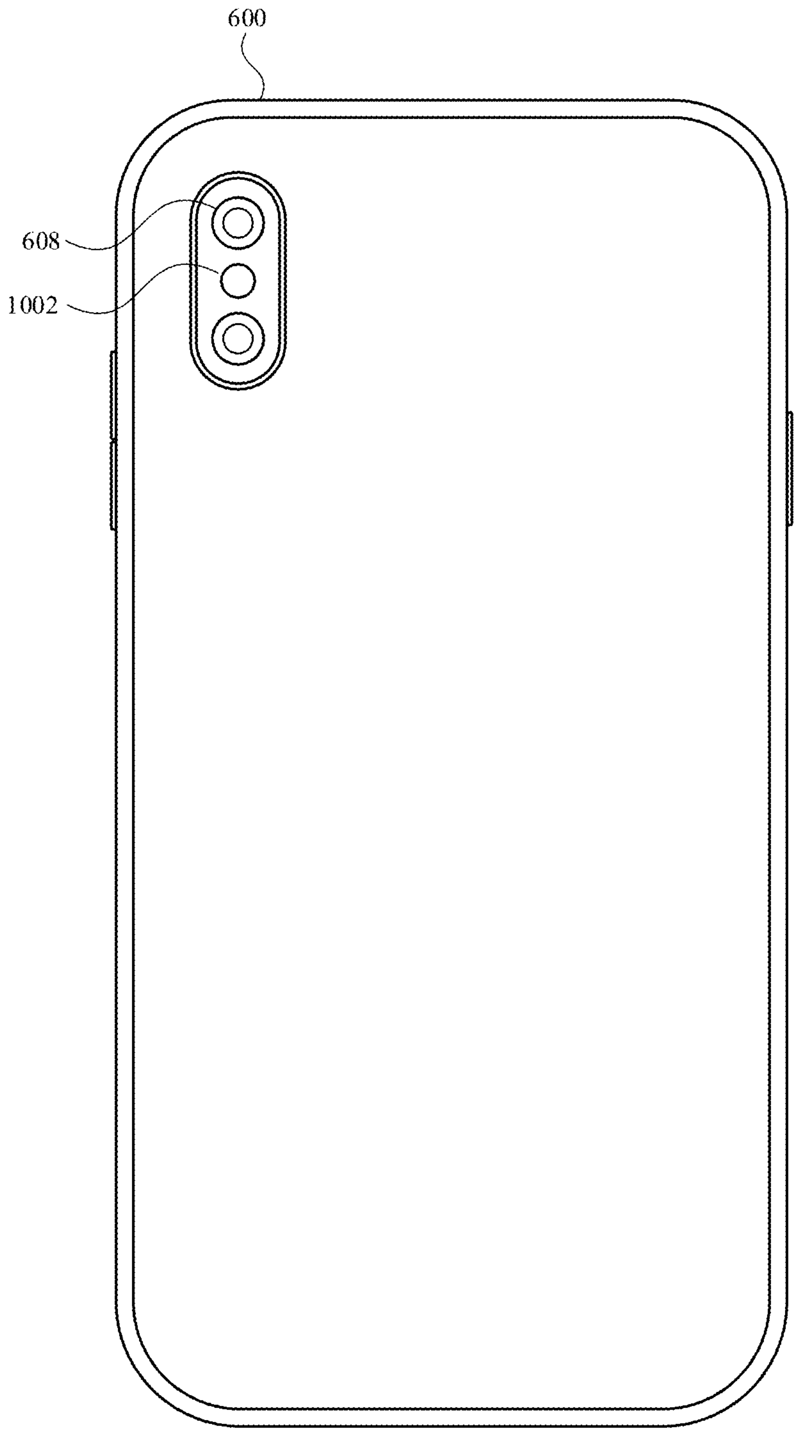
FIGS. 10A-10F illustrate exemplary user interfaces for indicating an interference to adjusting simulated image effects, in accordance with some embodiments.

FIG. 10A illustrates a rear-view of electronic device 600. In some embodiments, electronic device 600 includes one or more rear-facing cameras 608 and one or more rear depth camera sensors 1002 (e.g., similar to depth camera sensors 175). In some embodiments, one or more rear-facing cameras 608 are integrated with one or more rear depth camera sensors 1002.

Figure 10B:

FIG. 10B illustrates a front-view of electronic device 600 with display 602. In some embodiments, electronic device 600 includes one or more front-facing cameras 606 and one or more front depth camera sensors 1004. In some embodiments, one or more front-facing cameras 606 are integrated with one or more rear depth camera sensors 1004.

In FIG. 10B, electronic device 600 displays, on display 602, an affordance 1006 for launching the image capture application. Further in FIG. 10B, while displaying affordance 1006, electronic device detects (e.g., via a touch-sensitive surface of display 602) an activation 1001 of affordance 1006.

Figure 10C:
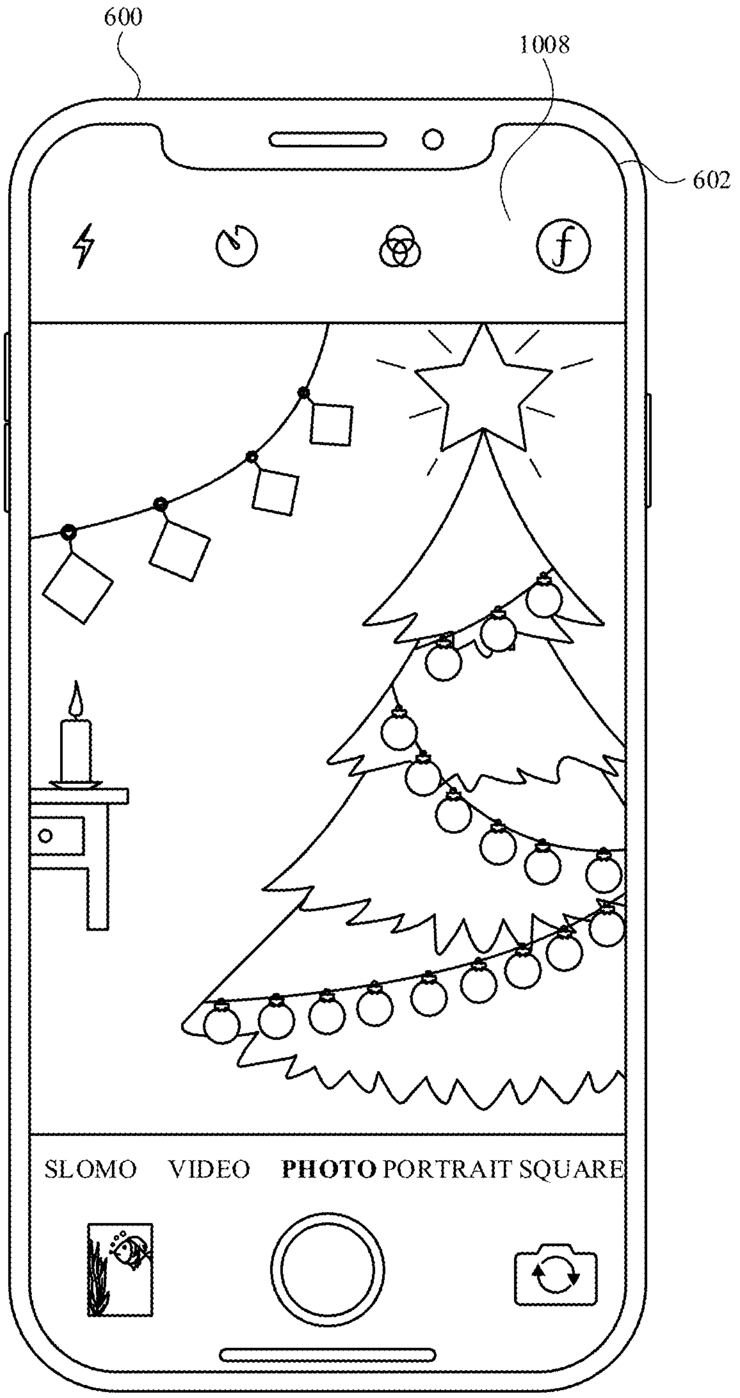

In FIG. 10C, in response to detecting activation 1001 of affordance 1006 for launching the image capture application, electronic device 600 displays, on display 602, a user interface 1008 of the image capture application (e.g., corresponding to user interface 614 and user interface 804). Upon (or prior to/in response to) launching the image capture application, electronic device 600 does not detect an interference (e.g., a magnetic interference or other external interference, such as from an accessory of the device) that may impede with or hinder the operation of one or more sensors (e.g., one or more depth sensors 1002 and 1004 of the device) that are used to perform a simulated image effect function of image capture application (e.g., the simulated depth effect descried above with reference to FIGS. 6A-6T and 8A-8M). As such, electronic device 600 does not display a notification indicative of the presence of an interference.

Figure 10D:
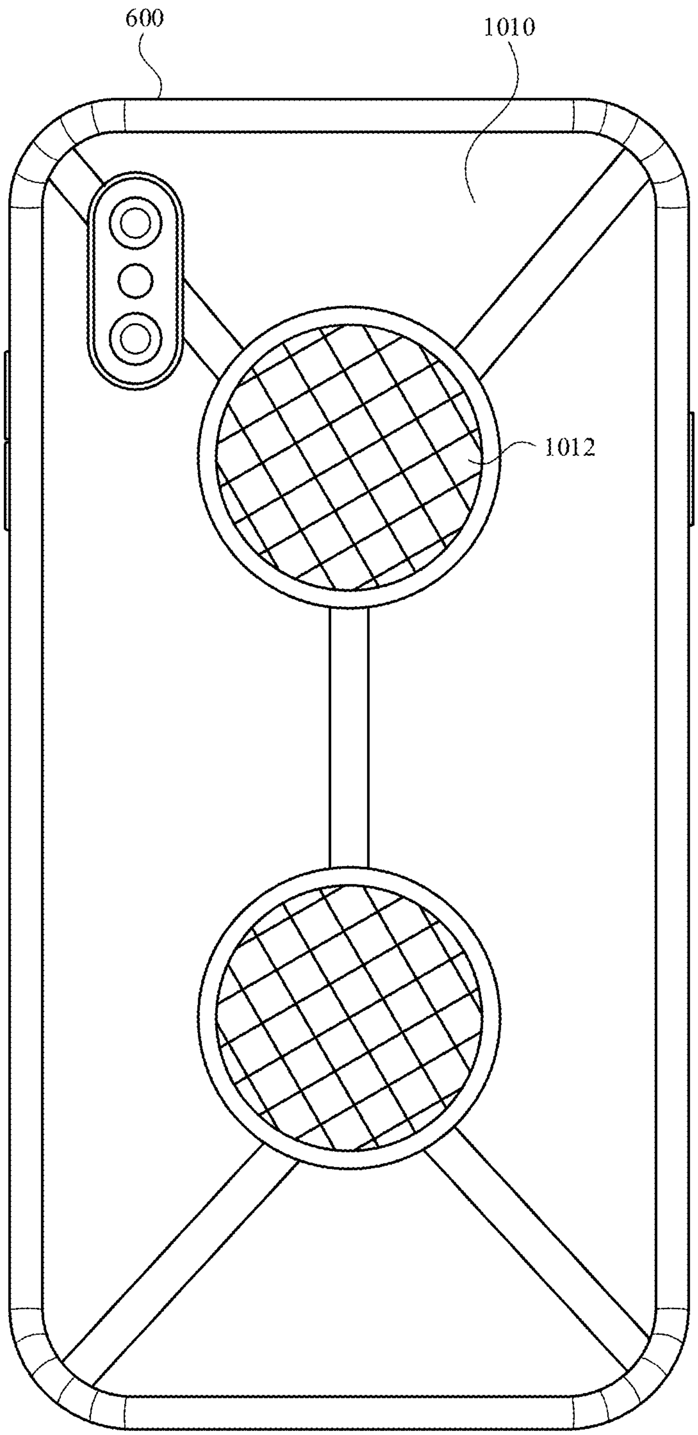

FIG. 10D illustrates a rear-view of electronic device 600, where the device is at least partially covered by a protective case 1010 (e.g., a smartphone case). Protective case 1010 includes a magnetic component 1012 (e.g., for securing the case and device to a holder, such as a car mount; a magnetic component that is part of an external battery case) detectable by one or more sensors of electronic device 600.

Figure 10E:

FIG. 10E illustrates a front-view of electronic device 600 at least partially covered by protective case 1010. In FIG. 10E, electronic device 600 displays, on display 602, affordance 1006 for launching the image capture application. Further in FIG. 10B, while displaying affordance 1006, electronic device detects (e.g., via a touch-sensitive surface of display 602) an activation 1003 of affordance 1006.

Figure 10F:
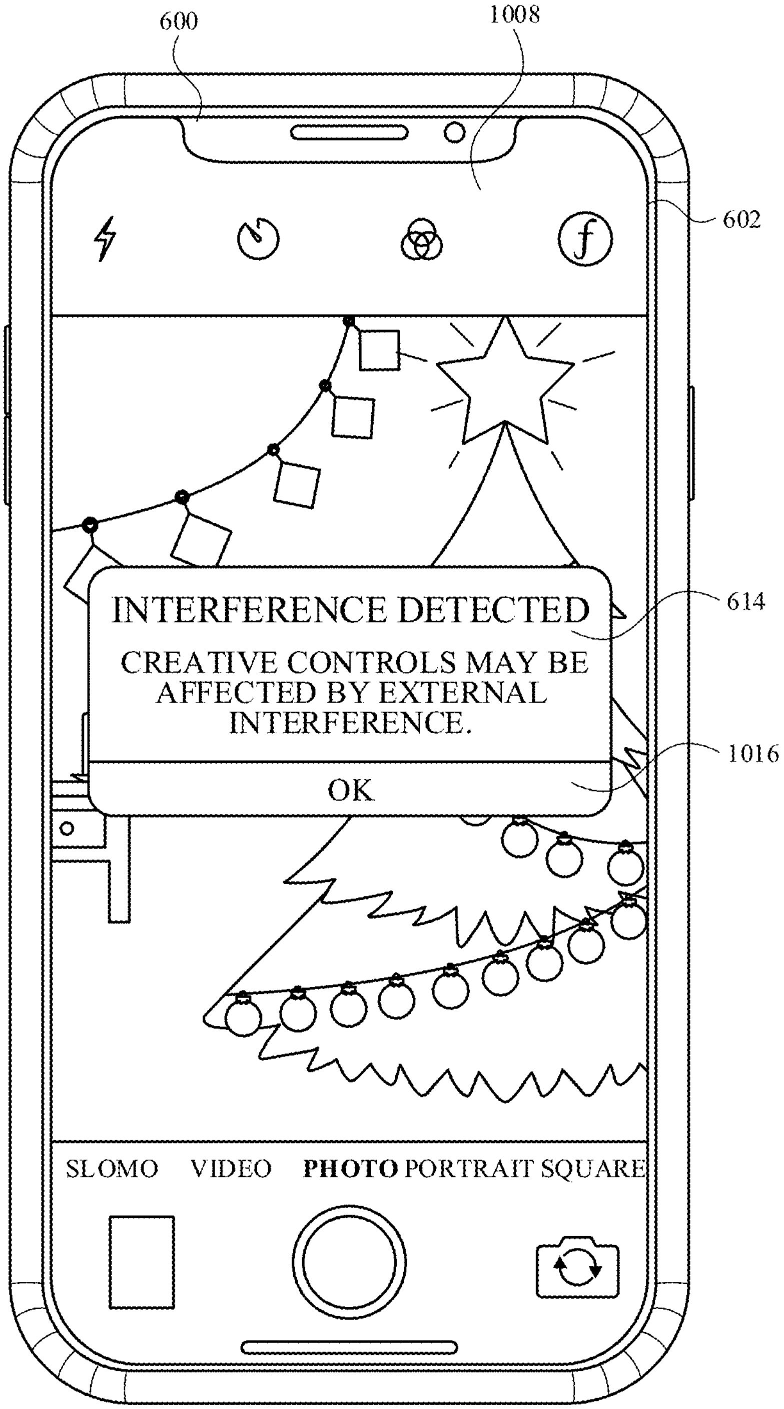

In FIG. 10F, in response to detecting activation 1003 of affordance 1006 for launching the image capture application, electronic device 600 displays, on display 602, user interface 1008 of the image capture application (e.g., corresponding to user interface 614 and user interface 804). Upon (or prior to/in response to) launching the image capture application, electronic device 600 detects an interference (e.g., a magnetic interference) from magnetic component 1012 of protective case 1010.

As shown in FIG. 10F, in response to detecting the interference, electronic device 600 displays (e.g., over user interface 1008 of the image capture application) a notification 1014 indicating that an interference has been detected and, because of the interference, one or more simulated image effects features (e.g., including the simulated depth effect feature described above with reference to FIGS. 6A-6T and 8A-8M) may be affected by the detected interference. In some embodiments, notification 1014 also includes an affordance 1016 for closing the notification and continuing with the use of the simulated image effects features despite the presence of the interference.

In some embodiments, electronic device 600 displays notification 1014 after having previously detected the presence of the interference (e.g., from magnetic component 1012 of protective case 1010) in a predetermined number of instances (e.g., after having launched the image capture application and detected the interference for 3, 5, or 7 times). Thus, in some embodiments, if there were no previous instances of detection of the interference, electronic device 600 forgoes displaying notification 1014 upon launching the image capture application despite having detected the interference from magnetic component 1012 of protective case 1010.

In some embodiments, if notification 1014 has already previously been presented on the device, electronic device 600 displays a new notification 1014 after detecting the presence of the interference (e.g., from magnetic component 1012 of protective case 1010) in a greater number of instances than when notification 1014 was previously displayed. For example, if previous notification 1014 was displayed after having detected the interference upon 3 previous launches of the image capture application, electronic device 600 forgoes displaying new notification 1014 until having detected the interference in 5 previous launches of the image capture application.

In some embodiments, if notification 1014 has already been presented on the device a predetermined number of times, electronic device 600 forgoes presenting the notification despite subsequent instances of detection of the interference.

In some embodiments, in response to detecting an activation of affordance 1016, electronic device 600 changes a mode of one or more simulated image effects (e.g., including the simulated depth effect) such that one or more features of an image effect becomes unavailable or stripped down for use.

FIG. 11 is a flow diagram illustrating a method for managing user interfaces for indicating an interference to adjusting simulated image effects, in accordance with some embodiments. Method 1100 is performed at a device (e.g., 100, 300, 500, 600) with a display and one or more sensors (e.g., one or more cameras, an interference detector capable of detecting an interference, such as magnetic interference, originating from a source that is external to the electronic device), including one or more cameras. Some operations in method 1100 are, optionally, combined, the orders of some operations are, optionally, changed, and some operations are, optionally, omitted.

As described below, method 1100 provides an intuitive way for managing user interfaces for simulated depth effects. The method reduces the cognitive burden on a user for managing and navigating user interfaces for simulated depth effects, thereby creating a more efficient human-machine interface. For battery-operated computing devices, enabling a user to navigate user interfaces faster and more efficiently by providing easy management of user interfaces for simulating depth effects conserves power and increases the time between battery charges.

While displaying, on the display (e.g., 602), a user interface of a camera application (e.g., 1008), the electronic device (e.g., 600) detects (1102), via the one or more sensors, external interference (e.g., from 1012) that will impair operation of a respective function of the one or more cameras (e.g., 606, 608) (e.g., magnetic interference; an interference that affects one or more camera related functions of the electronic device (e.g., one or more depth effect-related functions)) (e.g., from an accessory attached to, affixed to, covering, or placed near the electronic device, such as a protective case of the device or an external attachment on the device). Automatically detecting the external interference that will impair operation of a respective function of the one or more cameras reduces the number of inputs required from the user to control the device by enabling the user to bypass having to manually check whether there are external interferences affecting one or more functionality of the device. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Further, automatically detecting the external interference that will impair operation of a respective function of the one or more cameras and notifying the user of the detection provides the user with the option to correct the issue while still allowing the device to continue to operate at a reduced level of operation. This in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the respective function is (1104) a focus function of the one or more cameras (e.g., 606, 608) of the electronic device (e.g., 600).

In some embodiments, the interference is (1106) magnetic interference (e.g., from 1012).

In some embodiments, the interference is (1108) from (e.g., is caused by or is detected because of) an accessory (e.g., 1010) of the electronic device (e.g., 600) (e.g., a protective outer case or cover (e.g., a case or cover that incorporates a battery) for the electronic device, a magnetic sticker or attachment piece affixed to/attached to the electronic device).

In some embodiments, detecting the external interference (e.g. from 1012) that will impair the operation of the respective function of the one or more cameras (e.g., 606, 608) includes detecting the external interference upon displaying a user interface (e.g., 1008) for the camera application (e.g., in response to a user request to display a user interface for the camera application) on the electronic device. In some embodiments, the electronic device (e.g., 600) detects for the external interference that will impair the operation of the respective function of the one or more cameras only when the user interface for the camera application is displayed, and does not detect for the external interference after the user interface for the camera application has been displayed or when the user interface for the camera application is not displayed on the electronic device. Detecting for the external interference only when the user interface for the camera application is displayed, and not detecting for the external interference after the user interface for the camera application has been displayed or when the user interface for the camera application is not displayed reduces power consumption by detecting for the external interference when the functionality that may be affected by the external interference may be used on the device. Reducing power consumption enhances the operability of the device by improving the battery life of the device.

In response to detecting (1110) the interference (e.g., from 1012) external to the electronic device (e.g., 600), in accordance with a determination that a first criteria has been satisfied (e.g., including the current occurrence, at least a predetermined number of previous occurrences of the interference has been detected, such as occurrences detected when the camera application was previously launched on the electronic device), the electronic device displays (1112), on the display (e.g., 602), a notification (e.g., 1014) indicating that an operation mode (e.g., a depth effect mode) of the one or more cameras has been changed to reduce an impact of the external interference on the respective function of the one or more cameras (e.g., 606, 608). Displaying a notification indicating that an operation mode (e.g., a depth effect mode) of the one or more cameras has been changed to reduce an impact of the external interference on the respective function of the one or more cameras improves visual feedback by enabling the user to quickly and easily recognize that the device has changed an operation mode (e.g., a depth effect mode) of the one or more cameras to reduce an impact of the external interference. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting (1110) the interference external to the electronic device (e.g., 600), in accordance with a determination that the first criteria has not been satisfied (e.g., including the current occurrence, fewer than the predetermined number of previous occurrences of the interference has been detected), the electronic device (e.g., 600) forgoes displaying (1120), on the display (e.g., 602), the notification (e.g., 1014) indicating that the operation mode (e.g., a depth effect mode) of the one or more cameras (e.g., 606, 608) has been changed. Forgoing displaying the notification if fewer than the predetermined number of previous occurrences of the interference has been detected enhances improves device functionality by forgoing providing notifications for one-off events of interference detection (as opposed to persistent interference detection from, for example, an accessory of the device). Forgoing providing unnecessary notifications enhances user convenience and the operability of the device and makes the user-device interface more efficient which, additionally, reduces power usage and improves battery life of the device by enabling the user to use the device more quickly and efficiently.

In some embodiments, the first criteria includes (1114) a requirement that is met when a first predetermined amount (e.g., 5, 7, 11) of (discrete instances of) occurrences of detecting the external interference (e.g., from 1012) by the electronic device (e.g., 600). Thus, in some embodiments, the predetermined number of discrete detections of the external interface is required to trigger display of the notification. In some embodiments, a discrete occurrence of detection of the external interference occurs when the user attempts to use the camera application in a manner that would make use of the respective function of the one or more cameras and the device checks for external interference to determine whether the device is able to use the respective function of the one or more cameras and determines that the external interference is present. In some embodiments, the device checks for the external interference at predetermined intervals (e.g., once per hour, once per day, the first time each day that the camera application is used).

In some embodiments, the first predetermined number is (1116) dependent on (e.g., changes based on) the number of times the notification (e.g., 1014) has previously been displayed on the electronic device (e.g., 600). In some embodiments, the first predetermined number of detections of the external interface required to trigger the notification progressively increases based on the number of notifications that have already been displayed by the electronic device. For example, if a particular number (e.g., 3) of discrete detections of the external interference is required to trigger display of the first notification, a larger number (e.g., 5) of discrete detections of the external interference is required to trigger display of the second notification, and a yet greater number (e.g., 7 of discrete detections of the external interference is required to trigger display of the third notification. Progressively increasing the first predetermined number of detections of the external interface required to trigger the notification enhances user convenience by forgoing displaying the notification too frequently even when the user may already be aware of the interference (based on the previous notification) but is choosing to ignore the interference. Enhancing user convenience enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying, on the display (e.g., 602), the notification (e.g., 1014) includes displaying the notification in accordance with a determination that less than a second predetermined number of the notifications has previously been displayed on the electronic device (e.g., 600). In some embodiments, if at least the second predetermined number of notifications has previously been displayed on the electronic device, the electronic device forgoes displaying the notification (regardless of whether the first criteria has been satisfied).

In some embodiments, the change (1118) to the operation mode of the one or more cameras to reduce the impact of the external interference (e.g., from 1012) on the respective function of the one or more cameras (e.g., 606, 608) includes reducing (or lower, diminishing) the responsiveness of one or more functions (e.g., simulated depth effect-related functions, optical image stabilization, autofocus, and/or operations that require precise movements of mechanical components that can be adversely affected by the presence of strong magnetic fields in the proximity of the mechanical components) of the one or more cameras (or disabling one or more of the functions altogether), wherein the one or more functions correspond to functions that cannot be reliably executed by the one or more cameras while the external interference is being detected by the electronic device.

Note that details of the processes described above with respect to method 1100 (e.g., FIG. 11) are also applicable in an analogous manner to the methods described above and below. For example, method 700 optionally includes one or more of the characteristics of the various methods described above with reference to method 1100. For example, adjusting a simulated depth effect using a depth adjustment slider, as described in method 700, can be affected by magnetic interference, which can impede with one or more depth sensors used for simulating depth effects. For another example, method 900 optionally includes one or more of the characteristics of the various methods described above with reference to method 1100. For example, applying a simulated depth effect to objects within an image representation, as described in method 900, can be affected by magnetic interference, which can impede with one or more depth sensors used for simulating depth effects. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the functionality and versatility of simulated image effect features that can be applied to live feed and/or stored photos and images. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recognize a person or subject within a captured image or photo. Accordingly, use of such personal information data enables users to more easily recognize the content of a captured image or photo and to organize such captures images or photos. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of detection and recognition of a person or subject within an image or photo, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images or photos can be organized based on non-personal information data or a bare minimum amount of personal information or publicly available information, such as the date and time associated with the image or photo.

What is claimed is:

1. An electronic device, comprising:

a display;

one or more input devices;

one or more processors; and memory storing one or more programs configured to be executed by the one or more processors, the one or more programs including instructions for:

receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including:

distorting a first portion of the representation of image data that has a first depth in a first manner, wherein distorting the first portion of the representation of image data in the first manner comprises distorting the first portion by a first degree of distortion and wherein the first manner is determined based on a distance of the first portion from a predefined portion of the representation of image data; and distorting a second portion of the representation of image data that has the first depth in a second manner that is different from the first manner, wherein distorting the second portion of the representation of image data in the second manner comprises distorting the second portion by a second degree of distortion that is greater than the first degree of distortion and wherein the second manner is determined based on a distance of the second portion from the predefined portion of the representation of image data.

2. The electronic device of claim 1, wherein displaying, on the display, the representation of image data with the simulated depth effect further includes:

distorting a third portion of the representation of image data that is a same distance from the predefined portion as the first portion and has a second depth that is different from the first depth in the first manner with a magnitude determined based on the second depth; and distorting a fourth portion of the representation of image data that is a same distance from the predefined portion as the second portion and has the second depth in the second manner with a magnitude determined based on the second depth.

3. The electronic device of claim 1, wherein displaying, on the display, the representation of image data with the simulated depth effect further includes:

distorting one or more portions of the representation of image data, that is a same distance from the predefined portion as the first portion and has the first depth, in the first manner.

4. The electronic device of claim 1, wherein:

distorting the first portion of the representation of image data in the first manner comprises distorting the first portion based on a first distortion shape; and distorting the second portion of the representation of image data in the second manner comprises distorting the second portion based on a second distortion shape different from the first distortion shape.

5. The electronic device of claim 1, wherein receiving, via the one or more input devices, the request to apply the simulated depth effect to the representation of image data comprises:

detecting, via the one or more input devices, one or more inputs selecting a value of an image distortion parameter, wherein distorting the representation of image data is based on one or more user inputs selecting a value of an image distortion parameter.

6. The electronic device of claim 5, wherein selecting a different value for the image distortion parameter causes a first change to the first portion of the representation of the image data and causes a second change to the second portion of the representation of the image data, wherein the first change is different from the second change and the first change and the second change both include a same type of change.

7. The electronic device of claim 1, wherein:

distorting the first portion in the first manner comprises blurring the first portion by a first magnitude;

distorting the second portion in the second manner comprises blurring the second portion by a second magnitude;

in accordance with a determination that the first portion is a greater distance from the predefined portion than a second distance is from the predefined portion, the first magnitude is greater than the second magnitude; and in accordance with a determination that the second portion is a greater distance from the predefined portion than the first portion is from the predefined portion, the second magnitude is greater than the first magnitude.

8. The electronic device of claim 1, the one or more programs including instructions for:

prior to receiving the request to apply the simulated depth effect to the representation of image data, displaying, on the display, the representation of image data; and while displaying the representation of image data, detecting, using the image data, a presence of the subject within the representation of image data.

9. The electronic device of claim 1, wherein displaying, on the display, the representation of image data with the simulated depth effect further comprises:

distorting the first portion of the representation of image data and the second portion of the representation of image data without distorting a portion of the representation of image data corresponding to the subject.

10. The electronic device of claim 1, wherein:

distorting the first portion of the representation of image data includes distorting the first portion in accordance with a determination that the first portion does not correspond to the subject; and distorting the second portion of the representation of image data includes distorting the second portion in accordance with a determination that the second portion does not correspond to the subject.

11. The electronic device of claim 1, the one or more programs including instructions for:

in response to receiving the request to apply the simulated depth effect to the representation of image data, identifying, based on the image data, one or more objects within the representation of image data that are associated with light-emitting objects.

12. The electronic device of claim 11, wherein displaying, on the display, the representation of image data with the simulated depth effect further comprises:

changing an appearance of one or more portions of the representation of image data that are associated with light-emitting objects in a third manner relative to the one or more portions of the representation of image data that are not associated with light-emitting objects.

13. The electronic device of claim 12, wherein changing the appearance of objects in the representation of image data that are associated with light-emitting objects in the third manner includes one or more of:

increasing a brightness of the one or more portions of the representation of image data that are associated with light-emitting objects relative to other portions of the representation of image data that are not associated with light-emitting objects;

increasing a saturation of the one or more portions of the representation of image data that are associated with light-emitting objects relative to other portions of the representation of image data that are not associated with light-emitting objects; and increasing a size of the one or more portions of the representation of image data that are associated with light-emitting objects relative to other portions of the representation of image data that are not associated with light-emitting objects.

14. The electronic device of claim 12, the one or more programs including instructions for:

detecting, via the one or more input devices, one or more inputs directed to changing a value of an image distortion parameter, wherein distorting the representation of image data is based on one or more user inputs selecting a value of an image distortion parameter; and in response to detecting the one or more inputs directed to changing the value of the image distortion parameter, changing a magnitude of change of the appearance of one or more portions of the representation of image data that are associated with light-emitting objects relative to other portions of the representation of image data that are not associated with light-emitting objects.

15. A non-transitory computer-readable storage medium storing one or more programs configured to be executed by one or more processors of an electronic device with a display and one or more input devices, the one or more programs including instructions for:

receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including:

distorting a first portion of the representation of image data that has a first depth in a first manner, wherein distorting the first portion of the representation of image data in the first manner comprises distorting the first portion by a first degree of distortion and wherein the first manner is determined based on a distance of the first portion from a predefined portion of the representation of image data; and distorting a second portion of the representation of image data that has the first depth in a second manner that is different from the first manner, wherein distorting the second portion of the representation of image data in the second manner comprises distorting the second portion by a second degree of distortion that is greater than the first degree of distortion and wherein the second manner is determined based on a distance of the second portion from the predefined portion of the representation of image data.

16. The non-transitory computer-readable storage medium of claim 15, wherein displaying, on the display, the representation of image data with the simulated depth effect further includes:

distorting a third portion of the representation of image data that is a same distance from the predefined portion as the first portion and has a second depth that is different from the first depth in the first manner with a magnitude determined based on the second depth; and distorting a fourth portion of the representation of image data that is a same distance from the predefined portion as the second portion and has the second depth in the second manner with a magnitude determined based on the second depth.

17. The non-transitory computer-readable storage medium of claim 15, wherein displaying, on the display, the representation of image data with the simulated depth effect further includes:

distorting one or more portions of the representation of image data, that is a same distance from the predefined portion as the first portion and has the first depth, in the first manner.

18. The non-transitory computer-readable storage medium of claim 15, wherein:

distorting the first portion of the representation of image data in the first manner comprises distorting the first portion based on a first distortion shape; and distorting the second portion of the representation of image data in the second manner comprises distorting the second portion based on a second distortion shape different from the first distortion shape.

19. The non-transitory computer-readable storage medium of claim 15, wherein receiving, via the one or more input devices, the request to apply the simulated depth effect to the representation of image data comprises:

detecting, via the one or more input devices, one or more inputs selecting a value of an image distortion parameter, wherein distorting the representation of image data is based on one or more user inputs selecting a value of an image distortion parameter.

20. The non-transitory computer-readable storage medium of claim 19, wherein selecting a different value for the image distortion parameter causes a first change to the first portion of the representation of the image data and causes a second change to the second portion of the representation of the image data, wherein the first change is different from the second change and the first change and the second change both include a same type of change.

21. The non-transitory computer-readable storage medium of claim 15, wherein:

distorting the first portion in the first manner comprises blurring the first portion by a first magnitude;

distorting the second portion in the second manner comprises blurring the second portion by a second magnitude;

in accordance with a determination that the first portion is a greater distance from the predefined portion than a second distance is from the predefined portion, the first magnitude is greater than the second magnitude; and in accordance with a determination that the second portion is a greater distance from the predefined portion than the first portion is from the predefined portion, the second magnitude is greater than the first magnitude.

22. The non-transitory computer-readable storage medium of claim 15, the one or more programs including instructions for:

prior to receiving the request to apply the simulated depth effect to the representation of image data, displaying, on the display, the representation of image data; and while displaying the representation of image data, detecting, using the image data, a presence of the subject within the representation of image data.

23. The non-transitory computer-readable storage medium of claim 15, wherein displaying, on the display, the representation of image data with the simulated depth effect further comprises:

distorting the first portion of the representation of image data and the second portion of the representation of image data without distorting a portion of the representation of image data corresponding to the subject.

24. The non-transitory computer-readable storage medium of claim 15, wherein:

distorting the first portion of the representation of image data includes distorting the first portion in accordance with a determination that the first portion does not correspond to the subject; and distorting the second portion of the representation of image data includes distorting the second portion in accordance with a determination that the second portion does not correspond to the subject.

25. The non-transitory computer-readable storage medium of claim 15, the one or more programs including instructions for:

in response to receiving the request to apply the simulated depth effect to the representation of image data, identifying, based on the image data, one or more objects within the representation of image data that are associated with light-emitting objects.

26. The non-transitory computer-readable storage medium of claim 25, wherein displaying, on the display, the representation of image data with the simulated depth effect further comprises:

changing an appearance of one or more portions of the representation of image data that are associated with light-emitting objects in a third manner relative to the one or more portions of the representation of image data that are not associated with light-emitting objects.

27. The non-transitory computer-readable storage medium of claim 26, wherein changing the appearance of objects in the representation of image data that are associated with light-emitting objects in the third manner includes one or more of:

increasing a brightness of the one or more portions of the representation of image data that are associated with light-emitting objects relative to other portions of the representation of image data that are not associated with light-emitting objects;

increasing a saturation of the one or more portions of the representation of image data that are associated with light-emitting objects relative to other portions of the representation of image data that are not associated with light-emitting objects; and increasing a size of the one or more portions of the representation of image data that are associated with light-emitting objects relative to other portions of the representation of image data that are not associated with light-emitting objects.

28. The non-transitory computer-readable storage medium of claim 26, the one or more programs including instructions for:

detecting, via the one or more input devices, one or more inputs directed to changing a value of an image distortion parameter, wherein distorting the representation of image data is based on one or more user inputs selecting a value of an image distortion parameter; and in response to detecting the one or more inputs directed to changing the value of the image distortion parameter, changing a magnitude of change of the appearance of one or more portions of the representation of image data that are associated with light-emitting objects relative to other portions of the representation of image data that are not associated with light-emitting objects.

29. A method, comprising:

at an electronic device with a display and one or more input devices:

receiving, via the one or more input devices, a request to apply a simulated depth effect to a representation of image data, wherein depth data for a subject within the representation of image data is available; and in response to receiving the request to apply the simulated depth effect to the representation of image data, displaying, on the display, the representation of image data with the simulated depth effect, including:

distorting a first portion of the representation of image data that has a first depth in a first manner, wherein distorting the first portion of the representation of image data in the first manner comprises distorting the first portion by a first degree of distortion and wherein the first manner is determined based on a distance of the first portion from a predefined portion of the representation of image data; and distorting a second portion of the representation of image data that has the first depth in a second manner that is different from the first manner, wherein distorting the second portion of the representation of image data in the second manner comprises distorting the second portion by a second degree of distortion that is greater than the first degree of distortion and wherein the second manner is determined based on a distance of the second portion from the predefined portion of the representation of image data.

30. The method of claim 29, wherein displaying, on the display, the representation of image data with the simulated depth effect further includes:

distorting a third portion of the representation of image data that is a same distance from the predefined portion as the first portion and has a second depth that is different from the first depth in the first manner with a magnitude determined based on the second depth; and distorting a fourth portion of the representation of image data that is a same distance from the predefined portion as the second portion and has the second depth in the second manner with a magnitude determined based on the second depth.

31. The method of claim 29, wherein displaying, on the display, the representation of image data with the simulated depth effect further includes:

distorting one or more portions of the representation of image data, that is a same distance from the predefined portion as the first portion and has the first depth, in the first manner.

32. The method of claim 29, wherein:

distorting the first portion of the representation of image data in the first manner comprises distorting the first portion based on a first distortion shape; and distorting the second portion of the representation of image data in the second manner comprises distorting the second portion based on a second distortion shape different from the first distortion shape.

33. The method of claim 29, wherein receiving, via the one or more input devices, the request to apply the simulated depth effect to the representation of image data comprises:

detecting, via the one or more input devices, one or more inputs selecting a value of an image distortion parameter, wherein distorting the representation of image data is based on one or more user inputs selecting a value of an image distortion parameter.

34. The method of claim 33, wherein selecting a different value for the image distortion parameter causes a first change to the first portion of the representation of the image data and causes a second change to the second portion of the representation of the image data, wherein the first change is different from the second change and the first change and the second change both include a same type of change.

35. The method of claim 29, wherein:

distorting the first portion in the first manner comprises blurring the first portion by a first magnitude;

distorting the second portion in the second manner comprises blurring the second portion by a second magnitude;

in accordance with a determination that the first portion is a greater distance from the predefined portion than a second distance is from the predefined portion, the first magnitude is greater than the second magnitude; and in accordance with a determination that the second portion is a greater distance from the predefined portion than the first portion is from the predefined portion, the second magnitude is greater than the first magnitude.

36. The method of claim 29, further comprising:

prior to receiving the request to apply the simulated depth effect to the representation of image data, displaying, on the display, the representation of image data; and while displaying the representation of image data, detecting, using the image data, a presence of the subject within the representation of image data.

37. The method of claim 29, wherein displaying, on the display, the representation of image data with the simulated depth effect further comprises:

distorting the first portion of the representation of image data and the second portion of the representation of image data without distorting a portion of the representation of image data corresponding to the subject.

38. The method of claim 29, wherein:

distorting the first portion of the representation of image data includes distorting the first portion in accordance with a determination that the first portion does not correspond to the subject; and distorting the second portion of the representation of image data includes distorting the second portion in accordance with a determination that the second portion does not correspond to the subject.

39. The method of claim 29, further comprising:

in response to receiving the request to apply the simulated depth effect to the representation of image data, identifying, based on the image data, one or more objects within the representation of image data that are associated with light-emitting objects.

40. The method of claim 39, wherein displaying, on the display, the representation of image data with the simulated depth effect further comprises:

changing an appearance of one or more portions of the representation of image data that are associated with light-emitting objects in a third manner relative to the one or more portions of the representation of image data that are not associated with light-emitting objects.

41. The method of claim 40, wherein changing the appearance of objects in the representation of image data that are associated with light-emitting objects in the third manner includes one or more of:

increasing a brightness of the one or more portions of the representation of image data that are associated with light-emitting objects relative to other portions of the representation of image data that are not associated with light-emitting objects;

increasing a saturation of the one or more portions of the representation of image data that are associated with light-emitting objects relative to other portions of the representation of image data that are not associated with light-emitting objects; and increasing a size of the one or more portions of the representation of image data that are associated with light-emitting objects relative to other portions of the representation of image data that are not associated with light-emitting objects.

42. The method of claim 40, further comprising:

detecting, via the one or more input devices, one or more inputs directed to changing a value of an image distortion parameter, wherein distorting the representation of image data is based on one or more user inputs selecting a value of an image distortion parameter; and in response to detecting the one or more inputs directed to changing the value of the image distortion parameter, changing a magnitude of change of the appearance of one or more portions of the representation of image data that are associated with light-emitting objects relative to other portions of the representation of image data that are not associated with light-emitting objects.

* * * * *